(12) United States Patent
Merg et al.

(10) Patent No.: US 12,738,110 B2
(45) Date of Patent: Sep. 15, 2026

(54) METHOD AND SYSTEM FOR CONFIGURING USER INTERFACE WITH PID FACET SELECTORS

(71) Applicant: Snap-on Incorporated, Kenosha, WI (US)

(72) Inventors: Patrick S. Merg, Hollister, CA (US); Jacob G. Foreman, Hollister, CA (US); Brett A. Kelley, San Jose, CA (US)

(73) Assignee: Snap-on Incorporated, Kenosha, WI (US)

( * ) Notice: Subject to any disclaimer, the term of this patent is extended or adjusted under 35 U.S.C. 154(b) by 172 days.

(21) Appl. No.: 18/484,071

(22) Filed: Oct. 10, 2023

(65) Prior Publication Data

US 2025/0118118 A1 Apr. 10, 2025

(51) Int. Cl.
*G07C 5/00* (2006.01)
*G06F 3/0482* (2013.01)
(Continued)

(52) U.S. Cl.
CPC ......... *G07C 5/0825* (2013.01); *G06F 3/0482* (2013.01); *G06F 3/0484* (2013.01)

(58) Field of Classification Search
CPC .............. G07C 5/0825; G07C 2205/02; G07C 5/0808; G06F 3/0482; G06F 3/0484; G06Q 50/40
See application file for complete search history.

(56) References Cited

U.S. PATENT DOCUMENTS 5,705,743 A * 1/1998 Leonard ................. G01D 3/022 73/114.61
8,190,648 B1 * 5/2012 Tomic ..................... G06F 16/20 707/805

(Continued)

FOREIGN PATENT DOCUMENTS

CN 119335994 A * 1/2025 ......... G05B 23/0221
WO WO-2008074160 A1 * 6/2008 ............. G06Q 10/06

OTHER PUBLICATIONS

International Searching Authority; PCT Notification of transmittal of the international search report and the written opinion of the International Searching Authority, or the declaration, with international search report and written opinion concerning international application No. PCT/US2024/046832; mailing date Nov. 19, 2024.

(Continued)

*Primary Examiner* — Peter D Nolan
*Assistant Examiner* — Peter Y Ning
(74) *Attorney, Agent, or Firm* — McDonnell Boehnen Hulbert & Berghoff LLP

(57) ABSTRACT

A method and system for servicing a vehicle using PID facet selectors. The method includes outputting a GUI including a PID facet selector and a first PID group container including sub-containers corresponding to a respective PID. The method includes requesting PIDs and outputting, within the GUI, parameter values received in response to the request(s). Each parameter corresponds to one of the PIDs. The method includes outputting, within the GUI in response to the selection of the PID facet selector, a second set of containers including a second PID group container including sub-containers corresponding to a respective PID. The method includes outputting, within the GUI, parameter values received in response to a second portion of the requests. Each parameter value received in response to the second portion of the requests corresponds to one of the PIDs within the second PID group.

23 Claims, 68 Drawing Sheets

(51) Int. Cl.
*G06F 3/0484* (2022.01)
*G07C 5/08* (2006.01)

(56) References Cited

U.S. PATENT DOCUMENTS

| | | | | |
|---|---|---|---|---|
| 9,563,985 | B2 * | 2/2017 | Fish | G06F 3/04886 |
| 10,157,347 | B1 * | 12/2018 | Kasturi | G06N 20/10 |
| 11,386,401 | B2 * | 7/2022 | Johnson | G06Q 30/0283 |
| 2004/0172177 | A1 * | 9/2004 | Nagai | G07C 5/085 701/33.4 |
| 2009/0222412 | A1 * | 9/2009 | Lee | G06F 16/2428 707/999.102 |
| 2011/0288954 | A1 * | 11/2011 | Bertosa | G06Q 30/0639 701/31.4 |
| 2014/0075356 | A1 * | 3/2014 | Gray | G07C 5/008 715/771 |
| 2014/0277914 | A1 * | 9/2014 | Fish | G06F 3/04886 701/31.4 |
| 2014/0282256 | A1 * | 9/2014 | Fish | G07C 5/008 715/835 |
| 2014/0316621 | A1 * | 10/2014 | Martin | F02P 23/04 180/65.28 |
| 2015/0039176 | A1 * | 2/2015 | Fish | G07C 5/008 701/31.6 |
| 2016/0300402 | A1 * | 10/2016 | Nassar | G07C 5/008 |
| 2018/0232450 | A1 * | 8/2018 | Bivens | G06F 16/93 |
| 2019/0197800 | A1 | 6/2019 | Lewis et al. | |
| 2020/0201848 | A1 * | 6/2020 | Srinivasan | G06F 16/2428 |
| 2021/0005031 | A1 * | 1/2021 | Brauer | G07C 5/0841 |
| 2022/0414174 | A1 * | 12/2022 | Banipal | G06F 16/90332 |
| 2023/0192112 | A1 | 6/2023 | Merg et al. | |
| 2023/0252824 | A1 | 8/2023 | Merg et al. | |
| 2023/0252830 | A1 | 8/2023 | Merg et al. | |
| 2024/0194002 | A1 * | 6/2024 | Murphy | G07C 5/0825 |

OTHER PUBLICATIONS

Snap-on Incorporated; 5 Gas Exhaust Probe; downloaded from the world wide web at https://shop.snapon.com/product/Handheld-Gas-Analyzers/Five-Gas-Exhaust-Probe/HHGA-9 on Sep. 8, 2023.

Snap-on Incorporated; Adaptor, Pressure Transducer; downloaded from the world wide web at https://shop.snapon.com/product/Pressure-Transducers-Kits/Adaptor%2C-Pressure-Transducer/EEMS324PSA on Sep. 8, 2023.

Snap-on Incorporated; Motorcycle Exhaust Probe; downloaded from the world wide web at https://shop.snapon.com/product/Handheld-Gas-Analyzers/Motorcycle-Exhaust-Probe/HHGA-8 on Sep. 8, 2023.

Snap-on Incorporated; Pressure Adaptor (for Digital Multimeters) downloaded from the world wide web at https://shop.snapon.com/product/Multimeter-Accessories/Pressure-Adaptor-(for-Digital-Multimeters)/EEDM5030 on Sep. 8, 2023.

Snap-on Incorporated; Pressure Transducer with Cable, 0-500 PSI; downloaded from the world wide web at ttps://shop.snapon.com/product/VERDICT-Accessories/Pressure-Transducer-with-Cable%2C-0-500-PSI/EEPV302AT on Sep. 8, 2023.

Snap-on Incorporated; Standard Exhaust Probe; downloaded from the world wide web at https://shop.snapon.com/product/Handheld-Gas-Analyzers/Standard-Exhaust-Probe/HHGA-7 on Sep. 8, 2023.

Snap-on Incorporated; Temperature Adaptor and Probe; downloaded from the world wide web at https://shop.snapon.com/product/Temperature-Probes-and-Adaptors/Temperature-Adaptor-and-Probe/EEDMTEMP-1 on Sep. 8, 2023.

Test Products International Inc.; SP555 Wireless Air Velocity Probe; downloaded from the world wide web at https://www.testproductsintl.com/indoor-air-quality-iaq-2/air-velocity-temperature/sp555-wireless-air-velocity-probe/ on Sep. 8, 2023.

* cited by examiner

| FIG. 8A | FIG. 8B | FIG. 8C | FIG. 8D |
|---|---|---|---|

| VEHICLE | SYSTEM | COMP. | SYMPTOM | PID | THRESHOLD |
|---|---|---|---|---|---|
| V1 | S1 | C1 | $A01 | $01 | T1 |
| V1 | S1 | C1 | $A02 | $02 | T1 |
| V1 | S1 | C2 | $A03 | $03 | T2, T3 |
| V1 | S1 | C2 | $A04 | $04 | T4 |
| V1 | S1 | C2 | $A05 | $05 | T5 |
| V1 | S1 | C2 | $A05 | $06 | T6 |
| V1 | S1 | C2 | $A05 | $07 | T7 |
| V1 | S1 | C2 | $A05 | $08 | T8, T9 |
| V1 | S1 | C3 | $A06 | $09 | T10, T11 |
| V1 | S1 | C3 | $A07 | $0A | T10, T11 |
| V1 | S1 | C3 | $A08 | $0B | T10, T11 |
| V1 | S1 | C3 | $A09 | $0C | T10, T11 |
| V1 | S1 | C3 | $A0A | $0D | T10, T11 |
| V1 | S1 | C3 | $A0B | $0E | T10, T11 |
| V1 | S1 | C3 | $A0C | $0F | T10, T11 |
| V1 | S1 | C3 | $A0D | $10 | T10, T11 |
| V1 | S1 | C3 | $A0E | $11 | T10, T11 |
| V1 | S1 | C3 | $A0F | $12 | T10, T11 |
| V1 | S1 | C3 | $A10 | $13 | T10, T11 |
| V1 | S1 | C3 | $A11 | $14 | T10, T11 |
| V1 | S1 | C4 | $A12 | $15 | T12, T13 |
| V1 | S1 | C4 | $A13 | $16 | T12, T13 |
| V1 | S1 | C4 | $A14 | $17 | T12, T13 |
| V1 | S1 | C4 | $A15 | $18 | T12, T13 |
| V1 | S2 | C5 | $C01 | $19 | T14, T15 |
| V1 | S2 | C5 | $C02 | $1A | T14, T15 |
| V1 | S2 | C5 | $C03 | $1B | T14, T15 |
| V1 | S2 | C5 | $C04 | $1C | T14, T15 |
| V1 | S1 | C1 | $A16 | $1D | T16, T17 |
| V1 | S1 | C1 | $A17 | $1E | T16, T17 |

| PID NAME | GROUP | SENSOR |
|---|---|---|
| AIR MASS SENSOR LEFT (V) | INTAKE AIRFLOW | |
| AIR MASS SENSOR RIGHT (V) | INTAKE AIRFLOW | |
| COOLANT TEMP. (ENGINE) (°C) | ENG. COOL.TEMP. | |
| COOL. TEMP. (COOLER OUTPUT)(°F) | ENG. COOL.TEMP. | |
| COOL. TEMP. (RADIATOR OUTLET) (°F) | ENG. COOL.TEMP. | |
| COOL. TEMP. (RADIATOR OUTLET) (°C) | ENG. COOL.TEMP. | |
| COOL. TEMP. (RADIATOR OUTPUT) (V) | ENG. COOL.TEMP. | |
| COOLANT TEMP. VOLTAGE (V) | ENG. COOL.TEMP. | |
| FAULT COUNTER OF CYLINDER 1 | MISFIRE COUNTER | |
| FAULT COUNTER OF CYLINDER 2 | MISFIRE COUNTER | |
| FAULT COUNTER OF CYLINDER 3 | MISFIRE COUNTER | |
| FAULT COUNTER OF CYLINDER 4 | MISFIRE COUNTER | |
| FAULT COUNTER OF CYLINDER 5 | MISFIRE COUNTER | |
| FAULT COUNTER OF CYLINDER 6 | MISFIRE COUNTER | |
| FAULT COUNTER OF CYLINDER 7 | MISFIRE COUNTER | |
| FAULT COUNTER OF CYLINDER 8 | MISFIRE COUNTER | |
| FAULT COUNTER OF CYLINDER 9 | MISFIRE COUNTER | |
| FAULT COUNTER OF CYLINDER 10 | MISFIRE COUNTER | |
| FAULT COUNTER OF CYLINDER 11 | MISFIRE COUNTER | |
| FAULT COUNTER OF CYLINDER 12 | MISFIRE COUNTER | |
| HO2S BANK 1 SENSOR 1 (MV) | OXYGEN SENSOR | 1 |
| HO2S BANK 1 SENSOR 2 (MV) | OXYGEN SENSOR | 1 |
| HO2S BANK 2 SENSOR 1 (MV) | OXYGEN SENSOR | 2 |
| HO2S BANK 2 SENSOR 2 (MV) | OXYGEN SENSOR | 2 |
| LF TIRE PRESSURE SENSOR (KPA) | TIRE PRESSURE | |
| LR TIRE PRESSURE SENSOR (KPA) | TIRE PRESSURE | |
| RF TIRE PRESSURE SENSOR (KPA) | TIRE PRESSURE | |
| RR TIRE PRESSURE SENSOR (KPA) | TIRE PRESSURE | |
| MAF SENSOR BANK 1 (G/S) | INTAKE AIRFLOW | |
| MAF SENSOR BANK 2 (G/S) | INTAKE AIRFLOW | |

| CYLINDER | BANK | SPATIAL | MEASUREMENT TYPE | SCALE/UNIT |
|---|---|---|---|---|
| | | LEFT | VOLTAGE | VOLTS DC |
| | | RIGHT | VOLTAGE | VOLTS DC |
| | | AT ENGINE | TEMPERATURE | DEGREES C |
| | | AT RADIATOR | TEMPERATURE | DEGREES F |
| | | AT RADIATOR | TEMPERATURE | DEGREES F |
| | | AT RADIATOR | TEMPERATURE | DEGREES C |
| | | AT RADIATOR | VOLTAGE | VOLTS DC |
| | | | VOLTAGE | VOLTS DC |
| 1 | | | COUNTS | |
| 2 | | | COUNTS | |
| 3 | | | COUNTS | |
| 4 | | | COUNTS | |
| 5 | | | COUNTS | |
| 6 | | | COUNTS | |
| 7 | | | COUNTS | |
| 8 | | | COUNTS | |
| 9 | | | COUNTS | |
| 10 | | | COUNTS | |
| 11 | | | COUNTS | |
| 12 | | | COUNTS | |
| | 1 | | VOLTAGE | MILLIVOLTS DC |
| | 2 | | VOLTAGE | MILLIVOLTS DC |
| | 1 | | VOLTAGE | MILLIVOLTS DC |
| | 2 | | VOLTAGE | MILLIVOLTS DC |
| | | LEFT FRONT | PRESSURE | KPA |
| | | LEFT REAR | PRESSURE | KPA |
| | | RIGHT FRONT | PRESSURE | KPA |
| | | RIGHT REAR | PRESSURE | KPA |
| | | | FLOW RATE | GRAMS / SEC. |
| | | | FLOW RATE | GRAMS / SEC. |
| 29 | 30 | 31 | 66 | 67 |

| FUNCTIONAL TEST | RESET PROCEDURE | COMPONENT TEST |
|---|---|---|
| FT1, FT2 | RP5 | CT1, CT2 |
| FT1, FT3 | RP6 | CT3, CT4 |
| FT4, FT5 | | CT5, CT6 |
| FT4, FT5 | | CT7, CT8 |
| FT4, FT5 | | CT9, CT10 |
| FT4, FT5 | | CT11, CT12 |
| FT4, FT5, FT6 | | CT13, CT14 |
| FT4, FT5, FT6 | | CT15, CT16 |
| FT7, FT8, FT9 | | CT17, CT18 |
| FT7, FT8, FT10 | | CT19, CT20 |
| FT7, FT8, FT11 | | CT21, CT22 |
| FT7, FT8, FT12 | | CT23, CT24 |
| FT7, FT8, FT13 | | CT25, CT26 |
| FT7, FT8, FT14 | | CT27, CT28 |
| FT7, FT8, FT15 | | CT29, CT30 |
| FT7, FT8, FT16 | | CT31, CT32 |
| FT7, FT8, FT17 | | CT33, CT34 |
| FT7, FT8, FT18 | | CT35, CT36 |
| FT7, FT8, FT19 | | CT37, CT38 |
| FT7, FT8, FT20 | | CT39, CT40 |
| FT21, FT22, FT23 | | CT41, CT42 |
| FT21, FT22, FT23 | | CT43, CT44 |
| FT21, FT22, FT23 | | CT45, CT46 |
| FT21, FT22, FT23 | | CT47, CT48 |
| FT24, FT25 | RP1 | CT49, CT50 |
| FT26, FT27 | RP2 | CT51, CT52 |
| FT28, FT29 | RP3 | CT53, CT54 |
| FT30, FT31 | RP4 | CT55, CT56 |
| FT32, FT33 | | CT57, CT58 |
| FT32, FT33 | | CT59, CT60 |

| FIG. 9A | FIG. 9B | FIG. 9C | FIG. 9D |
|---|---|---|---|

| VEHICLE | SYSTEM | COMP. | SYMPTOM | PID | THRESHOLD |
|---|---|---|---|---|---|
| V2 | S1 | C3 | $A25 | $01 | T40, T41 |
| V2 | S1 | C3 | $A26 | $02 | T42, T43 |
| V2 | S1 | C3 | $A27 | $03 | T40, T41 |
| V2 | S1 | C3 | $A28 | $04 | T42, T43 |
| V2 | S1 | C8 | $A29 | $05 | T44, T45 |
| V2 | S1 | C8 | $A2A | $06 | T46, T47 |
| V2 | S1 | C8 | $A2B | $07 | T46, T47 |
| V2 | S1 | C9 | $A2C | $08 | T48, T49 |
| V2 | S1 | C10 | $A2D | $09 | T50, T51 |
| V2 | S1 | C10 | $A2E | $0A | T52, T53 |
| V2 | S1 | C11 | $A2F | $0B | T54, T55 |
| V2 | S1 | C11 | $A30 | $0C | T56, T57 |
| V2 | S1 | C3 | $A31 | $0D | T58, T59 |
| V2 | S1 | C7 | $A32 | $0E | T60, T61 |
| V2 | S1 | C3 | $A33 | $0F | T62, T63 |
| V2 | S1 | C3 | $A34 | $10 | T64, T65 |
| V2 | S1 | C13 | $A35 | $11 | T66, T67 |
| V2 | S1 | C2 | $A36 | $12 | T68, T69 |
| V2 | S1 | C3 | $A37 | $13 | T70, T71 |
| V2 | S1 | C1 | $A38 | $14 | T72, T73 |
| V2 | S1 | C1 | $A39 | $15 | T72, T73 |
| V2 | S1 | C3 | $A3A | $16 | |
| V2 | S1 | C3 | $A41 | $17 | T74, T75 |
| V2 | S1 | C3 | $A42 | $18 | T74, T75 |
| V2 | S1 | C3 | $A43 | $19 | T74, T75 |
| V2 | S1 | C3 | $A44 | $1A | T74, T75 |
| V2 | S1 | C3 | $A45 | $1B | T74, T75 |
| V2 | S1 | C3 | $A46 | $1C | T74, T75 |
| V2 | S1 | C3 | $A47 | $1D | T74, T75 |
| V2 | S1 | C3 | $A48 | $1E | T74, T75 |

| PID NAME | GROUP | SENSOR |
|---|---|---|
| SHORT TERM FUEL TRIM - BANK 1 | ENGINE FUEL | |
| LONG TERM FUEL TRIM - BANK 1 | ENGINE FUEL | |
| SHORT TERM FUEL TRIM - BANK 2 | ENGINE FUEL | |
| LONG TERM FUEL TRIM - BANK 2 | ENGINE FUEL | |
| FUEL PRES. (FUEL TANK) | ENGINE FUEL | 1 |
| FUEL PRES. (FUEL RAIL - LT SIDE) | ENGINE FUEL | 1 |
| FUEL PRES. (FUEL RAIL - RT SIDE) | ENGINE FUEL | 1 |
| FUEL TANK LEVEL INPUT | ENGINE FUEL | 1 |
| NOX SENSOR (%) | ENGINE SENSOR INPUT | 1 |
| NOX SENSOR (V) | ENGINE SENSOR INPUT | 1 |
| THROTTLE POSITION SENSOR (%) | ENG. RUNNING VALUES | 1 |
| THROTTLE POSITION SENSOR (V) | ENG. RUNNING VALUES | 1 |
| ODOMETER | VEHICLE MOVEMENT | |
| ENGINE SPEED | ENG. RUNNING VALUES | |
| TRANSMISSION GEAR | VEHICLE MOVEMENT | |
| TRANSMISSION ACTUAL GEAR | VEHICLE MOVEMENT | |
| INTAKE AIR TEMP. SENSOR (°C) | ENGINE SENSOR INPUT | 1 |
| ENG. COOLANT TEMP. SENSOR (°C) | ENG. RUNNING VALUES | 1 |
| TRAVEL DIST. SINCE DTCS CLEARED | VEHICLE MOVEMENT | |
| MAF SENSOR BANK 1 (G/S) | INTAKE AIRFLOW | 1 |
| MAF SENSOR BANK 2 (G/S) | INTAKE AIRFLOW | 1 |
| WARM-UPS SINCE DTCS CLEARED | VEHICLE MOVEMENT | |
| FAULT COUNTER OF CYLINDER 1 | MISFIRE COUNTER | |
| FAULT COUNTER OF CYLINDER 2 | MISFIRE COUNTER | |
| FAULT COUNTER OF CYLINDER 3 | MISFIRE COUNTER | |
| FAULT COUNTER OF CYLINDER 4 | MISFIRE COUNTER | |
| FAULT COUNTER OF CYLINDER 5 | MISFIRE COUNTER | |
| FAULT COUNTER OF CYLINDER 6 | MISFIRE COUNTER | |
| FAULT COUNTER OF CYLINDER 7 | MISFIRE COUNTER | |
| FAULT COUNTER OF CYLINDER 8 | MISFIRE COUNTER | |

| CYLINDER | BANK | SPATIAL | MEASUREMENT TYPE | SCALE/UNIT |
|---|---|---|---|---|
| | 1 | | | PERCENT |
| | 1 | | | PERCENT |
| | 2 | | | PERCENT |
| | 2 | | | PERCENT |
| | | AT FUEL TANK | PRESSURE | KPA |
| | | LEFT SIDE | PRESSURE | KPA |
| | | RIGHT SIDE | PRESSURE | KPA |
| | | | | PERCENT |
| | | | | PERCENT |
| | | | VOLTAGE | VOLTS DC |
| | | | | PERCENT |
| | | | VOLTAGE | VOLTS DC |
| | | | | KM/HR |
| | | | | RPM |
| | | | RATIO | GEAR NO. |
| | | | RATIO | GEAR NO. |
| | | | TEMPERATURE | DEGREES C |
| | | | TEMPERATURE | DEGREES C |
| | | | | KM/HR |
| | 1 | | FLOW RATE | GRAMS / SEC. |
| | 2 | | FLOW RATE | GRAMS / SEC. |
| | | | COUNTS | |
| 1 | | | COUNTS | |
| 2 | | | COUNTS | |
| 3 | | | COUNTS | |
| 4 | | | COUNTS | |
| 5 | | | COUNTS | |
| 6 | | | COUNTS | |
| 7 | | | COUNTS | |
| 8 | | | COUNTS | |

| FUNCTIONAL TEST | RESET PROCEDURE | COMPONENT TEST |
|---|---|---|
| FT34, FT35 | | CT81 |
| FT36, FT37 | | CT81 |
| FT38, FT39 | | CT81 |
| FT40, FT41 | | CT81 |
| FT42, FT43 | | CT82 |
| FT44, FT45 | | CT83 |
| FT46, FT47 | | CT83 |
| FT48, FT49 | | CT84 |
| FT50, FT51 | | CT85 |
| FT52, FT53 | | CT86 |
| FT54, FT55 | | CT87 |
| FT56, FT57 | | CT86 |
| FT58, FT59 | | |
| FT60, FT61 | | CT88 |
| FT62, FT63 | | |
| FT64, FT65 | | |
| FT66, FT67 | | CT89, CT90 |
| FT68, FT69 | | CT91, CT92 |
| FT70, FT71 | RP15 | |
| FT72, FT73 | | CT93 |
| FT74, FT75 | | CT93 |
| FT76, FT77 | | |
| FT7, FT8, FT9 | RP31 | CT17, CT18 |
| FT7, FT8, FT10 | RP32 | CT19, CT20 |
| FT7, FT8, FT11 | RP33 | CT21, CT22 |
| FT7, FT8, FT12 | RP34 | CT23, CT24 |
| FT7, FT8, FT13 | RP35 | CT25, CT26 |
| FT7, FT8, FT14 | RP36 | CT27, CT28 |
| FT7, FT8, FT15 | RP37 | CT29, CT30 |
| FT7, FT8, FT16 | RP38 | CT31, CT32 |

| FIG. 10A | FIG. 10B | FIG. 10C | FIG. 10D |
|---|---|---|---|

| VEHICLE | SYSTEM | COMP. | SYMPTOM | PID | PROTOCOL | THRESHOLD |
|---|---|---|---|---|---|---|
| V3 | S3 | C14 | $C12 | $67 | P1 | T20, T21 |
| V3 | S3 | C14 | $C13 | $68 | P1 | T20, T21 |
| V3 | S3 | C14 | $C14 | $69 | P1 | T20, T21 |
| V3 | S3 | C14 | $C15 | $70 | P1 | T20, T21 |
| V3 | S2 | C5 | $D07 | $AA | P1 | T22, T23 |
| V3 | S2 | C5 | $D08 | $AB | P1 | T22, T23 |
| V3 | S2 | C5 | $D09 | $AC | P1 | T22, T23 |
| V3 | S2 | C5 | $D0A | $AD | P1 | T22, T23 |
| V3 | S5 | C16 | $E25 | $F0 | P1 | T24, T25 |
| V3 | S5 | C16 | $E26 | $F1 | P1 | T24, T25 |
| V3 | S5 | C16 | $E27 | $F2 | P1 | T24, T25 |
| V3 | S5 | C16 | $E28 | $F3 | P1 | T24, T25 |
| V3 | S4 | C15 | $D16 | $D05 | P1 | T26, T27 |
| V3 | S4 | C15 | $D18 | $D06 | P1 | T26, T27 |
| V3 | S4 | C15 | $D1A | $D07 | P1 | T26, T27 |
| V3 | S4 | C15 | $D1C | $D08 | P1 | T26, T27 |
| V3 | S5 | C21 | $E01 | $C17 | P1 | |
| V3 | S1 | C3 | $A33 | $E01 | P1 | |
| V3 | S1 | C3 | $A34 | $E10 | P1 | |
| V3 | S1 | C3 | $A31 | $0D | P1 | T29 |
| V3 | S1 | C3 | $A32 | $0E | P1 | T30 |
| V3 | S1 | C3 | $A32 | $0E | P2 | T30 |
| V3 | S1 | C19 | $A35 | $0F | P1 | T31 |
| V3 | S1 | C19 | $A35 | $0F | P2 | T31 |
| V3 | S1 | C19 | $A35 | $0F | P1 | T31 |
| V3 | S1 | C28 | $A3A | $CF | P1 | T32, T33 |
| V3 | S1 | C28 | $A3B | $CE | P1 | T32, T33 |

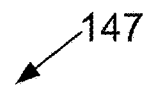

| PID NAME | GROUP | SENSOR |
|---|---|---|
| WS SENSOR LEFT FRONT | VWTD, WS | 1 |
| WS SENSOR LEFT REAR | VWTD, WS | 1 |
| WS SENSOR RIGHT FRONT | VWTD, WS | 1 |
| WS SENSOR RIGHT REAR | VWTD, WS | 1 |
| TIRE PRESSURE LEFT FRONT | TIRES, VWTD, WS | 1 |
| TIRE PRESSURE LEFT REAR | TIRES, VWTD, WS | 1 |
| TIRE PRESSURE RIGHT FRONT | TIRES, VWTD, WS | 1 |
| TIRE PRESSURE RIGHT REAR | TIRES, VWTD, WS | 1 |
| LF BRAKE PAD THICKNESS | BRAKES, TIRES, VWTD | 1 |
| LR BRAKE PAD THICKNESS | BRAKES, TIRES, VWTD | 1 |
| RF BRAKE PAD THICKNESS | BRAKES, TIRES, VWTD | 1 |
| RR BRAKE PAD THICKNESS | BRAKES, TIRES, VWTD | 1 |
| TIRE TEMP. LEFT FRONT | TIRES, TEMP., WS | 1 |
| TIRE TEMP. LEFT REAR | TIRES, TEMP., WS | 1 |
| TIRE TEMP. RIGHT FRONT | TIRES, TEMP., WS | 1 |
| TIRE TEMP. RIGHT REAR | TIRES, TEMP., WS | 1 |
| BRAKE APPLIED | BRAKES, TIRES, VWTD | 1 |
| TRANSMISSION GEAR | VWTD | 1 |
| TRANSMISSION ACTUAL GEAR | VEHICLE MOVEMENT | 1 |
| ODOMETER | VEHICLE MOVEMENT | 1 |
| ENGINE SPEED | VWTD | 1 |
| ENGINE SPEED | VWTD | 1 |
| VEHICLE SPEED | BRAKES, VWTD, WS | 1 |
| VEHICLE SPEED | BRAKES, VWTD, WS | 1 |
| VEHICLE SPEED | VEHICLE MOVEMENT | 1 |
| BRAKE FLUID PRES. FRONT | BRAKES | 1 |
| BRAKE FLUID PRES. REAR | BRAKES | 1 |

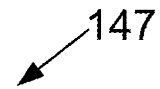

| SPATIAL | MEASUREMENT TYPE | SCALE/UNIT |
|---|---|---|
| LEFT FRONT | SPEED | KM/HR |
| LEFT REAR | SPEED | KM/HR |
| RIGHT FRONT | SPEED | KM/HR |
| RIGHT REAR | SPEED | KM/HR |
| LEFT FRONT | PRESSURE | KPA |
| LEFT REAR | PRESSURE | KPA |
| RIGHT FRONT | PRESSURE | KPA |
| RIGHT REAR | PRESSURE | KPA |
| LEFT FRONT | THICKNESS | MM |
| LEFT REAR | THICKNESS | MM |
| RIGHT FRONT | THICKNESS | MM |
| RIGHT REAR | THICKNESS | MM |
| LEFT FRONT | TEMPERATURE | DEGREES C |
| LEFT REAR | TEMPERATURE | DEGREES C |
| RIGHT FRONT | TEMPERATURE | DEGREES C |
| RIGHT REAR | TEMPERATURE | DEGREES C |
|  | STATUS | STATUS |
|  | RATIO | GEAR NO. |
|  | RATIO | GEAR NO. |
|  | DISTANCE | KM |
|  | SPEED | RPM |
|  | SPEED | RPM |
|  | SPEED | KM/HR |
|  | SPEED | KM/HR |
|  | SPEED | KM/HR |
| FRONT | PRESSURE | KPA |
| REAR | PRESSURE | KPA |

| FUNCTIONAL TEST | RESET PROCEDURE | COMPONENT TEST |
|---|---|---|
| FT55, FT56, FT57, FT58 | | CT100, CT101, CT102 |
| FT59, FT60, FT57, FT58 | | CT100, CT101, CT102 |
| FT61, FT62, FT57, FT58 | | CT100, CT101, CT102 |
| FT63, FT64, FT57, FT58 | | CT100, CT101, CT102 |
| FT40, FT41 | RP9, RP10 | CT104, CT106, CT107 |
| FT40, FT41 | RP9, RP10 | CT104, CT106, CT107 |
| FT40, FT41 | RP9, RP10 | CT104, CT106, CT107 |
| FT40, FT41 | RP9, RP10 | CT104, CT106, CT107 |
| FT71 | | CT92 |
| FT72 | | CT93 |
| FT73 | | CT94 |
| FT74 | | CT95 |
| | | CT104, CT105, CT106 |
| | | CT104, CT105, CT106 |
| | | CT104, CT105, CT106 |
| | | CT104, CT105, CT106 |
| FT70, FT71, FT72, FT73, FT74, FT75 | | CT90, CT91 |
| | | |
| FT76 | | CT92 |
| FT77 | | CT93 |
| | | CT95, CT96 |
| | | CT95, CT96 |
| | | CT95, CT96 |
| | | CT95, CT96 |
| FT78 | | CT94 |
| | | CT90 |
| | | CT91 |

485 486 487

| FIG. 11A | FIG. 11B | FIG. 11C | FIG. 11D |
|---|---|---|---|

| VEHICLE | SYSTEM | COMP. | SYMPTOM | PID | THRESHOLD |
|---|---|---|---|---|---|
| V4 | S6 | C31 | $B00 | $A1 | |
| V4 | S6 | C31 | $B01 | $A2 | |
| V4 | S6 | C31 | $B02 | $A3 | |
| V4 | S6 | C31 | $B03 | $A4 | |
| V4 | S6 | C31 | $B04 | $A5 | |
| V4 | S6 | C31 | $B05 | $A6 | |
| V4 | S6 | C31 | $B06 | $A7 | |
| V4 | S6 | C31 | $B07 | $A8 | |
| V4 | S6 | C31 | $B08 | $A9 | |
| V4 | S6 | C31 | $B09 | $AA | |
| V4 | S6 | C31 | $B0A | $AB | T80, T81 |
| V4 | S6 | C31 | $B0B | $AC | T80, T81 |
| V4 | S6 | C31 | $B0C | $AD | T80, T81 |
| V4 | S6 | C31 | $B0D | $AE | T80, T81 |
| V4 | S6 | C31 | $B0E | $AF | T80, T81 |
| V4 | S6 | C31 | $B0F | $B1 | T82, T83 |
| V4 | S6 | C31 | $B10 | $B2 | T82, T83 |
| V4 | S6 | C31 | $B11 | $B3 | T82, T83 |
| V4 | S6 | C31 | $B12 | $B4 | T82, T83 |
| V4 | S6 | C31 | $B13 | $B5 | T82, T83 |
| V4 | S6 | C31 | $B14 | $B6 | T84, T85 |
| V4 | S6 | C31 | $B15 | $B7 | T84, T85 |
| V4 | S6 | C31 | $B16 | $B8 | T84, T85 |
| V4 | S6 | C31 | $B17 | $B9 | T84, T85 |
| V4 | S6 | C31 | $B18 | $BA | T84, T85 |
| V4 | S6 | C31 | $B19 | $BB | T86 |
| V4 | S6 | C31 | $B1A | $BC | T87, T88 |
| V4 | S6 | C31 | $B1B | $BD | T89, T90 |
| V4 | S6 | C29 | $B1C | $BE | T91 |
| V4 | S6 | C29 | $B1D | $BF | T92 |
| V4 | S6 | C31 | BATTERY LEAK | $BC | |
| V4 | S6 | C31 | BATTERY NOISE | $BC | |
| V4 | S6 | C29 | $B1E | $C1 | T93, T94 |

| PID NAME | GROUP |
|---|---|
| BATTERY BLOCK 1 MAXIMUM VOLTAGE | BATTERY BLOCK 1 |
| BATTERY BLOCK 2 MAXIMUM VOLTAGE | BATTERY BLOCK 2 |
| BATTERY BLOCK 3 MAXIMUM VOLTAGE | BATTERY BLOCK 3 |
| BATTERY BLOCK 4 MAXIMUM VOLTAGE | BATTERY BLOCK 4 |
| BATTERY BLOCK 5 MAXIMUM VOLTAGE | BATTERY BLOCK 5 |
| BATTERY BLOCK 1 MINIMUM VOLTAGE | BATTERY BLOCK 1 |
| BATTERY BLOCK 2 MINIMUM VOLTAGE | BATTERY BLOCK 2 |
| BATTERY BLOCK 3 MINIMUM VOLTAGE | BATTERY BLOCK 3 |
| BATTERY BLOCK 4 MINIMUM VOLTAGE | BATTERY BLOCK 4 |
| BATTERY BLOCK 5 MINIMUM VOLTAGE | BATTERY BLOCK 5 |
| BATTERY BLOCK 1 VOLTAGE | BATTERY BLOCK 1 |
| BATTERY BLOCK 2 VOLTAGE | BATTERY BLOCK 2 |
| BATTERY BLOCK 3 VOLTAGE | BATTERY BLOCK 3 |
| BATTERY BLOCK 4 VOLTAGE | BATTERY BLOCK 4 |
| BATTERY BLOCK 5 VOLTAGE | BATTERY BLOCK 5 |
| BATTERY BLOCK 1 STATE OF CHARGE | BATTERY STATE OF CHARGE |
| BATTERY BLOCK 2 STATE OF CHARGE | BATTERY STATE OF CHARGE |
| BATTERY BLOCK 3 STATE OF CHARGE | BATTERY STATE OF CHARGE |
| BATTERY BLOCK 4 STATE OF CHARGE | BATTERY STATE OF CHARGE |
| BATTERY BLOCK 5 STATE OF CHARGE | BATTERY STATE OF CHARGE |
| BATTERY BLOCK 1 - CELL AVE. VOLTS | BATTERY BLOCK 1 |
| BATTERY BLOCK 2 - CELL AVE. VOLTS | BATTERY BLOCK 2 |
| BATTERY BLOCK 3 - CELL AVE. VOLTS | BATTERY BLOCK 3 |
| BATTERY BLOCK 4 - CELL AVE. VOLTS | BATTERY BLOCK 4 |
| BATTERY BLOCK 5 - CELL AVE. VOLTS | BATTERY BLOCK 5 |
| NUMBER OF BATTERY BLOCKS | BATTERY SUMMARY |
| MAXIMUM VOLTAGE OF BATT. BLOCK | BATTERY SUMMARY |
| MINIMUM VOLTAGE OF BATT. BLOCK | BATTERY SUMMARY |
| HIGH VOLT. BATTERY - TEMPERATURE | BATTERY SUMMARY |
| LOW VOLT. BATTERY - TEMPERATURE | BATTERY SUMMARY |
| MAXIMUM VOLTAGE OF BATT. BLOCK | BATTERY COMPLAINT |
| MAXIMUM VOLTAGE OF BATT. BLOCK | BATTERY COMPLAINT |
| BATTERY BLOCK 5 TEMPERATURE | BATTERY BLOCK 5 |

123

115

| SPATIAL | MEASUREMENT TYPE | SCALE/UNIT |
|---|---|---|
| BLOCK 1 | VOLTAGE | VOLTS DC |
| BLOCK 2 | VOLTAGE | VOLTS DC |
| BLOCK 3 | VOLTAGE | VOLTS DC |
| BLOCK 4 | VOLTAGE | VOLTS DC |
| BLOCK 5 | VOLTAGE | VOLTS DC |
| BLOCK 1 | VOLTAGE | VOLTS DC |
| BLOCK 2 | VOLTAGE | VOLTS DC |
| BLOCK 3 | VOLTAGE | VOLTS DC |
| BLOCK 4 | VOLTAGE | VOLTS DC |
| BLOCK 5 | VOLTAGE | VOLTS DC |
| BLOCK 1 | VOLTAGE | VOLTS DC |
| BLOCK 2 | VOLTAGE | VOLTS DC |
| BLOCK 3 | VOLTAGE | VOLTS DC |
| BLOCK 4 | VOLTAGE | VOLTS DC |
| BLOCK 5 | VOLTAGE | VOLTS DC |
| BLOCK 1 | PERCENTAGE | PERCENTAGE |
| BLOCK 2 | PERCENTAGE | PERCENTAGE |
| BLOCK 3 | PERCENTAGE | PERCENTAGE |
| BLOCK 4 | PERCENTAGE | PERCENTAGE |
| BLOCK 5 | PERCENTAGE | PERCENTAGE |
| BLOCK 1 | VOLTAGE | VOLTS DC |
| BLOCK 2 | VOLTAGE | VOLTS DC |
| BLOCK 3 | VOLTAGE | VOLTS DC |
| BLOCK 4 | VOLTAGE | VOLTS DC |
| BLOCK 5 | VOLTAGE | VOLTS DC |
| ALL | NUMBER | INTEGER |
| ALL | NUMBER | INTEGER |
| ALL | NUMBER | INTEGER |
| ALL | TEMPERATURE | DEGREES C |
| ALL | TEMPERATURE | DEGREES C |
| ALL | NUMBER | INTEGER |
| ALL | NUMBER | INTEGER |
| BLOCK 5 | TEMPERATURE | DEGREES C |

| FUNCTIONAL TEST | RESET PROCEDURE | COMPONENT TEST |
|---|---|---|
| FT80, FT81, FT86 | | CT120, CT121 |
| FT80, FT81, FT87 | | CT120, CT121 |
| FT80, FT81, FT88 | | CT120, CT121 |
| FT80, FT81, FT89 | | CT120, CT121 |
| FT80, FT81, FT90 | | CT120, CT121 |
| FT82, FT83, FT91 | | CT120, CT121 |
| FT82, FT83, FT92 | | CT120, CT121 |
| FT82, FT83, FT93 | | CT120, CT121 |
| FT82, FT83, FT94 | | CT120, CT121 |
| FT82, FT83, FT95 | | CT120, CT121 |
| FT84, FT85, FT96 | | CT120, CT121 |
| FT84, FT85, FT97 | | CT120, CT121 |
| FT84, FT85, FT98 | | CT120, CT121 |
| FT84, FT85, FT99 | | CT120, CT121 |
| FT84, FT85, FT100 | | CT120, CT121 |
| FT80, FT81, FT101, FT102 | RP20, RP21 | CT122, CT123 |
| FT80, FT81, FT103, FT104 | RP20, RP21 | CT122, CT123 |
| FT80, FT81, FT105, FT106 | RP20, RP21 | CT122, CT123 |
| FT80, FT81, FT107, FT108 | RP20, RP21 | CT122, CT123 |
| FT80, FT81, FT109, FT110 | RP20, RP21 | CT122, CT123 |
| FT84, FT85, FT111 | | CT124 |
| FT84, FT85, FT112 | | CT124 |
| FT84, FT85, FT113 | | CT124 |
| FT84, FT85, FT114 | | CT124 |
| FT84, FT85, FT115 | | CT124 |
| FT116, FT117 | | |
| FT118, FT119 | | CT122, CT123 |
| FT120, FT121 | | CT122, CT123 |
| FT122, FT123 | | CT124 |
| FT124, FT125 | | CT125, CT126 |
| FT118, FT119 | | CT120, CT121 |
| FT120, FT121 | | CT120, CT121 |
| FT122, FT123 | | CT127, CT128 |

SYSTEM / COMPONENT IDENTIFIER ← 264

SELECT SPATIAL ASPECT

265 → SPATIAL ASPECT A

266 → SPATIAL ASPECT B

267 → SPATIAL ASPECT C

268 → SPATIAL ASPECT D

269 → SPATIAL ASPECT E

270 → SPATIAL ASPECT F

271 → SPATIAL ASPECT G

272 → SPATIAL ASPECT H

273 EXIT

274 DIAGNOSIS

233 TEST DRIVE

VEHICLE IDENTIFIER (Y/M/M/E) ← 329

249

GUI CONTENT IDENTIFIER ←302
150

BACK ←303
152
PID FACETS 153
POSITION 155
FRONT
REAR
LEFT
RIGHT
TOP
BOTTOM
177
156
MEASURMENT 154
VOLTAGE
CURRENT
PERCENTAGE
TEMPERATURE
WEIGHT 299
COMPONENT 668
COMP. A1 178
COMP. A2
PID CLEAR 345
←328
669

SYSTEM A VALUES
NO ISSUE DETECTED ←158
157

| | |
|---|---|
| SYSTEM A - PID A (VDC) VALUE A ←159 | 338 SYSTEM A - PID B (VDC) VALUE B ←160 |
| SYSTEM A - PID C (VDC) VALUE C ←161 | 338 SYSTEM A - PID D (VDC) VALUE D ←162 |
| 338 SYSTEM A - PID E (°C) VALUE E ←163 | SYSTEM A - PID F (°C) VALUE F ←164 |
| 338 SYSTEM A - PID G (KPA) VALUE G ←165 | 338 SYSTEM A - PID H (KPA) VALUE H ←166 |
| SYSTEM A - PID I – LEFT (%) VALUE I ←167 | SYSTEM A - PID J – RIGHT (%) VALUE J ←168 |
| SYSTEM A - PID K – LEFT (%) VALUE K ←169 | SYSTEM A - PID L – RIGHT (%) VALUE L ←170 |
| SYSTEM A - PID M – REAR (°C) VALUE M ←171 | SYSTEM A - PID N – FRONT (°C) VALUE N ←172 |
| SYSTEM A - PID O – REAR (°C) VALUE O ←173 | SYSTEM A - PID P – FRONT (°C) VALUE P ←174 |
| SYSTEM A - PID Q – REAR (%) VALUE Q ←175 | SYSTEM A - PID R – FRONT (%) VALUE R ←176 |

VEHICLE IDENTIFIER (Y/M/M/E) ←329

420

OUTPUTTING, WITHIN EACH SUB-CONTAINER CORRESPONDING TO THE ONE OR MORE PIDS WITHIN THE FIRST PID GROUP, AN INDICATOR THAT INDICATES WHETHER A PARAMETER VALUE CORRESPONDING TO THE ONE OR MORE PIDS WITHIN THE FIRST PID GROUP HAS BREACHED THE RESPECTIVE THRESHOLD CORRESPONDING TO THE ONE OR MORE PIDS

INITIATING, IN RESPONSE TO A SELECTION OF A FIRST USER-SELECTABLE CONTROL, A PERFORMANCE OF THE FUNCTIONAL TEST, THE RESET PROCEDURE, OR THE GUIDED COMPONENT TEST

426

OUTPUTTING, IN RESPONSE TO THE SELECTION OF THE FIRST USER SELECTABLE CONTROL, A SECOND USER-SELECTABLE CONTROL SELECTABLE TO INITIATE THE PERFORMANCE OF THE FUNCTIONAL TEST, THE RESET PROCEDURE, OR THE GUIDED COMPONENT TEST

METHOD AND SYSTEM FOR CONFIGURING USER INTERFACE WITH PID FACET SELECTORS

BACKGROUND

Vehicles (e.g., cars and trucks) include systems and components that require servicing from time to time. Many of those systems and components are serviced via use of a computing system.

OVERVIEW

In a first implementation, a method is provided. The method includes determining a first selection made using a first graphical user interface (GUI) output on a display. The method also includes outputting, on the display, a second GUI based on the first selection. The second GUI includes a first set of containers and a first parameter-identifier (PID) facet selector. The first set of containers includes a first container corresponding to a first PID group. The first container includes multiple sub-containers corresponding to a respective PID. The method also includes transmitting requests to a vehicle. Each request includes one or more PIDs within the first PID group. Additionally, the method includes outputting, within the second GUI, parameter values received in response to a first portion of the requests, wherein each parameter value received in response to the first portion of the requests corresponds to one of the PIDs within the first PID group. Further, the method includes determining a selection of the first PID facet selector has occurred via the second GUI. Furthermore, the method includes outputting, within the second GUI in response to the selection of the first PID facet selector, a second set of containers instead of the first set of containers. The second set of containers includes a container corresponding to a second PID group different than the first PID group. The container corresponding to the second PID group includes multiple sub-containers corresponding to a respective PID. Furthermore still, the method includes outputting, within the second GUI, parameter values received in response to a second portion of the requests. Each parameter value received in response to the second portion of the requests corresponds to one of the PIDs within the second PID group.

In a second implementation, a computing system is provided. The computing system comprises a processor, a display, and a non-transitory computer-readable memory containing instructions executable by the processor to perform functions. The functions include determining a first selection made using a first GUI output on the display. The functions also include outputting, on the display, a second GUI based on the first selection. The second GUI includes a first set of containers and a first PID facet selector. The first set of containers includes a first container corresponding to a first PID group. The first container includes multiple sub-containers corresponding to a respective PID. The functions further include transmitting requests to a vehicle. Each request includes one or more PIDs within the first PID group. Additionally, the functions include outputting, within the second GUI, parameter values received in response to a first portion of the requests. Each parameter value received in response to the first portion of the requests corresponds to one of the PIDs within the first PID group. Further, the functions include determining a selection of the first PID facet selector has occurred via the second GUI. Furthermore, the functions include outputting, within the second GUI in response to the selection of the first PID facet selector, a second set of containers instead of the first set of containers. The second set of containers includes a container corresponding to a second PID group different than the first PID group. The container corresponding to the second PID group includes multiple sub-containers corresponding to a respective PID. Furthermore still, the functions include outputting, within the second GUI, parameter values received in response to a second portion of the requests. Each parameter value received in response to the second portion of the requests corresponds to one of the PIDs within the second PID group.

In a third implementation, a non-transitory computer-readable memory is provided. The non-transitory computer-readable memory has stored therein instructions executable by a processor to cause a computing system to perform functions. The functions include determining a first selection made using a first GUI output on the display. The functions also include outputting, on the display, a second GUI based on the first selection. The second GUI includes a first set of containers and a first PID facet selector. The first set of containers includes a first container corresponding to a first PID group. The first container includes multiple sub-containers corresponding to a respective PID. The functions further include transmitting requests to a vehicle. Each request includes one or more PIDs within the first PID group. Additionally, the functions include outputting, within the second GUI, parameter values received in response to a first portion of the requests. Each parameter value received in response to the first portion of the requests corresponds to one of the PIDs within the first PID group. Further, the functions include determining a selection of the first PID facet selector has occurred via the second GUI. Furthermore, the functions include outputting, within the second GUI in response to the selection of the first PID facet selector, a second set of containers instead of the first set of containers. The second set of containers includes a container corresponding to a second PID group different than the first PID group. The container corresponding to the second PID group includes multiple sub-containers corresponding to a respective PID. Furthermore still, the functions include outputting, within the second GUI, parameter values received in response to a second portion of the requests. Each parameter value received in response to the second portion of the requests corresponds to one of the PIDs within the second PID group.

In a fourth implementation, a computing system having a processing means and a data storage means is provided. The computing system includes means for determining a first selection made using a first GUI output on the display. The computing system also includes means for outputting, on the display, a second GUI based on the first selection. The second GUI includes a first set of containers and a first PID facet selector. The first set of containers includes a first container corresponding to a first PID group. The first container includes multiple sub-containers corresponding to a respective PID. The computing system further includes means for transmitting requests to a vehicle. Each request includes one or more PIDs within the first PID group. Additionally, the computing system includes means for outputting, within the second GUI, parameter values received in response to a first portion of the requests. Each parameter value received in response to the first portion of the requests corresponds to one of the PIDs within the first PID group. Further, the computing system includes means for determining a selection of the first PID facet selector has occurred via the second GUI. Furthermore, the computing system includes means for outputting, within the second GUI in response to the selection of the first PID facet selector, a second set of containers instead of the first set of containers. The second set of containers includes a container corresponding to a second PID group different than the first PID group. The container corresponding to the second PID group includes multiple sub-containers corresponding to a respective PID. Furthermore still, the computing system includes means for outputting, within the second GUI, parameter values received in response to a second portion of the requests. Each parameter value received in response to the second portion of the requests corresponds to one of the PIDs within the second PID group.

Other implementations will become apparent to those of ordinary skill in the art by reading the following detailed description, with reference where appropriate to the accompanying drawings.

BRIEF DESCRIPTION OF THE DRAWINGS

Example implementations are described herein with reference to the drawings.

FIG. 8 shows an arrangement of FIGS. 8A, 8B, 8C, and 8D, which extend across three drawing sheets. FIG. 8A, FIG. 8B, 8C, and FIG. 8D show mapping data, in accordance with the example embodiments.

FIG. 9 shows an arrangement of FIGS. 9A, 9B, 9C, and 9D, which extend across three drawing sheets. FIG. 9A, FIG. 9B, 9C, and FIG. 9D show mapping data, in accordance with the example embodiments.

FIG. 10 shows an arrangement of FIGS. 10A, 10B, 10C, and 10D, which extend across three drawing sheets. FIG. 10A, FIG. 10B, 10C, and FIG. 10D show mapping data, in accordance with the example embodiments.

FIG. 11 shows an arrangement of FIGS. 11A, 11B, 11C, and 11D, which extend across three drawing sheets. FIG. 11A, FIG. 11B, 11C, and FIG. 11D show mapping data, in accordance with the example embodiments.

FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40, FIG. 41, FIG. 42, FIG. 43, FIG. 44, FIG. 45, FIG. 46, FIG. 47, FIG. 48, FIG. 49, FIG. 50, FIG. 51, FIG. 52, FIG. 53, FIG. 54, and FIG. 55 show graphical user interfaces (GUIs), in accordance with the example embodiments.

FIG. 58, FIG. 59, FIG. 60, FIG. 61, FIG. 62, FIG. 63 and FIG. 64 show function sets, in accordance with the example embodiments.

All the figures are schematic and not necessarily to scale. Like reference numbers are used in the drawings to identify like elements unless the context or description describes otherwise.

DETAILED DESCRIPTION

I. Introduction

Figure 1:
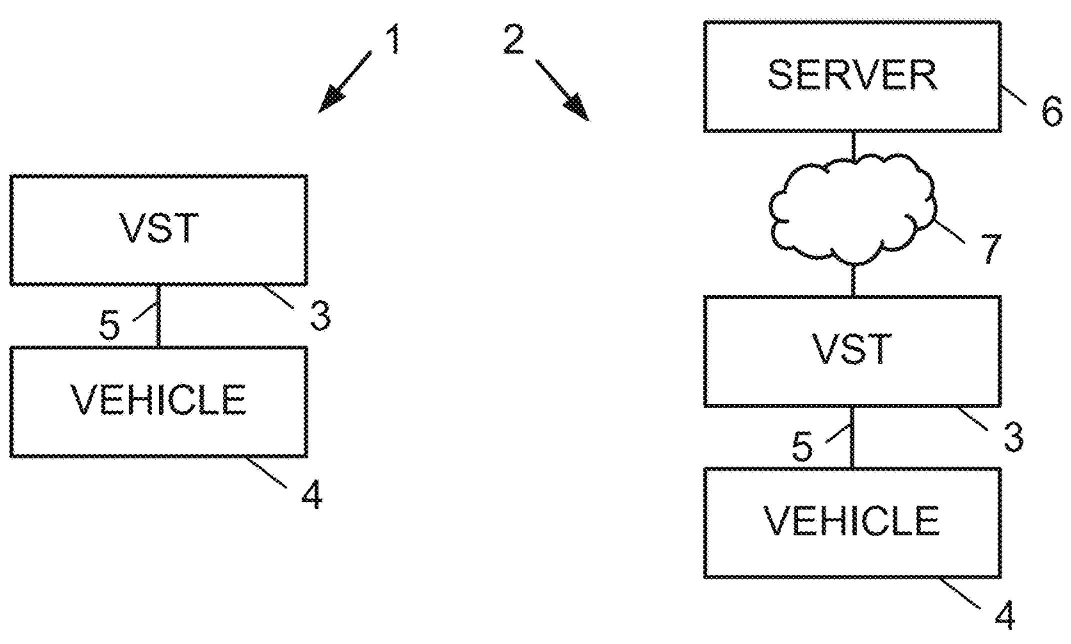
FIG. 1 shows block diagrams of systems, in accordance with the example embodiments.

This description describes several example implementations, at least some of which pertain to improved methods and systems for servicing a vehicle and/or use of a computing system (e.g., a vehicle service tool (i.e., a VST)) to service a vehicle.

As described below, a VST and a vehicle can operatively connect to one another using a wired or wireless connection. The vehicle can transmit a vehicle data message (VDM) according to a VDM protocol. Some vehicles use multiple different VDM protocols to transmit VDMs. A wired connection between the VST and the vehicle can include a connection to one or more vehicle networks. In some implementations, multiple vehicle networks in the vehicle carry VDMs according to different VDM protocols. The VST can operatively connect to the multiple vehicle networks at the same or different times.

A vehicle can transmit a VDM between two or more electronic control units (ECUs) while the vehicle operates in a normal mode (e.g., a mode in which a VST is not connected to the vehicle or a mode in which a VST is connected to the vehicle, but is not transmitting VDMs to the vehicle). On the other hand, when a VST is connected to the vehicle and operating in a diagnostic mode, the vehicle can continue transmitting a VDM between two or more ECUs, as well as transmit a VDM directed to the connected VST. In some cases, the vehicle transmits the VDM directed to the VST in response to receiving a VDM from the VST.

In accordance with at least some implementations, the VST can transmit (to a vehicle) a VDM to request a parameter identifier (PID) parameter value. As an example, a PID parameter value can be indicative of an electrical signal received at an ECU from a sensor connected to the ECU. As another example, a PID parameter value can be indicative of a value calculated by an ECU, such as a fuel trim value calculated by an ECU for a powertrain control system.

In accordance with at least some implementations, the VST can transmit (to a vehicle) a VDM to request a diagnostic trouble code (DTC) status from an ECU. The ECU can respond by transmitting (to the VST) a VDM indicative of whether a DTC is set active (i.e., current) or was previously set active (i.e., historical).

In accordance with at least some implementations, the VST can transmit (to a vehicle) a VDM to request an ECU to perform a functional test or reset procedure. The ECU can respond by performing the requested functional test or reset procedure. During performance of the functional test the VST can gain control over one or more inputs or outputs of the ECU.

As the quantities of ECUs in vehicles have increased and as the desire to more correctly diagnose malfunctions with ECUs has increased, the quantities of PIDs, DTCs, functional tests and reset procedures available in vehicles have also increased (e.g., from hundreds to thousands). One way to provide a technician with the ability to request PIDs or DTCs or to perform functional tests or reset procedures is to provide the technician with user-selectable controls corresponding to each PID, DTC, functional test, or reset procedure. That technician may need to scroll through pages of screens listing the PIDs, DTCs, functional tests, or reset procedures to be able to select which PIDs, DTCs, functional tests, or reset procedures the technician is interested in requesting and/or performing. Such scrolling and selecting is time consuming and burdensome to the technician.

In some cases, the technician knows a symptom or component malfunctioning in a vehicle, but does not know which PIDs, DTCs, functional tests, or reset procedures are applicable to the symptom or component. Selecting PIDs, DTCs, functional tests, or reset procedures by trial and error is time consuming and can be a waste of time if the PIDs, DTCs, functional tests, or reset procedures are inapplicable to the component, symptom, or other aspect of a vehicle being worked.

In at least some implementations, a user can select the known symptom and/or component via a graphical user interface (GUI) to cause the VST to display PIDs, PID parameter values, and PID facet selectors. The VST can compare the PID parameter values to one or more applicable thresholds and highlight a corresponding PID facet selector to guide a technician to locate applicable tests and reset procedures that can be performed on the vehicle. In response to selection of the PID facet selector, the VST can output on a GUI user-selectable controls selectable to perform or initiate performing a test or reset procedure on the vehicle.

In at least some implementations, a processor, such as a processor of the VST, can refer to mapping data to determine a group of PIDs, thresholds, and PID facet selectors corresponding to a symptom or component and generate a GUI for displaying the group of PIDs, PID parameter values received for the PIDs, and the PID facet selectors. In response to selection of one or more PID facet selectors, the processor of the VST can output a GUI showing a group of PIDs (e.g., a different group of PIDs) and user-selectable controls corresponding to tests and/or reset procedures.

In at least some implementations, the mapping data used to determine a group of PIDs for including in a GUI can include data that indicates two different PIDs corresponding to identical operating parameters of a vehicle are available using different VDM protocols. As an example, PID parameter values corresponding a speed of a vehicle or a speed of an engine (i.e., RPM) can be available via a first VDM protocol, such as a vehicle manufacturer VDM protocol and via a second VDM protocol, such as a government mandated VDM protocol.

As an example, a VST can use a first VDM protocol to send a VDM to request from the vehicle a VDM including a VDM parameter. Assuming transmission of each VDM by the VST or the vehicle using the first VDM protocol takes 0.000130 seconds to complete. Based on that example and assumption, 7,692 VDM can be sent each second (i.e., 3,846 VDM sent by the VST and 3,846 VDM sent by the vehicle). If the VST requests PID parameters for six different PIDs each second, then the VST can request and receive the PID parameters for each of the six PIDs 641 times each second. On the other hand, if the VST can request PID parameter values for two the six PIDs using a second VDM protocol, then the VST is able to request and receive PID parameters for each of the four other PIDs 961 times each second. Displaying more frequent updates of PID parameter values on the display can be beneficial in discovering a vehicle malfunction more quickly.

As another example, displaying a GUI including a group of N quantity of PIDs and tests based on a quantity of selections less than N quantity of selections that would be required to individually select the N quantity of PIDs and tests is at least one way in which example implementations can reduce the amount of time required to set up a VST to service a vehicle.

In this description, a user-selectable control is sometimes abbreviated as USC. A USC can be output on a display screen (or more simply, a display). In implementations in which the display is configured as a touch screen display, the USC output on the display can be selectable to trigger a processor to perform a function corresponding to the USC. Under some circumstances, however, the USC output on the display may not be selectable. For example, the USC may be output on the display to notify a user that the device including the display has the capability to perform the function, but the USC is not currently enabled to trigger performance of the function. In other words, the USC may be disabled until the user enables the USC (e.g., by paying a subscription fee, obtaining a certification credential to perform the feature, or acknowledging a safety warning). In at least some implementations, a USC includes a hardware key or button remote from a display. Selection of such a USC can occur by selecting (e.g., pushing the hardware key or button). A USC including a hardware key or button can be reconfigurable. For example, selection of the USC while a first GUI is displayed triggers performance of a first set of functions and selection of the USC while a second GUI is displayed triggers performance of a second set of functions. A USC can include a graphical icon and/or text. The graphical icon and/or text can be a representative description of a set of functions (i.e., one or more functions) that is performed in response to a selection of the USC including the graphical icon and/or text.

In this description, at least some of the embodiments pertain to a GUI that includes one or more containers. A container is an area of a GUI for displaying other component(s) of the GUI. Accordingly, a container can cover at least a portion of an area of the display on which the GUI is displayed. In many instances, multiple components within a container are related to one another. For example, a container can include a PID, a PID parameter value, and a PID flag that indicates whether a PID parameter value corresponding to the PID has breached a threshold corresponding to the PID. In at least some implementations, a container is marked using visible borders, such as line segments. In at least some of those implementations, two containers share a common border. In at least some implementations, a container distinguishes itself from other containers or other portions of the GUI using shading (e.g., a first color distinctly different from an adjacent second color). A container may include one or more containers. A container within another container can be referred to as a sub-container. On one hand, a container may contact one or more other containers. On the other hand, a container may not contact another container.

A container or some other portion of a GUI can include a user-selectable control (USC). The user-selectable control corresponds to one or more functions that can be initiated and/or performed in response to a selection of the USC. A USC can be embodied in a VST as a hardware USC, such as a hardware key or button. The hardware USC can be reconfigured. A GUI can show an indication of the function(s) corresponding to the hardware USC.

II. Example Systems, Vehicles, and Connectivity

FIG. 1 shows a system 1 and a system 2 in accordance with the example embodiments. The system 1 includes a vehicle service tool (VST) 3, a vehicle 4, and a communication link 5. The system 2 includes the VST 3, the vehicle 4, the communication link 5, a server 6, and a communication network 7. The VST is a computing system. In at least some embodiments, the computing system includes the VST 3 and the server 6.

The communication network 7 can include one or more wireless networks and/or one or more wired networks. The wireless network(s) can carry communications using a wireless communication standard or protocol, examples of which are discussed below. The wired network(s) can carry communications using a wired communication standard or protocol, examples of which are discussed below. The communication network 7 can include one or more networks within the internet and/or a cloud computing network.

The VST 3 is operable to service the vehicle 4. The VST 3 can transmit a vehicle data message (VDM) to the vehicle 4 and can receive a VDM from the vehicle 4. The VST 3 can transmit a message to the server 6 to request information for servicing the vehicle 4 and can receive a message from the server 6 including the information for servicing the vehicle 4. The VST 3 can display at least a portion of the information for servicing the vehicle 4. As an example, the service information can include a diagnostic flowchart, a technical service bulletin, an original equipment manufacturer (OEM) position statement, a video, a schematic diagram, a component location diagram, a repair tip, a commonly-replaced parts graph, PID definitions, a PID graph, a diagnostic trouble code (DTC) definition, a safety warning, a repair order, or some other type of service information. As another example, the information can include an index value (or more simply, an index) to information stored at the VST 3, and the VST 3 can retrieve and then display the information based on the index. As an example, the index can indicate a GUI, a list of PID facet selectors, or a list of PID facets. The index can be one of multiple indices sent to the VST 3.

The VST 3 can transmit a message to the server 6 to request data for configuring the VST 3 to service the vehicle 4. The VST 3 can receive a message from the server including the data for configuring the VST 3 to service the vehicle 4. As an example, the data for configuring the VST 3 can include a GUI, information to populate a GUI, information to configure a GUI, an index value or indices, or mapping data. As another example, the data for configuring the VST 3 can include a file, such as a hypertext mark-up language (HTML) file arranged as a GUI.

The vehicle 4 can include any vehicle described in this description. The vehicle 4 can include a vehicle that includes a vehicle system, component or other aspect described in this description as being a part of a vehicle. In at least some embodiments, the vehicle 4 includes at least a portion of the communication link 5.

The server 6 can operate on a computing system. The server 6 can include the computing system on which it operates. The server 6 can include one or more servers. As an example, the server 6 can be configured to provide a web service to another computing system, such as the VST 3 or a computing system within the vehicle 4. As an example, the web service can include a web service to provide the VST 3 with information for servicing the vehicle.

The communication link 5 can include a wireless communication link and/or a wired communication link. As an example, the wireless communication link can include a communication link configured to carry communications using a wireless communication standard or protocol, examples of which are discussed below. As another example, the wired communication link can include a communication link configured to carry communications using a wired communication standard or protocol, examples of which are discussed below. The communication link 5 can include and/or be arranged as the wired communication link 14, the wireless communication link 15, and/or the wireless communication link 16, each of which is shown in FIG. 2.

Figure 2:
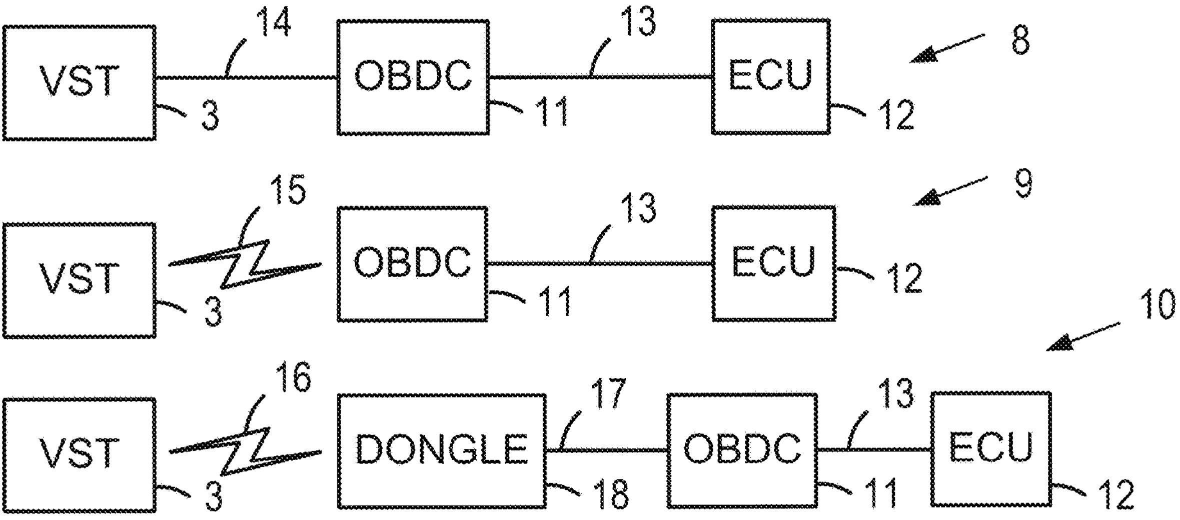
FIG. 2 shows connection arrangements, in accordance with the example embodiments.

Next, FIG. 2 shows an arrangement 8, 9, 10 for operatively connecting the VST 3 to component(s) in a vehicle (e.g., the vehicle 4 shown in FIG. 1). In the arrangement 8, 9, 10, an on-board diagnostic connector (OBDC) 11 is operatively connected to an electronic control unit (ECU) 12 using a vehicle network 13. The ECU 12 can include one or more ECUs in the vehicle, such as the ECU 33, 34, 35, 36 shown in FIG. 3, the ECU 61 shown in FIG. 4, or any other ECU described in this description. The vehicle network 13 can include or be a part of the communication link 5 shown in FIG. 1 and FIG. 2.

In the arrangement 8, the VST 3 is connected directly to the OBDC 11 using a wired communication link 14. As an example, the wired communication link 14 can be contained within a harness with multiple wires, at least one of which is configured to carry a VDM between the VST 3 and the OBDC 11. The harness can include a connector removably attachable to the OBDC 11. The wired communication link 14 can include one or more wires.

In the arrangement 9, the VST 3 is connected directly to the OBDC 11 using a wireless communication link 15. The wireless communication link 15 can include an air interface established to carry a VDM between the VST 3 and the OBDC 11. The wireless communication link 15 and the air interface can be configured in accordance with a wireless communication standard or protocol, such as any wireless communication standard or protocol described in this description.

In the arrangement 10, the VST 3 is connected indirectly to the OBDC 11 using a wireless communication link 16 and a dongle 18. The dongle 18 includes a connector 17 removably attachable to the OBDC 11 and a wireless transceiver and a wired transceiver. The wireless communication link 16 can include an air interface established to carry a VDM between the VST 3 and the dongle 18. The wireless communication link 16 and the air interface can be configured in accordance with a wireless communication standard or protocol, such as any wireless communication standard or protocol described in this description. The wired transceiver of the dongle 18 can receive a VDM transmitted to the OBDC 11 over the vehicle network 13 from an ECU and can transmit a VDM onto the vehicle network 13 for transmission to an ECU connected to the OBDC 11.

Figures 3, 4:
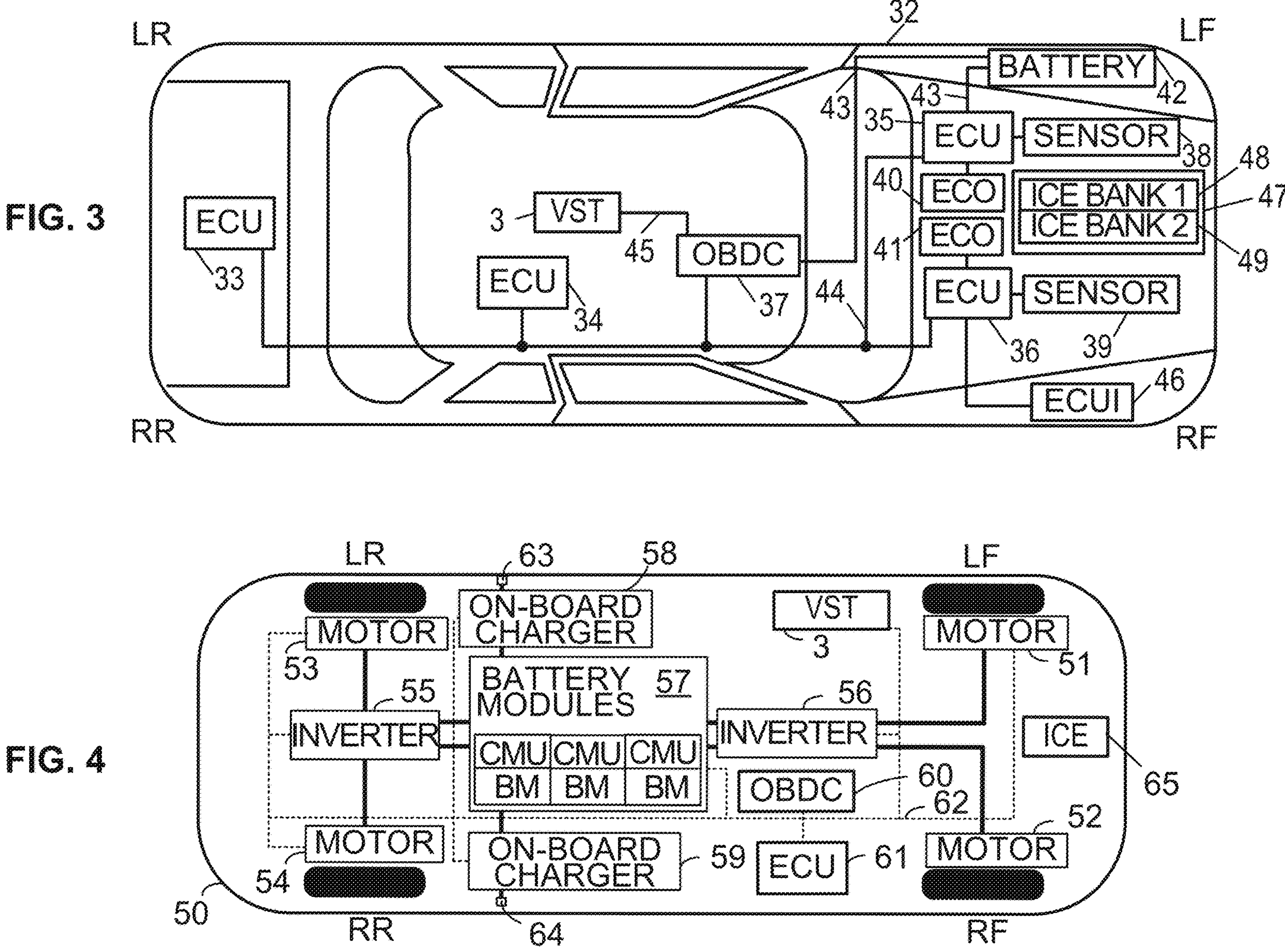
FIG. 3 and FIG. 4 show vehicles, in accordance with the example embodiments.

Next, FIG. 3 shows a vehicle 32 and placement of the VST 3 within the vehicle 32 in accordance with the example embodiments. In at least some embodiments, the vehicle 4 shown in FIG. 1 can be arranged like at least a portion of the vehicle 32. In at least some embodiments, the vehicle 32 can be included within the system 1, 2 in place of or in addition to the vehicle 4.

The vehicle 32 includes an internal combustion engine ICE 47 including a bank 48 and a bank 49. As an example, the bank 48 can be referred to as "bank 1", "left bank," and/or "front bank," and the bank 49 can be referred to as "bank 2," "right bank," and/or "rear bank." The vehicle 32 includes an ECU 33, 34, 35, 36, an OBDC 37, a sensor 38, 39, an ECU controlled output (ECO) 40, 41, a battery 42, and a battery-connected circuit 43. The ECU 33, 34, 35, 36 is operatively connected to the OBDC 37 via the vehicle network 44 to allow transmission of a VDM between the OBDC 37 and the ECU connected to the vehicle network 44. The vehicle network 44 can include a wired and/or wireless network and/or can include or be arranged like the vehicle network 13 shown in FIG. 2. The vehicle 32 also includes an ECU input (ECUI) 46. An ECUI (e.g., the ECUI 46) can include a vehicle component (e.g., a sensor, a key cylinder) operatively connected to an input pin of an ECU.

In at least some embodiments, the OBDC 37 is located within a passenger compartment of the vehicle 32, within an engine compartment of the vehicle 32, or within a storage compartment within the vehicle 32 in front of or behind the passenger compartment. The VST 3 can be removably attachable to the OBDC 37. The VST 3 can connect to the OBDC 37 via a communication link 45. In at least some embodiments, the VST 3 includes the communication link 45 (e.g., a harness). The VST 3 is typically removed after the vehicle 32 has been serviced. In that way, the VST 3 can be used to diagnose other vehicles. The OBDC 37 can be configured like and/or include the OBDC 11 shown in FIG. 2 and the communication link 45 can be configured like and/or include the wired communication link 14, the wireless communication link 15, and/or the wireless communication link 16 and the dongle 18 (all shown in FIG. 2).

The battery-connected circuit 43 can include one or more electrical circuits (e.g., one or more power circuits). FIG. 3 shows the battery-connected circuit 43 extending between the battery 42 and the ECU 35 and between the battery 42 and the OBDC 37. For clarity of FIG. 3, other examples of the battery-connected circuit 43 that extend between the battery 42 and some other vehicle component of the vehicle, such as the ECU 34, 35, 36, the sensor 38, 39, the ECO 40, 41 and the ECUI 46 are not shown in FIG. 3. The battery-connected circuit 43 between the battery 42 and the OBDC 37 can provide an electrical current to provide operational power for the VST 3.

The sensor 38, 39 is a device that provides a signal to the ECU 35, 36, respectively. The signal represents some characteristic of a vehicle the ECU 35, 36 is configured to monitor. As an example, the sensor 38, 39 can include one from among: an accelerometer, a camshaft position sensor, a crankshaft position sensor, a current sensor, a fluid level sensor, a fluid pressure sensor, a fluid temperature sensor, a hall effect sensor, an infrared sensor, a knock sensor, a mass air flow sensor, an oil pressure sensor, an oxygen sensor, a photo transistor, a piezoelectric sensor, a position sensor, a pressure sensor, a rain sensor, a refrigerant sensor, a temperature sensor, a thermistor, a throttle position sensor, a tire pressure sensor, a vehicle speed sensor, a voltage sensor, a wheel speed sensor, a yaw rate sensor, or some other typo of sensor. The signal provided by the sensor 38, 39 can be a target signal that corresponds to a selected functional test.

The ECO 40, 41 is a device controlled by the ECU 35, 36, respectively. The ECU 35, 36 can control the ECO 40, 41, respectively, using an output signal or an output condition. The output signal from an ECU can be a target signal that corresponds to a selected functional test. As an example, the ECO 40, 41 can include one from among: a fuel injector, a motor, a pump, a relay, solenoid, a transformer, or a valve. In accordance with at least some implementations, an ECU is selectable to perform a functional test and/or provide a DTC in accordance with an industry standard, such as the SAE J1979_201202 and/or ISO 15031-5 standards for E/E diagnostic test modes. As an example, the output condition can include establishing a particular voltage level on an electrical circuit operatively connected or connectable to the ECO 40, 41. For instance, the particular voltage level can be a nominal 5-volt reference signal, a nominal 12-volt reference signal, or an electrical ground level signal (e.g., a nominal 0-volt reference level).

The output signal of the ECU 35, 36 (i.e., the ECU output signal) can be any of a variety of electrical or output signals. As an example, the ECU output signal can include an analog or digital electrical signal. As a more particular example, the ECU output signal can include a pulse-width modulated signal, a triangular waveform signal, a saw tooth waveform signal, a rectangular waveform signal, a square waveform signal, or a sinusoidal waveform signal, among others. As another example, the ECU output signal can include a video signal or an audio signal. As yet another example, the digital electrical signal can include a data transmission. As an example, a data transmission can be communicated using a serial peripheral interface (SPI) interface, an inter-integrated circuit (I2C) interface, or a universal asynchronous receiver transmitter (UART) interface, among others. In response to receiving a functional test command, a processor in the ECU can execute program instructions or logic to cause the ECU output condition or output signal to appear at and/or on the ECO 40, 41.

Next, FIG. 4 shows a vehicle 50 and placement of the VST 3 within the vehicle 50 in accordance with the example embodiment. The vehicle 4 shown in FIG. 1 can be arranged like the vehicle 50. The vehicle 50 is an electric vehicle. In at least some implementations, the vehicle 50 includes an internal combustion engine (ICE) 65 such that the vehicle 50 is a hybrid vehicle.

As shown in FIG. 4, the vehicle 50 includes a motor 51 at a left front location of the vehicle 50, a motor 52 at a right front location of the vehicle 50, a motor 53 at a left rear location of the vehicle 50, and a motor 54 at a right rear location of the vehicle 50. The vehicle 50 also includes an inverter 55, 56, an on-board charger 58, 59, a charge port 63, 64, an ECU 61, an OBDC 60, and a vehicle network 62. As an example, the charge port 63 can include an AC voltage charge port and the charge port 64 can include a DC voltage charge port. The vehicle 50 can further include battery modules 57 including multiple battery modules (BM) and multiple cell monitoring units (CMU). The CMU can determine parameters regarding the battery modules, such as a battery voltage, a battery temperature, or a battery internal resistance. One or more of the motor 51, 52, 53, 54, the inverter 55, 56, the battery modules 57, the charge port 63, 64 and/or one or more other components (e.g., a conductor or connector connected to the motor 51, 52, 53, 54, the inverter 55, 56, the battery modules 57, the charge port 63, 64) can include a high-voltage component.

Figure 5:
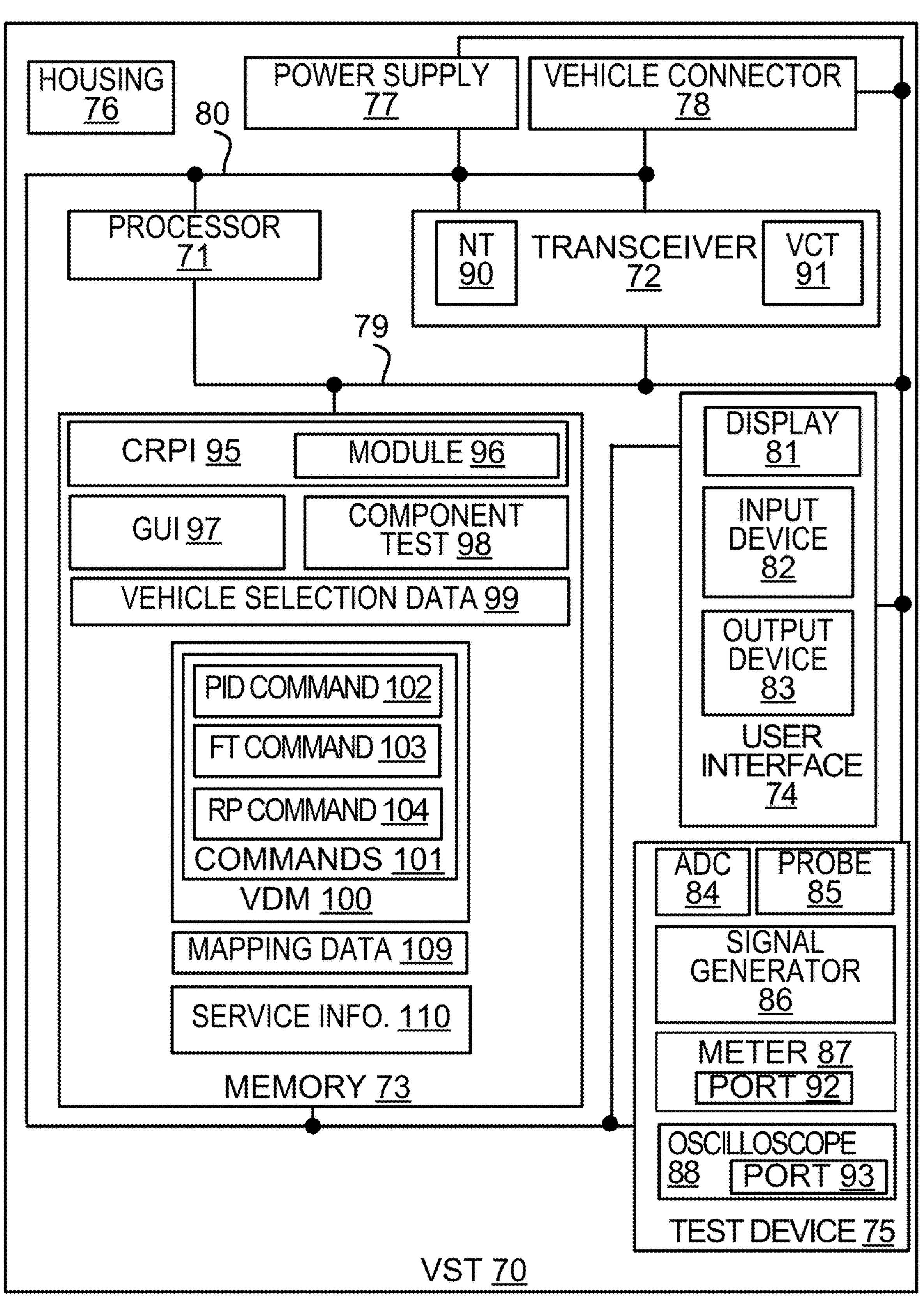
FIG. 5 is a block diagram of a vehicle service tool, in accordance with the example embodiments.

Next, FIG. 5 is a block diagram of a VST 70 in accordance with the example embodiments. The VST 3 shown in FIG. 1 to FIG. 4 can be arranged like the VST 70 and/or include one or more aspects of the VST 70. The VST 70 includes a computing system operable to service a vehicle (e.g., the vehicle 4, 32, 50). The VST 70 can perform any function(s) described in this description as being performed by the VST 3. The VST 3 can perform any function(s) described in this description as being performed by the VST 70.

The VST 70 can include a processor 71, a transceiver 72, a memory 73, a user interface 74, a test device 75, a housing 76, a power supply 77, a vehicle connector 78, a data bus 79, and/or an electrical circuit 80. The data bus 79 can operatively connect two or more of the processor 71, the transceiver 72, the memory 73, the user interface 74, the test device 75, the power supply 77, or the vehicle connector 78 to one another. In other words, the data bus 79 can provide an operative connection between two or more of the processor 71, the transceiver 72, the memory 73, the user interface 74, the test device 75, the power supply 77, and/or the vehicle connector 78. An operative connection allows for the operatively connected devices to communicate with one another.

A. Processor

A processor, such as the processor 71, 131 (shown in FIG. 12) or any other processor discussed in this description, can include one or more processors. Any processor discussed in this description can thus be referred to as "at least one processor" and/or "one or more processors." Furthermore, any processor discussed in this description can include a general purpose processor (e.g., an INTEL® single core microprocessor or an INTEL® multicore microprocessor), and/or a special purpose processor (e.g., a digital signal processor, a graphics processor, an embedded processor, or an application specific integrated circuit (ASIC) processor). Furthermore still, any processor discussed in this description can include or be operatively connected to a memory controller that controls a flow of data going to and from a memory, such as the memory 73, 133 (shown in FIG. 12).

Any processor discussed in this description can be operable to execute computer-readable program instructions (CRPI). Any CRPI discussed in this description can, for example, include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a procedural programming language, such as the "C" programming language. Any processor discussed in this description can be operable to execute hard-coded functionality in addition to or as an alternative to software-coded functionality (e.g., via CRPI). In at least some implementations of the VST 70, the processor 71 is a specific processor that is programmed to perform any function(s) described in this description as being performed by the VST 3, 70 and/or with respect to a module.

An embedded processor refers to a processor with a dedicated function or functions within a larger electronic, mechanical, pneumatic, and/or hydraulic device, and is contrasted with a general purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that the embedded processor can include (a) an advanced RISC (reduced instruction set computer) machine (ARM) processor (e.g., an ATSAMS70-DTE processor provided by the Atmel Corporation, San Jose, California), or (b) a COLDFIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

B. Memory

A memory, such as the memory 73, 133 or any other memory discussed in this description, can include one or more memories. Any memory discussed in this description can thus be referred to as "at least one memory" and/or "one or more memories." A memory can include a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a tangible, volatile or non-volatile, storage component, such as an optical, magnetic, organic or other memory or disc storage component. Additionally or alternatively, a non-transitory memory can include or be operable as a random-access memory (RAM), a read-only memory (ROM), a programmable read-only memory (PROM), an erasable programmable read-only memory (EPROM), a flash memory, an electrically erasable programmable read-only memory (EEPROM), or a compact disk read-only memory (CD-ROM). The RAM can include static RAM or dynamic RAM. A non-transitory memory can be operable as a removable storage device, a non-removable storage device, or a combination thereof. A removable storage and/or a non-removable storage device can include a magnetic disk device such as a flexible disk drive or a hard-disk drive (HDD), an optical disk drive such as a compact disc (CD) drive and/or a digital versatile disk (DVD) drive, a solid state drive (SSD), or a tape drive.

A transitory memory can include, for example, CRPI or a module provided over a communication network (e.g., the communication network 7), a communication link (e.g., the communication link 5, the wired communication link 14 or the wireless communication link 15, 16), or a data bus (e.g., the data bus 79).

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable mediums." Any of those alternative terms can be preceded by the prefix "transitory" if the memory is transitory or "non-transitory" if the memory is non-transitory. For a memory including multiple memories, two or more of the multiple memories can be the same type of memory or different types of memories.

C. Transceiver

A transceiver, such as the transceiver 72, 132 (shown in FIG. 12) or any other transceiver discussed in this description, can include one or more transceivers. Each transceiver includes one or more transmitters operable to transmit data onto a data bus within the computing system (e.g., the VST 70, the server 130 (shown in FIG. 12)) including the transceiver. Each transceiver includes one or more receivers operable to receive data or a communication carried over a data bus within computing system (e.g., the VST 70 or the server 130) including the transceiver. Unless stated differently, any data described as being transmitted to a device or system is considered to be received by that device or system. Similarly, unless stated differently, any data described as being received from a device or system is considered to be transmitted by that device or system directly or indirectly to the receiving device or system. For some implementations, a transceiver can include a transmitter and a receiver in a single semiconductor chip. In at least some of those implementations, the semiconductor chip can include a processor.

For purposes of this description and with respect to a particular vehicle (e.g., the vehicle 4, 32, 50), a network can be operable as a vehicle network, a non-vehicle network, or a multi-purpose network. The vehicle network is at least partly on-board the particular vehicle and has an OBDC and one or more electronic controls units interconnected to the OBDC and/or to each other. In at least some implementations, the VST 3, 70 includes a harness that operatively connects to the OBDC in the particular vehicle and allows the VST 3, 70 to be disposed outside of the particular vehicle. In those or in other implementations, the VST 3, 70 is operable to communicate with the OBDC and can be disposed within or outside of the particular vehicle. The non-vehicle network is off-board of the particular vehicle and includes one or more network nodes outside of the particular vehicle. The multi-purpose network is contained at least partly within the particular vehicle and at least partly off-board the particular vehicle. The multi-purpose network can include a vehicle network and a non-vehicle network.

In at least some of the example implementations, a transmitter, such as a transmitter within any transceiver described in this description, transmits radio signals carrying data, and a receiver, such as a receiver within any transceiver described in this description, receives radio signals carrying data. A transceiver with a radio transmitter and radio receiver can include one or more antennas and can be referred to as a "radio transceiver," an "RF transceiver," or a "wireless transceiver." "RF" represents "radio frequency."

A radio signal transmitted or received by a radio transceiver can be arranged in accordance with one or more wireless communication standards or protocols such as an Institute of Electrical and Electronics Engineers (IEEE®) standard, such as (i) an IEEE® 802.11 standard for wireless local area networks (wireless LAN) (which is sometimes referred to as a WI-FI® standard) (e.g., 802.11a, 802.11ac, 802.11ad, 802.11ax, 802.11b, 802.11g, or 802.11n), (ii) an IEEE® 802.15 standard (e.g., 802.15.1, 802.15.3, 802.15.4 (ZIGBEE®), or 802.15.5) for wireless personal area networks (PANs), (iii) a BLUETOOTH® version 5.1, 5.2, 5.3, or 5.4 standard developed by the Bluetooth Special Interest Group (SIG) of Kirkland, Washington, (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, (xviii) the LoRaWAN communication standard, or (xix) a 5G new radio (5G NR) communication standard by the 3rd Generation Partnership Project (3GPP) standards organization, such as the 5G NR, phase one or 5G NR, phase two communication standard. Other examples of the wireless communication standards or protocols are possible.

In at least some of the implementations, a transmitter, such as a transmitter within any transceiver described in this description, can be operable to transmit a signal (e.g., one or more signals or one or more electrical waves) carrying or representing data onto an electrical circuit (e.g., one or more electrical circuits). Similarly, a receiver, such as a receiver within any transceiver described in this description, can be operable to receive via an electrical circuit a signal carrying or representing data over the electrical circuit. The electrical circuit can be part of a non-vehicle network, a vehicle network, or a multi-purpose network. The signal carried over an electrical circuit can be arranged in accordance with a wired communication standard such as a Transmission Control Protocol/Internet Protocol (TCP/IP), an IEEE® 802.3 Ethernet communication standard for a LAN, a data over cable service interface specification (DOCSIS standard), such as DOCSIS 4.0, a universal serial bus (USB) specification, such as a USB4 standard, a vehicle data message (VDM) protocol, or some other wired communication standard or protocol. Examples of a VDM protocol are listed in elsewhere in this description. An electrical circuit can include a wire, a printed circuit on a circuit board, and/or a network cable (e.g., a single wire, a twisted pair of wires, a fiber optic cable, a coaxial cable, a wiring harness, a power line, a printed circuit, a CAT5 cable, and/or CAT6 cable). The wire can be referred to as a "conductor". Transmission of data over the conductor can occur electrically and/or optically.

In accordance with at least some implementations, the transceiver 72, 132 includes a network transceiver and/or a vehicle communications transceiver. As shown in FIG. 5, the transceiver 72 includes a network transceiver 90 and/or a vehicle communications transceiver 91. The network transceiver is operable to communicate over a non-vehicle network and/or a multi-purpose network. The vehicle communications transceiver is operable to communicate over a vehicle network and/or a multi-purpose network. The transceiver 72, 132 can be operable as a gateway to communicate over a multi-purpose network. The transceiver 72, 132 is also operable to communicate over the data bus 79, 135 (shown in FIG. 12), respectively.

In at least some implementations, the network transceiver includes a modem, a network interface card, a local area network (LAN) on motherboard (LOM), and/or a chip mountable on a circuit board. As an example, the chip can include a CC3100 Wi-Fi® network processor available from Texas Instruments, Dallas, Texas, a CC256MODx Bluetooth® Host Controller Interface (HCI) module available from Texas instruments, or a different chip for communicating via Wi-Fi®, Bluetooth® or another communication protocol.

A network node that is within and/or connected to a non-vehicle network and/or that communicates via a non-vehicle network or a multi-purpose network using a packet-switched technology can be locally configured for a next 'hop' in the network (e.g., a device or address where to send data to, and where to expect data from). As an example, a device (e.g., a transceiver) operable for communicating using an IEEE® 802.11 standard can be configured with a network name, a network security type, and a password. Some devices auto-negotiate this information through a discovery mechanism (e.g., a cellular phone technology).

The network transceiver 90 can be arranged to transmit a request and/or receive a response using a transfer protocol, such a hypertext transfer protocol (i.e., HTTP), an HTTP over a secure socket link (SSL) or transport layer security (TLS) (i.e., HTTPS), a file transfer protocol (i.e., FTP), or a simple mail transfer protocol (SMTP). The network transceiver 90 can be arranged to transmit an SMS message using a short message peer-to-peer protocol or using some other protocol.

The data transmitted by the transceiver 72 can include a destination identifier or address of a computing system to which the data is to be transmitted. The data or communication transmitted by the transceiver 72 can include a source identifier or address of the VST 70. The source identifier or address can be used to send a response to the VST 70. As an example, this data or communication can include a user identifier corresponding to a user of the VST 70, credential data corresponding to a user of the VST 70, a VDM, a GUI, or other data instead or as well.

D. User Interface

In at least some implementations, the user interface 74 includes a display 81, an input device 82, and/or an output device 83.

The display 81 can include one or more displays. As an example, each display of the one or more displays includes a capacitive touch screen display, a resistive touch screen display, a plasma display, a light emitting diode (LED) display, a cathode ray tube display, an organic light-emitting diode (OLED) display (such as an active-matrix OLED or a passive-matrix OLED), a liquid crystal display (LCD) device (such as include a backlit, color LCD device), a touch screen display with the LCD device, a capacitive touch screen display, or a resistive touch screen display. The display 81 can include a different type of display as well or instead. Each display can include one or more display screens.

In at least some implementations, the display 81 is affixed (e.g., removably affixed) to a substrate of the housing 76 and/or to the housing 76. In those or in other implementations, the display 81 is worn and/or within a wearable device, such as a pair of glasses or goggles, a head-mountable display, or a wrist display, such as a wristwatch (e.g., a smartwatch).

The display 81 is operable to display displayable content. Examples of displayable content are provided throughout this application by describing objects displayed by the display 81. As an example, the display 81 is operable to display a GUI, content of a GUI, a USC of a GUI and/or the user interface 74, a message, a notification, an indicator of a PID condition, a sub-container, a container, a PID, a parameter value, a PID condition, service information, a PID facet list, a PID facet list expander, a PID facet selector, or some other type of information or data.

The display 81 can also be operable to display a still image (such as a visible light image, a thermal image, and/or a blended image based on a visible light image and a thermal image), a video, a text file (such as a text file with a PDF file extension or an XML file extension), a hypertext markup language file, a web page (such as a web page including a search bar and/or a cursor), and/or a GUI. In at least some implementations, the display 81 is operable to display a horizontal scroll bar and/or a vertical scroll bar. The horizontal scroll bar and the vertical scroll bar can be used to cause the display 81 to display content not currently displayed on the display 81. A web page displayable on the display 81 can include any content shown in or described with respect to any one or more of the GUIs shown in the drawings and/or described in this description. Other examples of content displayable on the display 81 are also possible.

The input device 82 is operable to receive user inputs from a user of the VST 70. As an example, the input device 82 includes a keyboard or keypad including one or more keys operable to be pressed or otherwise manipulated by the user. As another example, the input device 82 includes a microphone operable to receive sound waves, such as sound waves produced by the user speaking words in a vocabulary of the VST 70. In the implementations in which the display 81 is operable as a touch screen display, the display 81 can receive user inputs from a user of the VST 70, such as a selection of a PID facet selector, a PID facet list expander, or a USC. Accordingly, the input device 82 can include the display 81 when operable as a touch screen display. As another example, the input device 82 can include a camera to capture images (e.g., an image of a user fingerprint, a user face, a vehicle, a vehicle component, a bar code, or a matrix code).

In the implementations that include the output device 83, the output device 83 can include one or more speakers operable to convert electrical signals to audible sounds. In those or in other implementations, the output device 83 can include wired headphones and/or wireless headphones. The wired headphones can connect to an audio plug operatively connectable to an audio jack. The wireless headphones can include in-ear headphones, such as the AIRPODS PRO® in-ear headphones by Apple Inc. In the implementations that include the output device 83, the output device 83 can include the display 81 to display content (e.g., GUIs and service information) output by the processor 71.

E. Test Device

The test device 75 can include one or more test devices, such as one or more test devices to test the vehicle 4, 32, 50. As an example, the test device 75 can include a meter 87 and/or an oscilloscope 88. The meter 87 includes a port 92 (e.g., one or more ports). The oscilloscope 88 includes a port 93 (e.g., one or more ports). The meter 87 can include a digital volt-ohm meter (DVOM). Additionally or alternatively, the meter 87 can include a current (i.e., amperage) meter. The meter 87 includes and/or is operatively connect to the port 92. The port 92 includes one or more ports for receiving an end of a meter lead. An opposite end of the meter lead is connectable to a component on a vehicle. The oscilloscope 88 can include one or more channels. The port 93 includes a port for each channel of the oscilloscope 88. Each port of the port 93 is operable to receive an end of an oscilloscope test lead. An opposite end of the oscilloscope test lead is connectable to a component on a vehicle.

Additionally, the test device 75 can include one or more of the following: an analog-to-digital converter (ADC) 84, a probe 85, and a signal generator 86. The signal generator 86 can output a signal onto a meter lead connected to the port 92 and/or onto an oscilloscope test lead connected to the port 93. The output signal can be used to measure a signal. For instance, the signal generator 86 can output a voltage differential across two meter leads connected to the port 92 (e.g., a red meter lead and a black meter lead) and onto a circuit for use in measuring a resistance of the circuit. The ADC 84 can be operable to convert an analog signal received via a meter lead or an oscilloscope test lead into a digital signal. A digital signal representing a signal detected by the ADC 84 can be output onto the data bus 79 for transmission to the processor 71.

The probe 85 can include one or more probes. As an example, the probe 85 can include a temperature probe, such as a temperature probe including a thermocouple and a connector connectable to the port 92, 93, and/or a temperature adaptor and probe, item EEDMTEMP-1 available from Snap-on Incorporated, Kenosha, Wisconsin. As another example, the probe 85 can include a pressure probe, such as a pressure adaptor for digital multimeter, item EEDM5030, available from Snap-on Incorporated, a pressure transducer and cable, item EEPV302AT, or a pressure transducer adaptor, item EEMS324PSA, each available from Snap-on Incorporated. As another example, the probe 85 can include an exhaust probe, such as a standard exhaust probe, item HHGA-7; a 5-gas exhaust probe, item HHGA-9; or a motorcycle exhaust probe, item HHGA-8; each of which is available from Snap-On Incorporated. As yet another example, a probe can include an air velocity and temperature probe, such as a wireless air velocity vane probe, item TPI-555, available Test Products International Inc., Beaverton, Oregon.

F. Additional Components

A power supply, such as the power supply 77, 138 (shown in FIG. 12) or any other power supply discussed in this description, can be arranged in any of a variety of configurations. As an example, the power supply can be operable to include circuitry to receive AC current from an AC electrical supply (e.g., electrical circuits operatively connected to an electrical wall outlet) and convert the AC current to a DC current for supplying to one or more from among the components connected to the power supply 77. As another example, the power supply can be operable to include a battery or be battery operated. As yet another example, the power supply can be operable to include a solar cell or be solar operated. Moreover, a power supply can be operable to include and/or connect to a power distribution circuit to distribute electrical current throughout the device or system including that power supply. In at least some implementations of the VST 70, the power distribution circuit includes the electrical circuit 80 (i.e., one or more electrical circuits) that connects to the processor 71, the memory 73, the transceiver 72, the user interface 74 the test device 75, and/or the vehicle connector 78. Other examples of a power supply, such as the power supply 77, are also possible.

In at least some implementations, the VST 70 includes a housing 76. The housing 76 surrounds at least a portion of the following: the processor 71, the transceiver 72, the memory 73, the user interface 74, the test device 75, the data bus 79, the power supply 77, the electrical circuit 80, and/or the vehicle connector 78. The housing 76 can support a substrate, such as a printed circuit board. In at least some example implementations, at least a portion of the following: the processor 71, the memory 73, the transceiver 72, the user interface 74, the data bus 79, the power supply 77, the electrical circuit 80, and/or the vehicle connector 78 is/are mounted on and/or connected to a substrate of the housing 76. The housing 76 can be made from various materials. For example, the housing 76 can be made from a plastic material (e.g., acrylonitrile butadiene styrene (ABS)) and a thermoplastic elastomer used to form a grip on the housing 76.

The vehicle connector 78 includes one or more vehicle connectors connectable to a vehicle, such as the vehicle 4, 32, 50. The vehicle connector 78 can include a vehicle connector configured to connect to an OBDC. The vehicle connector 78 can include a dongle, such as the dongle 18.

G. Memory Content

The example implementations can determine, generate, store (e.g., write into a memory), transmit, read, receive, and/or otherwise use a variety of computer-readable data. At least some of the computer-readable data can be stored in a memory, such as the memory 73, 133.

As an example, the memory 73 contains computer-readable programming instructions (CRPI) 95, a module 96 (i.e., one or more modules), a GUI 97 (i.e., one or more GUI), a component test 98 (i.e., one or more component tests), vehicle selection data 99, a vehicle data message 100 (i.e., one or more VDMs or data for generating one or more VDMs), mapping data 109, and/or service information 110. Additionally, the memory 73 can contain any of the content within the system memory 674 shown in FIG. 65 and/or within the computer program product 694 shown in FIG. 66.

The CRPI 95 can include program instructions executable by a processor, such as the processor 71. As an example, the CRPI 95 can include program instructions that are executable to cause the VST 70 to perform any function described as being performed by the VST 70, by the processor 71, and/or by some other component of the VST 70. As an example, the CRPI 95 can include program instructions executable by the processor to perform one or more functions of any one or more the function set 400, 410, 415, 420, 425, 430, 435, 440 shown in FIG. 57 to FIG. 64. In at least some embodiments, the CRPI 95 can include the module 96. In at least some embodiments, the module 96 includes at least a portion of the CRPI 95.

Figure 6:
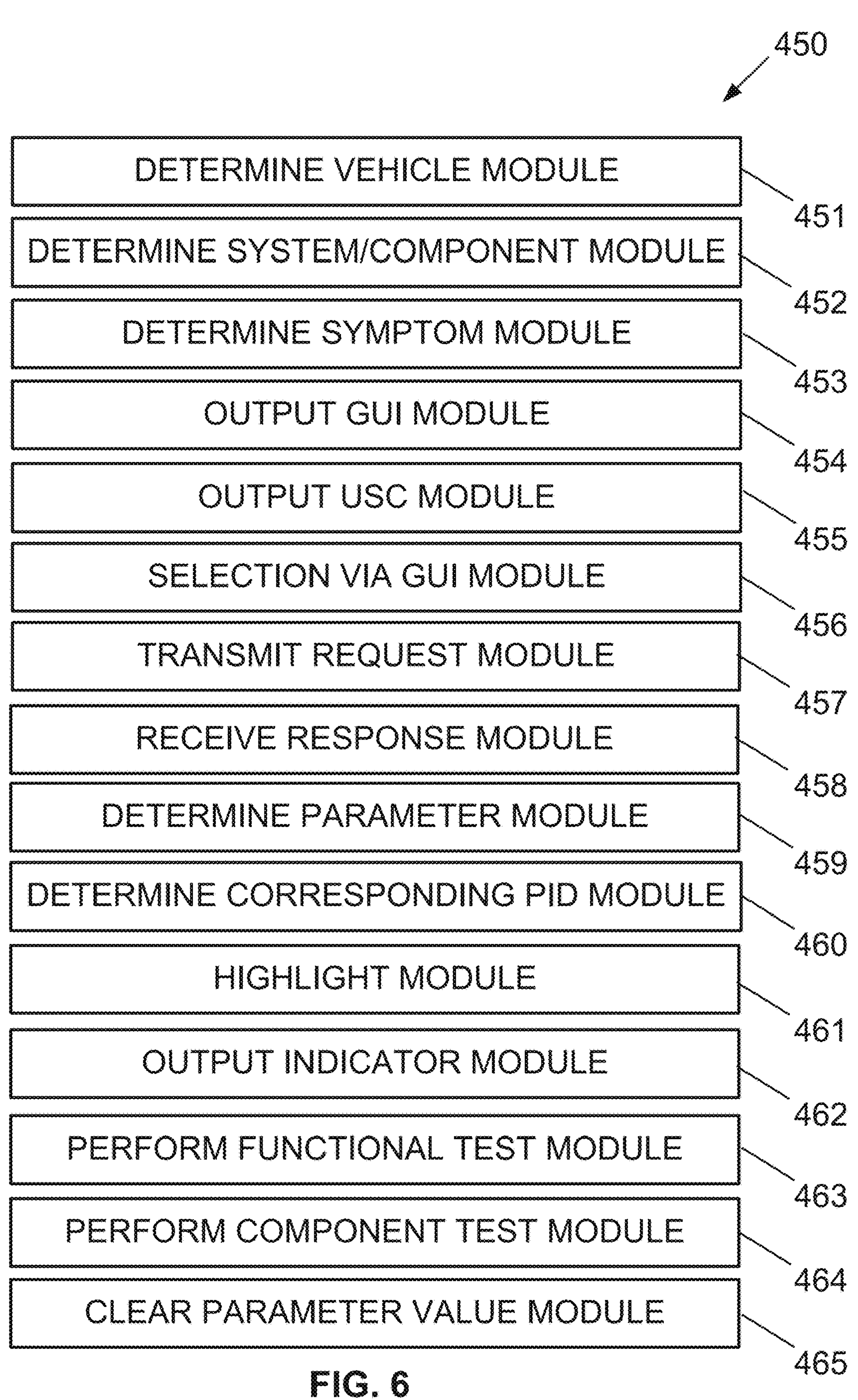
FIG. 6 shows modules, in accordance with the example embodiments.

The module 96 can include one or more modules. Examples of modules within the module 96 are shown in FIG. 6. In at least some embodiments, multiple modules are arranged as an application. As an example, an application can comprise a browser application.

The GUI 97 can include one or more GUIs and/or data for generating one or more GUIs. In at least some implementations, the GUI 97 includes a GUI transmitted to the VST 70 from the server 130. Examples of a GUI contained within and/or generated based on data contained within the GUI 97 are shown in FIG. 13 to FIG. 55. In at least some embodiments, each GUI corresponds to one or more types of vehicles, one or more systems, one or more vehicle components, one or more symptoms, and/or one or more DTCs. In at least some embodiments, a GUI is populated with vehicle identifying information regarding one or more types of vehicles and/or USCs corresponding to one or more systems or vehicle components. The GUI 97 can include a data map that indicates which type(s) of vehicle(s), vehicle system(s), vehicle component(s), symptoms, or DTCs corresponds to a GUI. The processor can determine the GUI based on the mapping data and data indicative of the type(s) of vehicle(s), system(s), vehicle component(s), symptom(s) or DTC(s).

The component test 98 can include one or more component tests, such as one or more guided component test. Each component test can include computer-readable program instructions (e.g., a perform component test module 464) executable to perform the component test. Execution of a component test module can include configuring a test device for performing the component test for the component and/or vehicle to be tested. As an example, a component test can include a voltage test, an amperage test, a frequency test, a resistance test, a duty cycle test, or a pressure test. As another example, a component test can be specified for a particular component, such as a fuel pump voltage test or a fuel pump pressure test. As yet another example, a component test can be specified for a particular vehicle on a particular vehicle, such as a fuel pump voltage test on a 2018 Jeep Cherokee (4WD) with 3.6 L engine, or a fuel pump pressure test on a 2018 Jeep Cherokee (4WD) with a 3.6 L engine.

A guided component test can include a component test performed by the test device 75 (e.g., a test performed by the meter 87 or the oscilloscope 88). The guided component test can include one or more setup instructions executable by the processor 71 or the test device 75 to configure the meter 87 or the oscilloscope 88 to perform a particular component test. As an example, the setup instructions can include an instruction for the processor to select the meter 87 or the oscilloscope 88. As another example, the setup instructions can include an instruction to put the meter 87 in a particular measurement mode (e.g., a voltage measurement mode, an amperage measurement mode, or a resistance measurement mode). As another example, the setup instructions can include an instruction to configure the oscilloscope 88 with a particular display setting, such as a particular sweep rate or volts per division. As yet another example, the setup instructions can include an instruction to configure the oscilloscope 88 with a particular trigger mode.

A guided component test can also include test instructions. As an example, the test instructions can include an instruction to sample input signals received at the test device 75. The instruction to sample input signals can be based on whether the guided component test is for measuring a direct current signal or an alternating current signal. Such instruction can specify a sampling rate for sampling the input signals. As another example, the test instructions can include an instruction for storing the input signal samples in a memory. As yet another example, the test instructions can include an instruction to output a representation of the input signal samples on a display. In accordance with implementations in which the test device 75, the meter 87 or the oscilloscope 88 is remote from the VST 70, the setup instructions and the test instructions can include an instruction for establishing a communication link between the VST 70 and the test device 75, the meter 87, or the oscilloscope 88 and instruction for transmitting or receiving a communication corresponding to a guided component test via the communication link.

In at least some implementations, the guided component test includes displayable information, such as test procedures, test device connection guidance, connector views, a graph showing a known good waveform for a component corresponding to the guided component test, a graph showing a known bad waveform for a particular component corresponding to the guided component test, or expected test results.

In at least some implementations, the component test 98 includes multiple sets of test device configuration parameters and each set of test device configuration parameters is associated with an index value. A server (e.g., the server 6, 130) can determine which set of device configuration parameters is to be used to set up the test device 75 during a vehicle ID session. The server can transmit the determined set of test device configuration parameters to the VST 3, 70. Alternatively, the server can transmit the index value associated with the determined set of test device configuration parameters to the VST 3, 70. In this alternative arrangement, the computing system can determine the appropriate test device configuration parameters for the vehicle ID session based on the index value received at the VST 3, 70.

The vehicle selection data 99 can include one or more vehicle selection menus or data for generating the one or more vehicle selection menus that can be output on and/or within a GUI of the GUI 97. The processor 71 can output a vehicle selection menu on the display 81 to allow a user to select a type of vehicle or a particular vehicle. The vehicle selection data 99 can also include data that represents relationships between vehicle model years and the types of vehicles that were built for and/or during each model year. For instance, for a given model year, the vehicle selection data 99 can include data that indicates all vehicle makes that include at least one type of vehicle for the given model year, and for each of those vehicle makes, the vehicle selection data 99 can include data that indicates all vehicle models that correspond to one of the vehicle makes that built at least one type of vehicle for the given model year. FIG. 14 and other figures show a vehicle identifier 329 with a GUI. In at least some implementations, the vehicle identifier 329 can be output on the GUI based on selections made using one or more vehicle selection menus based on the vehicle selection data 99. As an example, at least a portion of the vehicle selection data 99 can be output on and/or within a GUI, such as the GUI 275 shown in FIG. 13.

The vehicle data message 100 includes one or more vehicle data messages (VDMs) and/or data to generate the one or more VDMs to be transmitted by the VCT 91. A VDM within the vehicle data message 100 can include a VDM received by the vehicle communications transceiver 91. A VDM within the vehicle data message 100 can include a VDM that is to be or has been transmitted by the VCT 91. The VDM can include a message map for decoding a VDM received by the VCT 91 and/or for encoding a VDM that is to be transmitted by the VCT 91. The message map can include a formula for converting one or more fields of a VDM to a value represented by the one or more fields. The message map can indicate which field in the VDM is a PID and which field(s) are a PID parameter value. The message map can include a textual description corresponding to each PID so that the processor can know which container or sub-container including PID is to be populated with the textual description and a parameter value corresponding to the PID. As an example, the fields can represent an engine RPM, a battery voltage, an engine coolant temperature, or any PID represented within a GUI shown in FIG. 18 to FIG. 55.

The vehicle data message 100 can include one or more buffers to store PIDs and corresponding parameter values. In at least some implementations, the buffer(s) store the PIDs and corresponding parameter values in a first in, first out (FIFO) format. The processor can read parameter values from the buffer and output the parameter values within a GUI to show a historical representation of the parameter values.

The vehicle data message 100 can include commands 101 can include a PID command 102 (i.e., one or more PID commands), a functional test command 103 (i.e., one or more functional test commands), and a reset procedure command 104 (i.e., one or more reset procedure commands). A PID command can include a PID. A functional test command can include an identifier of a functional test. A reset procedure command can include an identifier of a reset procedure. An identifier of a PID, a functional test identifier, a reset identifier, a component test identifier can be included within mapping data or an index described in this description.

The PID command 102 includes data that indicates how a VDM should be arranged to request a PID parameter value from the vehicle 4 for a particular PID. As an example, the PID command 102 can indicate a particular VDM protocol that is to be used to generate the VDM. As another example, the PID command 102 can include an ECU identifier of the ECU from which the PID parameter value is to be requested. As yet another example, the PID command 102 can include the PID. The processor 71 can determine the PID command 102 based on an index value corresponding to a PID. The PID command 102 can include a PID group identifier for one or more PIDs so that the processor 71 can determine which PIDs belong to a PID group and can populate a container with PID data regarding PIDs in the PID group.

As an example, a VDM can be arranged as $07 $DF $02 $01 $31 $42 $00 $00 $00 $00. In that example VDM, the fifth byte is the PID, the sixth byte is a parameter value. In at least some implementations, the PID command 102 includes formulas for converting a PID parameter value to a value represented by the PID parameter value.

The functional test command 103 includes data that indicates how a VDM should be arranged for requesting the vehicle 4 to perform a particular functional test. As an example, the functional test command 103 can indicate a particular VDM protocol that is to be used to generate the VDM. As another example, the functional test command 103 can include an ECU identifier of the ECU that is configured to perform the functional test. As yet another example, the functional test command 103 can include the functional test identifier. The processor 71 can determine the functional test command 103 based on an index value corresponding to a functional test identifier. One or more functional test commands can correspond to a notification the processor 71 outputs on the display 81 before the processor 71 transmits the functional test command. As an example, the notification can include a safety alert, or a set-up instruction.

Additionally or alternatively, the processor 71 can determine the functional test command 103 based on a menu selection and program code or data that corresponds to the menu selection. The processor 71 can use data indicating a VDM protocol to determine which VCT of multiple VCTs is to be used to transmit a functional test command and/or the format for generating a VDM including the functional test command.

The reset procedure command 104 includes data that indicates how a VDM should be arranged for requesting the vehicle 4 to perform a particular reset procedure. As an example, the reset procedure command 104 can indicate a particular VDM protocol that is to be used to generate the VDM. As another example, the reset procedure command 104 can include an ECU identifier of the ECU that is configured to perform the reset procedure. As yet another example, the reset procedure command 104 can include the reset procedure identifier. The processor 71 can determine the reset procedure command 104 based on an index value corresponding to a reset procedure identifier. As an example, performing a reset procedure can include modifying a setting within an ECU (e.g., a setting that indicates the oil life setting is 100%, resetting an advanced driver assistance system (ADAS) component after a vehicle collision, or resetting a fuel injector). As another example, performing the reset procedure can include reprogramming an ECU with the vehicle. For instance, reprogramming the ECU can include flash programming a software calibration file into the ECU and/or flash programming an ECU according to SAE standard J2534. In at least some implementations, performing the reset can include scanning a matrix code (e.g., a QR code), decoding the matrix code, requesting a software download for a component that is to be reprogrammed, receiving the software download, and reprogramming the component with the software download. As yet another example, performing the reset procedure can include re-zeroing a sensor, such as a steering wheel angle sensor. As yet another example, performing the reset procedure can include a level initiation and leveling of headlight reset procedures to adjust, for example, an angle or height of the headlight.

The mapping data 109 can include mapping data that maps a variety of data to each other. The mapping data 109 can include an index mapped to data the processor 71 uses to output a GUI, content of a GUI, or a VDM. As an example, the processor 71 can execute a determine parameter module 459 (shown in FIG. 6) to determine a PID based on mapping data. The mapping data 109 can include an index that matches an index received from the server 130. As an example, the mapping data 109 can include mapping data arranged according to a mapping data arrangement 69, 69 shown in FIG. 7, such as the set 142, 143, 146, 148, 149 of mapping data. As another example, the mapping data 109 can include mapping data 20 shown in FIG. 8A to FIG. 8D; mapping data 145 shown in FIG. 9A to FIG. 9D; mapping data 147 shown in FIG. 10A to FIG. 10D, and/or mapping data 115 shown in FIG. 11A to FIG. 11D.

The mapping data 109 can be referred to as a database and/or a data map. The database or data map can include the mapping data 109 alone or with other data. In accordance with at least some embodiments, the mapping data 109 includes a data map or mapping data with multiple classes of data. The multiple classes include two or more classes from among a set of classes including: a vehicle model year class, a vehicle make class, a vehicle model class, a vehicle system class, a vehicle sub-system class, a vehicle component class, a vehicle data message class, a PID group class, a component test class, a units class, and a spatial class. A class can be referred to as a "data type" or a "field."

Turning back to FIG. 5, the service information 110 can include service information for populating into a GUI. The service information can correspond to particular vehicles, particular vehicle components and systems, particular PID facets, or particular PIDs. The service information can correspond to particular tests or reset procedures. As an example, the service information 110 can include instructions, specifications, images, videos, component location information, schematic diagrams, or some other type of service information listed in this description or otherwise.

H. Example Modules

Next FIG. 6 shows a set 450 of modules. The module 96 in FIG. 5 and/or a module 141 shown in FIG. 12 can include one or more modules of the set 450 of modules. The set 450 of modules includes a determine vehicle module 451, a determine system/component module 452, a determine symptom module 453, an output GUI module 454, an output USC module 455, a selection via GUI module 456, a transmit request module 457, a receive response module 458, a determine parameter module 459, a determine corresponding PID module 460, a highlight module 461, an output indicator module 462, a perform functional test module 463, a perform component test module 464, and a clear parameter value module 465.

The determine vehicle module 451 can be configured to determine a vehicle, such as vehicle a user wants to diagnose and/or service via the VST 3, 70. The vehicle can be operatively connected to the VST via the communication link 5. As an example, the processor 71 executing the determine vehicle module 451 can determine the vehicle based on vehicle identifying information received at the processor 71. In at least some implementations, the vehicle identifying information can be contained within a VDM received from the vehicle, an image showing a code encoded with the vehicle identifying information, or an image showing a textual representation of a VIN. In at least some implementations, the vehicle identifying information can be generated based on selections made via a GUI, such as the GUI 275 shown in FIG. 13. As another example, the processor 131 executing the determine vehicle module 451 can determine the vehicle based on a communication including vehicle identification information sent to the server 130 from the VST 70. As another example, the processor executing the determine vehicle module 451 can determine the vehicle based on the vehicle selection data 99 shown in FIG. 5 and FIG. 12. The processor 71, 131 can determine a GUI to output based on the determined vehicle.

The determine system/component module 452 can be configured to determine a system or component within a vehicle, such as a system or component a user wants to diagnose and/or service via the VST 3, 70. As an example, the processor 71 executing the determine system/component module 452 can determine the component or system based on vehicle identifying information received at the processor 71. The component or system can be represented by a character of a vehicle identification number the processor 71 receives from the vehicle. As an example, the processor 71 executing the determine system/component module 452 can determine the component or system based on one or more selections from a GUI, such as the GUI 275 shown in FIG. 13 and/or the GUI 250 shown in FIG. 14. The processor 71, 131 can determine a GUI to output based on the determined system and/or component.

The determine symptom module 453 can be configured to determine a symptom of a vehicle, such as a symptom a user wants to diagnose and/or service via the VST 3, 70. As an example, the processor 71 executing the determine symptom module 453 can determine the symptom based on a for a previously-determined component or system in a previously-determined vehicle. As an example, the processor 71 executing the determine symptom module 453 can determine the symptom based on one or more selections from a GUI, such as the GUI 248 shown in FIG. 16 and/or the GUI 247 shown in FIG. 17. In regard to the GUI 247, the symptom can indicate a DTC. The processor 71, 131 can determine a GUI to output based on the determined symptom. The determined symptom can include one or more symptoms.

The output GUI module 454 can be configured to output a GUI (e.g., a first GUI) and/or data to generate a GUI (i.e., GUI data). As an example, outputting the GUI and/or the GUI data can include a processor outputting the GUI or the GUI data to a data bus, a network, and/or a display. Outputting the GUI can include displaying the GUI on the display. As an example, execution of the output GUI module 454 can include outputting and/or displaying the GUI 150, 247, 248, 249, 250, 275, 300, 500, 600 shown in one or more of the drawings. As another example, execution of the output GUI module 454 can include outputting and/or displaying a GUI for making a selection, such as: a selection of a vehicle, a selection of a vehicle system or component identifier, a selection of a spatial aspect, a selection of a symptom, a selection of a DTC, or a selection of a PID group from among multiple PID groups corresponding to the selected vehicle system or component. The output GUI module can be configured to output a second GUI based on a selection made from a first GUI.

In accordance with at least some embodiments, outputting a GUI (e.g., a second GUI) can include outputting a GUI based on a selection made via another GUI (e.g., a first GUI). The second GUI includes a first set of containers and a first PID facet selector. The first set of containers includes a first container corresponding to a first PID group. The first container includes multiple sub-containers corresponding to a respective PID. Additionally, parameter values received in response to a first portion of the requests for PIDs in a PID group can be output within the second GUI. Each parameter value received in response to the first portion of the requests corresponds to one of the PIDs within the PID group.

In accordance with the embodiments in which a PID facet selector has been selected from the second GUI discussed above, the output GUI module 454 can be configured to output a second set of containers instead of the first set of containers within the second GUI in response to the selection of the PID facet selector. The second set of containers includes a container corresponding to a second PID group different than the first PID group. The container corresponding to the second PID group includes multiple sub-containers corresponding to a respective PID. Additionally, the output GUI module 454 can be configured to output, within the second GUI, parameter values received in response to a second portion of the requests. Each parameter value received in response to the second portion of the requests corresponds to one of the PIDs within the second PID group.

The output GUI module 454 can be configured to output a GUI including a set of containers including one or more containers. Each of the one or more other containers corresponds to a respective PID group other than the first PID group displayed in the GUI before selection of a PID facet selector. Each of the one or more other containers includes multiple sub-containers corresponding to a respective PID within one of the respective PID groups.

The output USC module 455 can be configured to output a USC on the display 81. As an example, outputting a USC occurs by outputting a GUI. As another example, outputting a USC occurs by modifying a GUI to show the USC.

A USC can include a PID facet selector. A PID facet selector can include and/or be configured as a USC. As an example, the output USC module 455 can be configured to output a USC (i.e., a PID facet selector) in response to selection of a different USC (i.e., a PID facet list expander). In accordance with FIG. 18 and FIG. 19, selection of the PID facet list expander 155, 156, 668 in FIG. 18 causes the set 177, 178, 669 of PID facet selectors to be output within the GUI 150 as shown in FIG. 19. In accordance with at least some embodiments, a set (e.g., a group) of PID facet selectors can include: a group of PID facet selectors corresponding to cylinders of an internal combustion engine, a group of PID facet selectors corresponding to fuel injectors of the internal combustion engine, a group of PID facet selectors corresponding to ignition coils of the internal combustion engine, or a group of PID facet selectors corresponding to different banks of the internal combustion engine. In accordance with at least some embodiments, a set (e.g., a group) of PID facet selectors can include: a group of PID facet selectors include a particular group of PID facet selectors, the particular group of PID facet selectors includes multiple, particular PID facet selectors corresponding to respective vehicle components distinguished, in part, using numerals based on a spatial arrangement of the vehicle components within the vehicle.

The output USC module 455 can be configured to output a USC selectable to clear previously-received parameter values from a GUI and/or from the memory (e.g., from the vehicle data message 100).

The selection via GUI module 456 can be configured to make a selection via a GUI output on the display 81. As an example, execution of the selection via the GUI module 456 can include determining a USC displayed on the display 81 is selected or a hardware USC of the user interface 74 is selected. As another example, execution of the selection via the GUI module 456 can include determining a context associated with a selected USC. As an example, the context associated with a selected USC can include a vehicle characteristic (e.g., a vehicle, a system, a component, a symptom, a DTC, or a PID group), a PID facet list expander, a PID facet selector, a data list of a contextual group of PIDs, a container within a GUI, a sub-container within a GUI, a functional test, or a guided component test. The context can indicate a VDM to be transmitted to the vehicle 4, 32 50 or indicate a communication to be transmitted to the server 130 (e.g., a communication to request service information from the server 130).

In at least some embodiments, a selection made using a GUI output on a display includes one or more from among: a selection of a vehicle, a selection of a vehicle model year, a selection of a vehicle make, a selection of a vehicle model, a selection of a vehicle system, a selection of a vehicle sub-system, a selection of a vehicle component, a selection of the first PID group from among multiple PID groups corresponding to the vehicle system, a selection of the first PID group from among multiple PID groups corresponding to the vehicle component, a selection of a symptom, or a selection of a DTC. In at least some embodiments, the selection of the DTC includes a DTC received via execution of transmit request module 457 to request a DTC and the receive response module 458.

In at least some embodiments, a selection made using a GUI output on a display includes a selection indicative of a selection of data corresponding to one or more from among the vehicle model year class, the vehicle make class, the vehicle model class, the vehicle system class, the vehicle sub-system class, or the vehicle component class. The vehicle data message class includes a PID message class. The data map is arranged so that first particular data within the data map indicates the first vehicle component is related to the first vehicle sub-system, and that the first vehicle sub-system is related to the vehicle system. In at least some embodiments, the vehicle data message class includes a PID message class, a functional test actuator class, or a functional test reset class.

The transmit request module 457 can be configured to transmit a communication via a transceiver. As an example, the processor 71 can execute the transmit request module 457 to transmit a communication to the server 130 via the network transceiver 90 or to transmit a VDM to the vehicle 4, 32, 50 via the vehicle communication transceiver 91. The transmit request module 457 can be configured to generate the message and transmit the message to the transceiver 72, network transceiver 90, or the vehicle communication transceiver 91. As another example, the transmit request module 457 can be configured to transmit requests to a vehicle. The requests can include one or more PIDs within a PID group. As an example based on the GUI 150 shown in FIG. 20, the requests can include PIDs I, J, L, Q, and R indicated within the container 182. Additionally, the requests to the vehicle can include a DTC request. Additionally, the requests to the vehicle can include a functional test request or a reset procedure request.

The receive response module 458 can be configured to receive a communication via a receiver. At the VST 70, the processor 71 can execute the receive response module 458 to receive a communication from the server 130 via the network transceiver 90 or to receive a VDM from the vehicle 4, 32, 50 via the vehicle communication transceiver 91. As an example, the receive response module 458 can be configured to receive a VDM from a vehicle and recover a PID (such as the PIDs I, J, L, Q, or R indicated within the container 182) and a corresponding PID parameter. As another example, the receive response module 458 can be configured to receive a DTC in response to a DTC request. The received DTC can correspond to a PID group.

At the server 130, the processor 131 can execute the receive response module 458 to receive a communication from the VST 70 via the transceiver 132. As an example, the receive response module 458 can be configured to receive a request for a GUI and data to determine which GUI to provide in response (such as data that indicates a vehicle identifier, vehicle system, vehicle component, symptom, or DTC). The receive response module 458 can be configured to parse a received communication to recover data within the communication and provide the data to a processor.

The determine parameter module 459 can be configured to determine a parameter value (or more simply, a parameter) corresponding to a PID. As an example, the determine parameter module 459 can be configured to parse a VDM (such as the VDM arranged as $07 $DF $02 $01 $31 $42 $00 $00 $00 $00 discussed above) to determine the sixth byte $42 is the parameter corresponding PID $31 represented by the fifth byte. The determine parameter module 459 can be configured to determine a parameter from each received VDM including a PID and parameter and to store the parameters within the vehicle data message 100 and/or to output the parameter to the display 81 or to a module that outputs the parameter to the display 81.

Additionally or alternatively, the parameter module 459 can be configured to determine whether a parameter value corresponding to a PID breaches a threshold corresponding to the PID. In at least some embodiments, mapping data can include data indicative of the threshold. As an example, the processor 71 can receive a VDM including the PID and PID parameter value, parse the VDM to determine the PID parameter value and that the PID parameter value corresponds to the PID. As another example, the processor 71 can convert the PID parameter value within the VDM to a modified PID parameter value. For instance, the processor 71 can receive a VDM including the PID $11 and a one byte PID parameter value representing a throttle position. Converting that PID parameter value can include changing the PID parameter value from hexadecimal to decimal and multiplying the decimal value by 100 so as to obtain a throttle position in the range of 0-100 percent. The parameter module 459 can be configured to output a PID flag within a GUI and/or to modify a PID flag within the GUI. As an example, the PID flag can include a white flag (e.g., the PID flag 338 shown in FIG. 18) if the threshold corresponding to the PID has not yet been breached or a black flag (e.g., the PID flag 339 shown in FIG. 25) if the threshold corresponding to the PID has been breached by a PID parameter value corresponding to the PID.

Figure 30:
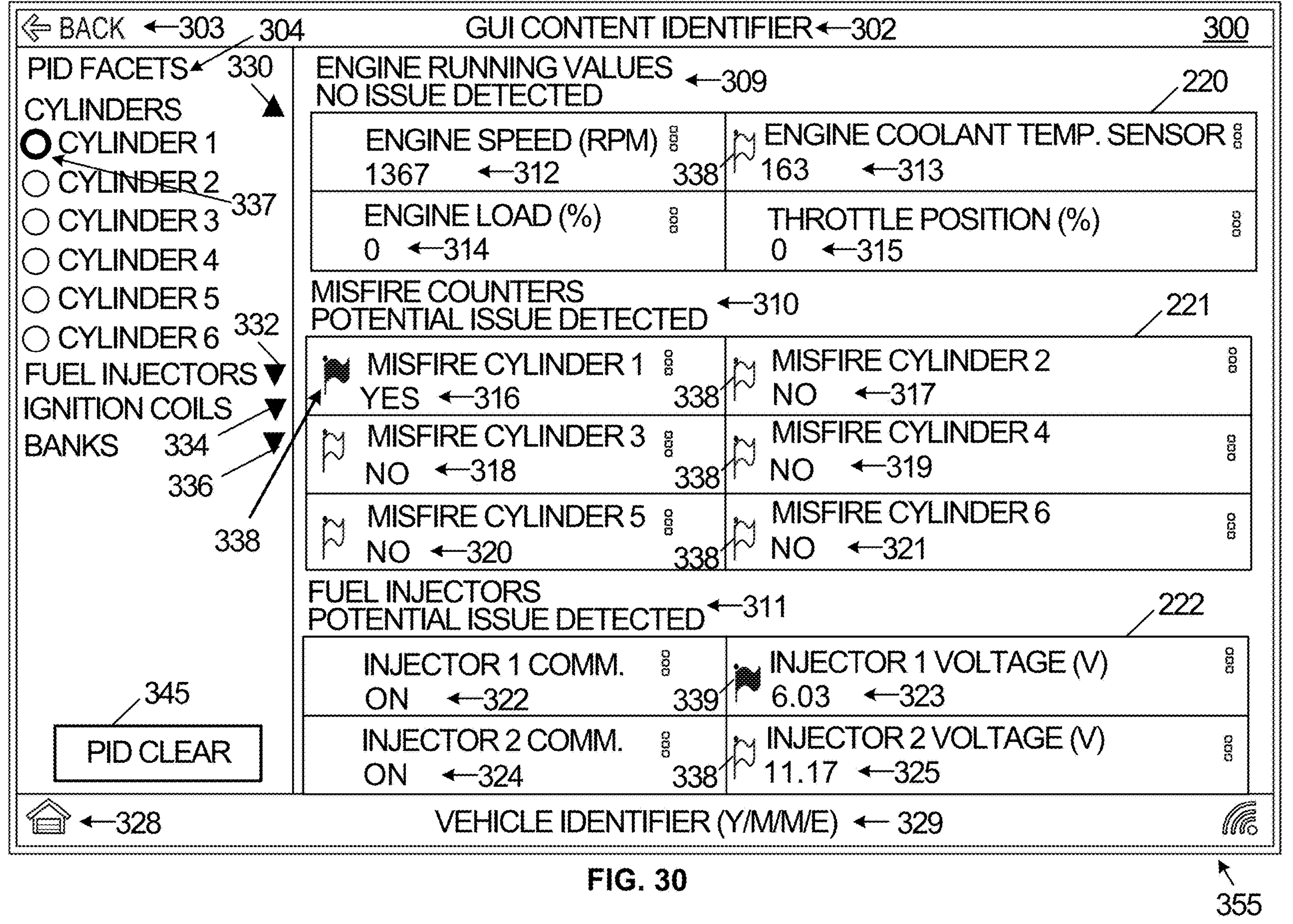
Figure 35:
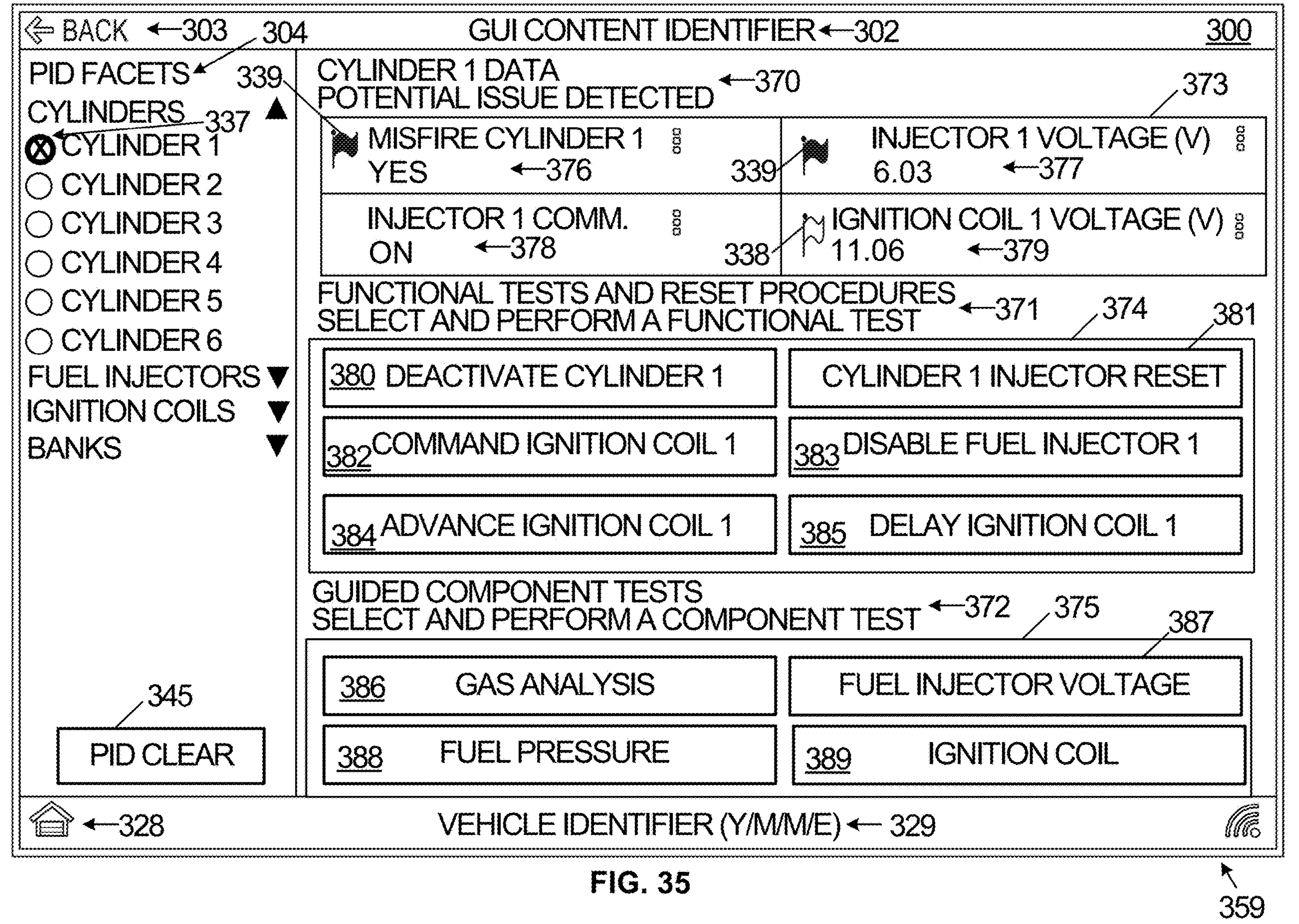

The determine corresponding PID module 460 can be configured to determine one or more PIDs corresponding to a selection, such as selection of a vehicle, system, component, symptom, DTC, or PID facet selector. As an example, the determine corresponding PID module 460 can determine one or more PIDs that correspond to a PID facet corresponding to a PID facet selector. Referring to FIG. 30 and FIG. 35, in response to a selection of the PID facet selector 337 as shown in FIG. 30, the determine corresponding PID module 460 can determine that PIDs indicated by the PID content 312, 313, 314, 315 correspond to the PID facet selector 337 and cause the PID content 312, 313, 314, 315 to be output in the GUI 300 as shown in FIG. 35. The determine corresponding PID module 460 can determine a PID based on a selection by reference to the mapping data 109 (e.g., the mapping data 20, 115, 145, 147.

The highlight module 461 can be configured to highlight one or more aspects of a GUI. As an example, execution of the highlight module 461 can include highlighting a PID facet selector, such as a PID facet selector corresponding to a component for which the processor 71 has determined a parameter value has breached a threshold for a PID corresponding to the component. Other PID facet selectors can be unhighlighted while another PID facet selector is highlighted. An example of a PID facet selector 337 that is highlighted is shown in FIG. 30. Other PID facet selectors of the set 331 of PID facet selectors are shown as not highlighted in FIG. 30. As another example, execution of the highlight module 461 can include highlighting a PID flag, such as a PID flag 339 shown in FIG. 25, to indicate a threshold corresponding to the PID has breached a threshold.

The output indicator module 462 can be configured to output an indicator that indicates whether a parameter value corresponding to a PID has breached a threshold corresponding to the PID. In the drawings, the indicator is represented as a flag (e.g., the PID flag 338 shown in FIG. 25). Additionally, in the drawings, a white flag (i.e., the PID flag 338 in several drawings) represents the parameter values corresponding to the PID have not breached the threshold, whereas a black flag (i.e., the PID flag 339 in several drawings) represents that at least one parameter value corresponding to the PID has breached a threshold. An indicator output by execution of the output indicator module 462 can be represented by an indicator different than a flag.

Execution of the output indicator module 462 can include comparing each parameter value received for a PID to one or more thresholds corresponding to the PID, such as a minimum threshold and a maximum threshold. In at least some embodiments, the processor executing the output indicator module 462 can refer to the mapping data 109 to determine threshold(s) corresponding to each PID.

As an example, execution of the output indicator module 462 can include outputting an indicator that indicates whether a parameter value corresponding to one or more PIDs within a PID group has breached the respective threshold corresponding to the one or more PIDs. As an example, the indicator can be output within a container or sub-container, such as the container 221 shown in FIG. 25 and a sub-container corresponding to the PID content 316 shown in FIG. 25.

The perform functional test module 463 can be arranged to configure the VST 3, 70 for performing a functional test. As an example, configuring the VST can include associating a USC on the display 81 or a hardware USC with the functional test and generating a VDM to send to the vehicle 4, 32, 50 in response to determining the USC has been selected. Execution of the perform functional test module 463 can include the processor 71 causing the VCT 91 to transmit the VDM to an ECU in the vehicle via one of the arrangement 8, 9, 10 shown in FIG. 2. Execution of the perform functional test module 463 can include receiving one or more VDM from the vehicle during performance of the functional test and/or receiving one or more VDMs after performance of the functional test with data indicating a status with respect to performance of the functional test. As an example, the VDM(s) received during or after performance of the functional test can include a PID and a PID parameter value representing a status with respect to a component or system being tested via the functional test or a related component. Execution of the perform functional test module 463 can include outputting the PID parameter value within a GUI output to the display 81. The perform functional test module 463 can be arranged to-configured to perform the functional test in response to selection of a USC corresponding to a functional test, such as the USC 188 shown in FIG. 20. In at least some embodiments, execution of the perform functional test module 463 causes the processor to output another USC (e.g., the start USC 228 shown in FIG. 54) that has to be selected before the request for performance of the functional test is sent to the vehicle. The other USC can be output with an instruction and/or safety alert. The perform functional test module 463 can be configured to transmit a VDM to request performance of a reset procedure.

The perform component test module 464 can be arranged to configure the VST 3, 70 for performing a component test (e.g., a guided component test). As an example, configuring the VST 3, 70 can include configuring the test device 75 for performing the component test. As an example, configuring the test device 75 can include configuring the signal generator 86, the meter 87, and/or the oscilloscope 88 for performing the component test. As an example, configuring the signal generator 86 can include configuring the signal generator 86 to output a particular electrical signal (e.g., a sine wave with a particular frequency and amplitude, or a square wave with a particular frequency, duty cycle and amplitude) for providing to a component on the vehicle in order to see how the component responds to the particular electrical signal. As another example, executing the perform component test module 464 can include outputting within a GUI (e.g., the GUI 445 shown in FIG. 55) a representation of a measurement made by performing the component test. In at least some implementations, the measurement includes a voltage, a resistance, a current, a frequency, a pressure, a percentage, or a weight (e.g., a force). The representation, in at least some implementations, includes a textual or graphical representation. As an example, the graphical representation includes a heat map or a line graph. The perform component test module 464 can be configured to perform the component test in response to selection of a USC corresponding to a component test, such as the USC 192 shown in FIG. 20. In at least some embodiments, execution of the perform component test module 464 causes the processor to output another USC (e.g., the start USC 228 shown in FIG. 54) that has to be selected before beginning the guided component test (e.g., a measurement).

Figure 34:
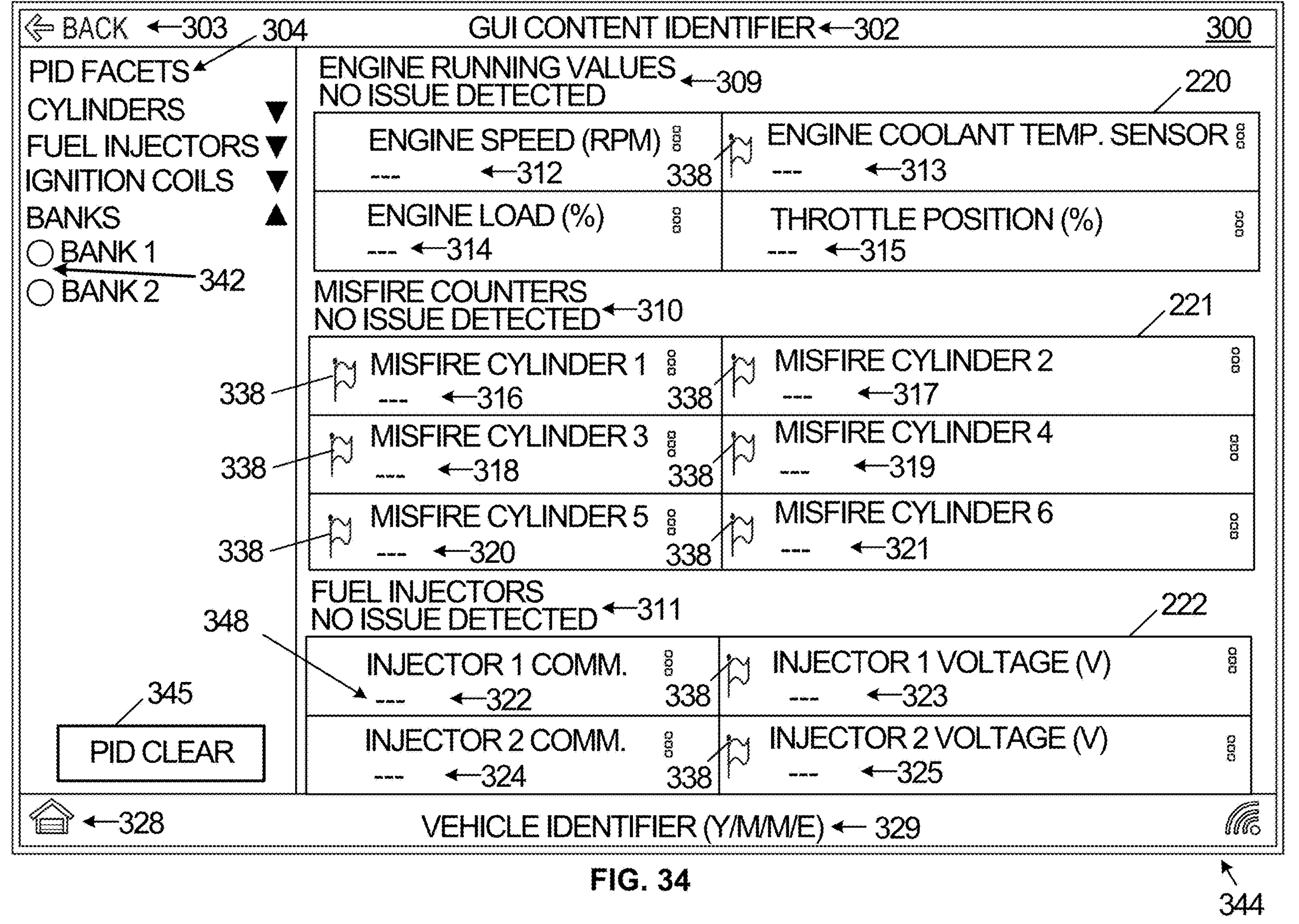

The clear parameter value module 465 can be configured to clear previously-received parameter values from a GUI and/or from the non-transitory computer-readable memory (e.g., from a buffer within the vehicle data message 100). FIG. 34 shows an example of a GUI after parameter values have been cleared. The processor 71 can execute the clear parameter value module 465 in response to a selection of the PID clear USC 345 shown in the GUI 150, 300, 500, 600. Clearing previously-received parameter values from the second GUI and/or from the non-transitory computer-readable memory (e.g., from the vehicle data message 100).

I. Example Mapping Data

Figure 7:
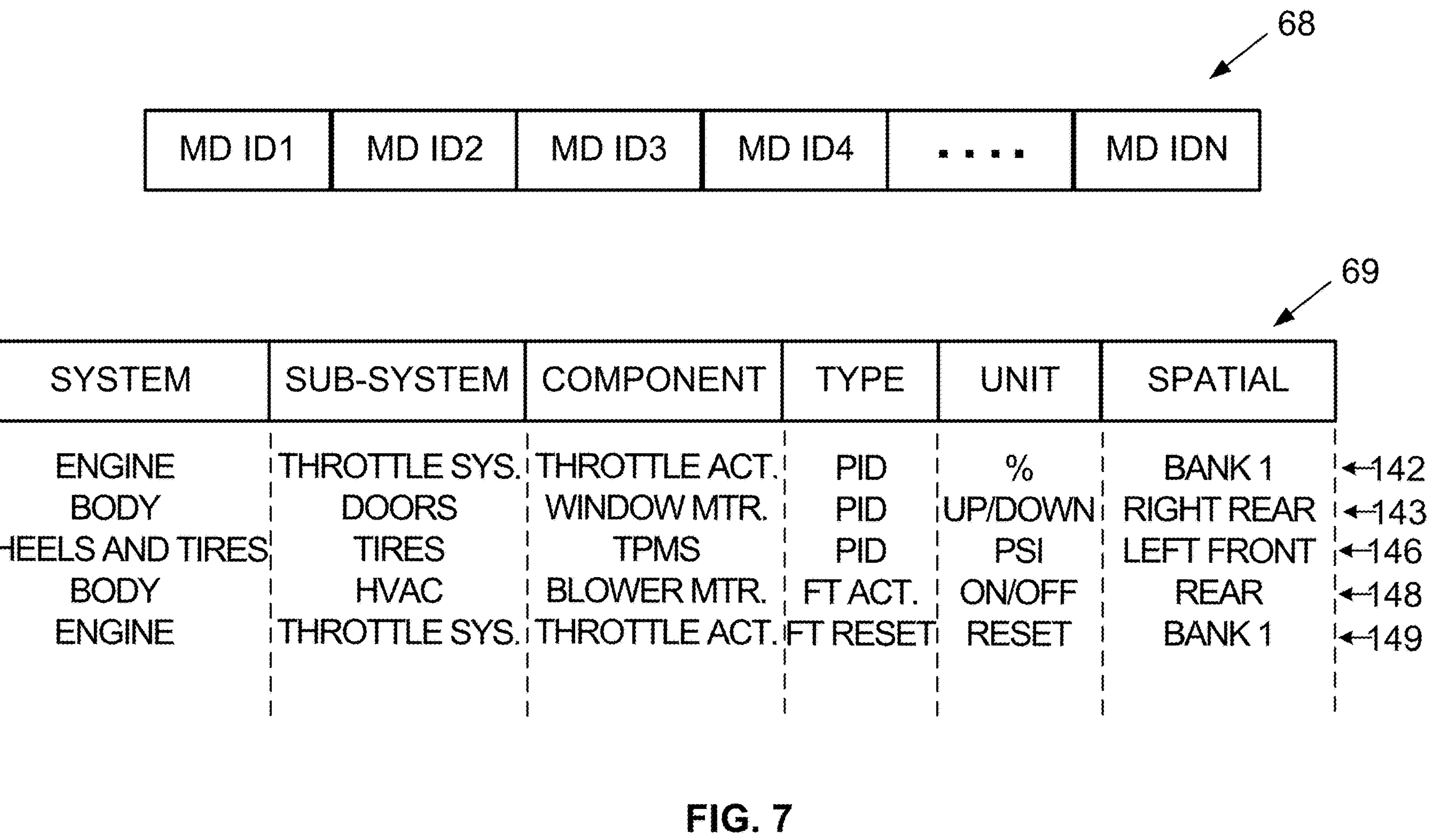
FIG. 7 shows a mapping data arrangement, in accordance with the example embodiments.

Next, FIG. 7 shows a mapping data arrangement 68. Each item in a rectangle shown in FIG. 7 represents an identifier within the mapping data. The mapping data arrangement 68 indicates "IDN" to represent N quantity identifiers. As an example, N can equal two to thirteen identifiers. As another example, N can equal a quantity of identifiers greater than thirteen identifiers.

FIG. 7 shows a mapping data arrangement 69 in accordance with the mapping data arrangement 68. The mapping data arrangement 69 includes a system identifier, a subsystem identifier, a component, a type identifier, a unit identifier, and a spatial identifier. The identifiers within the mapping data arrangement 69 do not have to be stored in a sequence, such as a sequence from left to right as shown in FIG. 7, FIG. 8A to FIG. 8D, FIG. 9A to FIG. 9D, FIG. 10A to FIG. 10D, and/or FIG. 11A to FIG. 11D show example mapping data including other types of mapping data identifiers. A person having ordinary skill in the art will understand that the mapping data 109 can include mapping data corresponding to any combination of mapping data identifiers described in this description, and can include mapping data corresponding to one or more other mapping data identifiers.

FIG. 7 shows a set 142, 143, 146, 148, 149 of mapping data identifiers arranged according to the mapping data arrangement 69, 69. For example, the set 142 includes a system identifier "Engine," a sub-system identifier "Throttle system," a component identifier "Throttle actuator," a type identifier "PID," a unit identifier "%," and a spatial identifier "Bank 1." The abbreviations "MTR" and "FT ACT" in the set 148 represent "motor" and "functional test actuator," respectively. The abbreviations "SYS," "ACT," and "FT" in the set 149 or another set in FIG. 7 represent "system" "actuator," and "functional test," respectively. The mapping data 109 (shown in FIG. 5 and FIG. 12) can include mapping data arranged according to the mapping data arrangement 68.

1. First Mapping Data Example

Next, FIG. 8 (i.e., FIG. 8A to FIG. 8D) show mapping data 20 in accordance with example embodiments in which a group of vehicles corresponding to a vehicle identifier "V1" include an internal combustion engine. The data within each row of the mapping data 20 are mapped to each other and to the group of vehicles identifiable by the vehicle identifier "V1." The mapping data 20 can be contained within the mapping data 109 shown in FIG. 5 and FIG. 12. A person having ordinary skill in the art will understand that the mapping data 20, 109 can be stored in a memory as binary data.

Each row of the mapping data 20 includes at least some of the following: a vehicle identifier, a system identifier, a component identifier, a symptom identifier, a PID, a threshold, a PID name, a group identifier, a sensor identifier, a cylinder identifier, a bank identifier, a spatial identifier, a measurement type identifier, a scale/unit identifier, a functional test identifier, a reset procedure identifier, or a component test identifier.

The vehicle identifiers for the mapping data 20 are shown in a column 21. Each of those vehicle identifiers is shown as "V1" to represent a group of vehicles that uniquely distinguishes that group of vehicles from other groups of vehicles. As an example, the vehicle identifier "V1" (or a vehicle identifier "V2", "V3", or "V4" shown in FIG. 9A, FIG. 10A, FIG. 11A, respectively) can represent a VIN, a portion of a VIN, or some combination of vehicle identifying information, such as a YMM, YMME, or other combination of vehicle identifying information. Examples of such information is described elsewhere in this description.

The system identifiers for the mapping data 20 are shown in a column 22. That column includes the system identifiers "S1" and "S2." Table A shows example data that can correspond to or be represented by the system identifiers shown in FIG. 8A, FIG. 9A, FIG. 10A, and FIG. 11A. In other words, a system identifier can be stored in memory as a hexadecimal or binary number. A person having ordinary skill in the art will understand that the example embodiments can relate to additional and/or different systems.

TABLE A

| System ID | Hexa-decimal ID | Binary ID | Textual description |
|---|---|---|---|
| S1 | $00 | 0000 0000 | Powertrain system |
| S2 | $01 | 0000 0001 | Tire Pressure Monitor system (TPMS) |
| S3 | $02 | 0000 0010 | Anti-lock Brakes system |
| S4 | $03 | 0000 0011 | Tire Temperature system |
| S5 | $04 | 0000 0100 | Brakes system |
| S6 | $05 | 0000 0101 | Battery system |
| S7 | $06 | 0000 0110 | Advance Driver Assistance system |
| S8 | $07 | 0000 0111 | Heating, Ventilation and Air Conditioning system |

The component identifiers for the mapping data 20 are shown in a column 23. That column includes the component identifiers "C1," "C2," "C3," "C4," and "C5." Table B shows example data that can correspond to or be represented by the component identifiers shown in FIG. 8A, FIG. 9A, FIG. 10A, and FIG. 11A. In other words, a component identifier can be stored in memory as a hexadecimal or binary number. A person having ordinary skill in the art will understand that the example embodiments can relate to additional and/or different components.

TABLE B

| Component ID | Hexadecimal ID | Binary ID | Textual description |
|---|---|---|---|
| C1 | $00 | 0000 0000 | Mass air flow sensor |
| C2 | $01 | 0000 0001 | Engine coolant temperature sensor |
| C3 | $02 | 0000 0010 | Powertrain control module |
| C4 | $03 | 0000 0011 | Oxygen sensor |
| C5 | $04 | 0000 0100 | Tire pressure sensor |
| C6 | $05 | 0000 0101 | Engine knock sensor |
| C7 | $06 | 0000 0110 | Crankshaft position sensor |
| C8 | $07 | 0000 0111 | Fuel pressure sensor |
| C9 | $08 | 0000 1000 | Fuel tank level sensor |
| C10 | $09 | 0000 1001 | NOx sensor |
| C11 | $0A | 0000 1010 | Throttle position sensor |
| C12 | $0B | 0000 1011 | Engine coolant level sensor |
| C13 | $0C | 0000 1100 | Intake air temperature sensor |
| C14 | $0D | 0000 1101 | Wheel speed sensor |
| C15 | $0E | 0000 1110 | Tire temperature sensor |
| C16 | $0F | 0000 1111 | Brake pad wear sensor |
| C17 | $10 | 0001 0000 | Manifold air pressure sensor |
| C18 | $11 | 0001 0001 | Camshaft position sensor |
| C19 | $12 | 0001 0010 | Vehicle speed sensor |
| C20 | $13 | 0001 0011 | EGR temperature sensor |
| C21 | $14 | 0001 0100 | Brake applied sensor |
| C22 | $15 | 0001 0101 | Engine oil pressure sensor |
| C23 | $16 | 0001 0110 | Engine oil level sensor |
| C24 | $17 | 0001 0111 | Steering angle sensor |
| C25 | $18 | 0001 1000 | Barometric pressure sensor |
| C26 | $19 | 0001 1001 | Air/Fuel ratio sensor |
| C27 | $1A | 0001 1010 | Turbo boost sensor |
| C28 | $1B | 0001 1011 | Brake fluid pressure sensor |
| C29 | $1C | 0001 1100 | Battery cell temperature sensor |
| C30 | $1D | 0001 1101 | Battery cell voltage sensor |
| C31 | $1E | 0001 1110 | Battery |

The symptom identifiers (two-digit hexadecimal numbers) for the mapping data 20 are shown in a column 24. Each symptom identifier in that column represents a DTC. In at least some embodiments, the three-digit hexadecimal numbers used in any drawing to represent a DTC or any other DTC discussed in this description can include a five-character DTC. The first character of the five-character DTC can be "P" for powertrain, "B" for body, "C" for chassis, or "U" for network. The second character of the five character DTC can be "0" for a generic SAE DTC or "1" for a manufacturer specific DTC. The third character of the five-character DTC can be a "1" for fuel and air metering, "2" for fuel and air metering (injector circuit malfunctions), "3" for ignition system or misfire, "4" for auxiliary emission controls, "5" for vehicle speed control and idle control system, "6" for computer and auxiliary output, and "7" or "8" for transmission. The fourth and fifth characters of the five character DTC is a specific fault index, such as number index between 00 and 99, inclusive. In FIG. 8A, all of the symptom identifiers are hexadecimal numbers representing a DTC. As can be seen in FIG. 11A, a symptom identifier can identify a symptom other than a DTC.

The PID identifiers (two-digit hexadecimal numbers) for the mapping data 20 are shown in a column 25. The thresholds for the mapping data 20 are shown in a column 144. As shown in FIG. 8A (as well as in FIG. 9A, FIG. 10A, and FIG. 11A), one or more thresholds can be mapped to a PID. In accordance with at least some examples, two thresholds mapped to a PID can include a maximum and minimum threshold. In the drawings, a threshold is represented by a prefix "T" to indicate threshold and a number to distinguish between different thresholds. In accordance with at least some embodiments, each threshold represents a numerical value specified in a column of measurement types and/or in a column of scale/units. As an example, the threshold T14 can be a minimum threshold representing 70 kPa and the threshold T15 can be a maximum threshold representing 400 kPa. A processor can be configured to compare PID parameter values received for a PID to the threshold(s) mapped to that PID, and to output a PID flag (e.g., the PID flag 338 shown in FIG. 24) to indicate whether a PID parameter value has breached a threshold.

Turning to FIG. 8B, the PID names are shown in a column 26. The abbreviations "COOL, "TEMP," "HO2S," "MV," "LF," "RF," and "MAF" stand for coolant, temperature, heated oxygen sensor, millivolt, left front, right front, and mass air flow, respectively. A processor can compare parameter values corresponding to a PID to one or more thresholds corresponding to the PID to determine whether the parameter values have breached a threshold.

The group identifier for the mapping data 20 are shown in a column 27. The abbreviation "ENG" stands for engine. The sensor identifiers for the mapping data 20, if any, are shown in a column 28. The sensor identifiers can be numeric to distinguish between different sensors. The cylinder identifiers for the mapping data 20, if any, are shown in a column 29. The cylinder identifiers can be numeric to distinguish between different cylinders within an internal combustion engine.

Turning to FIG. 8C, the bank identifiers for the mapping data 20, if any, are shown in a column 30. The bank identifier includes an identifier of a bank (e.g., a first or second bank, a front or rear bank, or a left or right bank) within an internal combustion engine. The spatial identifiers for the mapping data 20, if any, are shown in a column 31. The measurement type identifiers, if any, for the mapping data 20 are shown in a column 66. The scale/unit identifiers for the mapping data 20, if any, are shown in a column 67. A group identifier, sensor identifier, cylinder identifier, bank identifier, or spatial identifier can be used to determine whether a datum mapped to the group identifier corresponds to a particular PID facet.

Turning to FIG. 8D, the functional test identifiers for the mapping data 20, if any, are shown in a column 443. The reset procedure identifiers for the mapping data 20, if any, are shown in a column 444. The component test identifiers for the mapping data 20, if any, are shown in a column 449. A functional test identifier, reset procedure identifier, or component test identifier can be used to determine whether to include a USC within a GUI if a selected PID facet includes the PID mapped to the functional test identifier, reset procedure identifier, or component test identifier. The functional tests begin with the prefix "FT." The reset procedures begin with the prefix "RP." The component tests begin with the prefix "CT."

In accordance with the example embodiments, a user can use the VST 70 to make selections, such as selections indicative of a vehicle, a system, a component, a symptom (e.g., a DTC), and/or a spatial aspect. Mapping data can be determined based on such selection(s). A GUI can be output based on the determined mapping data. As an example, based on receiving a vehicle identifier "V1," a system identifier "S1," a component identifier "C2," and a symptom identifier "A05," a processor can execute the determine parameter module 459 to determine from the mapping data 20 that the PIDs $05, $06, $07, $08 correspond to the aforementioned identifiers. Afterwards, the processor can execute the output GUI module 454 to output a GUI that includes one or more containers, a PID facet list, PID facet selectors, and container content identifiers based on the determined PIDs $05, $06, $07, $08.

A group identifier, sensor identifier, or spatial identifier can be used to determine whether a datum or data mapped to the group, sensor or spatial identifier corresponds to a particular PID facet. In some implementations, a PID facet list for a vehicle can indicate PID facets using the group identifiers mapped to the vehicle and/or based on the group identifiers mapped to the vehicle.

A processor can determine functional test(s), reset procedure(s), or component test(s) to include within a GUI in response to selection of a PID facet selector by referring to the mapping data (e.g., the mapping data 20,109) and based on PIDs corresponding to one or more of the vehicle, system, component or symptom identifiers. The PID $05 and PID $06 correspond to a temperature measurement, functional test FT4, FT5, FT6, and component test CT11, CT12, CT13, CT14. As an example, those functional tests and component tests can be output in a GUI if a PID facet selector for temperature is selected. The PID $07 and PID $08 correspond to a voltage measurement, functional test FT4, FT5, FT6, and component test CT15, CT16, CT17, CT18. As another example, those functional tests and component tests can be output in a GUI if a PID facet selector for voltage is selected.

2. Second Mapping Data Example

Next, FIG. 9 (i.e., FIG. 9A to FIG. 9D) show mapping data 145 in accordance with example embodiments in which a group of vehicles corresponding to a vehicle identifier "V2" include an internal combustion engine. The data within each row of the mapping data 145 are mapped to each other and to the group of vehicles identifiable by the vehicle identifier "V2." The mapping data 145 can be contained within the mapping data 109 shown in FIG. 5 and FIG. 12. A person having ordinary skill in the art will understand that the mapping data 145, 109 can be stored in a memory as binary data.

Each row of the mapping data 145 includes at least some of the following: a vehicle identifier, a system identifier, a component identifier, a symptom identifier, a PID, a threshold, a PID name, a group identifier, a sensor identifier, a cylinder identifier, a bank identifier, a spatial identifier, a measurement type identifier, or a scale/unit identifier, a functional test identifier, a reset procedure identifier, or a component test identifier.

The vehicle identifiers for the mapping data 145 are shown in a column 207. Each of those vehicle identifiers is shown as "V2" to represent a group of vehicles that uniquely distinguishes that group of vehicles from other groups of vehicles.

The system identifiers for the mapping data 145 are shown in a column 208. That column includes the system identifiers "S1." Table A shows example data that can correspond to or be represented by the system identifiers shown in column 208. A person having ordinary skill in the art will understand that the group of vehicles identifiable by the vehicle identifier V2 can include one or more systems other than the system identifiable by the system identifier S1.

The component identifiers for the mapping data 145 are shown in a column 209. That column includes the component identifiers "C1," "C2," "C3," "C7," "C8," "C9," "C10,", "C11," and "C13." Table B shows example data that can correspond to or be represented by the component identifiers shown in column 209.

The symptom identifiers (two-digit hexadecimal numbers) for the mapping data 145 are shown in a column 210. Each symptom identifier in that column represents a DTC. Examples of DTC represented by a symptom identifier are discussed above.

The PID identifiers for the mapping data 145 are shown in a column 211. The thresholds for the mapping data 145, if any, are shown in a column 212. The threshold in column 212 can include thresholds defined as a quantity specified in the scale/unit or based on the measurement type corresponding to the threshold.

Turning to FIG. 9B, the PID names for the mapping data 145 are shown in a column 213. The abbreviations "LT," "RT," "V," "PR," "G/S," and "NOX" stand for left, right, volts, pressure, grams/second, and nitric oxide, respectively. The group identifier for the mapping data 145 are shown in a column 214. The sensor identifiers for the mapping data 145, if any, are shown in a column 215.

Turning to FIG. 9C, the cylinder identifiers for the mapping data 145, if any, are shown in a column 216. The bank identifiers for the mapping data 145, if any, are shown in a column 217. The spatial identifiers for the mapping data 145, if any, are shown in a column 218. The measurement type identifiers for the mapping data 145, if any, are shown in a column 594. The scale/unit identifiers for the mapping data 145, if any, are shown in a column 595.

Turning to FIG. 9D, the functional test identifiers for the mapping data 145, if any, are shown in a column 596. The reset procedure identifiers for the mapping data 145, if any, are shown in a column 597. The component test identifiers for the mapping data 145, if any, are shown in a column 598.

Figure 12:
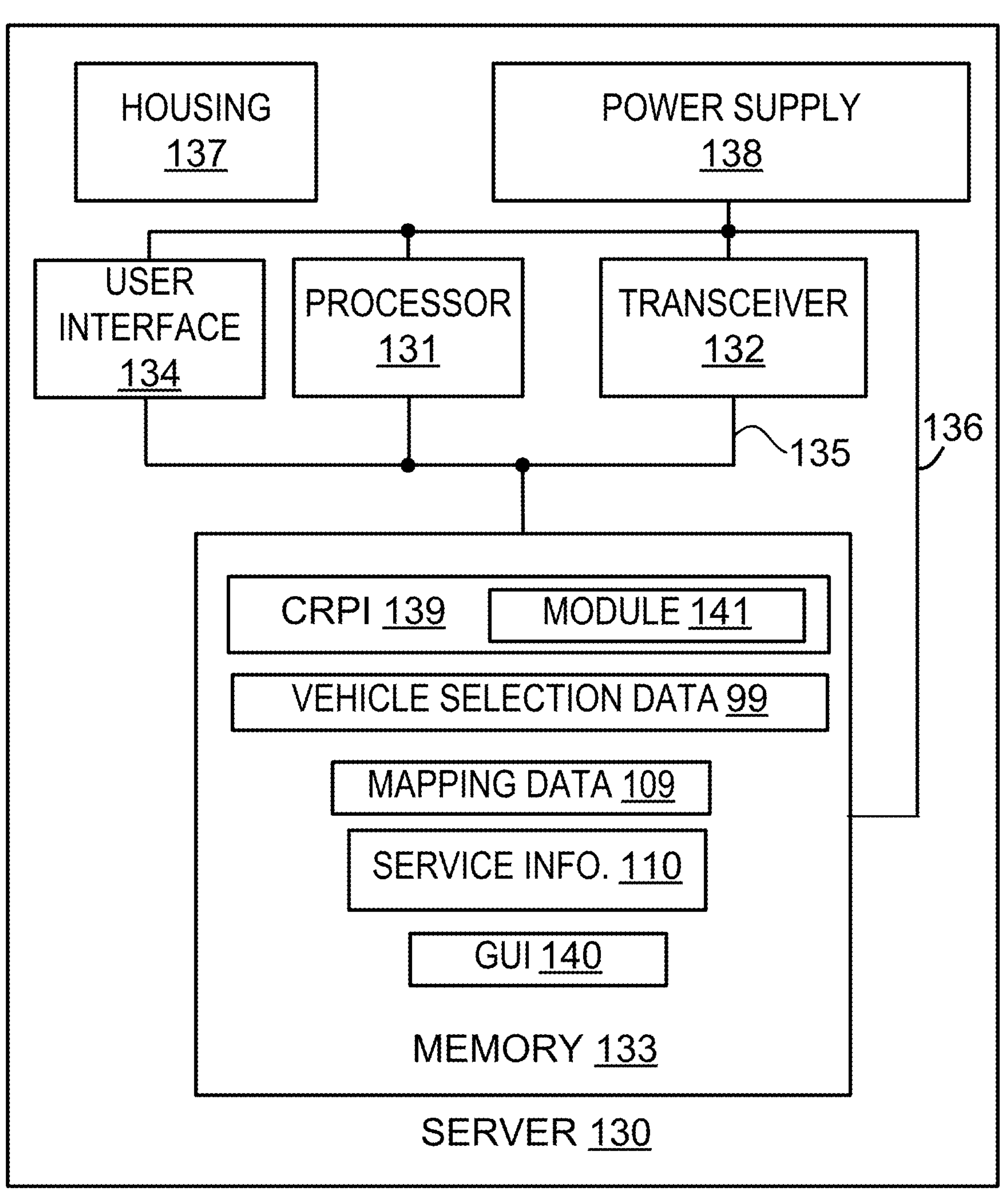
FIG. 12 is a block diagram of a server, in accordance with the example embodiments.

One distinction between the mapping data 20 shown in FIG. 8A to FIG. 8D and the mapping data 145 shown in FIG. 9A to FIG. 9C is that the mapping data 20 corresponds to a vehicle "V1" whereas the mapping data 145 corresponds to a vehicle "V2." Accordingly, the mapping data 109 shown in FIG. 5 and FIG. 12 can include mapping data for different vehicles so that unique GUIs can be output when those different vehicles are being serviced using the VST 3, 70. Moreover, FIG. 10A to FIG. 10D and FIG. 11A to FIG. 11D show mapping data for two other, different vehicles.

3. Third Mapping Data Example

Figure 10D:
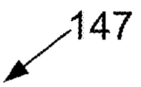

Next, FIG. 10 (i.e., FIG. 10A to FIG. 10D) show mapping data 147 in accordance with example embodiments in which a group of vehicles corresponding to a vehicle identifier "V3" include an internal combustion engine. The data within each row of the mapping data 147 are mapped to each other and to the group of vehicles identifiable by the vehicle identifier "V3." The mapping data 147 can be contained within the mapping data 109 shown in FIG. 5 and FIG. 12. A person having ordinary skill in the art will understand that the mapping data 147, 109 can be stored in a memory as binary data.

Each row of the mapping data 147 includes at least some of the following: a vehicle identifier, a system identifier, a component identifier, a symptom identifier, a PID, a protocol identifier, a threshold, a PID name, a group identifier, a sensor identifier, a spatial identifier, a measurement type identifier, a scale/unit identifier, a functional test identifier, a reset procedure identifier, or a component test identifier.

The vehicle identifiers for the mapping data 147 are shown in a column 470. Each of those vehicle identifiers is shown as "V3" to represent a group of vehicles that uniquely distinguishes that group of vehicles from other groups of vehicles.

The system identifiers for the mapping data 147 are shown in a column 471. That column includes the system identifiers "S1," "S2," "S3," "S4," and "S5." Table A shows example data that can correspond to or be represented by the system identifiers shown in column 471.

The component identifiers for the mapping data 147 are shown in a column 472. That column includes the component identifiers "C3," "C5," "C14," "C15," "C16," "C19," "C21," and "C28." Table B shows example data that can correspond to or be represented by the component identifiers shown in column 472.

The symptom identifiers (two-digit hexadecimal numbers) for the mapping data 147 are shown in a column 473. Each symptom identifier in that column represents a DTC. Examples of DTC represented by a symptom identifier are discussed above.

The PID identifiers for the mapping data 147 are shown in a column 474. The thresholds for the mapping data 147, if any, are shown in a column 476. The threshold in column 476 can include thresholds defined as a quantity specified in the scale/unit or based on the measurement type corresponding to the threshold.

The protocol identifiers are shown in a column 475. Most of the protocol identifier in column 475 are "P1" to represent a first VDM protocol and "P2" to represent a second VDM protocol. As an example, the first VDM protocol can be a vehicle manufacturer (i.e., OEM) VDM protocol and the second VDM protocol can be a government mandated (e.g., OBD II) VDM protocol. As another example, two different VDM protocols corresponding to the protocol identifier P1 and P2 can be two different OEM VDM protocols, or two different government mandated VDM protocols. A processor can determine which transceiver within or connected to the processor is to receive a VDM for transmission to the vehicle based on a protocol identifier.

Turning to FIG. 10B, the PID names for the mapping data 147 are shown in a column 477. The abbreviations "WS," "RF," "RR" stand for wheel speed, right front, and right rear, respectively. The group identifiers for the mapping data 147 are shown in a column 478. The abbreviation "VWTD" stands for vehicle wheel test drive. The sensor identifiers for the mapping data 147 are shown in a column 479.

Turning to FIG. 10C, the spatial identifiers for the mapping data 147, if any, are shown in a column 480. The measurement type identifiers for the mapping data 147 are shown in a column 481. The scale/unit identifiers for the mapping data 147 are shown in a column 484.

Turning to FIG. 10D, the functional test identifiers for the mapping data 147, if any, are shown in a column 485. The reset procedure identifiers for the mapping data 147, if any, are shown in a column 486. The component test identifiers for the mapping data 147, if any, are shown in a column 487.

For the most part, the mapping data 147 pertains to wheels and brakes and PIDs corresponding to test driving a vehicle corresponding to the vehicle identifier V3. A person having ordinary skill in the art will understand that the vehicle can include an internal combustion engine and an ECU from which PIDs similar to PIDs represented in the mapping data 20, 145 can be requested. A processor can use the mapping data 147 to generate a GUI, such as a GUI 500 shown in FIG. 41 to FIG. 44.

The mapping data 147 includes the PID $0F in two different rows. The data in those two rows are identical except for the group identifiers, functional test identifiers, and component test identifiers. As a result, the processor can generate a GUI for a PID facet related to brakes, vehicle wheel test drive, or wheel speed that includes PID content for the PID $0F, but that does not include any functional test or component test related to the PID $0F. In contrast, the processor can generate a GUI for a PID facet related to vehicle movement that includes PID content for the PID $0F and that includes user-selectable controls for functional test FT78, as shown in column 485, and component test CT94, as shown in column 487. Based on the mapping data 147, the GUI for the PID facet related to vehicle movement can also include PID content for the PIDs $E01, $E10, the functional tests FT76, FT77, and the component test CT92, CT93.

4. Fourth Mapping Data Example

Next, FIG. 11 (i.e., FIG. 11A to FIG. 11D) show mapping data 115 in accordance with example embodiments in which a group of electric vehicles corresponding to a vehicle identifier "V4." The data within each row of the mapping data 115 are mapped to each other and to the group of vehicles identifiable by the vehicle identifier "V4." The mapping data 115 can be contained within the mapping data 109 shown in FIG. 5 and FIG. 12. A person having ordinary skill in the art will understand that the mapping data 115, 109 can be stored in a memory as binary data.

Each row of the mapping data 115 includes at least some of the following: a vehicle identifier, a system identifier, a component identifier, a symptom identifier, a PID, a threshold, a PID name, a group identifier, a spatial identifier, a measurement type identifier, and a scale/unit identifier, a functional test identifier, a reset procedure identifier, or a component test identifier.

The vehicle identifiers for the mapping data 115 are shown in a column 116. Each of those vehicle identifiers is shown as "V4" to represent a group of vehicles that uniquely distinguishes that group of vehicles from other groups of vehicles.

The system identifiers for the mapping data 115 are shown in a column 117. That column includes the system identifiers "S6." Table A shows example data that can correspond to or be represented by the system identifier shown in column 117.

The component identifiers for the mapping data 115 are shown in a column 118. That column includes the component identifiers "C29," "C30," and "C31." Table B shows example data that can correspond to or be represented by the component identifiers shown in column 118.

The symptom identifiers are shown in a column 119. All symptom identifiers in that column, except the bottom two-most symptom identifiers, represent a DTC. Examples of DTC represented by a symptom identifier are discussed above. The bottom two-most symptom identifiers in column 119 represent non-DTC symptom identifiers.

The PID identifiers for the mapping data 115 are shown in a column 120. The thresholds for the mapping data 115, if any, are shown in a column 121. The threshold in column 121 can include thresholds defined as a quantity specified in the scale/unit or based on the measurement type corresponding to the threshold.

Turning to FIG. 11B, the PID names for the mapping data 115 are shown in a column 122. The abbreviation "AVE" stands for average. The group identifier for the mapping data 115 are shown in a column 123.

Turning to FIG. 11C, the spatial identifiers for the mapping data 115 are shown in a column 124. The measurement type identifiers for the mapping data 115 are shown in a column 125. The scale/unit identifiers for the mapping data 115 are shown in a column 490.

Turning to FIG. 11D, the functional test identifiers for the mapping data 115, if any, are shown in a column 491. The reset procedure identifiers for the mapping data 115, if any, are shown in a column 492. The component test identifiers for the mapping data 115, if any, are shown in a column 493.

For the most part, the mapping data 115 pertains to batteries of a vehicle corresponding to the vehicle identifier V4. A person having ordinary skill in the art will understand that the vehicle can include multiple ECUs, such as an ECU for a system other than the S6 system, such that the mapping data 115 can include data corresponding to other systems and other PIDs. A processor can use the mapping data 115 to generate a GUI, such as a GUI 600 shown in FIG. 45 to FIG. 50.

J. Example Server

Next, FIG. 12 is a block diagram of a server 130 in accordance with the example embodiments. The server 6 shown in FIG. 1 can include one or more aspects of the server 130 and/or be arranged like the server 130. The server 130 can operate within the system 2 as the server 6 and/or in addition to the server 6. The server 130 can perform any function(s) described in this description as being performed by the server 6. The server 6 can perform any function(s) described in this description as being performed by the server 130.

The server 130 includes a processor 131, a transceiver 132, a memory 133, a user interface 134, a data bus 135, an electrical circuit 136, a housing, 137, and/or a power supply 138. The data bus 135 can operatively connect the processor 131, the transceiver 132, the memory 133, the user interface 134, and/or the power supply 138 to one another. In other words, the data bus 135 can provide an operative connection between two or more of the processor 131, the transceiver 132, the memory 133, the user interface 134, or the power supply 138. Examples of the processor 131, the transceiver 132, and the memory 133 are described elsewhere in this description. In at least some implementations of the server 130, the processor 131 is a specific processor that is programmed to perform any function(s) described in this description as being performed by the server 6, 130.

The electrical circuit 136 (i.e., one or more electrical circuits) is configured to distribute electrical current throughout the server 130. For example, the electrical circuit 136 can comprise one or more electrical circuits for carrying an electrical current from the power supply 138 to the processor 131, the transceiver 132, the memory 133, and/or the user interface 134, and one or more electrical circuits for carrying an electrical current from the processor 131, the transceiver 132, the memory 133, and/or the user interface 134 to the power supply 138. Examples of the power supply 138 are described elsewhere in this description.

The housing 137 surrounds at least a portion of the following: the processor 131, the transceiver 132, the memory 133, the user interface 134, the data bus 135, the electrical circuit 136 and/or the power supply 138. The housing 137 can support a substrate. In at least some example implementations, at least a portion of the following: the processor 131, the transceiver 132, the memory 133, the user interface 134, the data bus 135, the electrical circuit 136 and/or the power supply 138 is/are mounted on and/or connected to a substrate of the housing 137. The housing 137 can include a server rack.

The user interface 134 can include an input device and an output device. The user interface 134 can include a display, such as a display discussed with respect to the display 81. The display can be configured as an input device and/or an output device. The user interface 134 can display a GUI output by the processor 131. The input device is configured to allow a user to input data into the processor 131.

The memory 133 can include CRPI 139, a GUI 140, the vehicle selection data 99, the mapping data 109, the service information 110. The CRPI 139 can include a module 141 (i.e., one or more modules. Examples of modules within the module 141 are shown in FIG. 6.

The CRPI 139 can include program instructions executable by a processor, such as the processor 131. As an example, the CRPI 139 can include program instructions that are executable to cause the server 130 to perform any function described as being performed by the server 130, by the processor 131, and/or by some other component of the server 130. As an example, the CRPI 139 can include program instructions executable by the processor to perform one or more functions of any one or more the function set 400, 410, 415, 420, 425, 430, 435, 440 shown in FIG. 57 to FIG. 64.

The GUI 140 includes one or more GUIs. The GUI 140 can include a GUI that the server 130 transmits (as a service) to the VST 70. As an example, the GUI 140 can include one or more GUI in the GUI 97 shown in FIG. 5. The GUI 140 can also include a GUI that the server 130 outputs on a display of the user interface 134. The GUI 140 can include information the server 130 provides to the VST 70 to populate within a GUI on the display 81, such as any GUI shown in FIG. 13 to FIG. 55.

III. Example Graphical User Interfaces

As noted, the computing systems (e.g., the VST 3, 70, and/or the server 6, 130) can include a display for displaying a GUI. The drawings show various aspects of GUIs in accordance with the example embodiments. Those aspects include a USC configured to trigger a processor to perform function(s) corresponding to the USC. In at least some embodiments, a USC includes an icon indicative of a function corresponding to the USC. FIG. 13 to FIG. 55 shows screen shots of GUIs in accordance with the example embodiments.

A. Example GUI for Selecting a Vehicle

Figure 13:
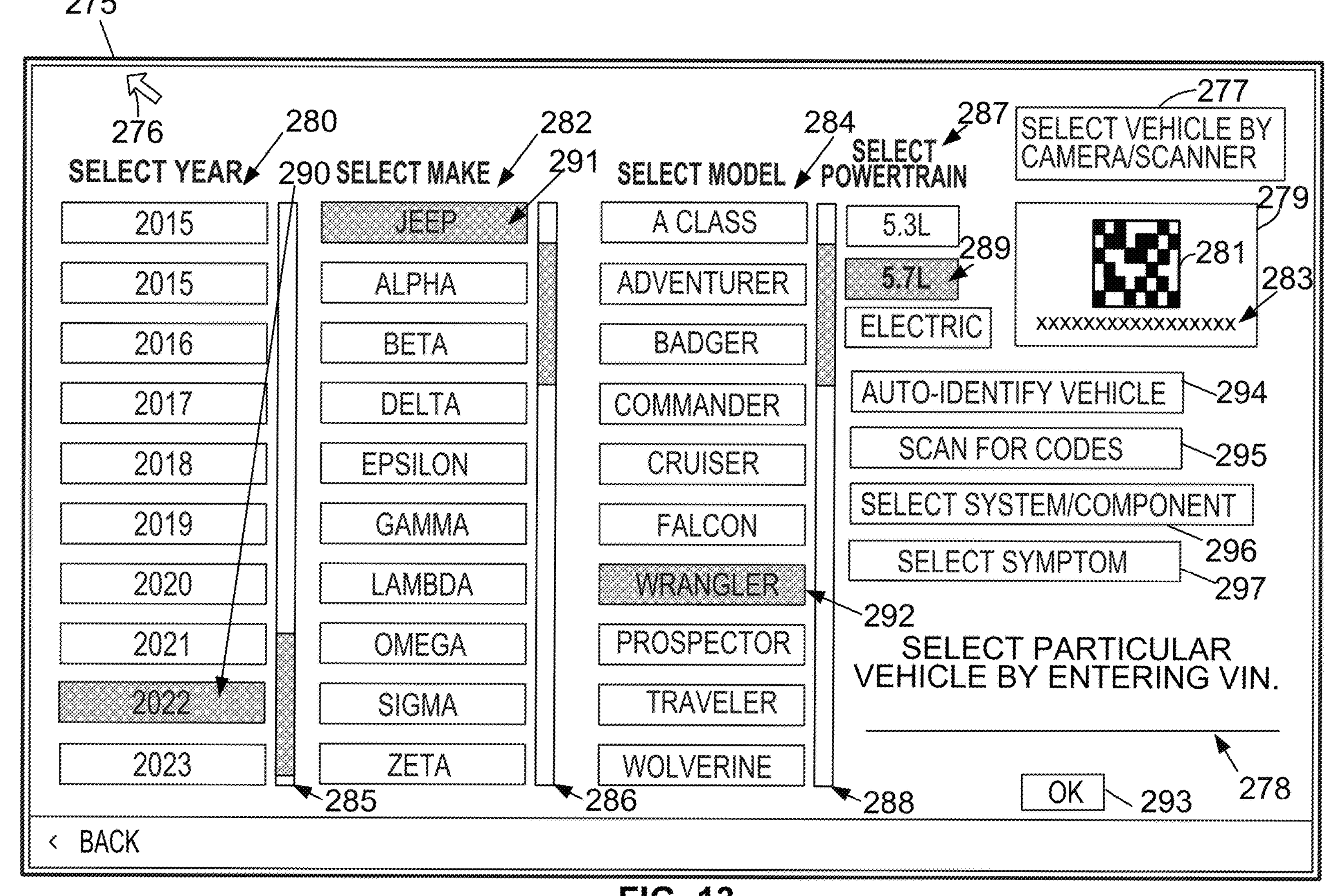
Figures 14, 15:
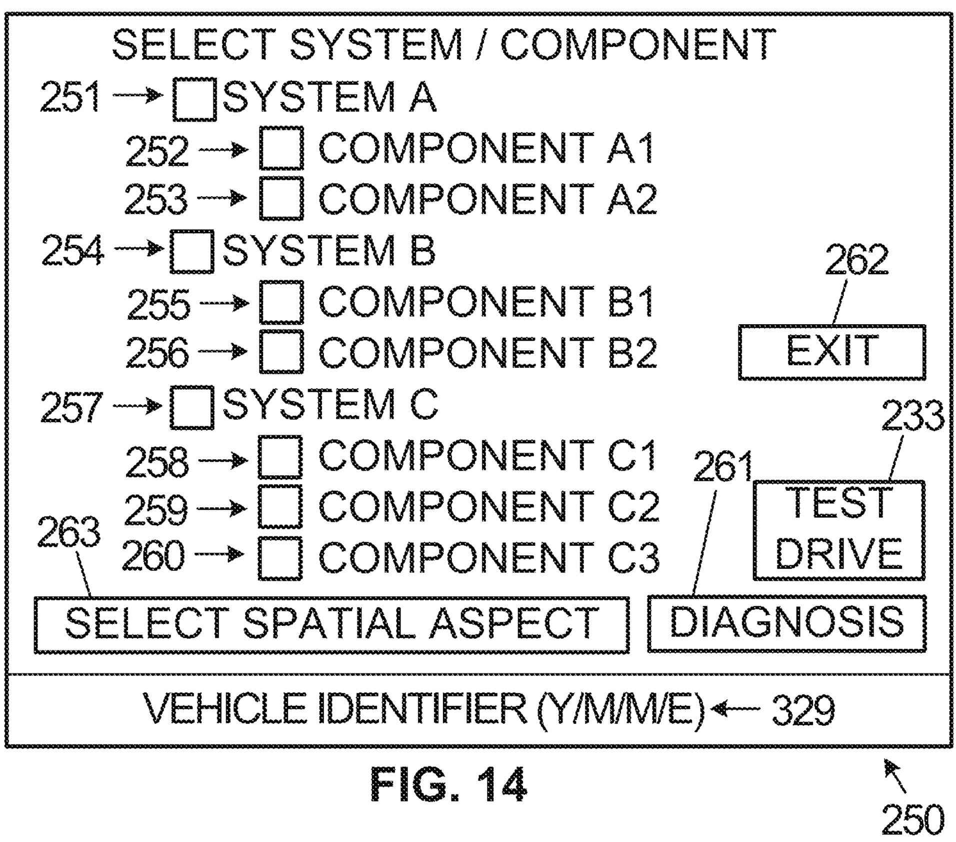

FIG. 13 shows a GUI 275 that includes a vehicle selection menu. The vehicle selection data 99 shown in FIG. 5 can also include data that represents relationships between vehicle model years and the types of vehicles that were built for and/or during each model year. For instance, for a given model year, the vehicle selection data 99 can include data that indicates all vehicle makes that include at least one type of vehicle for the given model year, and for each of those vehicle makes, the vehicle selection data 99 can include data that indicates all vehicle models that correspond to one of the vehicle makes that built at least one type of vehicle for the given model year. In at least some implementations, the vehicle selection data 99 can include data that indicates all engines that are used in each vehicle model. The vehicle selection data 99 can include data that indicates other criteria that can be used to distinguish different groups of common (i.e., like) vehicles. The processor 71 can generate a vehicle selection menu based on the other data within the vehicle selection data 99.

The GUI 275 can include a cursor 276 movable to point to a USC or another item of the GUI 275. The processor 71 can detect the USC or the other item of the GUI 275 is selected when the cursor 276 is disposed on the USC or the other item of the GUI 275. The other GUIs shown in the figures can also include a cursor, similar to the cursor 276, for use in selecting an item of that GUI. For implementations in which the display 81 includes a touch screen display, the GUIs shown in FIG. 13 to FIG. 55 may or may not include a cursor.

As shown in FIG. 13, the GUI 275 includes a year selection menu 280 in which a year selector 290 representing the year 2022 has been selected. The GUI 275 includes a make selection menu 282 in which a make selector 291 representing a make Jeep has been selected. The GUI 275 includes a model selection menu 284 in which a model selector 292 representing the model Wrangler has been selected. The GUI 275 includes a powertrain selection menu 287 in which an engine selector USC 289 representing the 5.7 liter engine has been selected. The year selection menu 280 includes a scroll bar 285 to cause the year selection menu 280 to display year(s) not currently shown in the year selection menu 280. Similarly, the make selection menu 282 includes a scroll bar 286 to cause the make selection menu 282 to display make(s) not currently shown in the make selection menu 282. Likewise, the model selection menu 284 includes a scroll bar 288 to cause the model selection menu 284 to display model(s) not currently shown in the model selection menu 284. Other examples of a selected year, make, model, and engine are also possible.

In at least some implementations, the make selection menu 282 is populated with vehicle makes after a year is selected from the year selection menu 280. Similarly, in at least some implementations, the model selection menu 284 is populated with vehicle models after a year is selected from the year selection menu 280 and after a make is selected from the make selection menu 282. Similarly, in at least some implementations, the powertrain selection menu 287 is populated with powertrain identifiers after a model is selected from the model selection menu 284 is populated with vehicle models after a year is selected from the year selection menu 280 and after a make is selected from the make selection menu 282. In alternative implementations, each of the year selection menu 280, the make selection menu 282, the model selection menu 284, or the powertrain selection menu 287 is in a separate GUI without the other of the year selection menu 280, the make selection menu 282, the model selection menu 284, and the powertrain selection menu 287.

In at least some implementations, the GUI 275 also includes a VIN USC 278 for entering an identifier of a particular vehicle. As an example, the VIN USC 278 can be used to type or key-in a vehicle identification number (VIN) associated with the particular vehicle. As another example, the VIN USC 278 can be used to cause the VCT 91 to request a VIN from an ECU in the vehicle 4, 32, 50. The processor 71 can receive the requested VIN and determine at least a year, make, model, and a serial number of the particular vehicle from the VIN.

The GUI 275 includes a vehicle selector USC 277 for capturing a visual indication of a particular vehicle. As an example, in response to selection of the vehicle selector USC 277, the processor 71 can cause a camera of the input device 82 to capture an image, such as an image of a code 281 representing a VIN, and to cause a GUI, such as the GUI 275 or a different GUI, to display a window 279 showing the image of code 281 and to display a representation of the alpha-numeric representation of the VIN 283 as determined by the processor 71 decoding the code 281. As yet another example, in response to selection of the vehicle selector USC 277, the processor 71 can cause a scanner of the user interface 74 to generate an image, such as an image of the code 281, and to cause a GUI, such as the GUI 275 or a different GUI, to display the window 279 showing the image of the code 281 and to display a representation of the alpha-numeric representation of the VIN 283 as determined by the processor 71 decoding the code 281.

The GUI 275 can include a USC 294 selectable to cause the VCT to transmit a VDM to the vehicle 4, 32, 50 to request a VIN corresponding to the vehicle and to cause the processor to identify the vehicle based on a response to the VDM sent to the vehicle. In at least some embodiments, the processor 71 can populate the year selection menu 280, the make selection menu 282, the model selection menu 284, and the powertrain selection menu 287 with selections based on the VIN received in the response to the VDM.

The GUI 275 can include a USC 295 selectable to cause the VCT 91 to transmit one or more VDMs to one or more ECUs in the vehicle 4, 32, 50 to request DTCs from those ECUs and to output within the GUI 275 or another GUI (e.g., the GUI 247 shown in FIG. 17) DTCs reported to the VST 70 from the ECU(s).

The GUI 275 can include a USC 296 selectable to cause the GUI 275 or another GUI (e.g., the GUI 250 shown in FIG. 14) to display USCs selectable to select system(s) and/or component(s) of interest to a user of the VST 70.

The GUI 275 can include a USC 297 selectable to cause the GUI 275 or another GUI (e.g., the GUI 248 shown in FIG. 16) to display USCs selectable to select symptom(s) of interest to a user of the VST 70. The GUI 275 can include a USC 293 that is selectable to enter selections made via the GUI 275.

B. Example GUIs for Selecting System, Component or Symptom

Next, FIG. 14 shows a GUI 250 that includes USCs selectable to select system(s) and/or component(s) of a vehicle corresponding to a vehicle identifier 329. In at least some embodiments, the vehicle identifier 329 can include vehicle identifying information entered and/or determined via use of the GUI 275 shown in FIG. 13.

As an example, the GUI 250 includes a USC 251, 254, 257 selectable to select a system within a vehicle. As an example, a System A, System B, System C corresponding to the USC 251, 254, 257, respectively, can correspond to a powertrain system, an anti-lock brake system, and body control system, or some other systems within the identified vehicle. As another example, the GUI 250 includes a USC 252, 253, 255, 256, 258, 259, 260 selectable to select a component within the vehicle. As an example, a Component A1, Component A2, Component B1, Component B2, Component B3, Component C1, Component C2, Component C3 corresponding to the USC 252, 253, 255, 256, 258, 259, 260, respectively, can correspond to a throttle position sensor, an EGR valve, a wheel speed sensor, a solenoid, a horn, a window motor, and an interior light, or some other components within the identified vehicle. A person having ordinary skill in the art will understand that the GUI can include USCs for selecting one or more systems and USCs for selecting one or more components.

The GUI 250 can also include a USC 261 selectable to initiate a diagnostic session for the selected system(s) and/or component(s). Initiating the diagnostic session can include the processor 71 outputting a GUI (e.g., a GUI 300, 500) to show data corresponding to the diagnostic session. The GUI 250 can include a USC 262 selectable to exit a current display mode of the VST 70 (e.g., display a GUI displayed on the display 81 immediately before a currently-displayed GUI). The GUI 250 can include a USC 263 selectable to cause the processor 71 to display within the GUI 250 or to display another GUI (e.g., the GUI 249 shown in FIG. 15) to show USCs selectable to select spatial aspects corresponding to the selected system(s) and/or component(s). The GUI 250 includes a USC 233 selectable to cause another GUI (e.g., the GUI 500 shown in FIG. 41) including aspects and controls regarding test driving a vehicle.

Next, FIG. 15 shows a GUI 249 that includes USCs selectable to select spatial aspect(s) corresponding a system or component corresponding to system/component identifier 264 of a vehicle corresponding to the vehicle identifier 329. As an example, the GUI 249 can include a USC 265, 266, 267, 268, 269, 270, 271, 272 selectable to select Spatial Aspects A, B, C, D, E, F, G, H, respectively. As an example, the Spatial Aspects A, B, C, D, E, F, G, H can include spatial aspects such as, left, right, left front, left rear, right front, right rear, front, back, bank one, bank two, top, bottom, or some other spatial aspect associated with a system or component in the vehicle. The GUI 249 can also include a USC 274 selectable to initiate a diagnostic session for the selected system(s) and/or component(s). Initiating the diagnostic session can include the processor 71 outputting a GUI (e.g., a GUI 300, 500) to show data corresponding to the diagnostic session. The GUI 249 can include a USC 273 selectable to exit a current display mode of the VST 70.

Figure 16:
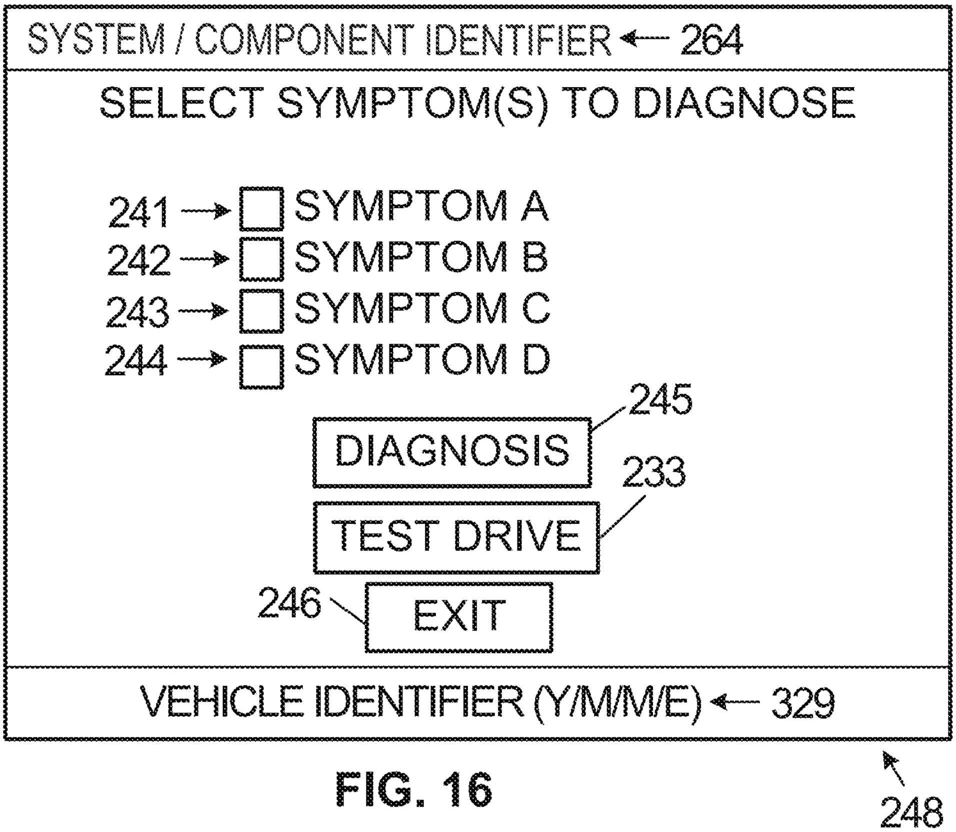

Next, FIG. 16 shows a GUI 248 that includes USCs selectable to select symptom(s) (of a system or component corresponding to system/component identifier 264 of a vehicle corresponding to the vehicle identifier 329) to diagnose. As an example, the GUI 249 can include a USC 241, 242, 243, 244 selectable to select Symptom A, Symptom B, Symptom C, Symptom D, respectively. As an example, for an embodiment in which the identified system or component includes a powertrain system, the Symptoms A, B, C, D can include symptoms such as "no start," "misfire," "hesitation," and "emissions test failure" or some other symptoms corresponding to a powertrain system. As another example, one or more of the Symptoms A, B, C, D can represent a The GUI 248 can also include a USC 245 selectable to initiate a diagnostic session for the selected symptom(s) of the identified system, component, and vehicle. Initiating the diagnostic session can include the processor 71 outputting a GUI (e.g., a GUI 300, 500) to show data corresponding to the diagnostic session. The GUI 248 can include a USC 246 selectable to exit a current display mode of the VST 70. In at least some embodiments, the GUI 248 can be output on the display 81 in response to a selection of the USC 297 shown in FIG. 13.

Figure 17:
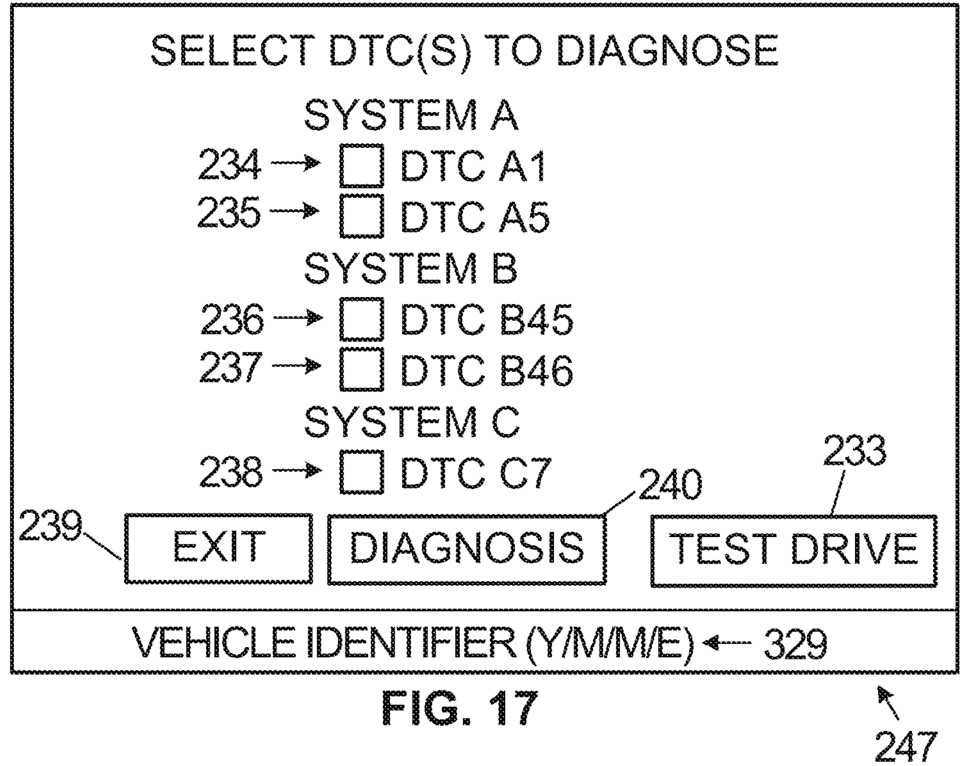

Next, FIG. 17 shows a GUI 247 that includes USCs selectable to select DTC(s) set by a system of a vehicle corresponding to the vehicle identifier 329. As an example, the GUI 247 can include a USC 234, 235, 236, 237, 238 selectable to select DTC A1, DTC A5, DTC B45, DTC B46, DTC C7, respectively. As an example, the DTC A1, DTC A5, DTC B45, DTC B46, DTC C7 can include powertrain codes in the form of PXXXX, body system codes in the form of BXXXX, chassis system codes in the form of CXXXX, or network & vehicle integration codes in the form of UXXXX, where the XXXX in each of those four forms of codes are four numbers.

The GUI 247 can also include a USC 240 selectable to initiate a diagnostic session for the selected DTC(s) of the identified system and vehicle. Initiating the diagnostic session can include the processor 71 outputting a GUI (e.g., a GUI 300, 500) to show data corresponding to the diagnostic session. The GUI 247 can include a USC 239 selectable to exit a current display mode of the VST 70. In at least some embodiments, the GUI 247 can be output on the display 81 in response to a selection of the USC 295 shown in FIG. 13.

C. First Example GUI with PID Facet Selectors

Figure 18:
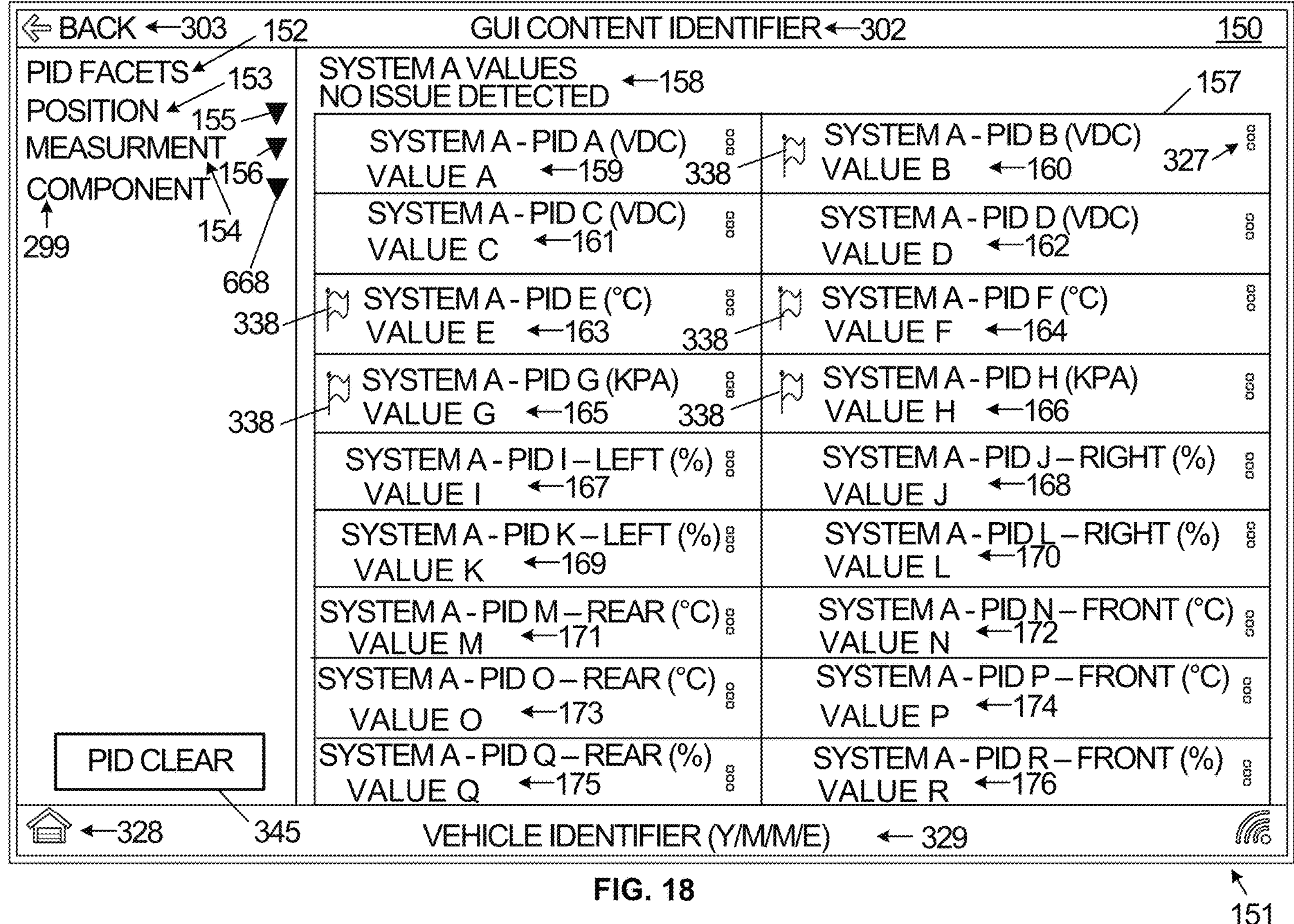

Next, FIG. 18 to FIG. 23 show various screen shots of a GUI 150. In particular, FIG. 18 shows a screen shot 151 of the GUI 150. As an example, the GUI 150, as shown in FIG. 18, can be output on the display in response to a selection of the USC 261 in the GUI 250 shown in FIG. 14. In accordance with that example, prior to selecting the USC 261, one or more of the USC 251 to USC 260 in FIG. 14 can be selected. For instance, prior to selecting the USC 261, the USC 251 corresponding to a System A can be selected so that a subsequently displayed GUI will include content corresponding to the System A.

As shown in FIG. 18, the GUI 150 includes the vehicle identifier 329, and a USC 328 selectable to cause the processor 71 to output a different GUI on the display 81 (e.g., a home screen GUI). The GUI 150 also includes a GUI content identifier 302 that summarizes the content within a GUI (e.g., the GUI 150, 300, 500, 600). As an example, the GUI content identifier 302 can indicate the GUI includes content regarding a diagnostic session, a vehicle component, a vehicle system, a symptom, or some other content displayable within the GUI. The GUI 150 also includes a USC 303 selectable to cause the processor 71 to output a GUI that was displayed immediately before the GUI containing the USC 303.

Figure 24:
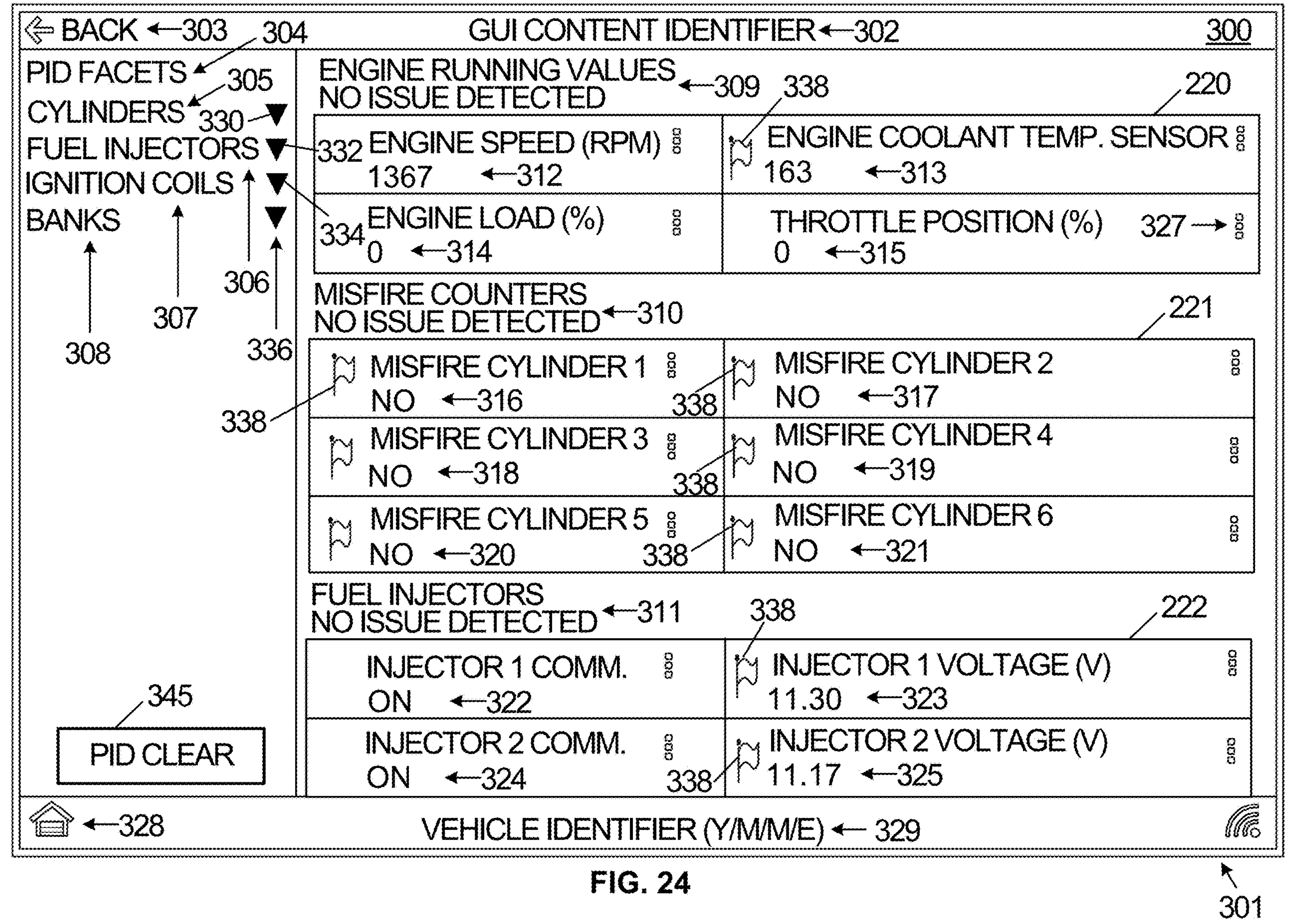
Figure 41:
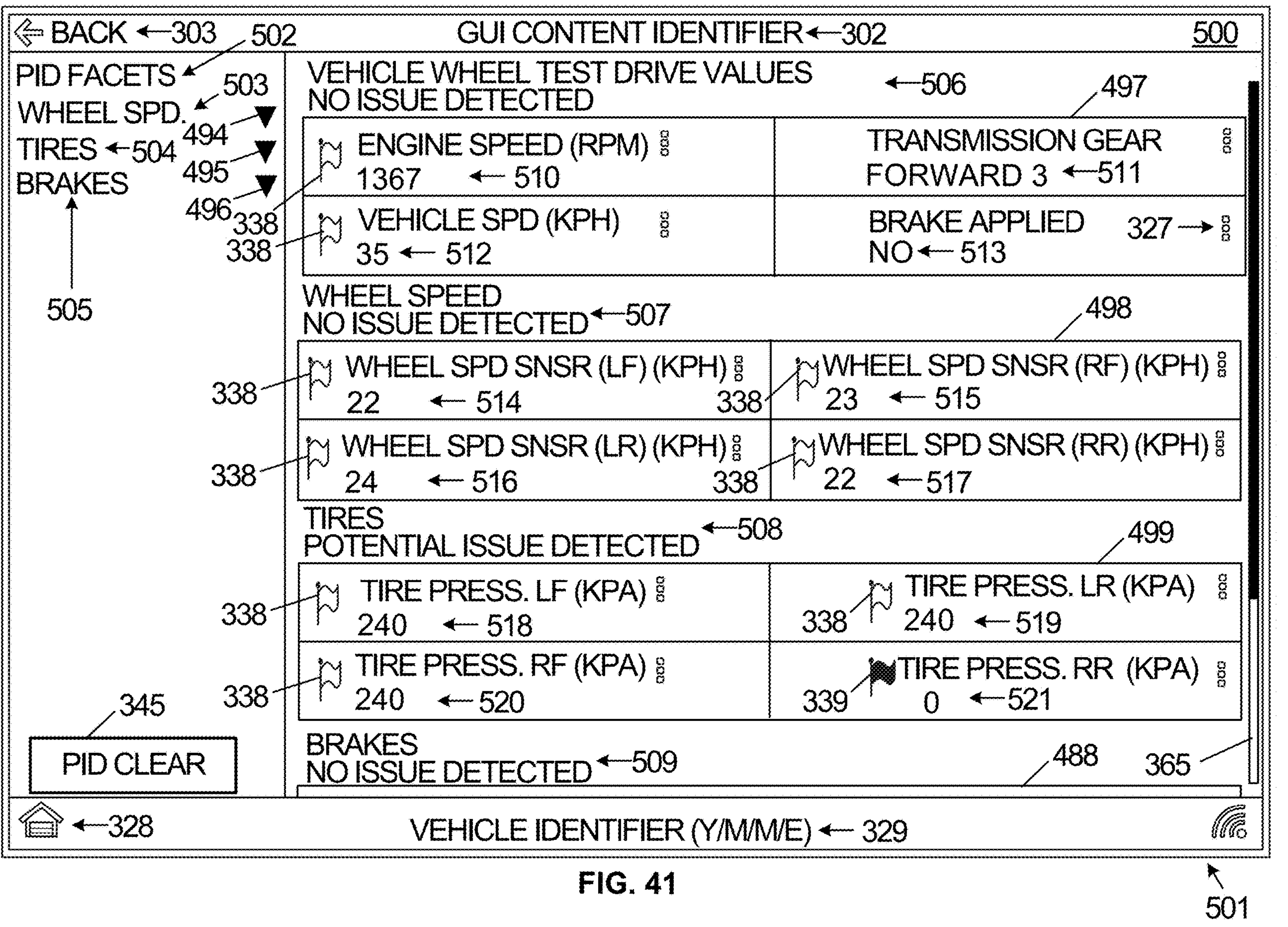
Figure 45:
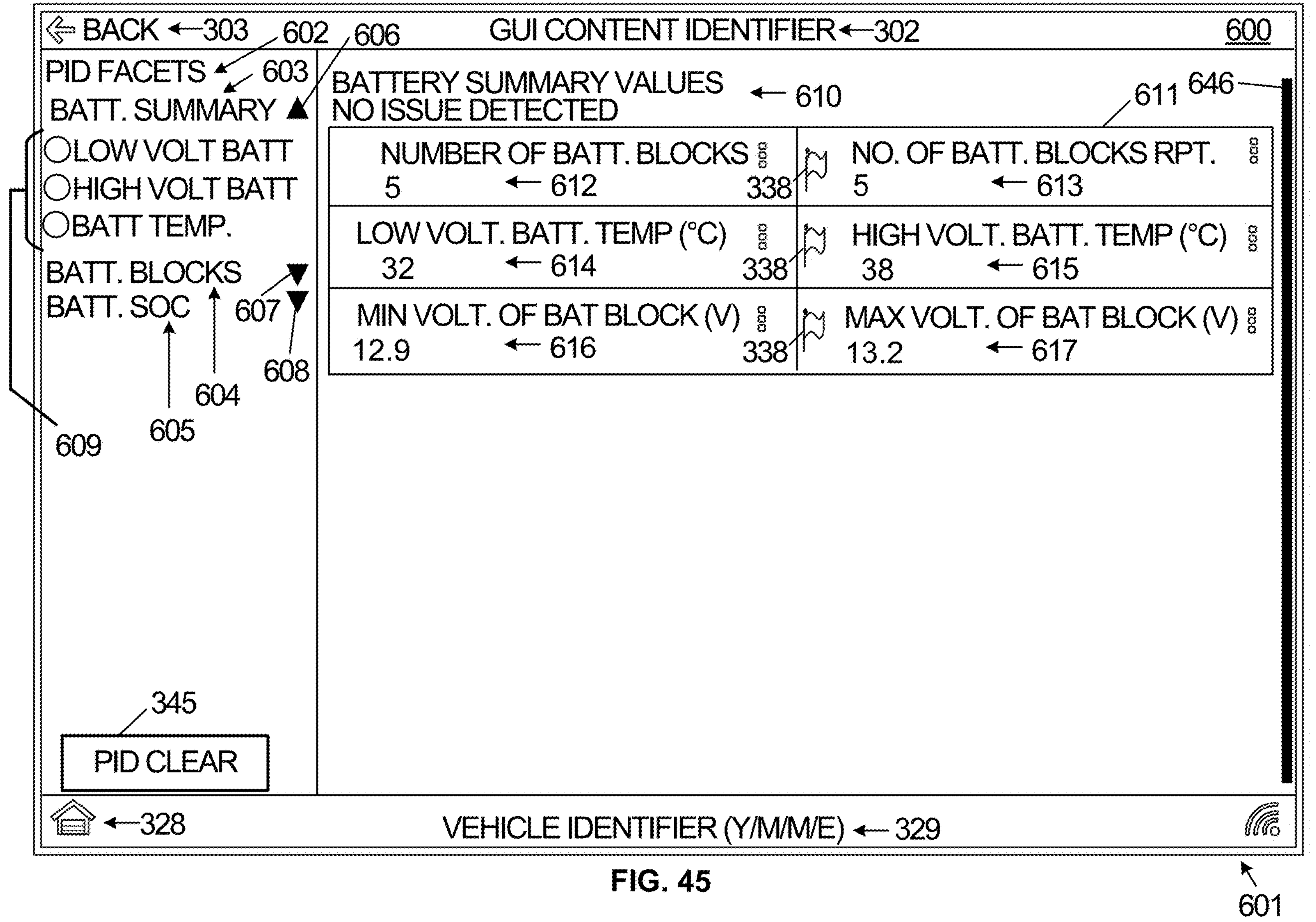

The GUI 150 includes a PID facet group identifier list 152. The PID facet group identifier list 152 includes a PID facet group identifier 153, 154, 299. In other embodiments, a PID facet group identifier list can include a quantity of PID facet group identifiers other than three PID facet identifiers (e.g., one, two, four, five or more PID facet identifiers). The GUI 150 includes a PID facet list expander 155, 156, 668 selectable to select a PID facet corresponding to the PID facet group identifier 153, 154, 299. As an example, the PID facet group identifier 153 indicates "position," the PID facet group identifier 154 indicates "measurement," and the PID facet group identifier 299 indicates "component." Other examples of a PID facet group identifier are also possible, some of which are shown in FIG. 24, FIG. 41, and FIG. 45.

In accordance with at least some implementations, a GUI includes one or more containers including content of the GUI. A person having ordinary skill in the art will understand that a GUI described and/or shown as having a container and content within the container can alternatively include such content without being contained in a container or displayed within multiple containers. The GUI 150, as shown in FIG. 18, includes a container 157 and a container content descriptor 158 corresponding to the container 157. In accordance with at least some embodiments, a container content descriptor can include a status identifier, such as "Potential issue detected" or "No issue detected." The container content descriptor 158 indicates the content within the container 157 pertains to a vehicle system "System A." Such indication can be output in the GUI 150 as a result of the USC 251 in FIG. 14 being selected prior to the USC 261 in FIG. 14 being selected.

In accordance with at least some embodiments, the content within a container in a GUI can include PID content. As an example, PID content can include a textual PID name, a units identifier, a PID parameter value, and/or a PID flag indicating whether a PID parameter value corresponding to the PID has breached a threshold corresponding to the PID. As an example, as shown in FIG. 18, the GUI 150 includes PID content 159, 160, 161, 162, 163, 164, 165, 166, 167, 168, 169, 170, 171, 172, 173, 174, 175, 176. As an example, the textual PID name of the PID content shown in FIG. 18 (as well as in other drawings) is above the corresponding PID parameter value. As shown in FIG. 18, a units identifier can indicate volts DC (i.e., VDC), degrees Celsius (i.e., ° C.), a percentage (i.e., %), or kilopascals (i.e., kPa). Other examples of a units identifier are also possible. The processor can update values contained within the PID content as additional VDM containing parameter values are received.

The GUI 150 includes a PID clear USC 345 selectable to clear PID parameter values. In accordance with at least some embodiments, clearing PID parameter values can include no longer showing any previously-received PID parameter value on the GUI 150. In at least some embodiments, the processor 71 can modify a GUI to show dashed lines instead of PID parameter values in response to a selection of the PID clear USC 345 before additional PID parameter values are received. In accordance with at least some embodiments, clearing PID parameter values can include deleting the previously-received PID parameter values from the memory 73 or noting the memory addresses at which the previously-received PID parameter values are stored can be written to with new data.

Figure 49:
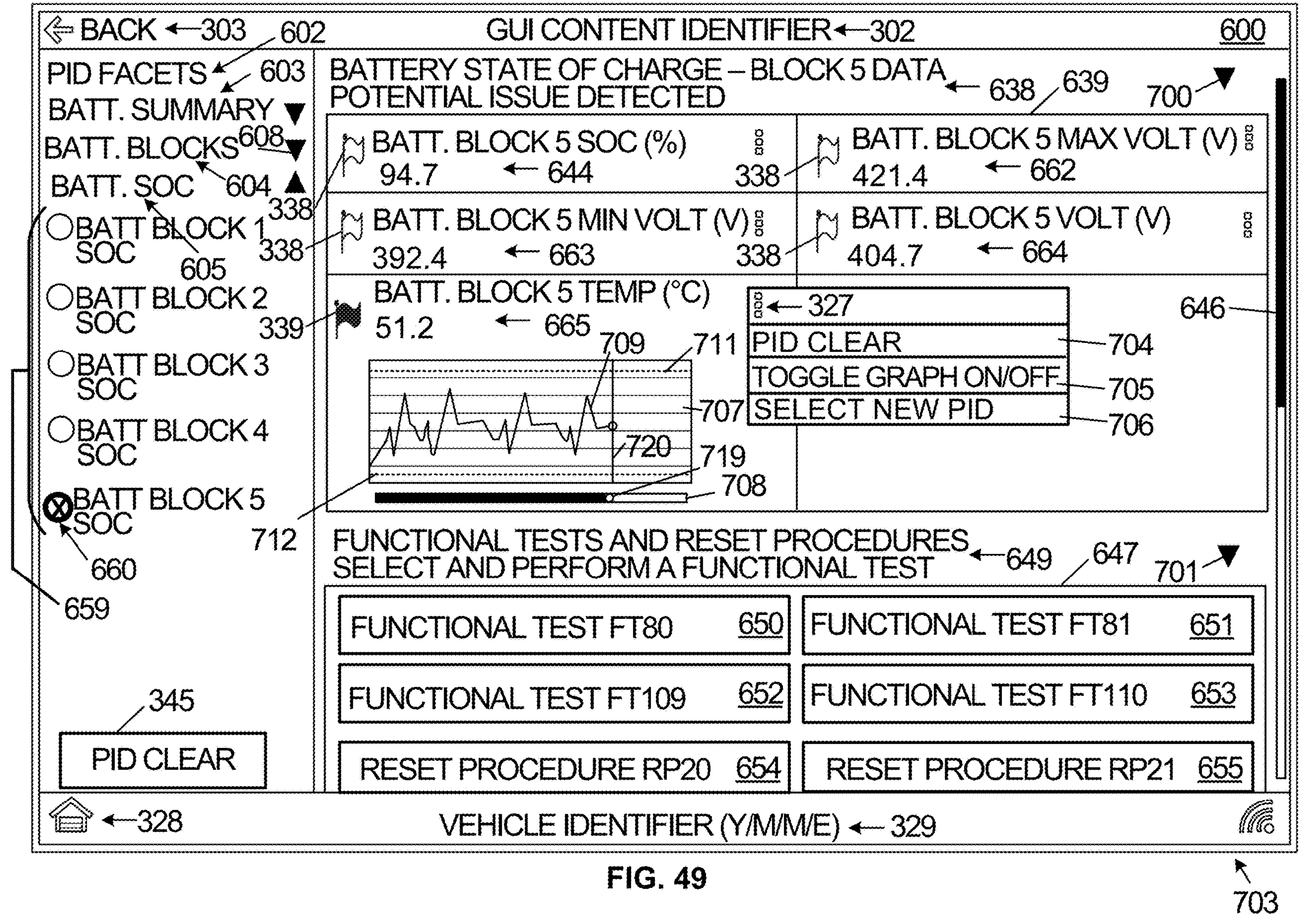

Furthermore, as shown in FIG. 18, the GUI 150 includes a USC 327 (represented as a column of three rectangles) selectable to cause a processor to modify a view of the GUI containing the USC 327. Other GUIs can also include the USC 327. As an example, the USC 327 can be selectable to display a pop-up window containing one or more other selectable functions, such as a function to display a graph of parameter values corresponding to a PID or a function to select different PID content in place of the PID content currently displayed in proximity to the USC 327. FIG. 49 shows functions selectable via the USC 327 in accordance with example embodiments.

Next, FIG. 19 shows a screen shot 179 of the GUI 150. As an example, the GUI 150 as shown in FIG. 19 can be output on the display 81 in response to a selection of the PID facet list expander 155, 156, 668 while displayed as shown in FIG. 18. As shown in FIG. 19, the GUI 150 includes a set 177 of PID facet selectors corresponding to the PID facet group identifier 153, a set 178 of PID facet selectors corresponding to the PID facet group identifier 154, and a set 669 of PID facet selectors corresponding to the PID facet group identifier 299. The set 177 includes the following position (i.e., spatial) facets: front, rear, left, right, top and bottom. The set 178 includes the following measurement facets: voltage, current, percentage, temperature, and weight. The set 669 includes the following component facets: component A1 and component A2. A set of PID facet selectors corresponding to vehicle components can include a quantity of component facets other than two as shown in FIG. 19. Other examples of a position, measurement, or component facet, or other combinations of position, measurement, or component facets corresponding to a PID facet list expander are also possible. FIG. 19 represents each PID facet selector of the set 177, 178, 669 without any highlighting. Alternatively, one or more PID facet selectors for corresponding PID facet(s) can be highlighted to indicate to a user that selecting the highlighted PID facet selector can be used to diagnose a potential issue (e.g., a malfunction with cylinder 1) that may exist within the vehicle. FIG. 30 shows an example of a highlighted PID facet selector. A PID facet selector can be used to modify a GUI to diagnose a vehicle even if the PID facet selector is not highlighted.

Figure 20:
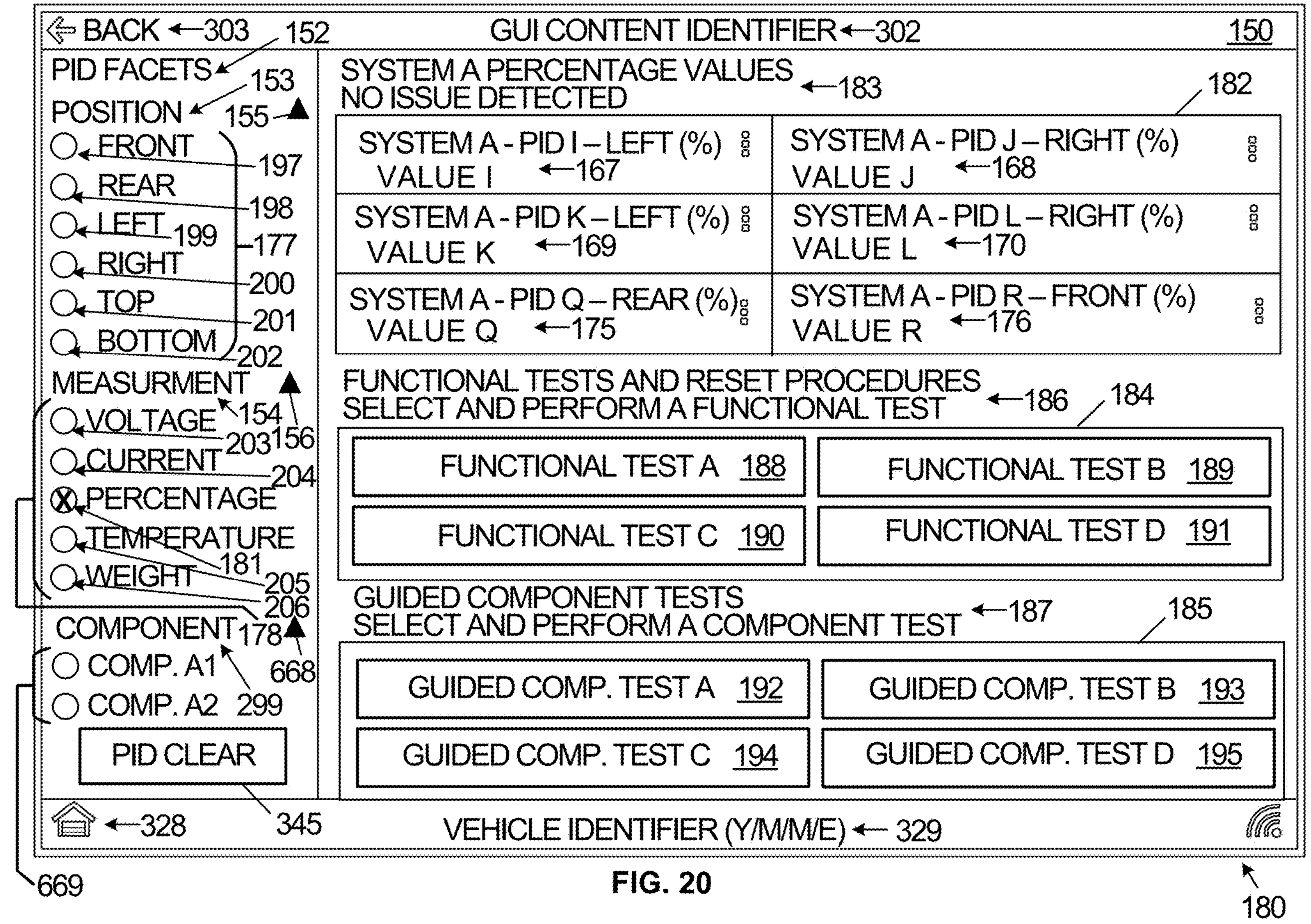

Next, FIG. 20 shows a screen shot 180 of the GUI 150. As an example, the GUI 150 as shown in FIG. 20 can be output on the display 81 in response to a selection of a PID facet selector 181 in the set 178 while displayed as shown in FIG. 19. Selection of a PID facet selector can cause the processor to modify a GUI or to display a different GUI. As an example, selecting the PID facet selector 181 can cause the processor 71 to modify the GUI 150 by displaying a container 182, 184, 185 instead of the container 157. Alternatively, the processor 71 can modify the GUI 150 so that the container 157 shown in FIG. 19 appears like the container 182 (i.e., filters the PID content shown in the container 157 to include just the PID content corresponding to PID facet selector 181). As shown, the container 182 includes the PID content 167, 168, 169, 170, 175, 176. Compared to FIG. 19, after a selection of the PID facet selector 181, the container 182 does not include PID content unrelated to the PID facet selector 181.

The container 182 includes a container 721, 722, 723, 724, 725, 726 (i.e., a sub-container of the container 182. As an example, the textual PID name of the PID content shown in the container 182 is above the corresponding PID parameter value.

The GUI 150, as shown in FIG. 20, includes a content descriptor 183, 186, 187 corresponding to the container 182, 184, 185, respectively. As an example, the content descriptor 183 indicates the container 182 corresponds to data regarding a selected PID facet selector (e.g., the PID facet selector 181), the content descriptor 186 indicates the container 184 corresponds to functional tests and reset procedures, and the content descriptor 187 indicates the container 185 corresponds to guided component tests.

Figure 56:
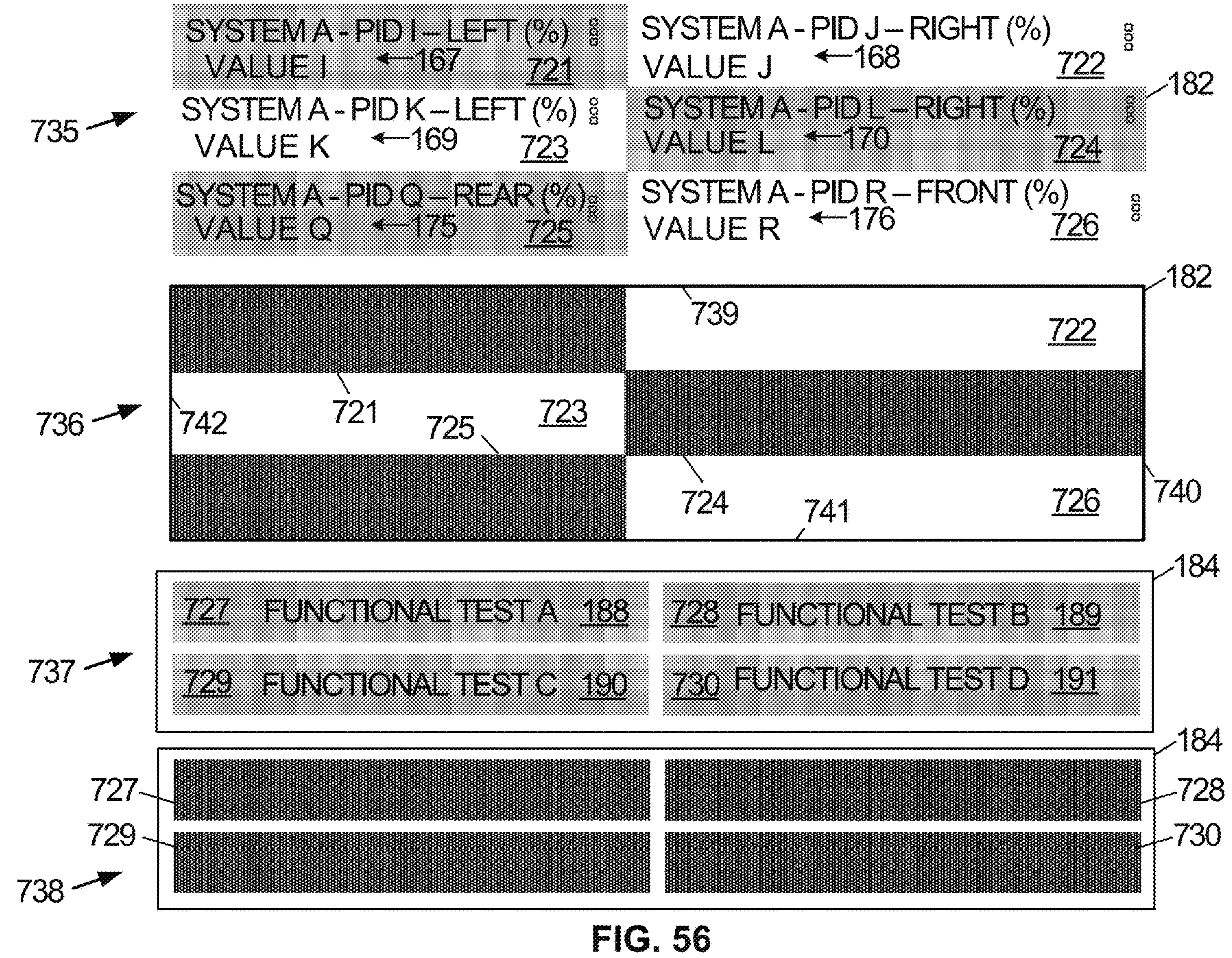
FIG. 56 shows containers, in accordance with the example embodiments.

The GUI 150, as shown in FIG. 20, includes a USC 188, 189, 190, 191 within the container 184, and a USC 192, 193, 194, 195 within the container 185. In at least some implementations, a USC includes a container and/or is contained within a respective container (e.g., a sub-container). For example, the USC 188, 189, 190, 191, 192, 193, 194, 195 can include and/or be contained within a container 727, 728, 729, 730, 731, 732, 733, 734. The container 727, 728, 729, 730 is a sub-container of the container 184. The container 731, 732, 733, 734 is a sub-container of the container 185. Other examples of the container 182 and 184 are shown in FIG. 56.

The USC 188, 189, 190, 191 corresponds to a functional test related to the PID facet selector 181 (i.e., percentage). For instance, a functional test corresponding to the USC 188, 189, 190, 191 can include a test arranged to control a component having a parameter defined using a percentage, such as a throttle position sensor position, an HVAC blend door position, a window up/down percentage, a fluid level, or a percent of remaining fluid life.

The USC 192, 193, 194, 195 corresponds to a guided component test related to the PID facet selector 181 (i.e., percentage). The USC 192, 193, 194, 195 can be selectable to initiate performing a guided component test, or to select a particular category of guided component tests to be performed. For example, the USC 192, 193, 194, 195 can be selectable to initiate setting up the test device 75 to perform a component test pertaining to a percentage. Setting up the test device 75 can include configuring the signal generator 86 to output a particular test signal, configuring the meter 87 to perform a particular measurement, or configuring the oscilloscope 88 to perform a particular measurement. As an example, a component test pertaining to a percentage can include a test to measure a duty cycle of a pulse code modulated signal, or a test to measure a voltage and determine what percent the measured voltage is compared to a threshold voltage.

The GUI 150 as shown in FIG. 20 also includes a PID facet selector 197, 198, 199, 200, 201, 202 corresponding to the following position PID facets: front, rear, left, right, top, bottom, respectively. Upon selecting one of those PID facet selectors, the processor can modify the GUI 150 to include: (i) PID content within the container 182 regarding the position indicated by the selected PID facet selector, (ii) USCs within the container 184 for selecting functional tests or reset procedures corresponding to the position indicated by the selected PID facet selector, and (iii) USCs within the container 185 for selecting guided component tests corresponding to the position indicated by the selected PID facet selector.

The GUI 150 as shown in FIG. 20 also includes a PID facet selector 203, 204, 205, 206 corresponding to the following measurement PID facets: voltage, current, temperature, weight, respectively. Upon selecting one of those PID facet selectors, the processor can modify the GUI 150 to include: (i) PID content within the container 182 regarding the type of measurement indicated by the selected PID facet selector, (ii) USCs within the container 184 for selecting functional tests or reset procedures corresponding to the measurement indicated by the selected PID facet selector, and (iii) USCs within the container 185 for selecting guided component tests corresponding to the measurement indicated by the selected PID facet selector.

Figure 21:
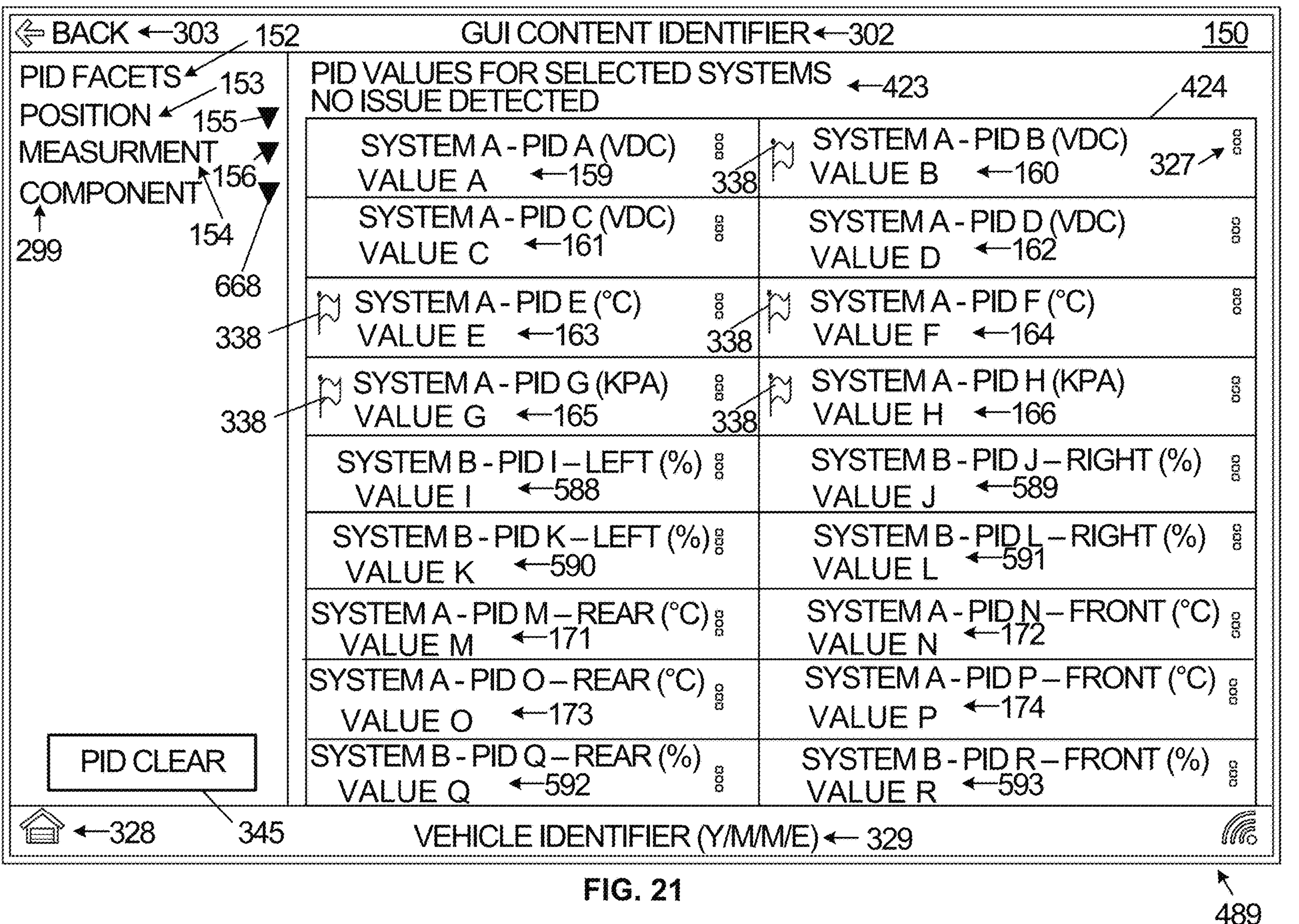

Next, FIG. 21 shows a screen shot 489 of the GUI 150. As an example, the GUI 150 shown in FIG. 21 can be output on the display in response to selection of the USC 251, the USC 252 and then the USC 261, all shown in FIG. 14, as the screen shot 489 shows PID content corresponding to a system A and a system B. As another example, the GUI 150 shown in FIG. 21 can be output on the display in response to selection of the USC 234 and/or the USC 235, and the USC 236 and/or the USC 237, and then the USC 240, all shown in FIG. 17, as the screen shot shows PID content corresponding to a system A and a system B.

The GUI 150, as shown in FIG. 21, includes a container 424 and a container content descriptor 423 corresponding to the container 424. The container content descriptor 423 indicates the content within the container 424 pertains to PIDs for selected systems, such as system(s) selected via selection of one or more USC in FIG. 14 or FIG. 17.

The container 424 includes PID content 159, 160, 161, 162, 163, 164, 165, 166, 171, 172, 173, 174 discussed above with respect to FIG. 18. All of that PID content pertains to a System A. The container 424 also includes PID content 588, 589, 590, 591, 592, 593, each of which pertains to a System B. A GUI including PID content for different systems can include PID content for more than two different systems, as shown in FIG. 21.

Figure 22:
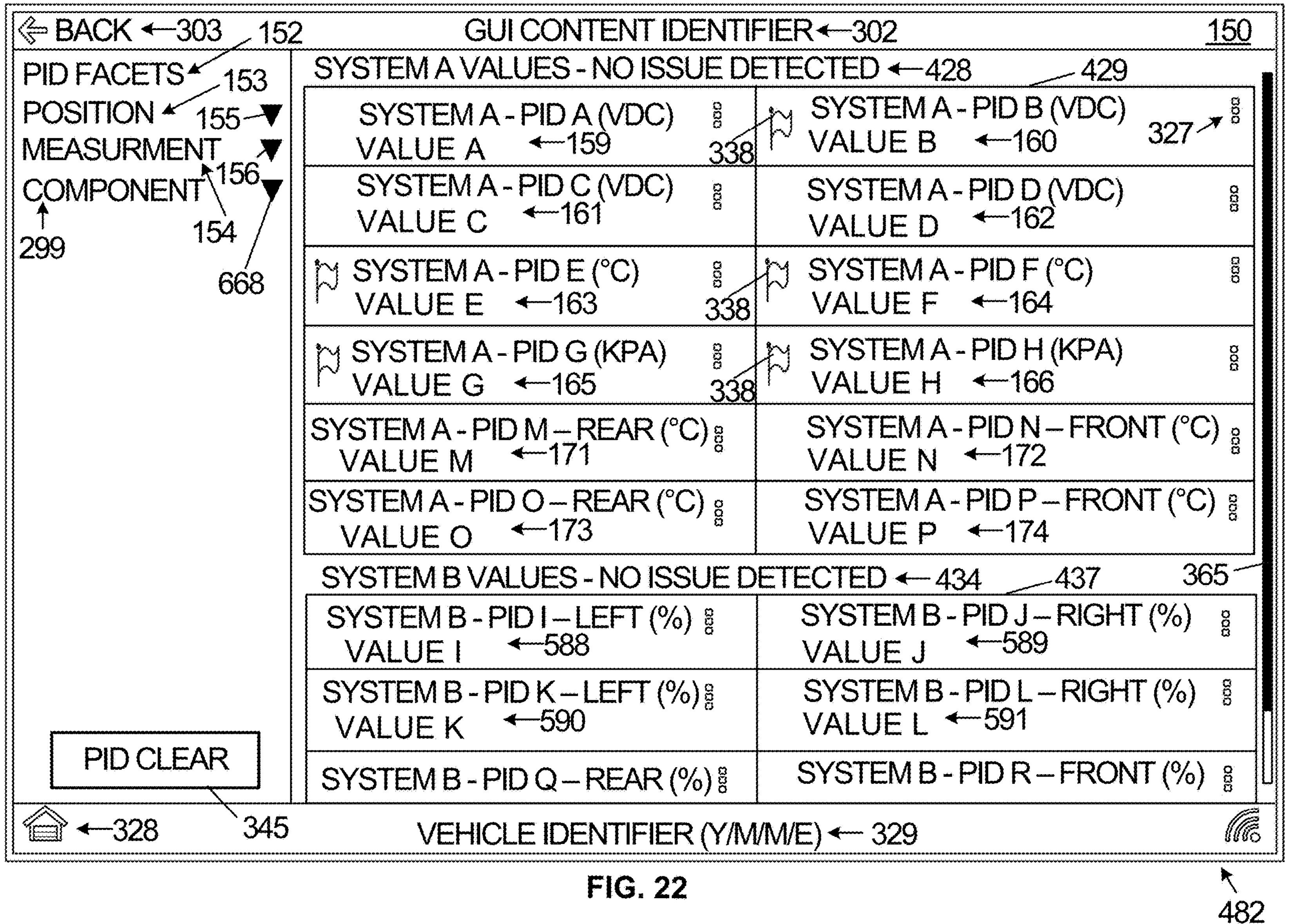

Next, FIG. 22 shows a screen shot 482 of the GUI 150. As an example, the GUI 150 shown in FIG. 22 can be output on the display in response to selection of the USC 251, the USC 254 and then the USC 261, all shown in FIG. 14, as the screen shot 482 shows PID content corresponding to a system A and a system B. As another example, the GUI 150 shown in FIG. 22 can be output on the display in response to selection of the USC 234 and/or the USC 235, and the USC 236 and/or the USC 237, and then the USC 240, all shown in FIG. 16, as the screen shot 482 shows PID content corresponding to a system A and a system B.

The GUI 150, as shown in FIG. 22, includes a container 429, 437 and a container content descriptor 428, 434 corresponding to the container 429, 437 respectively. The container content descriptor 428 indicates the content within the container 429 pertains to the system A, and the container content descriptor 434 indicates the content within the container 437 pertains to the system B.

The container 429 includes PID content 159, 160, 161, 162, 163, 164, 165, 166, 171, 172, 173, 174 discussed above with respect to FIG. 18. The container 437 includes PID content 588, 589, 590, 591, each of which pertains to the System B. The GUI 150 shown in FIG. 22 includes the scroll bar 365 selectable to cause the display to show other portions of the container 437, such as PID content 592, 593 pertaining to the System B. If one or more other systems were selected or determined based on USC selection(s) prior to selection of a selection of a USC for diagnosis, the scroll bar 365 can be used to cause PID content for the one or more other systems.

Figure 23:
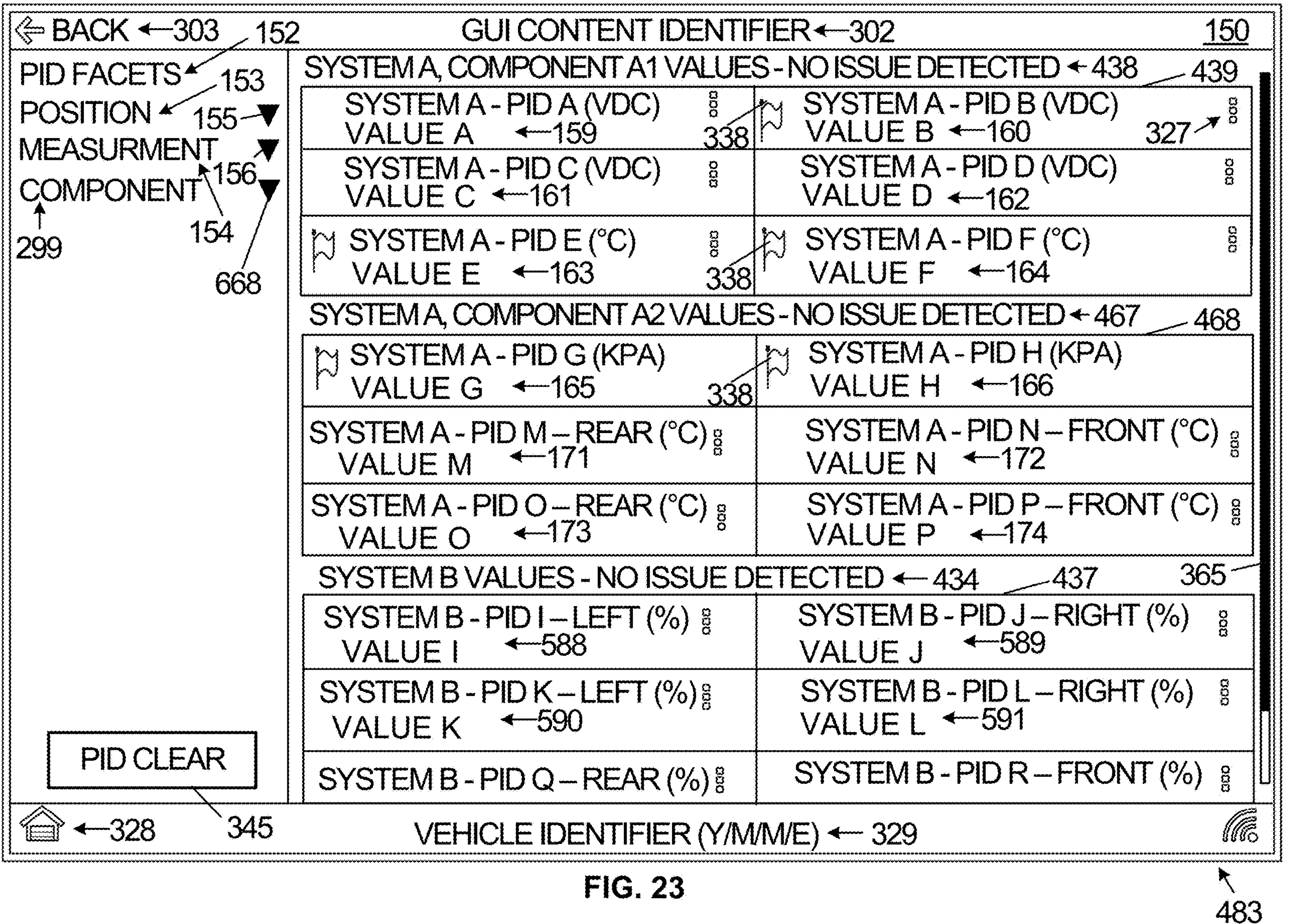

Next, FIG. 23 shows a screen shot 483 of the GUI 150. As an example, the GUI 150 shown in FIG. 23 can be output on the display in response to selection of the USC 252, the USC 253, the USC 254 and then the USC 261, all shown in FIG. 14, as the screen shot 483 shows PID content corresponding to a component A1 and component A2 (both of system A) and a system B. As another example, the GUI 150 shown in FIG. 23 can be output on the display in response to selection of the USC 234 (assuming DTC A1 corresponds to component A1), the USC 235 (assuming DTC A5 corresponds to component A2), and the USC 236 and/or the USC 237, and then the USC 240, all shown in FIG. 16, as the screen shot 483 shows PID content corresponding to a component A1 and component A2 (both of system A) and a system B. A GUI including PID content for different systems can include PID content for more than two different components that a system, as shown in FIG. 21. Additionally, in at least some embodiments, a GUI including PID content for different systems can include one or more component identifiers for each system to indicate which component(s) of that system are providing the PID parameter values.

The GUI 150, as shown in FIG. 23, includes the container 437, a container 439, 468, the container content descriptor 434, and a container content descriptor 438, 467 corresponding to the container 439, 468, respectively. The container content descriptor 438 indicates the content within the container 439 pertains to the system A and component A1, and the container content descriptor 467 indicates the content within the container 468 pertains to the system A and component A2.

The container 439 includes PID content 159, 160, 161, 162, 163, 164 discussed above with respect to FIG. 18. The container 468 includes PID content 165, 166, 171, 172, 173, 174, also discussed above with respect to FIG. 18. The container 437 includes PID content 588, 589, 590, 591, each of which pertains to the System B. The GUI 150 shown in FIG. 23 includes the scroll bar 365 selectable to cause the display to show other portions of the container 437, such as PID content 592, 593 pertaining to the System B. If one or more other systems were selected or determined based on USC selection(s) prior to selection of a selection of a USC for diagnosis, the scroll bar 365 can be used to cause PID content for the one or more other systems.

Before switching to a next example GUI, further description of the PID facet group identifier 299 is provided. The set 669 of PID facet selectors shown in FIG. 19 include two PID facet selectors (i.e., a PID facet selector for component A1 and a PID facet selector for component A2). In at least some implementations, the PID facet selectors for components can include PID facet selectors that are for duplicate components in a vehicle (i.e., a vehicle has multiple instances of the component). The duplicate components can be identical components associated with common part numbers, such as spark plugs, fuel injectors, ignition coils, exhaust gas temperature sensors, glow plugs, or wheel speed sensors. In contrast, non-duplicate components are not identical to each other, yet perform a similar function for different locations within the vehicle, such as oxygen sensors located in different exhaust pipes prior to or after a catalytic converter. A person having ordinary skill in the art will understand that one or more types of duplicate components listed above could be non-duplicate components for at least some vehicle models, and/or one or more types of non-duplicate components listed above could be duplicate components for at least some vehicle models.

In accordance with at least some other implementations, the PID facet selectors for components can include PID facet selectors that are for different components in a vehicle. As an example, the PID facet selector for components of a powertrain system can include PID facet selectors for the following components: a crankshaft position sensor, a camshaft position sensor, an intake air temperature sensor, and a mass air flow sensor.

As an example, mapping data corresponding to component A1 and component A2 is shown in Table C. That mapping data shows PIDs and test and reset procedure identifiers for each of those components. As an example, the test identifiers can identify functional tests, component tests, and reset procedures that correspond to the component identified in the same row of Table C.

TABLE C

| Component | PIDs | Test and reset procedure identifiers |
|---|---|---|
| A1 | 1, 2, 3, 4, 5, 6, 7, 8 | 21, 22, 23, 24, 25, 26, 27, 28 |
| A2 | 2, 4, 6, 8, 10, 12, 14, 16 | 21, 23, 25, 27, 29, 31, 33, 35, 37 |

Table D includes data indicative of possible selections of PID facet selectors and a Boolean logic arrangement for determining PIDs and test identifiers corresponding to each example selection of PID facet selectors and Boolean logic arrangement. As an example, the Boolean logic arrangement can be "Or" or "And." The processor 71 can populate the GUI 150 based on identified PIDs and test identifiers corresponding to the PID facet selector selections.

TABLE D

| PID Facet Selector Selections | Boolean logic | PIDs | Test Identifiers |
|---|---|---|---|
| Component A1 | Or | 1, 2, 3, 4, 5, 6, 7, 8 | 21, 22, 23, 24, 25, 26, 27, 28 |

TABLE D-continued

| PID Facet Selector Selections | Boolean logic | PIDs | Test Identifiers |
|---|---|---|---|
| Component A2 | Or | 2, 4, 6, 8, 10, 12, 14, 16 | 21, 23, 25, 27, 29, 31, 33, 35, 37 |
| Component A1 Component A2 | Or | 1, 2, 3, 4, 5, 6, 7, 8, 10, 12, 14, 16 | 21, 22, 23, 24, 25, 26, 27, 28, 29, 31, 33, 35 |
| Component A1 | And | 1, 2, 3, 4, 5, 6, 7, 8 | 21, 22, 23, 24, 25, 26, 27, 28 |
| Component A2 | And | 2, 4, 6, 8, 10, 12, 14, 16 | 21, 23, 25, 27, 29, 31, 33, 35, 37 |
| Component A1 Component A2 | And | 2, 4, 6, 8 | 21, 23, 25, 27 |

D. Second Example GUI with PID Facet Selectors

Next, FIG. 24 to FIG. 40 show various screen shots of a GUI 300. For example, FIG. 24 shows a screen shot 301 of the GUI 300. As shown in FIG. 24, the GUI 300 includes the GUI content identifier 302, the USC, 303, 328, the vehicle identifier 329, and the PID clear USC 345, all discussed above.

The GUI 300 includes a PID facet group identifier list 304. The PID facet group identifier list 304 includes a PID facet group identifier 305, 306, 307, 308. In other embodiments, a PID facet list can include a quantity of t PID facet identifiers other than four PID facet identifiers (e.g., 1, 2, 3, 5 or more PID facet identifiers). The GUI 300 includes a PID facet list expander 330, 332, 334, 336 selectable to select a PID facet corresponding to the PID facet group identifier 305, 306, 307, 308.

The GUI 300, as shown in FIG. 24, includes a container 220, 221, 222 and a container content descriptor 309, 310, 311 corresponding to the container 220, 221, 222, respectively. In accordance with at least some embodiments, a container content descriptor can include a status identifier, such as "Potential issue detected" or "No issue detected." As shown in FIG. 24, the GUI 300 includes PID content 312, 313, 314, 315 within the container 220, PID content 316, 317, 318, 319, 320, 321 within the container 221, and PID content 322, 323, 324, 325 within the container 222.

Additionally, as shown in FIG. 24, the GUI 300 can include a PID flag (e.g., an icon representing a flag attached to a flag pole). In accordance with the example embodiments, a PID flag can represent a status corresponding to PID content displayed in proximity to the PID flag. As an example, a PID flag can be shown as a white PID flag to represent that PID parameter values corresponding to a PID have not breached a threshold corresponding to the PID. As another example, a PID flag can be shown as a black PID flag to represent that one or more PID parameter values corresponding to a PID have breached a threshold corresponding to the PID. In FIG. 24, the PID flag 338 is used to indicate a parameter value corresponding to the PID content 316 has not breached a PID threshold.

Figure 25:
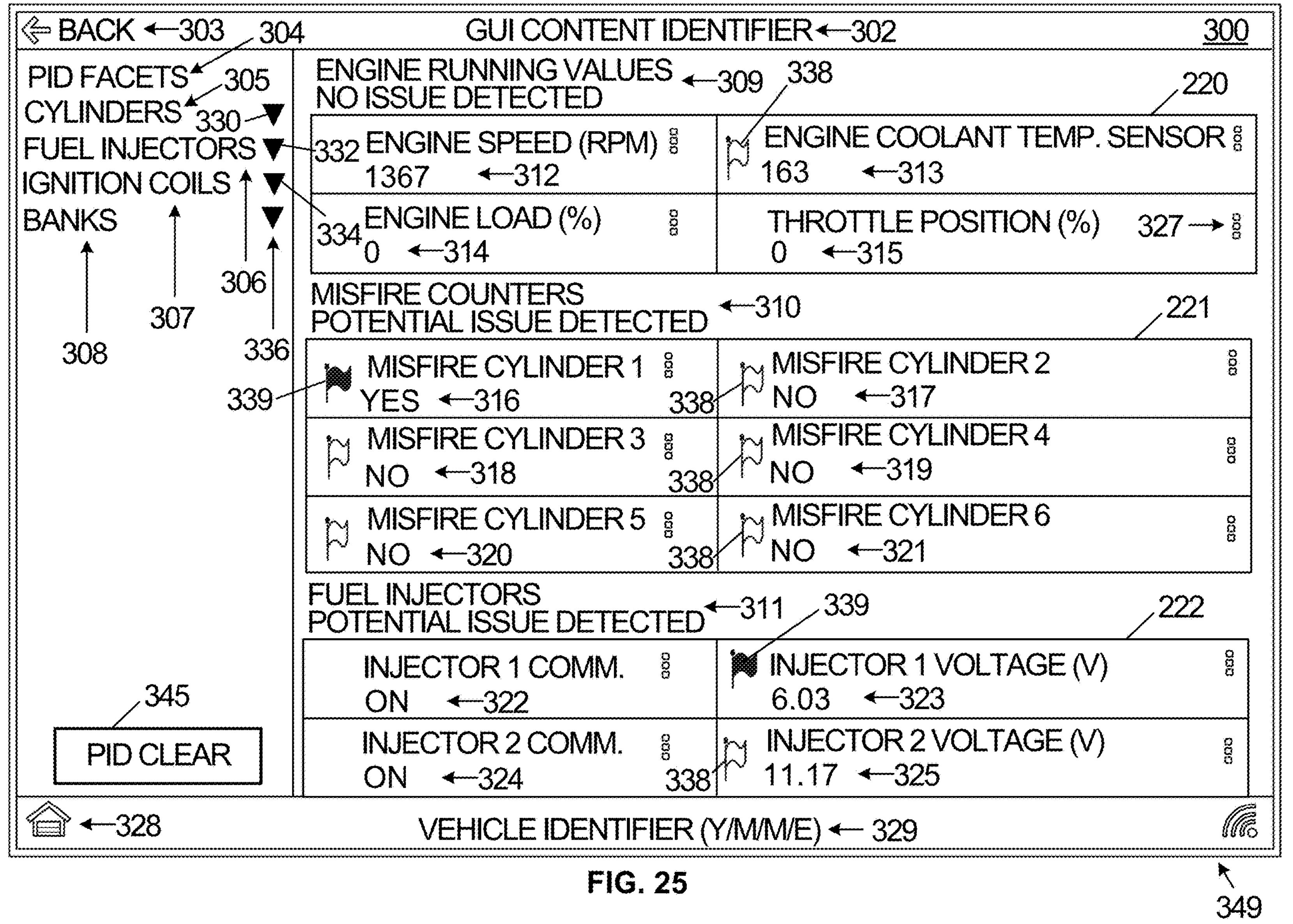

Next, FIG. 25 shows a screen shot 349 of the GUI 300. As an example, the GUI 300 as shown in the screen shot 349 can be output on the display 81 after displaying the GUI 300 as shown in the screen shot 301 shown in FIG. 24 and after the VST 3, 70 received one or more VDMs containing a parameter value corresponding to a PID represented in the PID content 316 that have breached a threshold corresponding to that PID, and one or more VDMs containing a parameter value corresponding to a PID represented in the PID content 323 that have breached a threshold corresponding to that PID.

Figure 26:
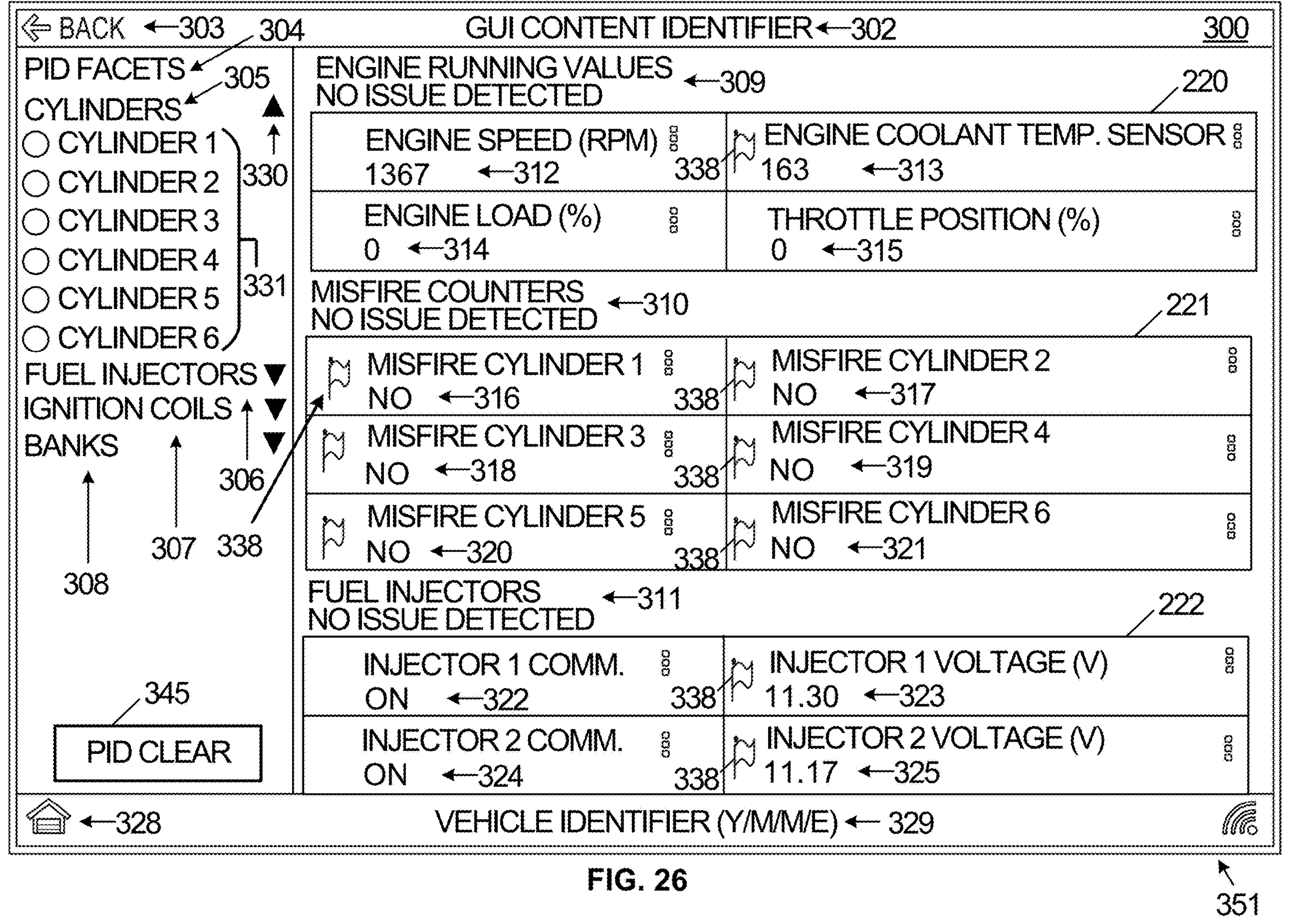

Next, FIG. 26 shows a screen shot 351 of the GUI 300. As an example, the GUI 300 as shown in the screen shot 351 can be output on the display 81 in response to a selection of the PID facet list expander 330 within the GUI 300. For instance, the GUI 300 shown in the screen shot 351 can be displayed after selecting the PID facet list expander 330 while the GUI 300 (as shown in FIG. 24) is output on the display 81. As shown in FIG. 26, the GUI 300 includes a set 331 of PID facet selectors corresponding to the PID facet group identifier 305. In particular, the set 331 includes PID facet selectors corresponding to Cylinder 1, Cylinder 2, Cylinder 3, Cylinder 4, Cylinder 5, and Cylinder 6. FIG. 26 represents each PID facet selector of the set 331 without any highlighting. In accordance with at least some embodiments, a PID facet selector output on a GUI is highlighted if a PID parameter value corresponding to the PID facet selector and a PID has breached a threshold corresponding to the PID. In accordance with at least some embodiments, a PID facet selector output on a GUI is highlighted if a DTC corresponding to the PID facet selector is set active within a vehicle connected to the VST 3, 70. As another example, the GUI 300 as shown in the screen shot 351 can be output on the display 81 in response a selection of the PID clear USC 345 from the GUI 300 as shown in FIG. 30.

Figure 27:
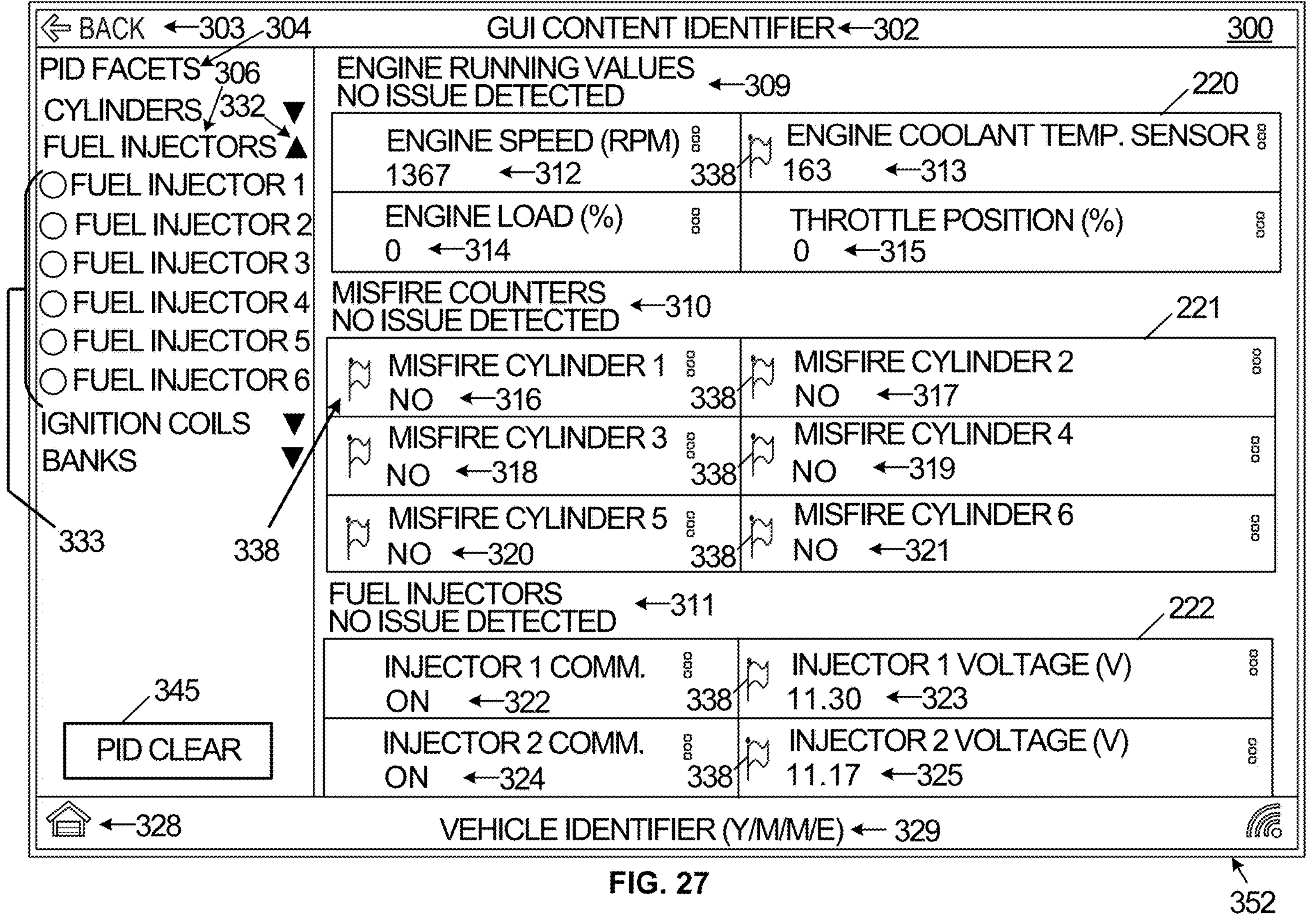
Figure 31:
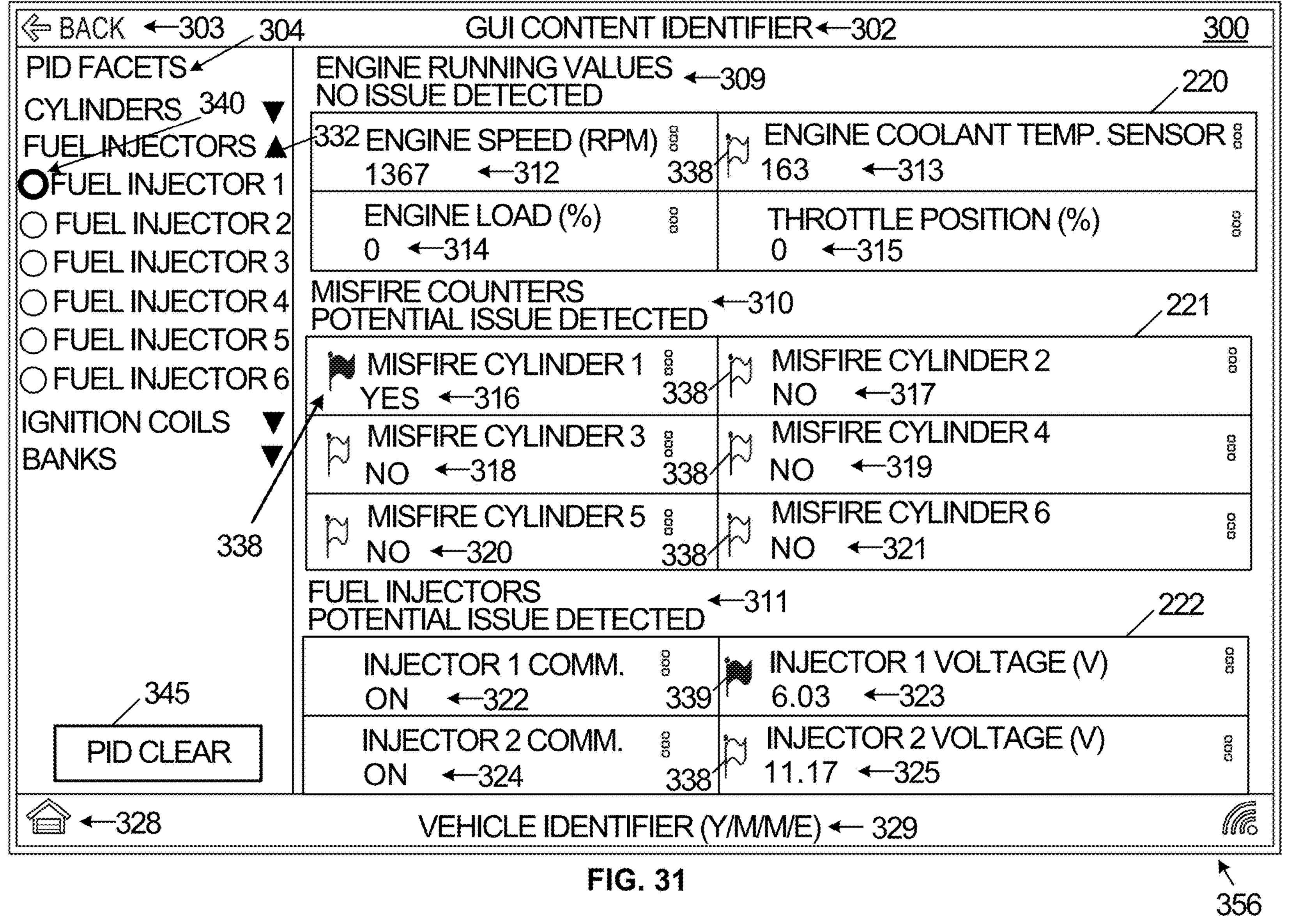

Next, FIG. 27 shows a screen shot 352 of the GUI 300. As an example, the GUI 300 as shown in the screen shot 352 can be output on the display 81 in response to a selection of the PID facet list expander 332 within the GUI 300. For instance, the GUI 300 shown in the screen shot 352 can be displayed after selecting the PID facet list expander 332 while the GUI 300 (as shown in FIG. 24) is output on the display 81. As shown in FIG. 27, the GUI 300 includes a set 333 of PID facet selectors corresponding to the PID facet group identifier 306. In particular, the set 333 includes PID facet selectors corresponding to Fuel Injector 1, Fuel Injector 2, Fuel Injector 3, Fuel Injector 4, Fuel Injector 5, and Fuel Injector 6. FIG. 27 represents each PID facet selector of the set 333 without any highlighting. As another example, the GUI 300 as shown in the screen shot 354 can be output on the display 81 in response a selection of the PID clear USC 345 from the GUI 300 as shown in FIG. 31.

Figure 28:
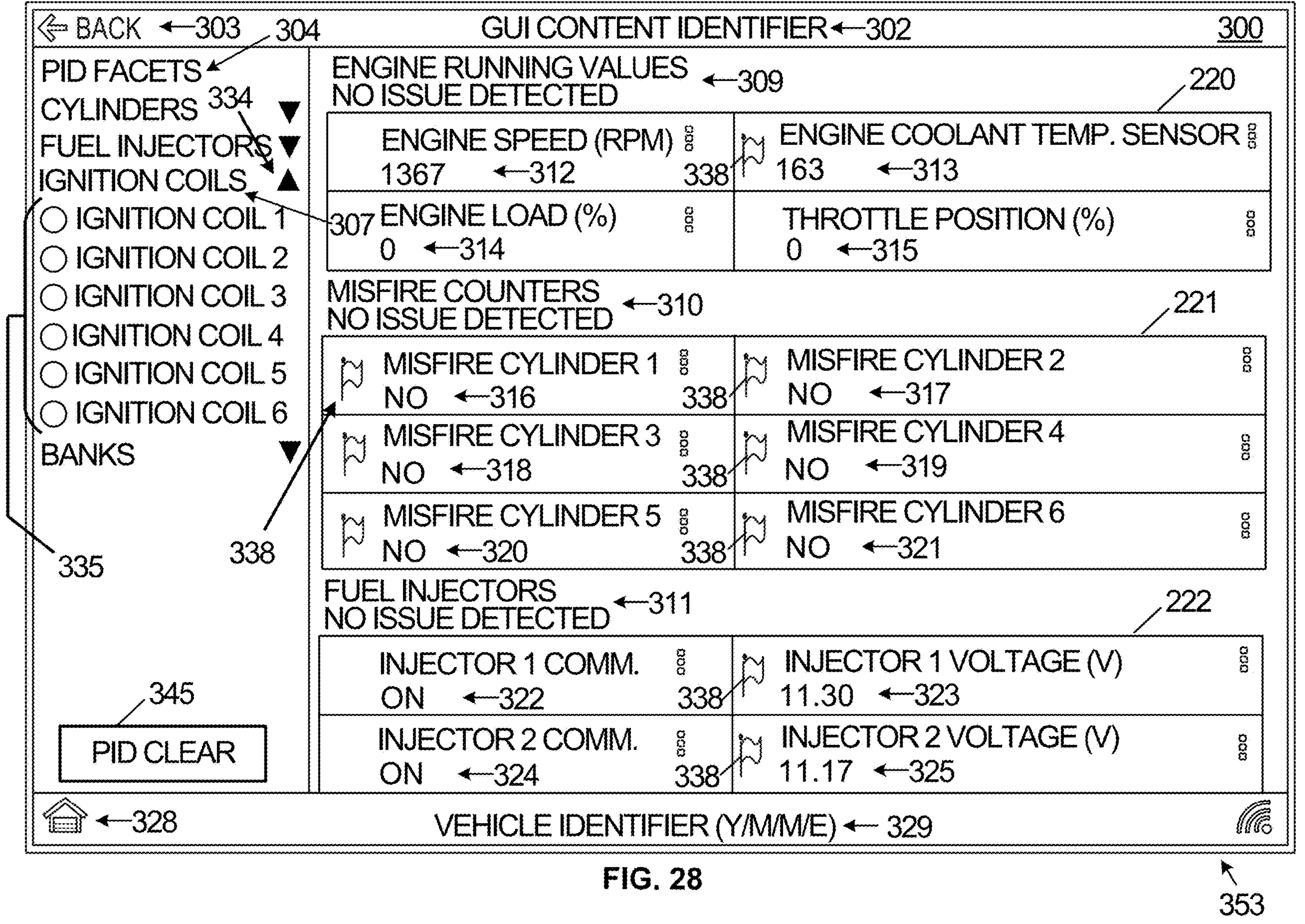
Figure 32:
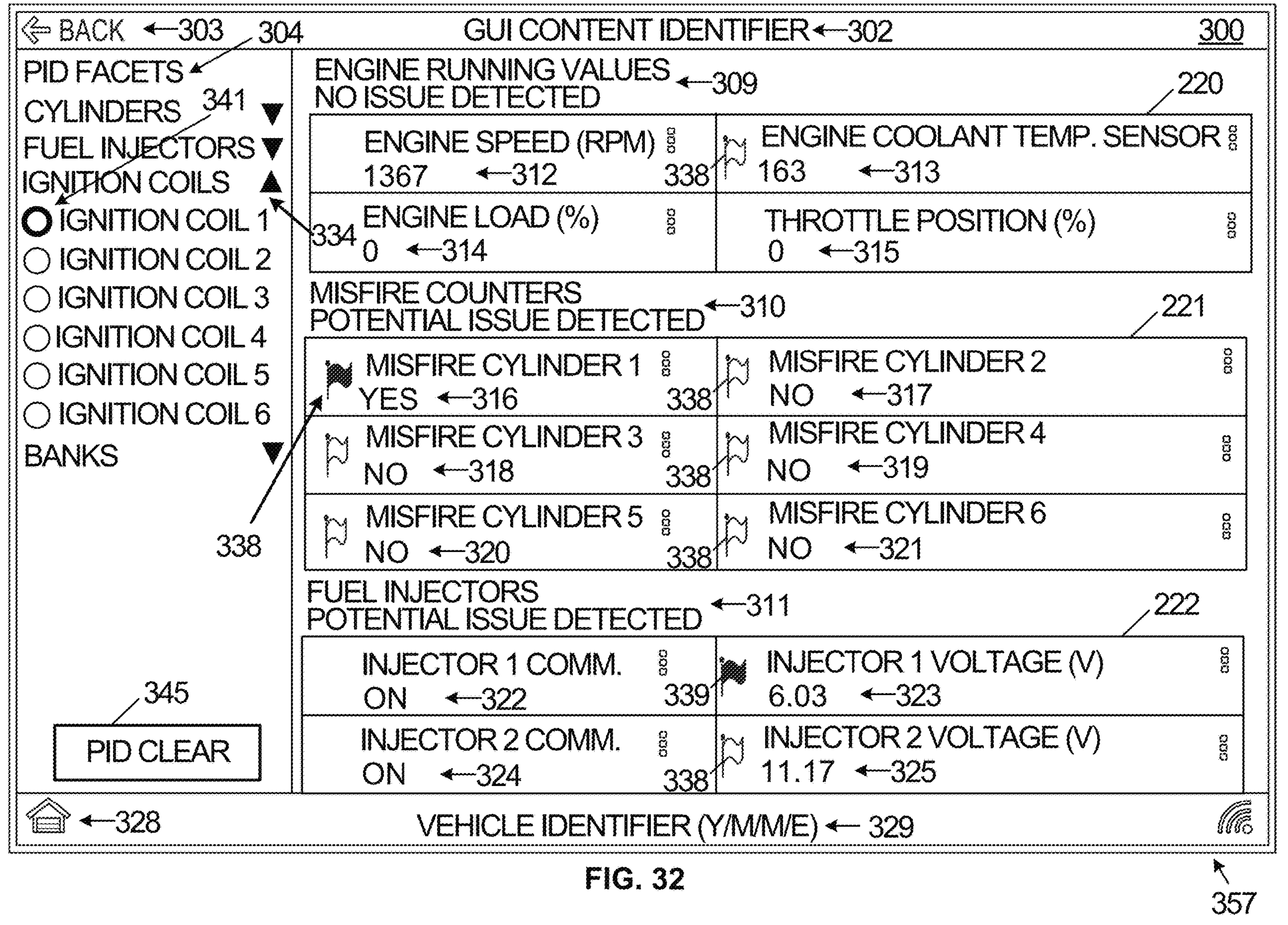

Next, FIG. 28 shows a screen shot 353 of the GUI 300. As an example, the GUI 300 as shown in the screen shot 353 can be output on the display 81 in response to a selection of the PID facet list expander 334 within the GUI 300. For instance, the GUI 300 shown in the screen shot 353 can be displayed after selecting the PID facet list expander 334 while the GUI 300 (as shown in FIG. 24) is output on the display 81. As shown in FIG. 28, the GUI 300 includes a set 335 of PID facet selectors corresponding to the PID facet group identifier 307. In particular, the set 335 includes PID facet selectors corresponding to Ignition Coil 1, Ignition Coil 2, Ignition Coil 3, Ignition Coil 4, Ignition Coil 5, and Ignition Coil 6. FIG. 27 represents each PID facet selector of the set 335 without any highlighting. As another example, the GUI 300 as shown in the screen shot 352 can be output on the display 81 in response a selection of the PID clear USC 345 from the GUI 300 as shown in FIG. 32.

Figure 29:
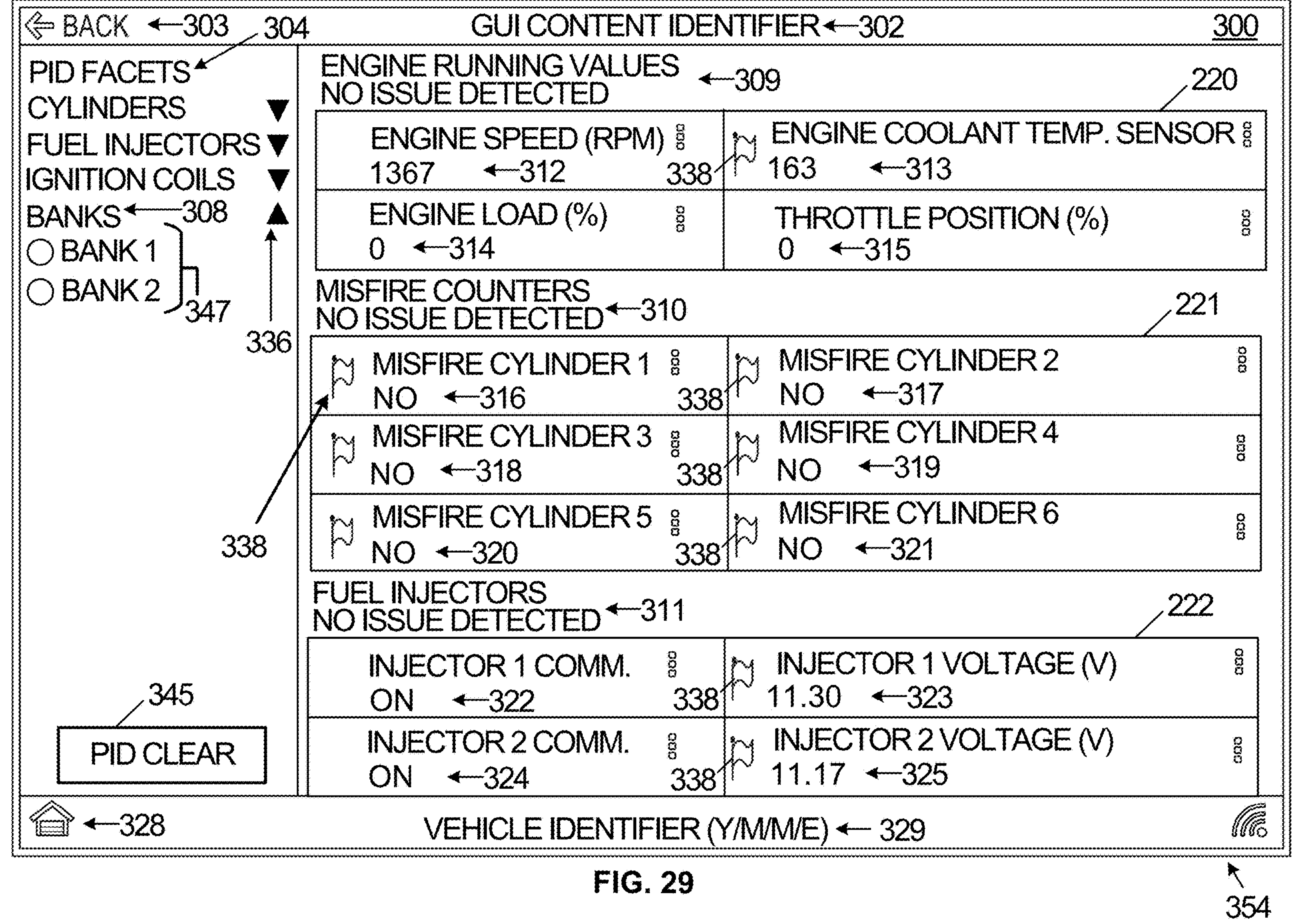
Figure 33:
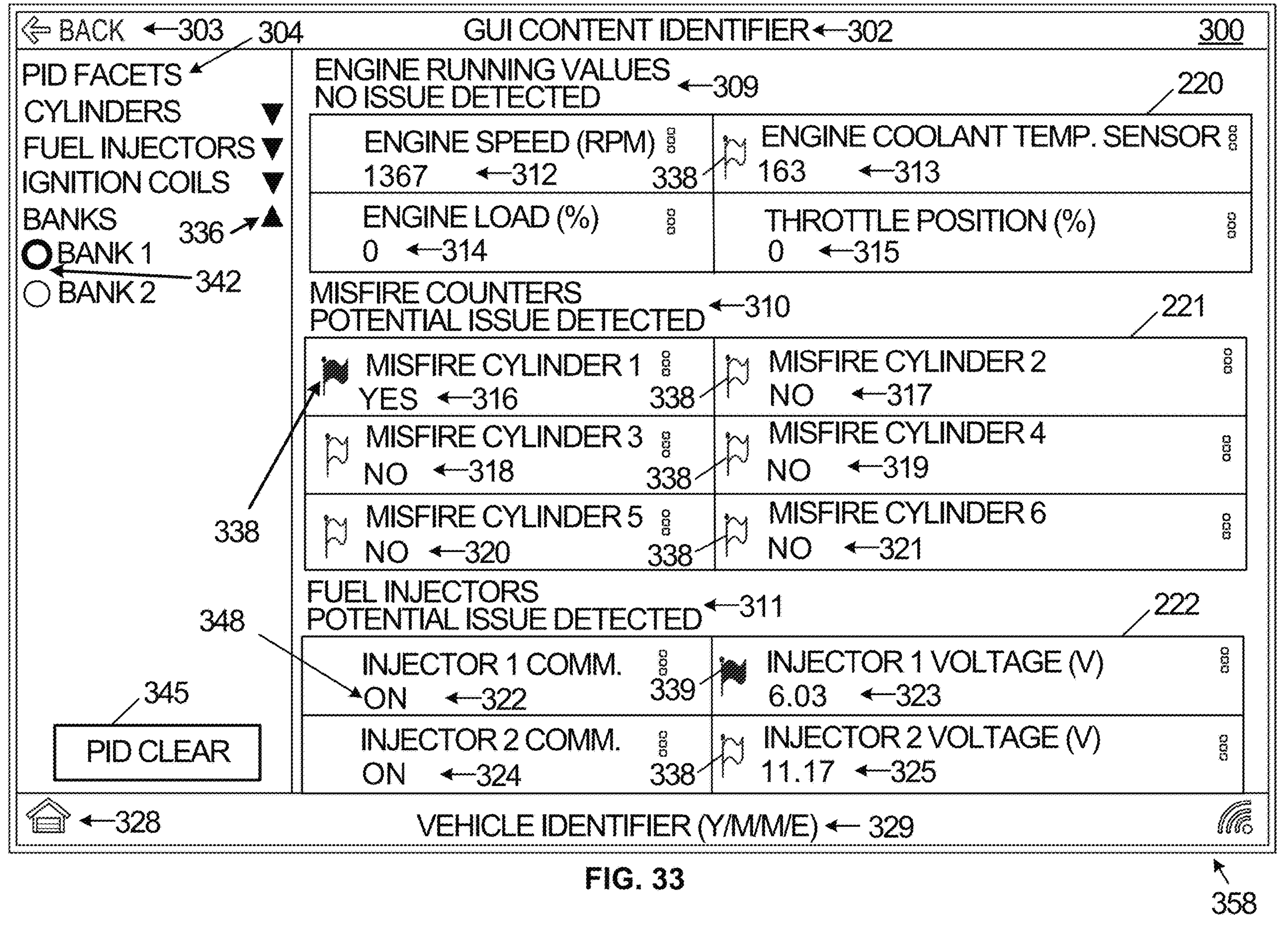

Next, FIG. 29 shows a screen shot 354 of the GUI 300. As an example, the GUI 300 as shown in the screen shot 354 can be output on the display 81 in response to a selection of the PID facet list expander 336 within the GUI 300. For instance, the GUI 300 shown in the screen shot 354 can be displayed after selecting the PID facet list expander 336 while the GUI 300 (as shown in FIG. 24) is output on the display 81. As shown in FIG. 29, the GUI 300 includes a set 347 of PID facet selectors corresponding to the PID facet group identifier 308. In particular, the set 347 includes PID facet selectors corresponding to Bank 1 and Bank 2. FIG. 29 represents each PID facet selector of the set 347 without any highlighting. As another example, the GUI 300 as shown in the screen shot 353 can be output on the display 81 in response a selection of the PID clear USC 345 from the GUI 300 as shown in FIG. 33.

Next, FIG. 30 shows a screen shot 355 of the GUI 300. As an example, the GUI 300 as shown in the screen shot 355 can be output on the display 81 in response to a selection of the PID facet list expander 330 within the GUI 300. For instance, the GUI 300 shown in the screen shot 355 can be displayed after selecting the PID facet list expander 330 while the GUI 300 (as shown in FIG. 24) is output on the display 81. As another example, the GUI 300 as shown in the screen shot 355 can be output on the display 81 in response to a PID parameter value corresponding to the PID within the PID content 316 breaching a threshold and causing a PID flag to change status to indicate the PID parameter value breached the threshold (while the GUI 300 as shown in FIG. 26 is output on the display 81). As shown in FIG. 30, a PID facet selector 337 corresponding the Cylinder 1 is highlighted. The highlighting can be used to indicate to a user that selecting the PID facet selector 337 can be used to diagnose a potential issue (e.g., a malfunction with cylinder 1) that may exist within the vehicle.

Next, FIG. 31 shows a screen shot 356 of the GUI 300. As an example, the GUI 300 as shown in the screen shot 356 can be output on the display 81 in response to a selection of the PID facet list expander 332 within the GUI 300. For instance, the GUI 300 shown in the screen shot 356 can be displayed after selecting the PID facet list expander 332 while the GUI 300 (as shown in FIG. 24) is output on the display 81. As another example, the GUI 300 as shown in the screen shot 356 can be output on the display 81 in response to a PID parameter value corresponding to the PID within the PID content 323 breaching a threshold and causing a PID flag to change status to indicate the PID parameter value breached the threshold (while the GUI 300 as shown in FIG. 27 is output on the display 81). As shown in FIG. 31, a PID facet selector 340 corresponding the Fuel Injector 1 is highlighted. The highlighting can be used to indicate to a user that selecting the PID facet selector 340 can be used to diagnose a potential issue (e.g., a malfunction with fuel injector 1) that may exist within the vehicle.

Next, FIG. 32 shows a screen shot 357 of the GUI 300. As an example, the GUI 300 as shown in the screen shot 357 can be output on the display 81 in response to a selection of the PID facet list expander 334 within the GUI 300. For instance, the GUI 300 shown in the screen shot 357 can be displayed after selecting the PID facet list expander 334 while the GUI 300 (as shown in FIG. 24) is output on the display 81. As another example, the GUI 300 as shown in the screen shot 357 can be output on the display 81 in response to a PID parameter value corresponding to the PID within the PID content 316 breaching a threshold and causing a PID flag to change status to indicate the PID parameter value breached the threshold (while the GUI 300 as shown in FIG. 28 is output on the display 81). As shown in FIG. 32, a PID facet selector 341 corresponding the Ignition Coil 1 is highlighted. The highlighting can be used to indicate to a user that selecting the PID facet selector 341 can be used to diagnose a potential issue (e.g., a malfunction with an ignition coil 1) that may exist within the vehicle.

Next, FIG. 33 shows a screen shot 358 of the GUI 300. As an example, the GUI 300 as shown in the screen shot 358 can be output on the display 81 in response to a selection of the PID facet list expander 336 within the GUI 300. For instance, the GUI 300 shown in the screen shot 358 can be displayed after selecting the PID facet list expander 336 while the GUI 300 (as shown in FIG. 24) is output on the display 81. As another example, the GUI 300 as shown in the screen shot 358 can be output on the display 81 in response to a PID parameter value corresponding to a PID associated with a cylinder within bank 1 of internal combustion engine (e.g., a PID within the PID content 316) breaching a threshold and causing a PID flag to change status to indicate the PID parameter value breached the threshold (while the GUI 300 as shown in FIG. 29 is output on the display 81). As shown in FIG. 33, a PID facet selector 342 corresponding the Bank 1 is highlighted. The highlighting can be used to indicate to a user that selecting the PID facet selector 342 can be used to diagnose a potential issue (e.g., a malfunction with a component within bank 1) that may exist within the vehicle.

Next, FIG. 34 shows a screen shot 344 of the GUI 300. As an example, the GUI 300, as shown in the screen shot 344 can be output on the display 81 in response to selection of the PID clear USC 345 while the GUI 300, as shown in the screen shot 358 within FIG. 33, is output on the display 81. Comparing the screen shot 358 and the screen shot 344, as shown in FIG. 34, the PID facet selector 342 is no longer highlighted after clearing the PIDs and before the processor 71 determines another PID represented in the GUI 300 breaches a PID threshold. Additionally, the PID flag 339 within the screen shot 358 indicate PID parameter thresholds have been breached, whereas the PID flag 338 within the screen shot 344 indicates PID parameter thresholds have not been breached. Furthermore, a PID parameter value 348 and other PID parameter values within the screen shot 358 include a textual parameter value, whereas the PID parameter value 348 and other PID parameter values within the screen shot 344 include dashed lines to represent that a PID parameter value for the corresponding PID has not been received after clearing the PIDs.

Next, FIG. 35 shows a screen shot 359 of the GUI 300. As an example, the GUI 300, as shown in the screen shot 359 can be output on the display 81 in response to selection of the PID facet selector 337 while the GUI 300, as shown in the screen shot 355 within FIG. 30, is output on the display 81. In FIG. 35, the PID facet selector 337 is marked with an icon (e.g., an X) to indicate that the PID facet selector 337 was and/or is currently selected.

The GUI 300, as shown in FIG. 35, includes a container 373, 374, 375 and container content descriptor 370, 371, 372 corresponding to the container 373, 374, 375, respectively. As an example, the container content descriptor 370 indicates the container 373 corresponds to data regarding a selected PID facet selector (e.g., the PID facet selector 337), the container content descriptor 371 indicates the container 374 corresponds to functional tests and reset procedures, and the container content descriptor 372 indicates the container 375 corresponds to guided component tests.

The GUI 300, as shown in FIG. 35, includes PID content 376, 377, 378, 379 within the container 373, a USC 380, 381, 382, 383, 384, 385 within the container 374, and a USC 386, 387, 388, 389 within the container 375. As an example, a textual PID name of the PID content shown in the container 373 is above the corresponding PID parameter value.

The USC 380, 381, 382, 383, 384, 385 corresponds to a functional test related to the PID facet selector 337 (i.e., cylinder 1). For instance, the USC 380, 381, 382, 383, 384, 385 corresponds to a functional test to deactivate cylinder 1, reset an injector for cylinder 1, command an ignition coil 1, disable fuel injector 1, advance ignition coil 1, and delay ignition coil 1, respectively.

The USC 386, 387, 388, 389 corresponds to a guided component test. The USC 386, 387, 388, 389 can be selectable to initiate performing a guided component test, or to select a particular category of guided component tests to be performed. For example, the USC 386, 387, 388, 389 can be selectable to initiate setting up the test device 75 and/or the probe 85 to perform a gas analysis test, a fuel injector voltage test, a fuel pressure test, or an ignition coil test, respectively. Setting up the test device 75 can include configuring the signal generator 86 to output a particular test signal, configuring the meter 87 to perform a particular measurement, or configuring the oscilloscope 88 to perform a particular measurement. A particular measurement, for example, can include a voltage, current, or resistance measurement. Such measurement can represent a parameter other than a voltage, current, or resistance, such as a force, temperature or pressure. Setting up the probe 85 can include connecting the probe 85 to the port 92, 93 or establishing wireless connectivity between the probe 85 and the transceiver 72.

Figure 36:
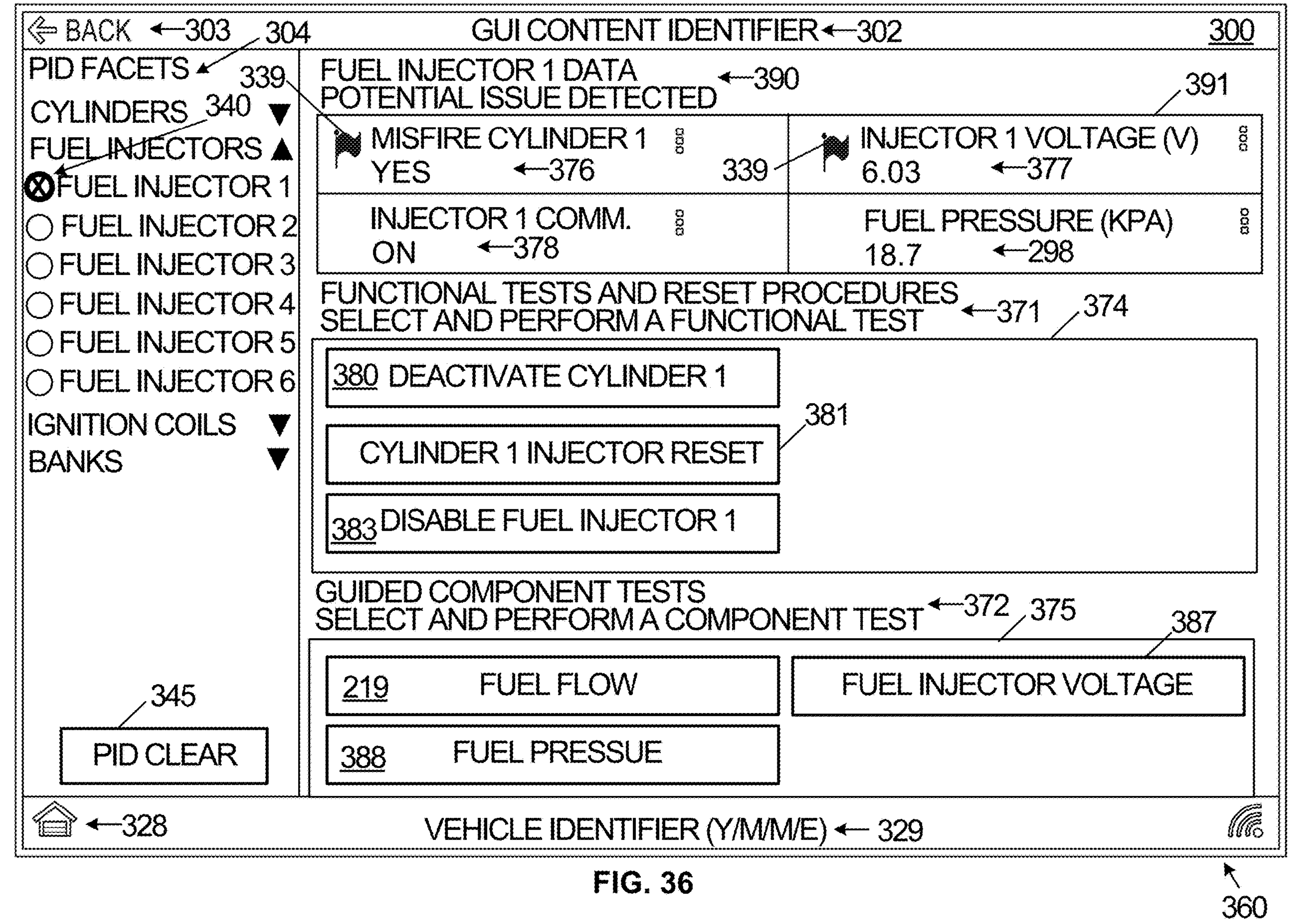

Next, FIG. 36 shows a screen shot 360 of the GUI 300. As an example, the GUI 300, as shown in the screen shot 360 can be output on the display 81 in response to selection of the PID facet selector 340 while the GUI 300, as shown in the screen shot 356 within FIG. 31, is output on the display 81. In FIG. 36, the PID facet selector 340 is marked with an icon (e.g., an X) to indicate that the PID facet selector 340 was and/or is currently selected.

The GUI 300, as shown in FIG. 36, includes a container 391, 374, 375 and container content descriptor 390, 371, 372 corresponding to the container 391, 374, 375, respectively. As an example, the container content descriptor 390 indicates the container 391 corresponds to data regarding a selected PID facet selector (e.g., the PID facet selector 340), the container content descriptor 371 indicates the container 374 corresponds to functional tests and reset procedures, and the container content descriptor 372 indicates the container 375 corresponds to guided component tests.

The GUI 300, as shown in FIG. 36, includes PID content 298, 376, 377, 378 within the container 391, a USC 380, 381, 383 within the container 374, and a USC 219, 387, 388 within the container 375. As an example, a textual PID name of the PID content 298, 376, 377, 378 is above a corresponding PID parameter value.

The description of the USC 380, 381, 383, 387, 388 with respect to FIG. 35 is applicable to those same USC in FIG. 36. A comparison of the container 374 shown in FIG. 35 and FIG. 36 shows that the USC 380, 381, 383 can be repositioned within a container. The description of the USC 219 corresponds to a guided component test for testing a fuel flow in a vehicle. For example, the USC 219 can be selectable to initiate setting up the test device 75 to measure fuel flow in a fuel line within the vehicle.

Compared to FIG. 35, the GUI 300 in FIG. 36 does not show the PID content 379 nor the USC 382, 384, 385, 386, 389. Based on such comparison, a person skilled in the art will understand that selection of a PID facet selector within a GUI can cause a processor to remove PID content and/or a USC that is not applicable to the PID facet selector. Removal of those items can be beneficial. For instance, removal of inapplicable PID content and/or an inapplicable USC frees up space within the GUI to display other PID content and/or other USC(s) that is/are applicable to the PID facet selector such that a user does not have to use a scroll bar to cause the processor to display the other PID content or USC. As another example, removal of inapplicable PID content can allow the processor to request parameter values for PIDs that are applicable to the PID facet selector more often during a given amount of time and to receive more requested parameter values during the given amount of time. As yet another example, removal of a USC for a functional test or guided component test inapplicable to a selected PID facet can allow a user to find an applicable test more quickly since the user doesn't spend time looking at USC for inapplicable tests.

Figure 37:
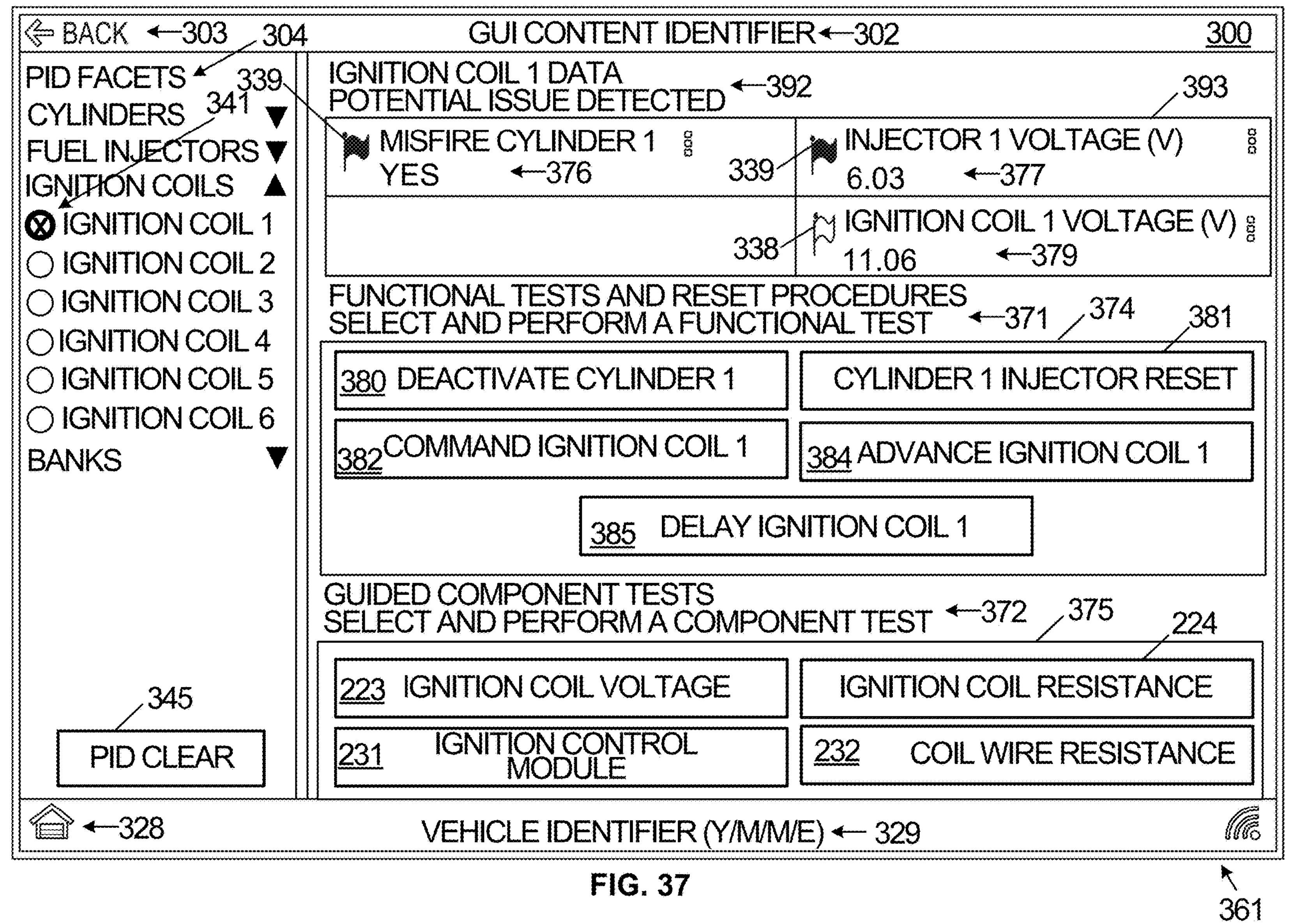

Next, FIG. 37 shows a screen shot 361 of the GUI 300. As an example, the GUI 300, as shown in the screen shot 361 can be output on the display 81 in response to selection of the PID facet selector 341 while the GUI 300, as shown in the screen shot 357 within FIG. 32, is output on the display 81. In FIG. 37, the PID facet selector 341 is marked with an icon (e.g., an X) to indicate that the PID facet selector 341 was and/or is currently selected.

The GUI 300, as shown in FIG. 37, includes a container 393, 374, 375 and container content descriptor 392, 371, 372 corresponding to the container 393, 374, 375, respectively. As an example, the container content descriptor 392 indicates the container 393 corresponds to data regarding a selected PID facet selector (e.g., the PID facet selector 341), the container content descriptor 371 indicates the container 374 corresponds to functional tests and reset procedures, and the container content descriptor 372 indicates the container 375 corresponds to guided component tests.

The GUI 300, as shown in FIG. 37, includes PID content 376, 377, 379 within the container 393, a USC 380, 381, 382, 384, 385 within the container 374, and a USC 223, 224, 231, 232 within the container 375. As an example, a textual PID name of the PID content shown in the container 393 is above the corresponding PID parameter value.

The description of the USC 380, 381, 382, 384, 385 with respect to FIG. 35 is applicable to those same USC in FIG. 37. The USC 223, 224, 231, 232 corresponds to a guided component test. The USC 223, 224, 231, 232 can be selectable to initiate performing a guided component test, or to select a particular category of guided component tests to be performed. For example, the USC 223, 224, 231, 232 can be selectable to initiate setting up the test device 75 and/or the probe 85 to perform an ignition coil voltage test, an ignition coil resistance test, an ignition control module test, or a coil wire resistance test, respectively.

Figure 38:
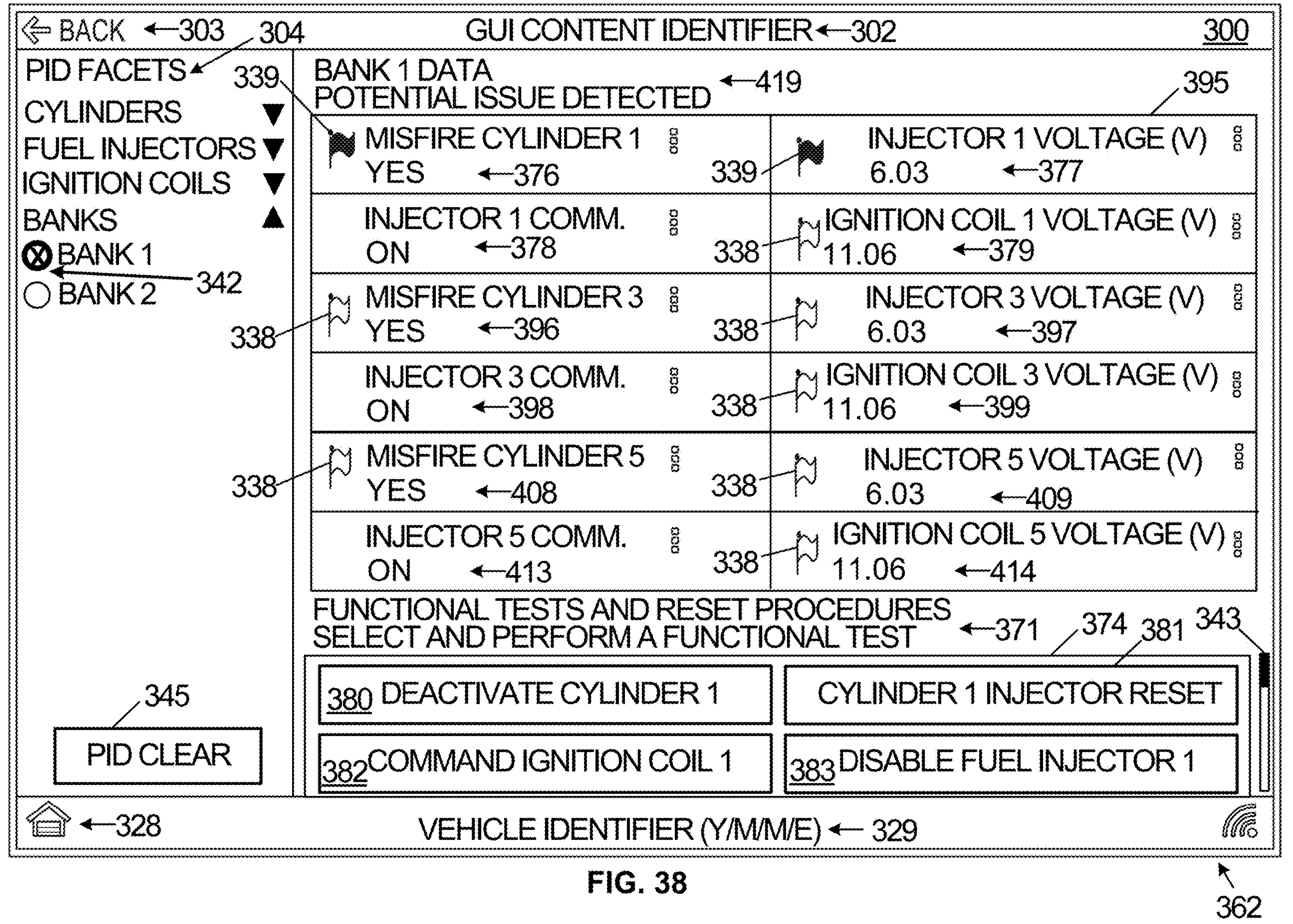

Next, FIG. 38 shows a screen shot 362 of the GUI 300. As an example, the GUI 300, as shown in the screen shot 362 can be output on the display 81 in response to selection of the PID facet selector 342 while the GUI 300, as shown in the screen shot 358 within FIG. 33, is output on the display 81. In FIG. 38, the PID facet selector 342 is marked with an icon (e.g., an X) to indicate that the PID facet selector 342 was and/or is currently selected. In at least some implementations, the engine bank corresponding to the PID facet selector 342 includes cylinders 1, 3, and 5. An engine bank can include fewer or more than three cylinders.

The GUI 300, as shown in FIG. 38, includes a container 374, 395 and container content descriptor 371, 419 corresponding to the container 374, 395, respectively. As an example, the container content descriptor 371 indicates the container 374 corresponds to functional tests and reset procedures, and the container content descriptor 419 indicates the container 395 corresponds to data regarding a selected PID facet selector (e.g., the PID facet selector 342).

The GUI 300, as shown in FIG. 38, includes PID content 376, 377, 378, 379, 396, 397, 398, 399, 408, 409, 413, 414 within the container 395, and the USC 380, 381, 382, 383 within the container 374. As an example, the textual PID name of the PID content shown in the container 395 is above the corresponding PID parameter value. The PID content 376, 377, 378, 379 corresponds to cylinder 1 of the bank 1. The PID content 396, 397, 398, 399 corresponds to cylinder 3 of the bank 1. The PID content 408, 409, 413, 414 corresponds to cylinder 5 of the bank 1.

The description of the USC 380, 381, 382, 383 with respect to FIG. 35 is applicable to those same USC in FIG. 38, although the USC 380, 381, 382, 383 in FIG. 38 correspond to the PID facet selector 342 (i.e., bank 1). The GUI 300, as shown in FIG. 38, includes a scroll bar 343 selectable to cause a processor to output a different portion of the GUI 300, such as a portion of the GUI 300 shown in FIG. 39 or FIG. 40.

Figure 39:
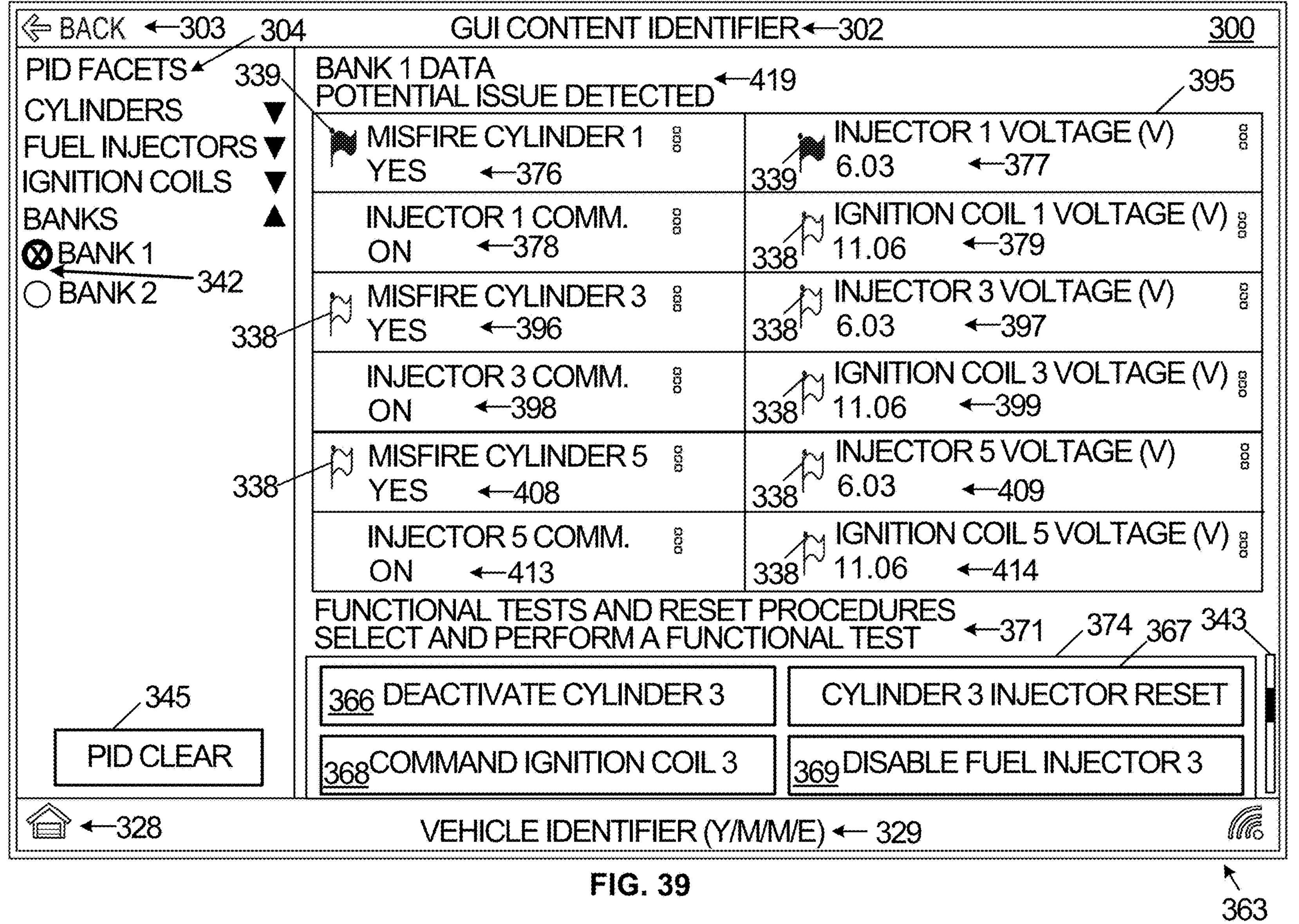

Next, FIG. 39 shows a screen shot 363 of the GUI 300. As an example, the GUI 300, as shown in the screen shot 362 can be output on the display 81 in response to use of the scroll bar 343 in the GUI 300 to select a different portion of the GUI 300, as compared to a portion of the GUI 300 shown in FIG. 38 or a portion of the GUI 300 shown in FIG. 40. In FIG. 39, the PID facet selector 342 is marked with an icon (e.g., an X) to indicate that the PID facet selector 342 was and/or is currently selected.

The GUI 300, as shown in FIG. 39, includes the container 374, 395 and the container content descriptor 371, 419 discussed above. The GUI 300, as shown in FIG. 39, includes PID content 376, 377, 378, 379, 396, 397, 398, 399, 408, 409, 413, 414 within the container 395, and a USC 366, 367, 368, 369 within the container 374.

The USC 366, 367, 368, 369 corresponds to a functional test related to the PID facet selector 342 (i.e., bank 1). For instance, the USC 366, 367, 368, 369 corresponds to a functional test to deactivate cylinder 3, reset an injector for cylinder 3, command an ignition coil 3, disable fuel injector 3, respectively. The GUI 300, as shown in FIG. 39, includes the scroll bar 343 selectable to cause a processor to output a different portion of the GUI 300, such as a portion of the GUI 300 shown in FIG. 38 or FIG. 40.

Figure 40:
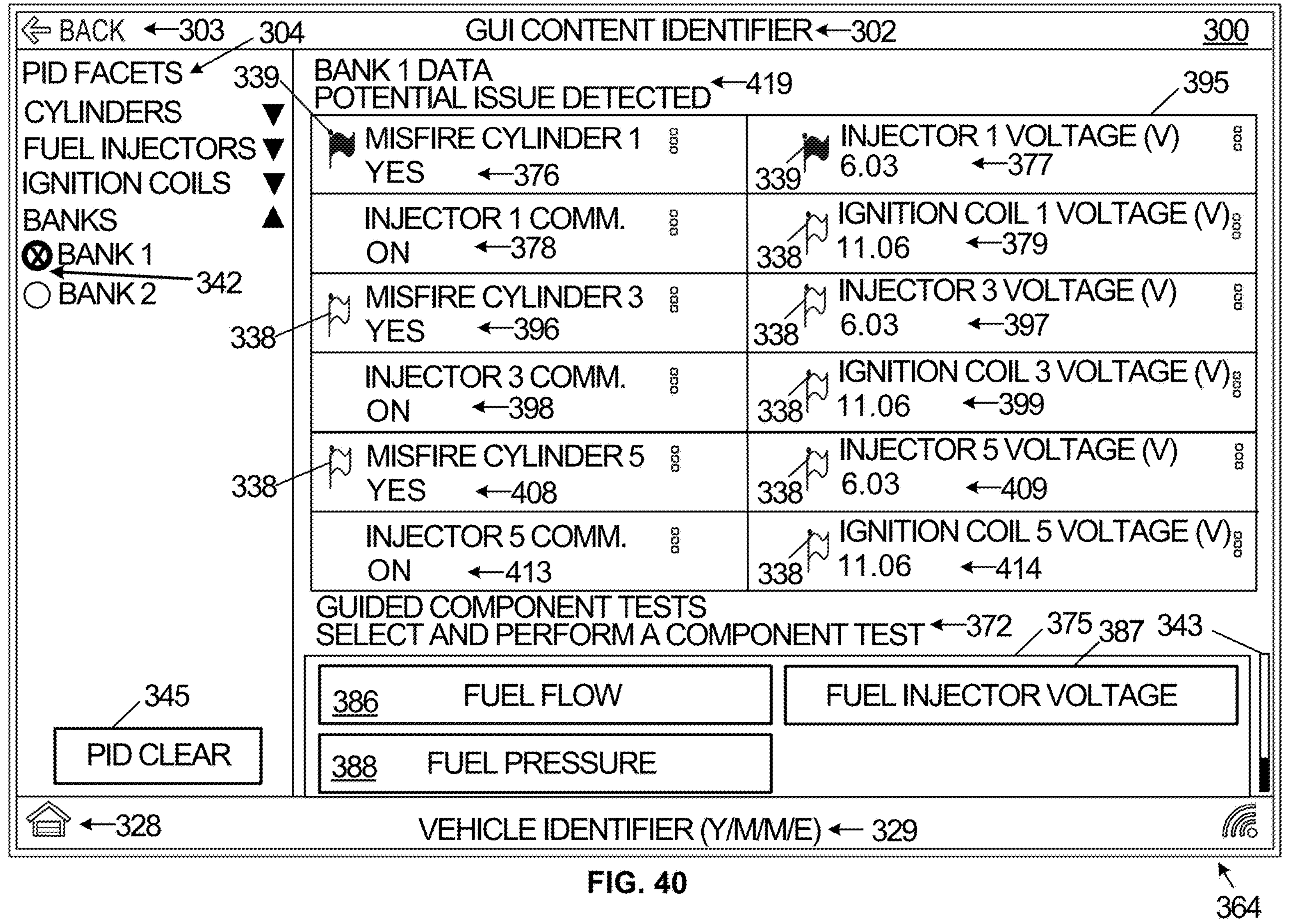

Next, FIG. 40 shows a screen shot 364 of the GUI 300. As an example, the GUI 300, as shown in the screen shot 364 can be output on the display 81 in response to use of the scroll bar 343 in the GUI 300 to select a different portion of the GUI 300, as compared to a portion of the GUI 300 shown in FIG. 38 or a portion of the GUI 300 shown in FIG. 39. In FIG. 40, the PID facet selector 342 is marked with an icon (e.g., an X) to indicate that the PID facet selector 342 was and/or is currently selected.

The GUI 300, as shown in FIG. 40, includes the container 375, 395 and the container content descriptor 372, 419 discussed above. The GUI 300, as shown in FIG. 40, includes PID content 376, 377, 378, 379, 396, 397, 398, 399, 408, 409, 413, 414 within the container 395, and a USC 386, 387, 388, 389 within the container 395. The description of the USC 386, 387, 388, 389 with respect to FIG. 35 is applicable to those same USC in FIG. 40. The GUI 300, as shown in FIG. 40, includes the scroll bar 343 selectable to cause a processor to output a different portion of the GUI 300, such as a portion of the GUI 300 shown in FIG. 38 or FIG. 39.

E. Third Example GUI with PID Facet Selectors

Next, FIG. 41 to FIG. 44 shows various screen shots of a GUI 500. For example, FIG. 41 shows a screen shot 501 of the GUI 500. As an example, the GUI 500, as shown in FIG. 41, can be output on the display in response to a selection of the USC 233 in the GUI 250 shown in FIG. 14 while a system or component identifier corresponding to vehicle wheels is selected. As an example, the USC 251 in FIG. 14 can correspond to system S3 shown in column 471 in FIG. 10A and in Table A above, and/or the USC 252 in FIG. 14 can correspond to component C14 shown in column 472 in FIG. 10A and in Table B above. As shown in the first four rows of the column 471, the column 472 in FIG. 10A and the column 478 in FIG. 10B after the header row, that system and component are mapped to the groups vehicle wheels test drive (VWTD) and wheel speeds (WS).

As shown in FIG. 41, the GUI 500 includes the GUI content identifier 302, the USC 303, 328, the PID clear USC 345, and the vehicle identifier 329. The GUI 500 can include a scroll bar 365 selectable to cause a processor to output a different portion of the GUI 500, such as a portion of the GUI 500 below a container 499.

The GUI 500 includes a PID facet group identifier list 502. The PID facet group identifier list 502 includes a PID facet group identifier 503, 504, 505 corresponding to wheel speed, tires, and brakes respectively. In accordance with at least some embodiments, a processor can determine the PID facet identifiers to include within a PID facet list by referring to mapping data, such as the mapping data 147 shown in FIG. 10A to FIG. 10D. As an example, the group identifiers in the column 478 in FIG. 10B show "tires" is grouped with both the VWTD and WS group identifiers, and the group "brakes" is grouped with both the VWTD and WS group identifiers, such that the processor can select the group identifiers tires and brakes as PID facet identifiers. As another example, the processor can use an identifier of a selected component (e.g., wheel speed sensor) to identify a PID facet identifier (e.g., wheel speed (i.e., WS)).

The GUI 500 includes a PID facet list expander 494, 495, 496 selectable to select a PID facet corresponding to the PID facet group identifier 503, 504, 505. The PID facet group identifier 503 indicates "wheel speed," the PID facet group identifier 504 indicates "tires," and the PID facet group identifier 505 indicates "brakes."

The GUI 500, as shown in FIG. 41, includes a container 488, 497, 498, 499 and a container content descriptor 509, 506, 507, 508 corresponding to the container 488, 497, 498, 499, respectively. As shown in FIG. 41, the GUI 500 includes PID content 510, 511, 512, 513, 514, 515, 516, 517, 518, 519, 520, 521. As shown in FIG. 41, a units identifier can indicate revolutions per minute (i.e., RPM), a transmission gear, kilometers per hour (i.e., KPH), or kilopascals (i.e., kPa).

Figure 42:
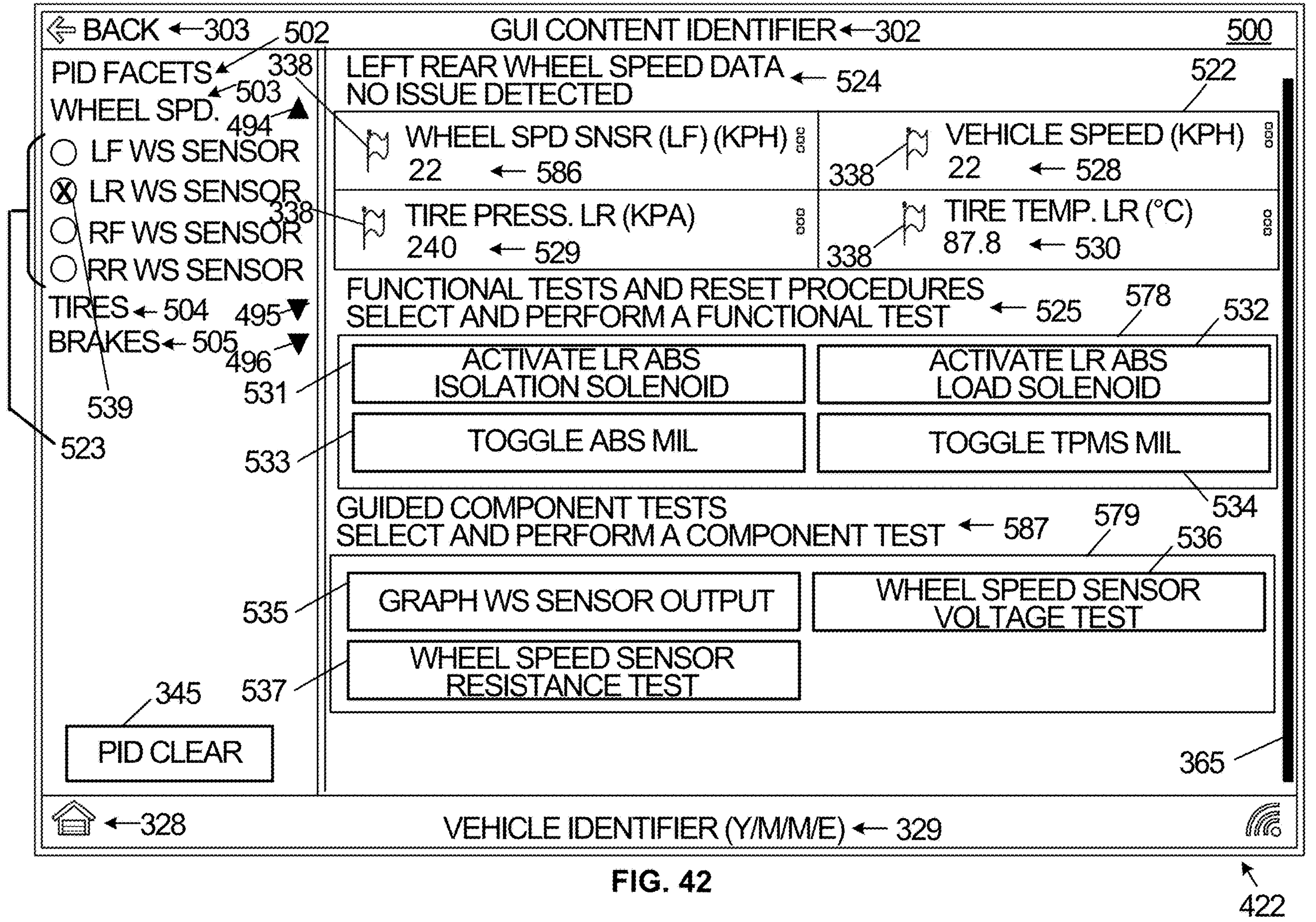

Next, FIG. 42 shows a screen shot 422 of the GUI 500. As an example, the GUI 500, as shown in the screen shot 422 can be output on the display 81 in response to selection of the PID facet list expander 494 and selection of a PID facet selector 539. Selection of the PID facet list expander 494 can cause the processor to reveal (as shown in FIG. 42) or hide (as shown in FIG. 41) a set 523 of PID facet selectors corresponding to the PID facet list expander 494. The PID facet selector 539 is marked with an icon (e.g., an X) to indicate that the PID facet selector 539 was and/or is currently selected.

The GUI 500, as shown in the screen shot 422, includes a container 522, 578, 579 and a container content descriptor 524, 525, 587 corresponding to the container 522, 578, 579, respectively. As an example, the container content descriptor 524 indicates the container 522 corresponds to data regarding a selected PID facet selector (e.g., the PID facet selector 539), the container content descriptor 525 indicates the container 578 corresponds to functional tests and reset procedures, and the container content descriptor 587 indicates the container 579 corresponds to guided component tests.

The GUI 500, as shown in FIG. 42, includes PID content 586, 528, 529, 530 within the container 522, a USC 531, 532, 533, 534 within the container 578, and a USC 535, 536, 537 within the container 579. In accordance with at least some implementations, the PID content 586 is provided by an ECU of a first system (e.g., an antilock brake system), the PID content 528 is provided by an ECU of a second system (e.g., a powertrain system), and the PID content 529 and the PID content 530 are provided by an ECU of third system (e.g., a TPMS).

The USC 531, 532, 533, 534 corresponds to a functional test related to the PID facet selector 539 (i.e., left rear wheel speed sensor). For instance, the USC 531, 532, 533, 534 corresponds to a functional test to activate a left rear ABS isolation sensor, activate a left rear ABS load solenoid, toggle an ABS malfunction indicator lamp (MIL), and toggle a tire pressure monitor system (TPMS) MIL, respectively. Other examples of functional test(s) or reset procedure(s) corresponding to a selected PID facet selector are also possible.

The USC 535, 536, 537 corresponds to a guided component test. The USC 535, 536, 537 can be selectable to initiate performing a guided component test, or to select a particular category of guided component tests to be performed. For example, the USC 535, 536, 537 can be selectable to initiate setting up the test device 75 for: sampling a signal to determine data to graph an output of a left rear wheel speed sensor, measuring a voltage, or measuring resistance, respectively. Other examples of component test(s) corresponding to a selected PID facet selector are also possible.

Figure 43:
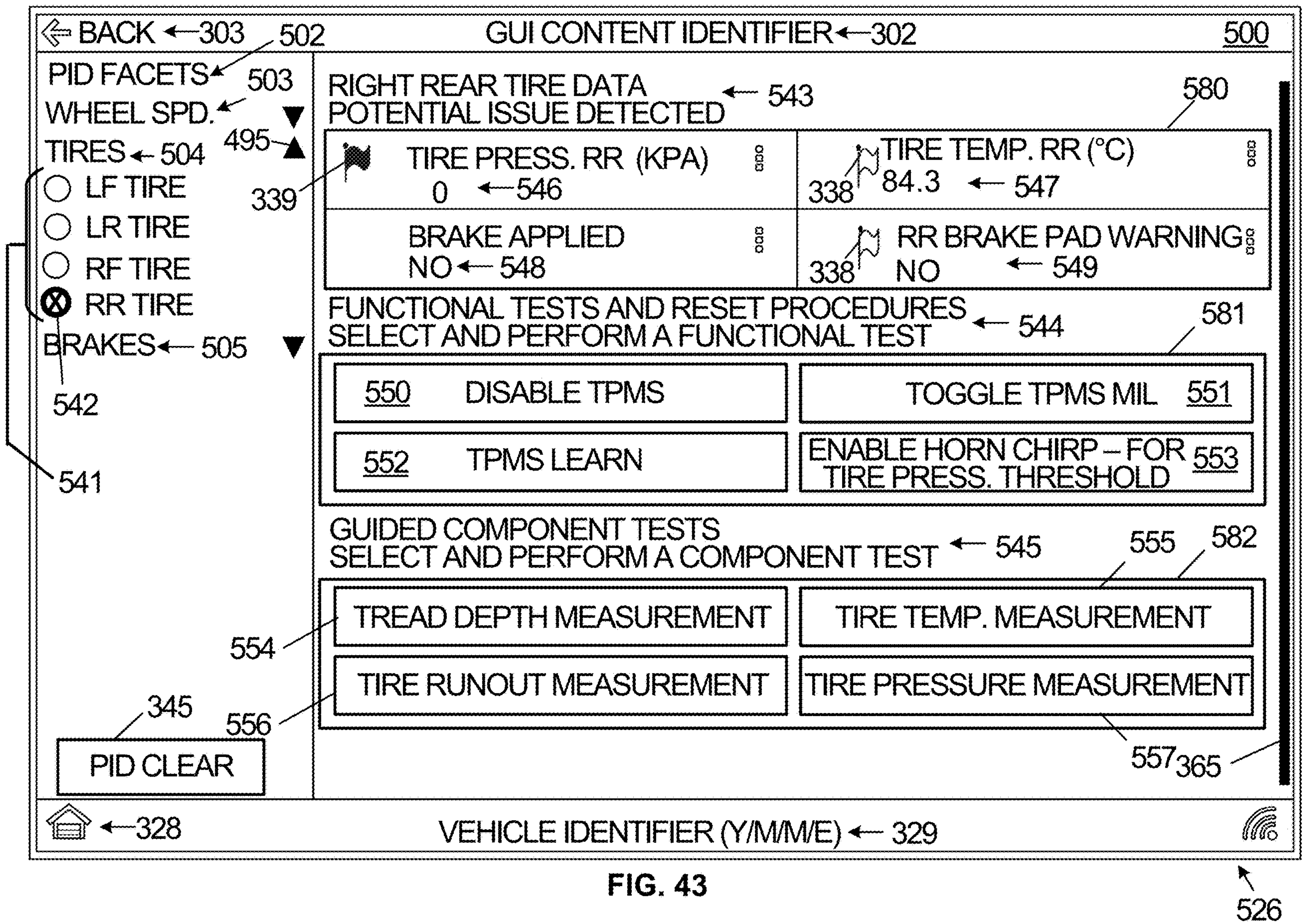

Next, FIG. 43 shows a screen shot 526 of the GUI 500. As an example, the GUI 500, as shown in the screen shot 526 can be output on the display 81 in response to selection of the PID facet list expander 495 and selection of a PID facet selector 542. Selection of the PID facet list expander 495 can cause the processor to reveal (as shown in FIG. 43) or hide (as shown in FIG. 41) a set 541 of PID facet selectors corresponding to the PID facet group identifier 504. The PID facet selector 542 is marked with an icon (e.g., an X) to indicate that the PID facet selector 542 was and/or is currently selected. The PID facet selector 542 is highlighted as a potential issue with respect to the right rear tire has been detected (i.e., the parameter value for the PID content 546 has breached a threshold). The PID flag 339 is output on the GUI 500 in FIG. 43 to indicate the threshold has been breached.

The GUI 500, as shown in the screen shot 526, includes a container 580, 581, 582 and a container content descriptor 543, 544, 545 corresponding to the container 580, 581, 582, respectively. As an example, the container content descriptor 543 indicates the container 580 corresponds to data regarding a selected PID facet selector (e.g., the PID facet selector 542), the container content descriptor 544 indicates the container 581 corresponds to functional tests and reset procedures, and the container content descriptor 545 indicates the container 582 corresponds to guided component tests.

The GUI 500, as shown in FIG. 43, includes PID content 546, 547, 548, 549 within the container 580, a USC 550, 551, 552, 553 within the container 581, and a USC 554, 555, 556, 557 within the container 582. In accordance with at least some implementations, the PID content 546 and PID content 547 are provided by an ECU of a first system (e.g., a TPMS) and the PID content 548 and the PID content 549 are provided by an ECU of second system (e.g., a brake system).

The USC 550, 551, 552, 553 corresponds to a functional test related to the PID facet selector 542 (i.e., right rear tire). For instance, the USC 550, 551, 552, 553 corresponds to: a functional test to disable a TPMS, a functional test to toggle a TPMS MIL, a functional test to perform a TPMS learn function, and a functional test to enable a horn chirp function for achieving a tire pressure threshold, respectively.

The USC 554, 555, 556, 557 corresponds to a guided component test. The USC 554, 555, 556, 557 can be selectable to initiate performing a guided component test, or to select a particular category of guided component tests to be performed. For example, the USC 554, 555, 556, 557 can be selectable to initiate setting up the test device 75 for: measuring a tire tread depth, measuring a tire temperature, measuring a tire runout, and measuring a tire pressure, respectively.

Figure 44:
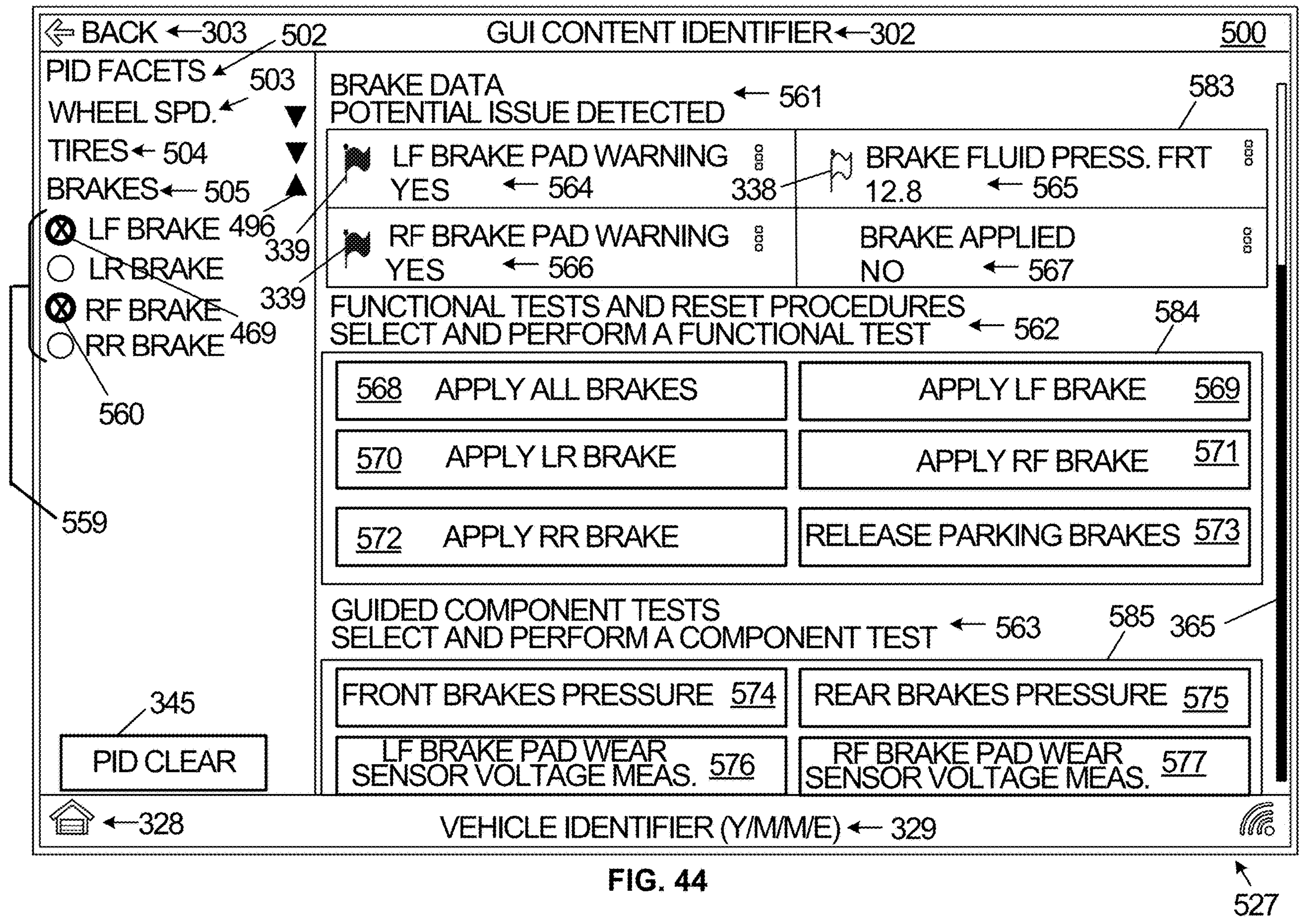

Next, FIG. 44 shows a screen shot 527 of the GUI 500. As an example, the GUI 500, as shown in the screen shot 527 can be output on the display 81 in response to selection of the PID facet list expander 496 and selection of a PID facet selector 469 and a PID facet selector 560. Selection of the PID facet list expander 496 can cause the processor to reveal (as shown in FIG. 44) or hide (as shown in FIG. 41) a set 559 of PID facet selectors corresponding to the PID facet list expander 496. The PID facet selector 469, 560 is marked with an icon (e.g., an X) to indicate that both the PID facet selector 469 and the PID facet selector 560 was and/or is currently selected. The PID facet selector 469, 560 is highlighted to indicate a potential issue corresponding to a PID facet for that PID facet selector has been detected (as also indicated by the PID flag 339).

The GUI 500, as shown in the screen shot 527, includes a container 583, 584, 585 and a container content descriptor 561, 562, 563 corresponding to the container 583, 584, 585, respectively. As an example, the container content descriptor 561 indicates the container 583 corresponds to data regarding a selected PID facet selector (e.g., the PID facet selector 469 and the PID facet selector 560), the container content descriptor 562 indicates the container 584 corresponds to functional tests and reset procedures, and the container content descriptor 563 indicates the container 585 corresponds to guided component tests.

The GUI 500, as shown in FIG. 44, includes PID content 564, 565, 566, 567 within the container 583, a USC 568, 569, 570, 571, 572, 573 within the container 584, and a USC 574, 575, 576, 577 within the container 585. As an example, a PID parameter value indicative of a brake pad warning can indicate a binary state (e.g., Yes if the warning exists or No if the warning does not exist). The brake pad warning can indicate brake pads may need replacement.

The USC 568, 569, 570, 571, 572, 573 corresponds to a functional test related to the PID facet selector 560 (i.e., right front brake). For instance, the USC 568, 569, 570, 571, 572, 573 corresponds to a functional test to: apply all brakes, apply left front brake, apply left rear brake, apply right front brake, apply right rear brake, and release parking brakes, respectively.

The USC 574, 575, 576, 577 corresponds to a guided component test. The USC 574, 575, 576, 577 can be selectable to initiate performing a guided component test, or to select a particular category of guided component tests to be performed. For example, the USC 574, 575, 576, 577 can be selectable to initiate setting up the test device 75 for: measuring front brakes pressure, measuring rear brakes pressure, measuring left front brake pad wear sensor voltage, and measuring right rear brake pad sensor voltage, respectively.

In accordance with at least some implementations, when multiple PID facet selectors have been selected, such as the PID facet selector 469 and the PID facet selector 560, a processor can use Boolean logic terms "or" or "and" to determine which PID content and tests are to be displayed within a GUI. As an example, the PID content 564, 565, 567 can correspond to the PID facet selector 469 and the PID content 565, 566, 567 can correspond to the PID facet selector 560. The processor using "or" logic would determine that the PID content 564, 565, 566, 567 should be populated within the container 583 when the PID facet selector 469 and the PID facet selector 560 are selected. As another example, the PID content 564, 565, 566, 567 and fifth PID content can correspond to the PID facet selector 469 and the PID content 564, 565, 566, 567 and sixth PID content can correspond to the PID facet selector 560. The processor using "and" logic would determine that the PID content 564, 565, 566, 567 should be populated within the container 583 when the PID facet selector 469 and the PID facet selector 560 are selected. The processor can be configured to not duplicate PID content within a single container. The use of Boolean logic to determine PID content, tests, and reset procedures to display within a GUI when multiple PID facet selectors are selected can be used when the PID facet selectors are from the same system or from multiple, different systems.

F. Fourth Example GUI with PID Facet Selectors

Next, FIG. 45 to FIG. 50 shows various screen shots of a GUI 600. For example, FIG. 45 shows a screen shot 601 of the GUI 600. As an example, the GUI 600, as shown in FIG. 45, can be output on the display in response to a selection of system and/or component and the USC 261 in the GUI 250 shown in FIG. 14 and selection of a PID facet list expander 606 corresponding to a battery summary. As an example, the USC 251 shown as System A in FIG. 14 can represent System S6 in FIG. 11A and the USC 252 shown as Component A1 in FIG. 14 can represent Component C31 in FIG. 11A. In accordance with that example and Table A and Table B above, the System S6 can represent a battery system, and the component C31 can represent a battery.

Figure 46:
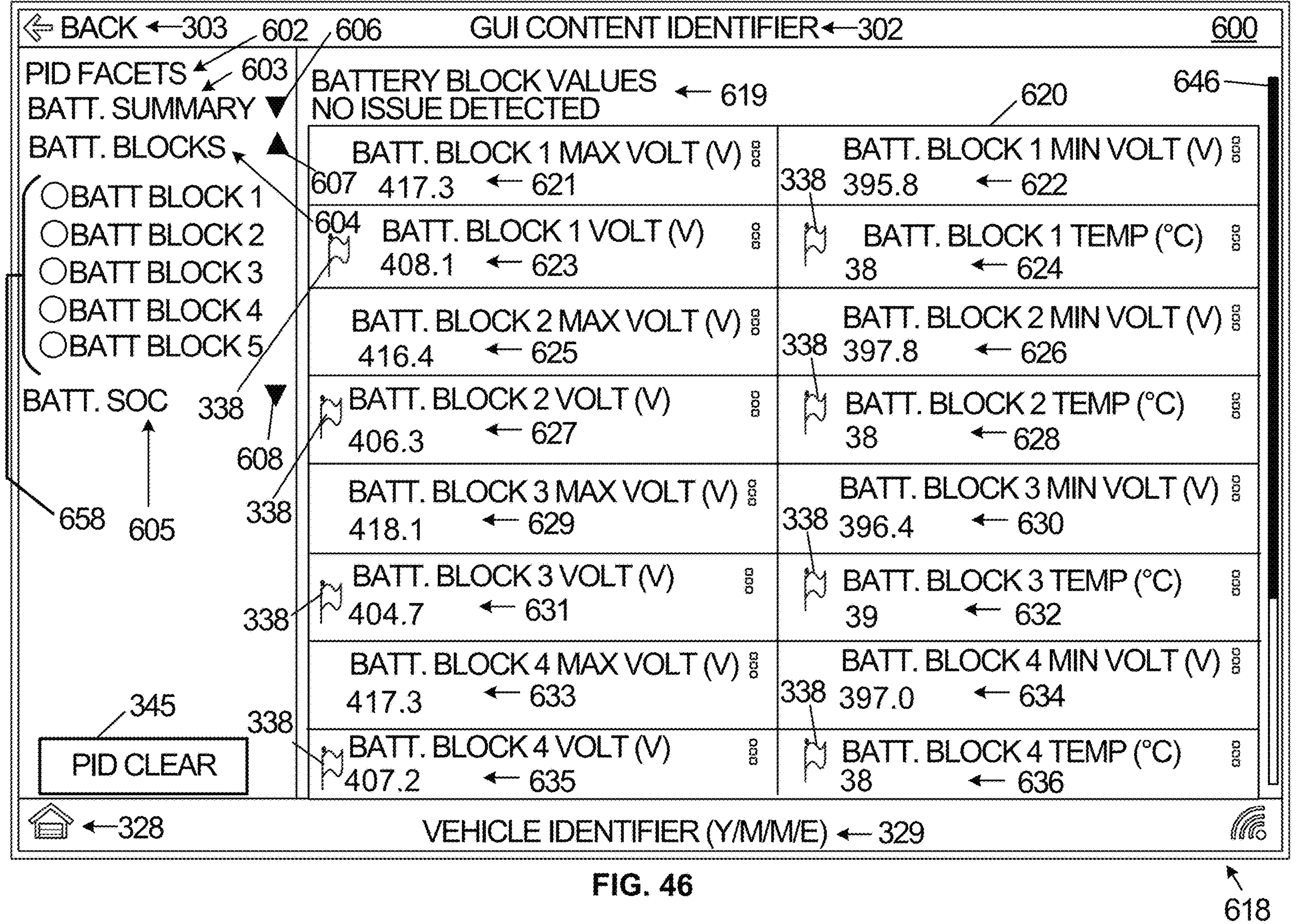
Figure 50:
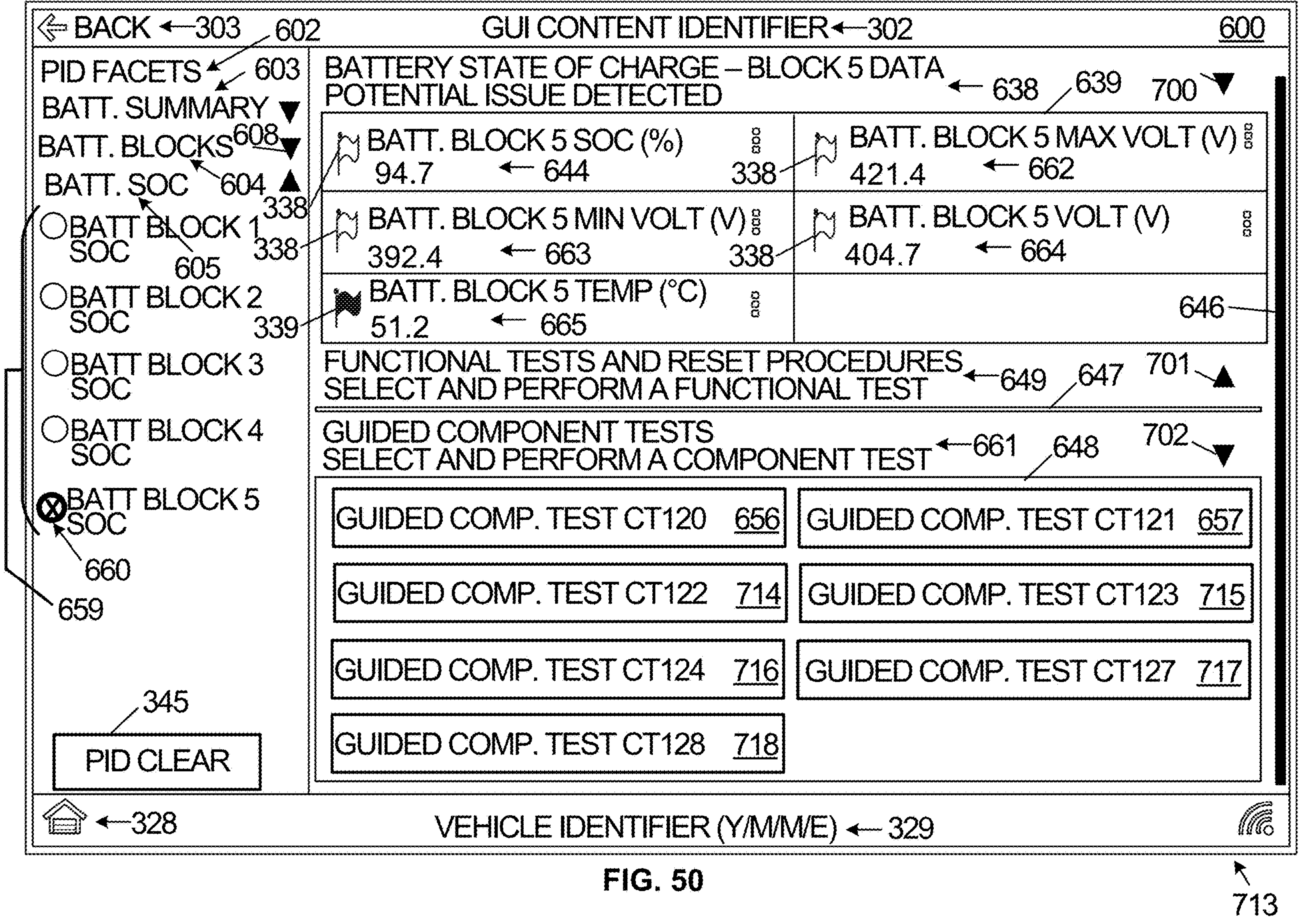

As shown in FIG. 45, the GUI 600 includes the GUI content identifier 302, the USC, 303, 328, the vehicle identifier 329, and the PID clear USC 345, all described above with respect to other GUIs. The GUI 600 includes a scroll bar 646. As represented in FIG. 46 and FIG. 50, the scroll bar 646 is selectable to cause a processor to output a different portion of the GUI 600, such as a portion of the GUI 600 below a container 620 in FIG. 46 or below a container 648 in FIG. 48.

The GUI 600 includes a PID facet group identifier list 602. The PID facet group identifier list 602 includes a PID facet group identifier 603, 604, 605. The GUI 600 includes a PID facet list expander 606, 607, 608 selectable to expand a PID facet list corresponding to the PID facet group identifier 603, 604, 605. The PID facet group identifier 603 indicates battery summary, the PID facet group identifier 604 indicates battery blocks, and the PID facet group identifier 605 indicates battery state-of-charge (SOC). As shown in FIG. 45, the GUI 600 includes a set 609 of PID facet selectors corresponding to the PID facet list expander 606. In particular, the set 609 includes PID facet selectors corresponding to battery low voltage measurements, battery high voltage measurements, and battery temperatures.

The GUI 600, as shown in FIG. 45, includes a container 611 and a container content descriptor 610 corresponding to the container 611. As shown in FIG. 45, the GUI 600 includes PID content 612, 613, 614, 615, 616, 617. The PID content 612, 614, 615, 616, 617 corresponds to the PID $BB, $BF, $BE, $BD, and $BC (in the mapping data 115 shown in FIG. 11A), respectively. The PID content 613 is representative of PID content calculated by the processor 71 (i.e., calculated PID content). As an example, the processor 71 can calculate PID content based on receipt of parameter values for other PIDs transmitted by the vehicle. For this example, the processor can request parameter values for each battery block and count the number of battery blocks responding to those requests. As another example, the calculated PID content can include a PID representing a delta (i.e., difference) between two parameter values corresponding to a common PID or different PIDs. For instance, a calculated PID can include representing a difference in parameter values for a transmission solenoid actual current PID and a transmission solenoid reference current PID. As another example, a calculated PID corresponding to soot loading of a diesel particulate filter (DPF) can be based on a difference between parameter values corresponding to exhaust pressure sensors, one sensor located upstream of the DPF and one sensor located downstream of the DPF. As yet another example, a calculated PID can be the delta between parameter values for a PID representing a target value and a PID representing a current value. Other examples of calculated PID content are also possible.

Next, FIG. 46 shows a screen shot 618 of the GUI 600. As an example, the GUI 600, as shown in FIG. 46, can be output on the display in response to a selection of the USC 261 in the GUI 250 shown in FIG. 14 and selection of a PID facet list expander 607 corresponding to a PID facet for battery blocks. As an example, the USC 261 can be selected after selecting the USC 251 when System A represents a battery system (e.g., the battery system shown in Table A) and/or after selecting the USC 252 when Component A1 represents a battery (e.g., the battery shown in Table B).

As shown in FIG. 46, the GUI 600 includes a set 658 of PID facet selectors corresponding to the PID facet list expander 607. In particular, the set 658 includes PID facet selectors corresponding to five battery blocks. Those battery blocks are referenced in column 123 in FIG. 11B. In other implementations, the set 658 can include a number of PID facets corresponding to a different quantity of battery blocks. The GUI 600, as shown in FIG. 46, includes a container 620 and a container content descriptor 619 corresponding to the container 620. As shown in FIG. 46, the GUI 600 includes PID content 621, 622, 623, 624, 625, 626, 627, 628, 629, 630, 631, 632, 633, 634, 635, 636 corresponding to PID $A1, $A6, $AB, $B6, $A2, $A7, $AC, $B7, $A3, $A8, $AD, $B8, $A4, $A9, $AE, and $B9 (shown in FIG. 11A), respectively. The scroll bar 646 shown in FIG. 46 can be used to cause the processor 71 to display other PID content, such as PID content corresponding to PID $A5, $AA, $AF, $BA, each of which pertains to "Battery Block 5" referenced in FIG. 11B.

The PID content 623, 624, 627, 628, 631, 632, 635, 636 include a PID flag 338. The processor 71 can set a PID flag to different states to represent whether a parameter value breaches a threshold corresponding to the PID. Referring to FIG. 11A, the threshold T80, T81 correspond to a PID for the PID content 623, 627, 631, 635, and the threshold T84, T85 corresponding to a PID for the PID content 624, 628, 632, 636.

Figure 47:
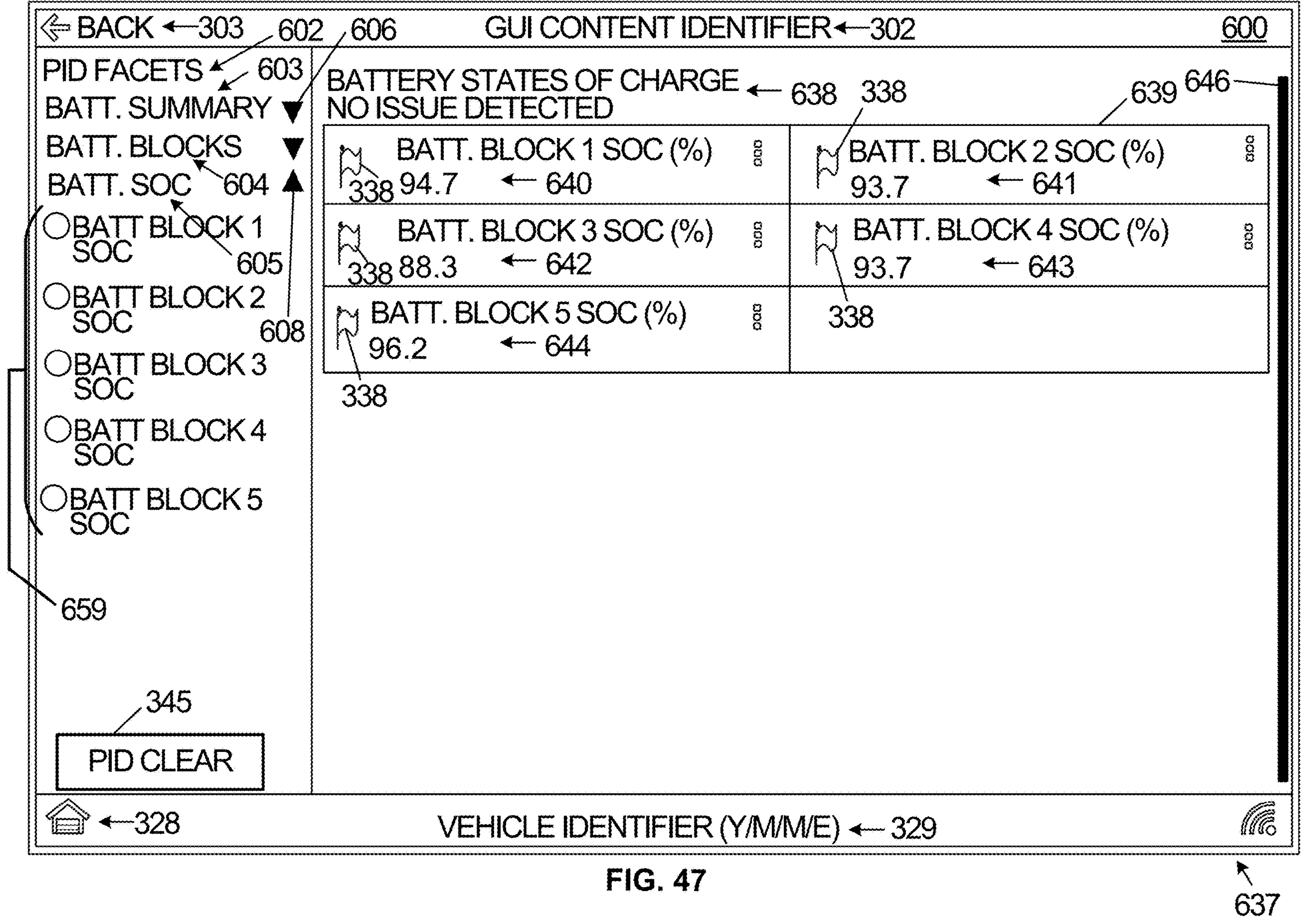

Next, FIG. 47 shows a screen shot 637 of the GUI 600. As an example, the GUI 600, as shown in FIG. 47, can be output on the display in response to a selection of the USC 261 in the GUI 250 shown in FIG. 14 and selection of a PID facet list expander 608 corresponding to a PID facet for battery state-of-charge (SOC). As an example, the USC 261 can be selected after selecting the USC 251 when System A represents a battery system (e.g., the battery system shown in Table A) and/or after selecting the USC 252 when Component A1 represents a battery (e.g., the battery shown in Table B).

As shown in FIG. 47, the GUI 600 includes a set 659 of PID facet selectors corresponding to the PID facet list expander 608. In particular, the set 659 includes PID facet selectors corresponding to the states of charge of five different battery blocks. Those battery blocks are referenced in column 123 in FIG. 11B. In other implementations, the set 659 can include a number of PID facet selecting corresponding to a different quantity of battery block states of charge. The GUI 600, as shown in FIG. 47, includes a container 639 and a container content descriptor 638 corresponding to the container 639. As shown in FIG. 47, the GUI 600 includes PID content 640, 641, 642, 643, 644 corresponding to PID $B1, $B2, $B3, $B4, $B5 shown in column 120 in FIG. 11A.

The PID content 640, 641, 642, 643, 644 include a PID flag 338. The processor 71 can set the PID flag for that PID content to different states to represent whether a parameter value breaches a threshold corresponding to the PID. Referring to FIG. 11A, the threshold T82, T83 correspond to a PID for the PID content 640, 641, 642, 643, 644.

Figure 48:
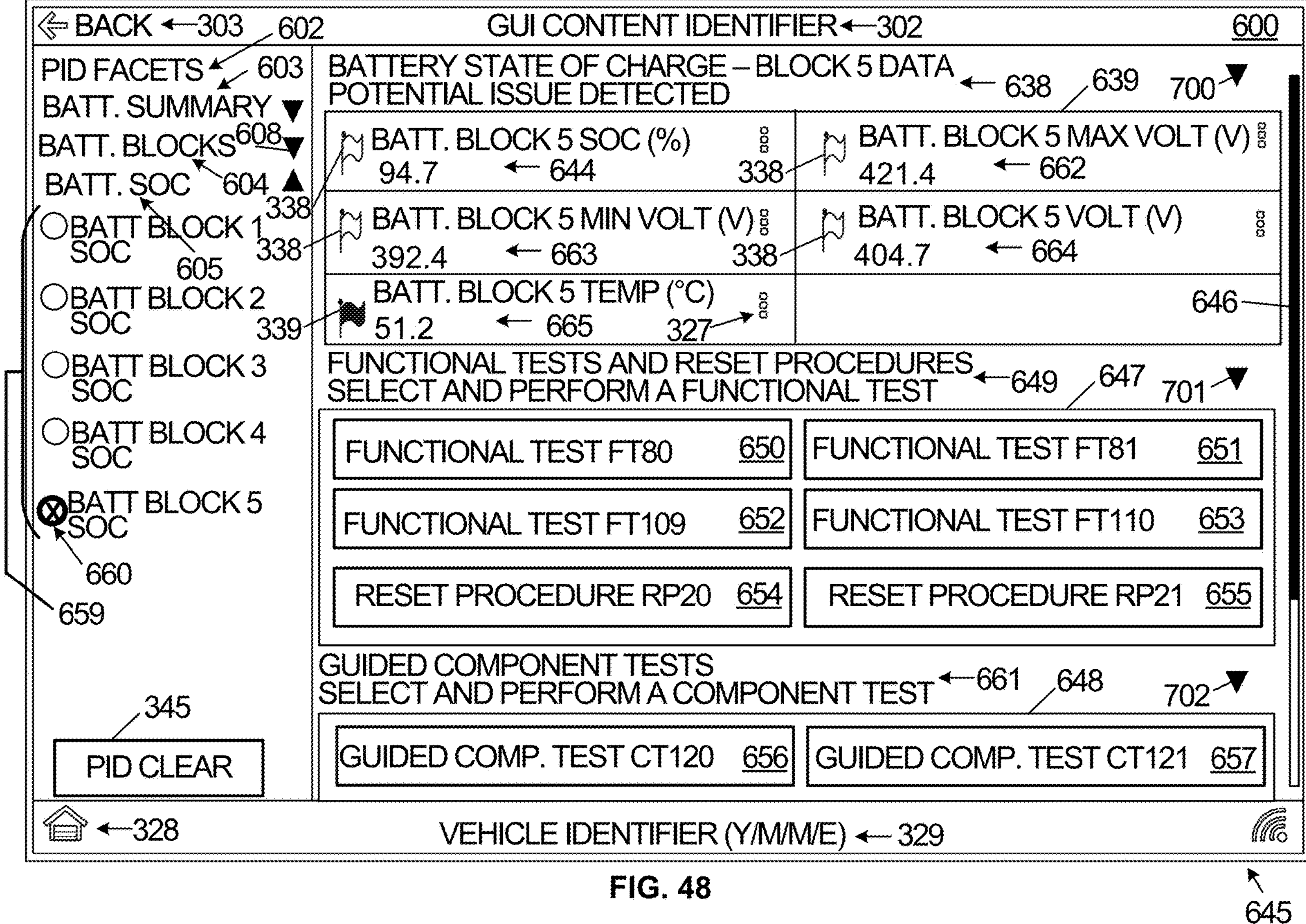

Next, FIG. 48 shows a screen shot 645 of the GUI 600. As an example, the GUI 600 as shown in FIG. 48 can be output on the display 81 in response to a selection of a PID facet selector 660 (corresponding to a high voltage battery block 5 state-of-charge) in the set 659 while displayed as shown in FIG. 47 and after a potential issue with the temperature of battery block 5 has been detected. The PID facet selector 660 is highlighted to indicate that the PID facet selector 660 pertains to the potential issue. Selecting the PID facet selector 660 can cause the processor 71 to modify the GUI 600 by displaying a container 647, 648 in addition to the container 639, and changing content within the container 639. As shown in FIG. 48, the container 639 includes the PID content 644, 662, 663, 664, 665 corresponding to the PID $B5, $A5, $AA, $AF, $C1. Compared to FIG. 47, after a selection of the PID facet selector 660, the container 639 does not include PID content 640, 641, 642, 643.

The GUI 600, as shown in FIG. 48, includes a container content descriptor 638, 649, 661 corresponding to the container 639, 647, 648, respectively. As an example, the container content descriptor 638 indicates the container 639 corresponds to block 5 battery state-of-charge data, the container content descriptor 649 indicates the container 647 corresponds to functional tests and reset procedures, and the container content descriptor 661 indicates the container 648 corresponds to guided component tests.

The container 647 includes a USC 650, 651, 652, 653, 654, 655 corresponding to a functional test or reset procedure related to the PID facet selector 660 (i.e., battery block 5 state-of-charge). As shown in FIG. 48, the USC 650, 651, 652, 653 can correspond to a functional test arranged to control a component corresponding to battery block 5, such as a functional test FT80, a functional test FT81, a functional test FT109, and a functional test FT110 (all corresponding to battery block 5 as shown in FIG. 11A to FIG. 11D). As an example, one of those functional tests can include a functional test arranged to open a circuit leading to that that battery block. Additionally, as shown in FIG. 48, the USC 654, 655 can correspond to a reset procedure corresponding battery block 5, such as the reset procedure RP20 and the reset procedure RP21 (both corresponding to battery block 5 as shown in FIG. 11A to FIG. 11D).

The container 648 includes a USC 656, 657 corresponding to a guided component test related to the PID facet selector 660. The USC 656, 657 can be selectable to initiate performing a guided component test, or to select a particular category of guided component tests to be performed. For example, the USC 656, 657 can be selectable to initiate setting up the test device 75 to perform a component test pertaining to battery block 5. As an example, a component test pertaining to battery block 5 can include a test to measure current into or out of the battery block or a temperature of the battery block.

FIG. 48 also shows a USC 700, 701, 702 selectable to expand or contract the container 639, 647, 648, respectively. In FIG. 48, the container 639, 647, 648 is shown in an expanded state.

Next, FIG. 49 shows a screen shot 703 of the GUI 600. As an example, the GUI 600 as shown in FIG. 49 can be output on the display 81 in response to selecting the USC 327 corresponding to the PID content 665 as shown in FIG. 48 and then selecting a USC 705 to toggle a graph for the PID content 665 on. FIG. 49 shows other examples of user-selectable controls that can be selected after selecting the USC 327 corresponding to the PID content 665, namely a USC 704 to clear the PID content 665 and a USC 706 to select a new PID to replace the PID content 665.

FIG. 49 also shows a PID graph 707 corresponding to the PID content 665. The PID graph shows a waveform 709 representing parameter values corresponding to the battery block five temperature PID, an indicator 711 corresponding to a first threshold (e.g., a maximum threshold), and an indicator 712 corresponding to a second threshold (e.g., a minimum threshold). So long at the parameter values corresponding to the PID content 665 does not rise above the first threshold or go below the second threshold, the PID flag 338 corresponding to the PID content 665 continues to indicate that a potential issue corresponding to the PID content 665 has not been detected. The GUI 600, as shown in FIG. 48, includes a scroll bar 708 corresponding to the waveform 709. A cursor selector USC 719 can be used to move a cursor 720 within the PID graph 707.

Next, FIG. 50 shows a screen shot 713 of the GUI 600. As an example, the GUI 600 as shown in FIG. 50 can be output on the display 81 in response to selecting the USC 701 from the GUI 600 as shown in FIG. 48. In that regard, selecting the USC 701 causes the container 647 to contract. In contrast, the USC 701 can be selected while the container 647 is contracted (as shown in FIG. 50) and the processor can expand the container 647 (as shown in FIG. 48). As a result of the container 647 being contracted, the container 648 is moved upwards to allow a USC 714, 715, 716, 717, 718 selectable to configure the VST 70 and/or the test device 75 for performing a component test.

Figure 51:
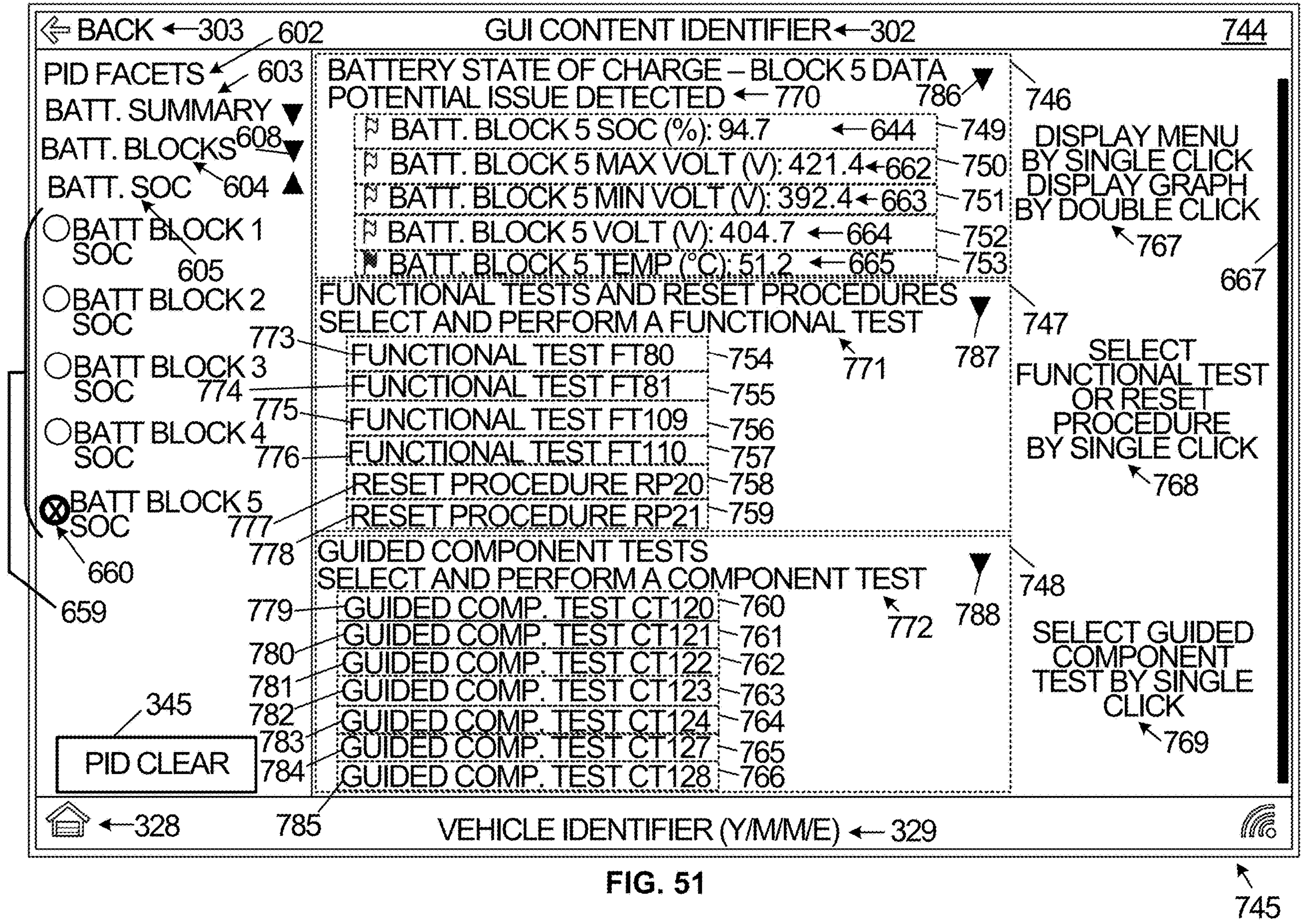

Next, FIG. 51 shows a screen shot 745 of a GUI 744. The GUI 744 includes several aspects shown in the GUI 600 shown in at least FIG. 48. Similar to the GUI 600, the GUI 744 as shown in FIG. 51 can be output on the display 81 in response to a selection of the PID facet selector 660 in the set 659. Selecting the PID facet selector 660 within the GUI 744 can cause the processor 71 to display a container 746, 747, 748. As shown in FIG. 51, the container 746 includes the PID content 644, 662, 663, 664, 665. The PID content 644, 662, 663, 664, 665 is disposed within a container 749, 750, 751, 752, 753, respectively.

The GUI 744, as shown in FIG. 51, includes a container content descriptor 770, 771, 772 corresponding to the container 746, 747, 748, respectively. As an example, the container content descriptor 770 indicates the container 746 corresponds to block 5 battery state-of-charge data, the container content descriptor 771 indicates the container 747 corresponds to functional tests and reset procedures, and the container content descriptor 772 indicates the container 748 corresponds to guided component tests.

The container 747 includes a USC 773, 774, 775, 776, 777, 778 corresponding to a functional test or reset procedure related to the PID facet selector 660 (i.e., battery block 5 state-of-charge). As shown in FIG. 48, the USC 773, 774, 775, 776 can correspond to a functional test arranged to control a component corresponding to battery block 5, such as a functional test FT80, a functional test FT81, a functional test FT109, and a functional test FT110 (all corresponding to battery block 5 as shown in FIG. 11A to FIG. 11D). As an example, one of those functional tests can include a functional test arranged to open a circuit leading to that that battery block. Additionally, as shown in FIG. 51, the USC 777, 778 can correspond to a reset procedure corresponding battery block 5, such as the reset procedure RP20 and the reset procedure RP21 (both corresponding to battery block 5 as shown in FIG. 11A to FIG. 11D). The USC 773, 774, 775, 776, 777, 778 is contained in a container 754, 755, 756, 757, 758, 759, respectively. The USC 773, 774, 775, 776, 777, 778 can indicate it is selectable by being displayed as a hyperlink (e.g., underlined text).

The container 748 includes a USC 779, 780, 781, 782, 783, 784 corresponding to a guided component test related to the PID facet selector 660. The USC 779, 780, 781, 782, 783, 784 can be selectable to initiate performing a guided component test, or to select a particular category of guided component tests to be performed. For example, the USC 779, 780, 781, 782, 783, 784, 785 can be selectable to initiate setting up the test device 75 to perform a component test pertaining to battery block 5. As an example, a component test pertaining to battery block 5 can include a test to measure current into or out of the battery block or a temperature of the battery block. The USC 779, 780, 781, 782, 783, 784, 785 is contained in a container 760, 761, 762, 763, 764, 765, 766, respectively. The USC 779, 780, 781, 782, 783, 784, 785 can indicate it is selectable by being displayed as a hyperlink (e.g., underlined text).

FIG. 51 also shows a USC 786, 787, 788 selectable to expand or contract the container 746, 747, 748, respectively. In FIG. 51, the container 786, 787, 788 is shown in an expanded state.

Figure 52:
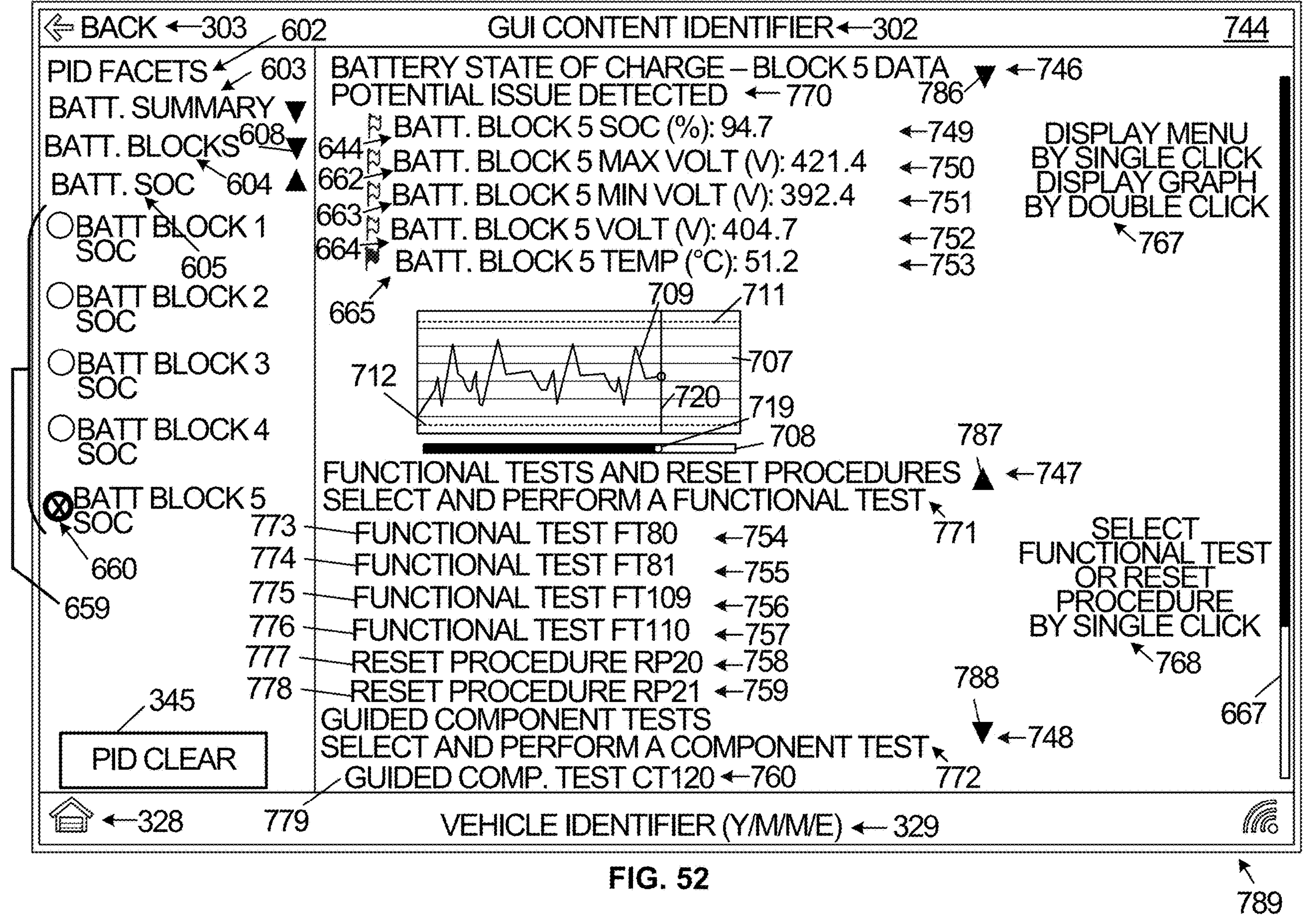
Figure 53:
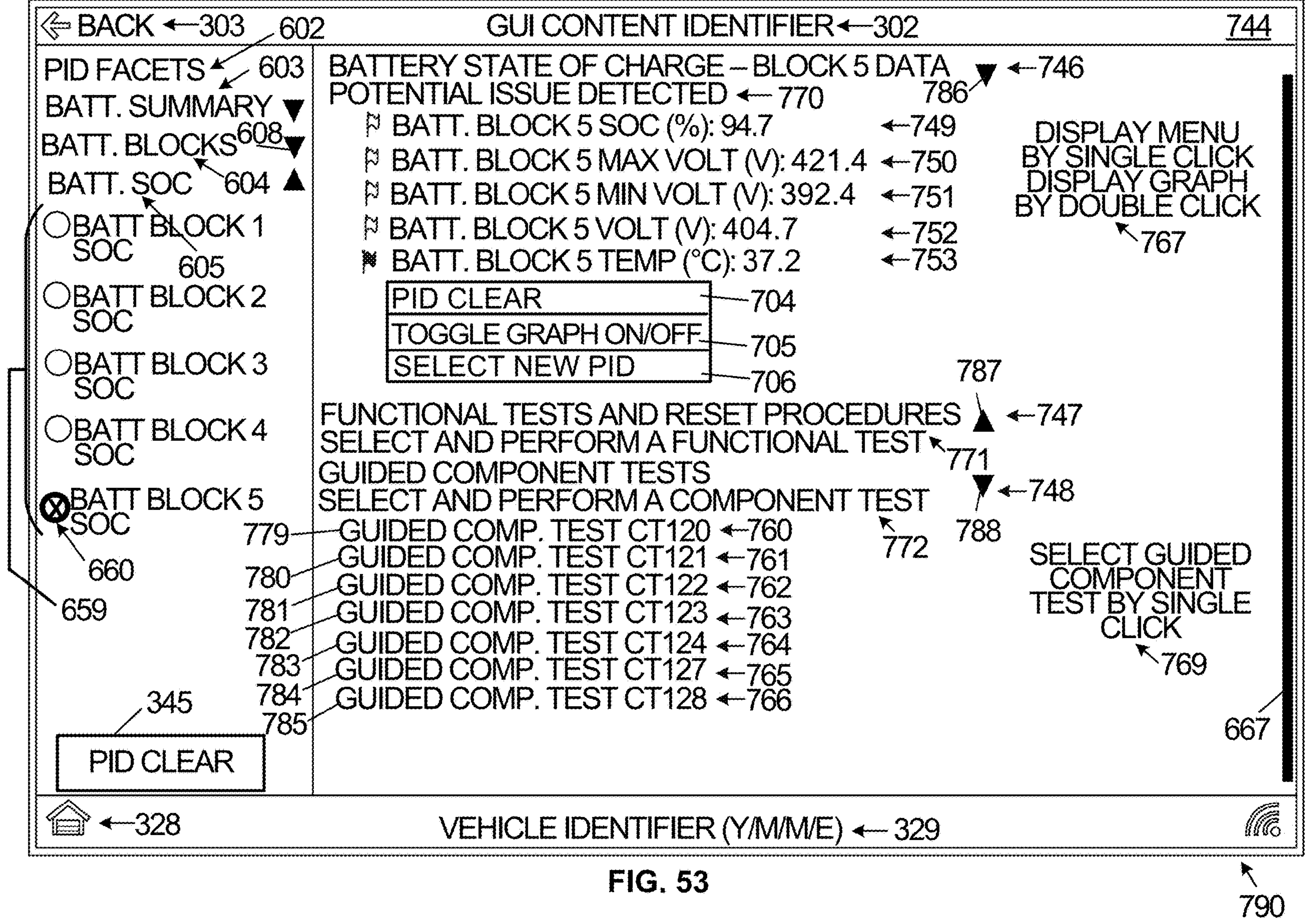

The container 746, 747, 748, 749, 750, 751, 752, 753, 754, 755, 756, 757, 758, 759, 760, 761, 762, 763, 764, 765, 766 are outlined using dashed lines. Those containers can be distinguished from one another using any of a variety means described throughout this description. FIG. 52 and FIG. 53 show at least some of the aforementioned containers without the dashed line used in FIG. 51.

The GUI 744 includes guidance 767, 768, 769. The guidance 767 indicates a single click can be performed to display a menu and a double click can be performed to display a graph. The single click or double click can correspond to clicking the PID content 644, 662, 663, 664, 665 or the container 749, 750, 751, 752, 753. The guidance 768 indicates a single click can be performed to select a functional test or resent procedure indicated within the container 747. The guidance 769 indicates a single click can be performed to select a component test indicated within the container 748. The VST 70 can be configured to allow selection of a test or reset procedure using some other action than as described with respect to the guidance 768, 769. The GUI 744 includes a scroll bar 667. The scroll bar 667 shown in FIG. 51 is represented such there is no content of the GUI 744 below the container 748 (e.g., below the USC 785).

Next, FIG. 52 shows a screen shot 789 of the GUI 744. As shown in FIG. 52, the screen shot 789 shows the PID graph 707, the scroll bar 708, the waveform 709, the indicator 711, 712, the cursor selector 719, and the selector 720. Those items are described with respect to FIG. 49. As an example, those items can be displayed within the GUI 744 in response to double clicking the PID content 665 or the container 753. As shown in FIG. 53 as compared to FIG. 52, displaying the PID graph 707 can cause content of the container 747 to be relocated within the GUI 744 and to cause some of the content of the container 748 to be relocated within the GUI 744 and some of the content of the container 748 to be removed from GUI 744 as shown in FIG. 53. Additionally, the scroll bar 667 becomes configured to allow a user to scroll down within the GUI 744. Such scroll down can result in the content of the container 748 to be removed from GUI 744 as shown in FIG. 53 to be displayed within the GUI 744.

Next, FIG. 53 shows a screen shot 790 of the GUI 744. As shown in FIG. 53, the screen shot 790 shows the USC 704 to clear the PID content 665, the USC 705 to toggle a graph for the PID content 665 on or off, and the USC 706 to select a new PID to replace the PID content 665. Those items are described with respect to FIG. 49. Those items can be displayed within the GUI 744 in response to single clicking the PID content 665 or the container 753. As an example, selecting the USC 705 can cause the processor 71 to output the GUI 744 as shown in FIG. 52. Additionally, the screen shot 790 shows the container 747 in a contracted state after a selection of the USC 787. The scroll bar 667 shown in FIG. 53 is represented such there is no content of the GUI 744 below the container 748 (e.g., below the USC 785).

G. Example GUIs for Performing Tests

Figure 54:
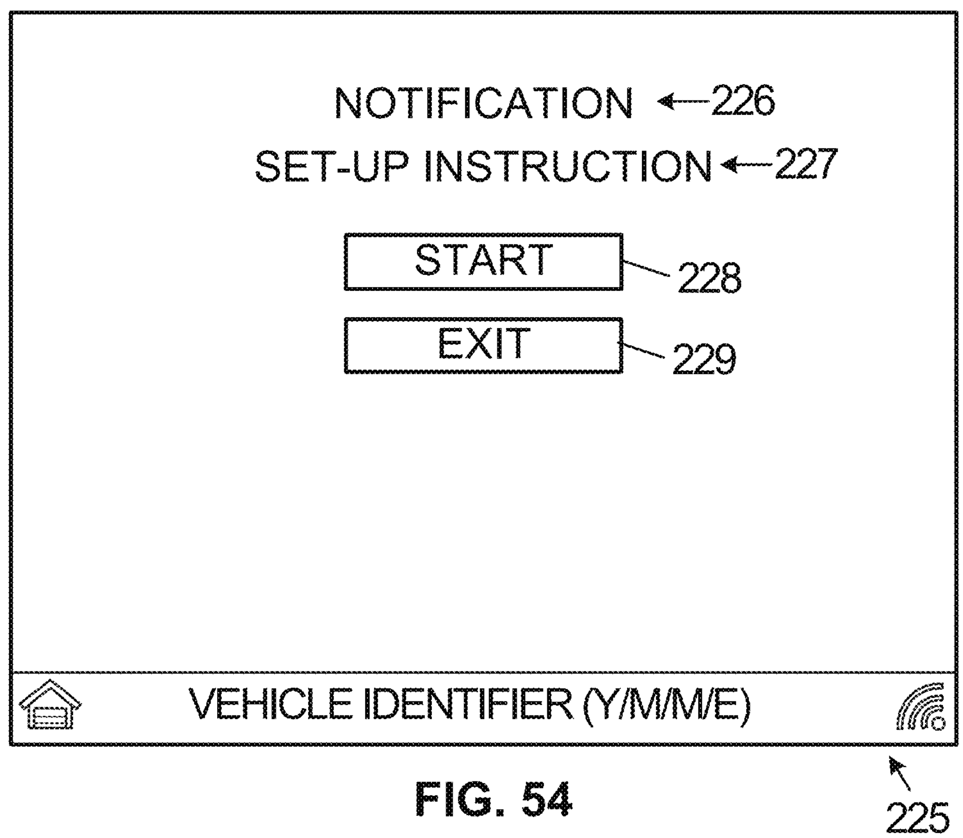

Next, FIG. 54 shows a screen shot of a GUI 225. As an example, the GUI 225 can be output on the display 81 in response to selection of a USC corresponding to a functional test, such as the USC 650 shown in FIG. 48, or a USC corresponding to a guided component test, such as the USC 656 shown in FIG. 48. A functional test can include a reset procedure. The GUI 225 includes a notification 226, a set-up instruction 227, a start USC 228, and an exit USC 229. As an example, the notification 226 can include a textual notification, such as a textual notification regarding a safety precaution regarding the functional test, reset procedure or guided component test. As an example, the set-up instruction 227 can include an operating condition for a vehicle (e.g., key-on engine off, vehicle in park, engine cold, engine warm, etc.) or an instruction regarding the test device 75 (e.g., connect probe 85 to port 93 and to circuit XYZ in the vehicle). The start USC 228 is selectable to begin the functional test, reset procedure or guided component test. The exit USC 229 is selectable to cause the processor 71 to remove the GUI 225 from the display 81 and to display a previously-displayed GUI, such as the GUI 600.

Figure 55:
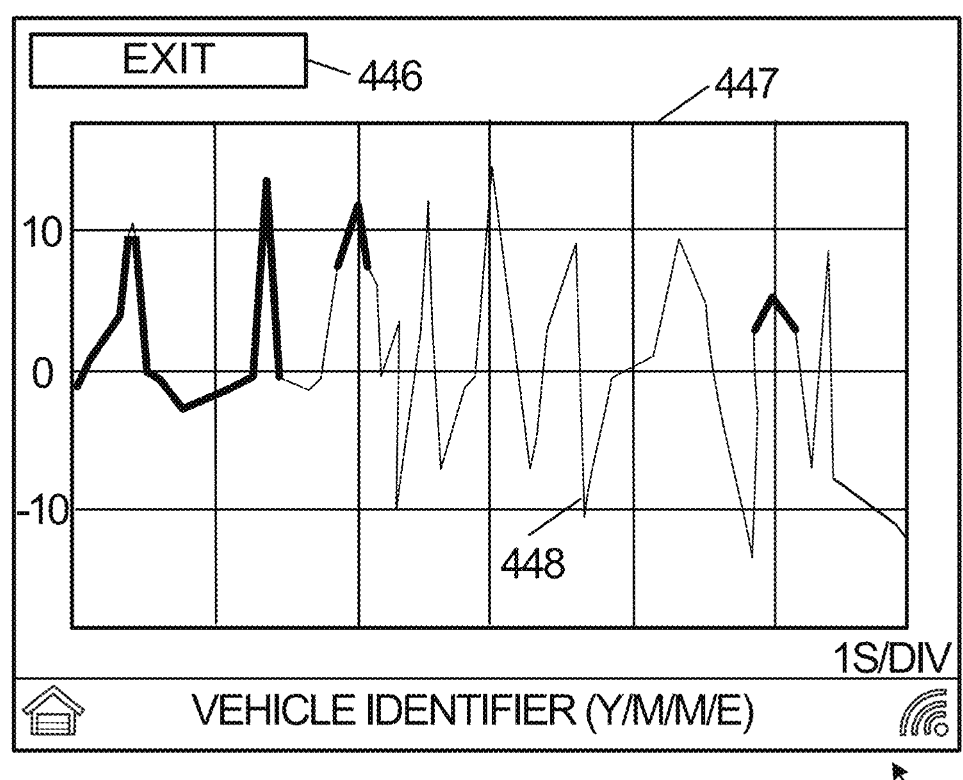

Next, FIG. 55 shows a screen shot of a GUI 445. As an example, the GUI 445 can be output on the display 81 in response to selection of a USC corresponding to a functional test, such as the USC 650 shown in FIG. 48, or a USC corresponding to a guided component test, such as the USC 656 shown in FIG. 48. In accordance with that example, selection of those USC do not require displaying a GUI like the GUI 225. As an example, the GUI 445 can be output on the display 81 in response to selection of the start USC 228 contained in a GUI like the GUI 225. The start USC 228 need not include text that states "start." The GUI 445 includes an exit USC 446 and a measurement representation 447. The exit USC 446 is selectable to cause the processor 71 to remove the GUI 445 from the display 81 and to display a previously-displayed GUI, such as the GUI 225 or the GUI 600. The measurement representation 447 can include a line graph 448, such a line graph representing a measurement made by the test device 75. Additionally or alternatively, the measurement representation 447 can include a textual representation of the measurement. The processor 71 can execute a test instruction to output a representation of the input signal samples on the display 81.

Next, FIG. 56 shows an illustration 735, 736, 737, 738. The illustration 735, 736 shows different views of the container 182. The illustration 737, 738 shows different views of the container 184. Other example views of the container 182, 184 are shown in FIG. 20.

The illustration 735 represents an implementation in which the container 721, 722, 723, 724, 725, 726 distinguishes itself from multiple other containers within the container 182 via shading. In the illustration 735, the container 182 is not marked with any lines.

The illustration 736 represents another implementation in which the container 721, 722, 723, 724, 725, 726 distinguishes itself from multiple other containers within the container 182 via shading. The PID content 167, 168, 169, 170, 175, 176 is not shown in the illustration 736 for clarity of the illustration 736. In the illustration 736, the container 182 is outlined using a line segment 739, 740, 741, 742.

The illustration 737 represents an implementation in which the container 727, 728, 729, 730 distinguishes itself from multiple other containers within the container 184 via shading. As noted with respect to FIG. 20, the USC 188, 189, 190, 191 can include and/or be contained within a container 727, 728, 729, 730. Similar to the container 182 shown in the illustration 736, the container 184 in the illustration 737 is outlined using four line segments.

The illustration 738 represents another implementation in which the container 727, 728, 729, 730 distinguishes itself from multiple other containers within the container 184 via shading. As noted with respect to FIG. 20, the USC 188, 189, 190, 191 can include and/or be contained within a container 727, 728, 729, 730. Similar to the container 182 shown in the illustration 736, the container 184 in the illustration 737 is outlined using four line segments. The functional test name for the USC 188, 189, 190, 191 is not shown in the illustration 738 for clarity of the illustration 738.

The example ways to distinguish multiple containers shown in FIG. 56 are applicable to other containers shown in the drawings. Other examples of distinguishing container are also possible.

IV. Example Operation

Figure 57:
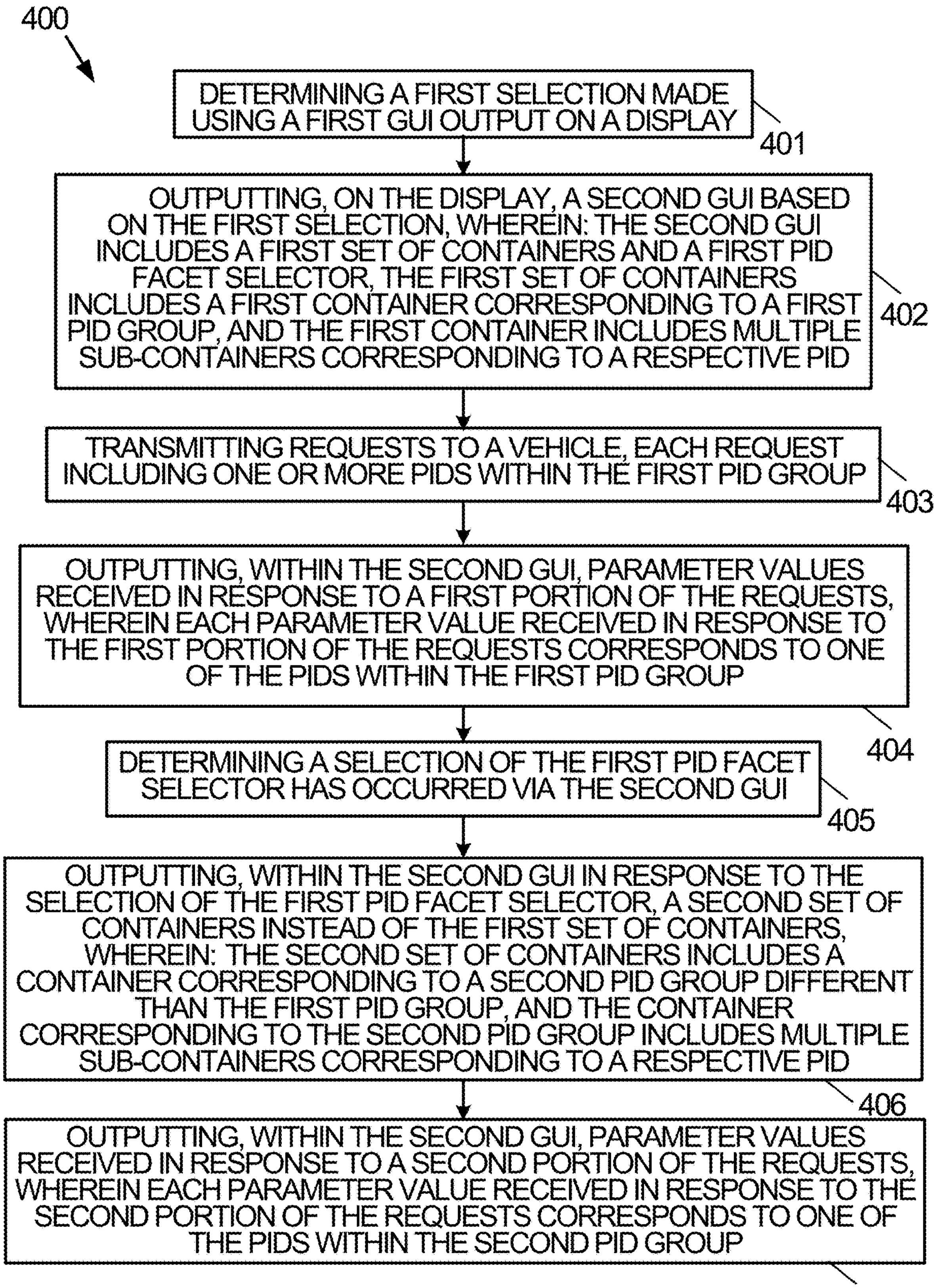
FIG. 57 shows a flow chart, in accordance with the example embodiments.

Next, FIG. 57 is a flow chart showing a function set 400 (e.g., a set of function(s)) of a method in accordance with the example implementations. The functions of the function set 400 are shown in a block 401, 402, 403, 404, 405, 406, 407 (which are arranged as a flowchart). Two or more functions and/or portions of two or more functions of the function set 400 can be performed at the same time. The functions of the function set 400 can be performed by one or more computing systems, such as one or more computing systems shown in FIG. 2 or configured to operate as a computing system shown in FIG. 2. For example, the functions of the function set 400 can be performed by one or more of the VST 3, the VST 70, the server 6, or the server 130. A computing system configured to perform a function of the function set 400 can perform other function(s) besides those shown in FIG. 57. As an example, those other function(s) can include one or more functions of one or more of the functions sets shown in FIG. 58 to FIG. 64.

Block 401 includes determining a first selection made using a first GUI output on a display. The function(s) of block 401 can be performed by a processor (e.g., one or more hardware processors) configured by machine-readable instructions including a module that is the same or similar to the selection via GUI module 456, in accordance with the example embodiments. As an example, the processor can determine a first selection made using a first GUI output on the display, as discussed with respect to the selection via GUI module 456.

Next, block 402 includes outputting, on the display, a second GUI based on the first selection. The second GUI includes a first set of containers and a first PID facet selector. The first set of containers includes a first container corresponding to a first PID group. The first container includes multiple sub-containers corresponding to a respective PID. The function(s) of block 402 can be performed by a processor (e.g., one or more hardware processors) configured by machine-readable instructions including a module that is the same or similar to the output GUI module 454, in accordance with the example embodiments. As an example, the processor can output, on the display, a second GUI based on the first selection, as discussed with respect to the output GUI module 454.

Next, block 403 includes transmitting requests to a vehicle, each request including one or more PIDs within the first PID group. The function(s) of block 403 can be performed by a processor (e.g., one or more hardware processors) configured by machine-readable instructions including a module that is the same or similar to the transmit request module 457, in accordance with the example embodiments. As an example, the processor can transmit requests to a vehicle, each request including one or more PIDs within the first PID group, as discussed with respect to the transmit request module 457.

Next, block 404 includes outputting, within the second GUI, parameter values received in response to a first portion of the requests, wherein each parameter value received in response to the first portion of the requests corresponds to one of the PIDs within the first PID group. The function(s) of block 404 can be performed by a processor (e.g., one or more hardware processors) configured by machine-readable instructions including a module that is the same or similar to the output GUI module 454, in accordance with the example embodiments. As an example, the processor can determine a first selection made using a first GUI output on the display, as discussed with respect to the output GUI module 454.

Next, block 405 includes determining a selection of the first PID facet selector has occurred via the second GUI. The function(s) of block 405 can be performed by a processor (e.g., one or more hardware processors) configured by machine-readable instructions including a module that is the same or similar to the selection via GUI module 456, in accordance with the example embodiments. As an example, the processor can determine a first selection made using a first GUI output on the display, as discussed with respect to the selection via GUI module 456.

Next, block 406 includes outputting, within the second GUI in response to the selection of the first PID facet selector, a second set of containers instead of the first set of containers. The second set of containers includes a container corresponding to a second PID group different than the first PID group. The container corresponding to the second PID group includes multiple sub-containers corresponding to a respective PID. The function(s) of block 406 can be performed by a processor (e.g., one or more hardware processors) configured by machine-readable instructions including a module that is the same or similar to the output GUI module 454, in accordance with the example embodiments. As an example, the processor can determine a first selection made using a first GUI output on the display, as discussed with respect to the output GUI module 454.

Next, block 407 includes outputting, within the second GUI, parameter values received in response to a second portion of the requests, wherein each parameter value received in response to the second portion of the requests corresponds to one of the PIDs within the second PID group. The function(s) of block 407 can be performed by a processor (e.g., one or more hardware processors) configured by machine-readable instructions including a module that is the same or similar to the output GUI module 454, in accordance with the example embodiments. As an example, the processor can determine a first selection made using a first GUI output on the display, as discussed with respect to the output GUI module 454.

Figure 58:
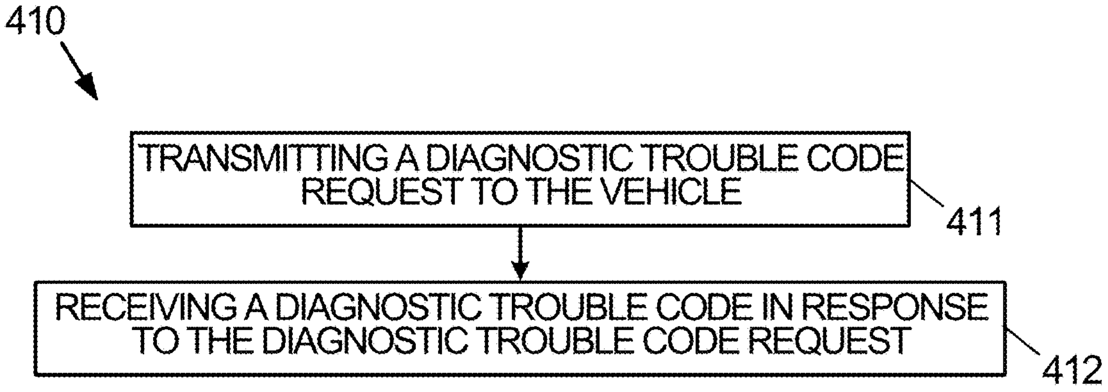

Next, FIG. 58 shows a function set 410. In accordance with the example embodiments, a method including the function(s) of the function set 410 can include one or more functions of the function set 400. Additionally, in accordance with at least some example embodiments, a method including the function(s) of the function set 410 can include a function discussed with respect to any one or more of FIG. 59 to FIG. 63.

Block 411 includes transmitting a DTC request to the vehicle. The function(s) of block 411 can be performed by a processor (e.g., one or more hardware processors) configured by machine-readable instructions including a module that is the same or similar to the transmit request module 457, in accordance with the example embodiments. As an example, the processor can transmit a DTC request to the vehicle, as discussed with respect to the transmit request module 457.

Block 412 includes receiving a DTC in response to the DTC request. The function(s) of block 412 can be performed by a processor (e.g., one or more hardware processors) configured by machine-readable instructions including a module that is the same or similar to the receive response module 458, in accordance with the example embodiments. As an example, the processor can receive a DTC in response to the DTC request, as discussed with respect to the receive response module 458.

In accordance with the embodiments based on the function set 410, the first selection includes the received DTC, and the first PID group corresponds to the received DTC.

Figure 59:
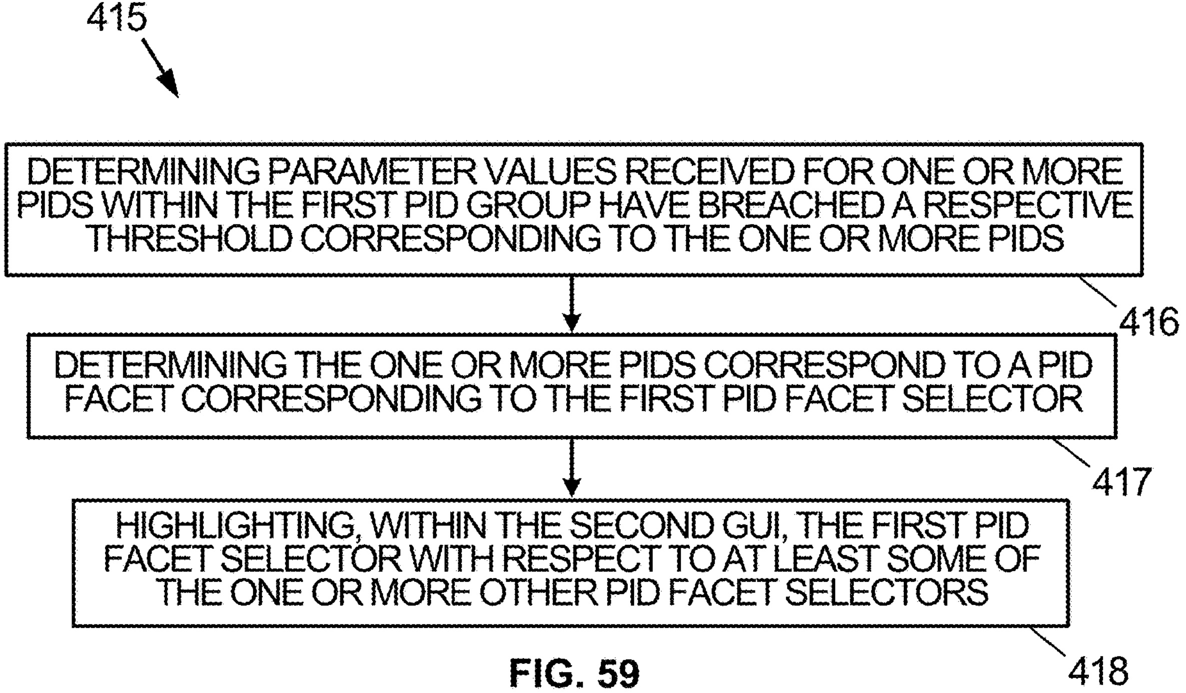

Next, FIG. 59 shows a function set 415. In accordance with the example embodiments, a method including the function(s) of the function set 415 can include one or more functions of the function set 400. In accordance with those embodiments, the second graphical user interface includes one or more other PID facet selectors. Additionally, in accordance with at least some example embodiments, a method including the function(s) of the function set 415 can include a function discussed with respect to any one or more of FIG. 58, FIG. 60, FIG. 61, FIG. 62, FIG. 63, or FIG. 64.

Block 416 includes determining parameter values received for one or more PIDs within the first PID group have breached a respective threshold corresponding to the one or more PIDs. The function(s) of block 416 can be performed by a processor (e.g., one or more hardware processors) configured by machine-readable instructions including a module that is the same or similar to the determine parameter module 459, in accordance with the example embodiments. As an example, the processor can determine parameter values received for one or more PIDs within the first PID group have breached a respective threshold corresponding to the one or more PIDs, as discussed with respect to the determine parameter module 459.

Block 417 includes determining the one or more PIDs correspond to a PID facet corresponding to the first PID facet selector. The function(s) of block 417 can be performed by a processor (e.g., one or more hardware processors) configured by machine-readable instructions including a module that is the same or similar to the determine corresponding PID module 460, in accordance with the example embodiments. As an example, the processor can determine the one or more PIDs correspond to a PID facet corresponding to the first PID facet selector, as discussed with respect to the determine corresponding PID module 460.

Block 418 includes highlighting, within the second GUI, the first PID facet selector with respect to at least some of the one or more other PID facet selectors. The function(s) of block 418 can be performed by a processor (e.g., one or more hardware processors) configured by machine-readable instructions including a module that is the same or similar to the highlight module 461, in accordance with the example embodiments. As an example, the processor can highlight, within the second GUI, the first PID facet selector with respect to at least some of the one or more other PID facet selectors, as discussed with respect to the highlight module 461.

Next, FIG. 60 shows a function set 420. In accordance with the example embodiments, a method including the function(s) of the function set 420 can include one or more functions of the function set 400 and the function set 415. Additionally, in accordance with at least some example embodiments, a method including the function(s) of the function set 420 can include a function discussed with respect to any one or more of FIG. 58, FIG. 59, FIG. 61, FIG. 62, FIG. 63, or FIG. 64.

Block 421 includes outputting, within each sub-container corresponding to the one or more PIDs within the first PID group, an indicator that indicates whether a parameter value corresponding to the one or more PIDs within the first PID group has breached the respective threshold corresponding to the one or more PIDs. The function(s) of block 421 can be performed by a processor (e.g., one or more hardware processors) configured by machine-readable instructions including a module that is the same or similar to the output indicator module 462, in accordance with the example embodiments. As an example, the processor can output, within each sub-container corresponding to the one or more PIDs within the first PID group, an indicator that indicates whether a parameter value corresponding to the one or more PIDs within the first PID group has breached the respective threshold corresponding to the one or more PIDs, as discussed with respect to the output indicator module 462.

Next, FIG. 61 shows a function set 425. In accordance with the example embodiments, a method including the function(s) of the function set 425 can include one or more functions of the function set 400. In accordance with those embodiments, the second set of containers includes one or more other containers, and the one or more other containers include a particular sub-container corresponding to a functional test, a reset procedure, or a guided component test. Additionally, in accordance with at least some example embodiments, a method including the function(s) of the function set 425 can include a function discussed with respect to any one or more of FIG. 58 to FIG. 60, FIG. 62, FIG. 63, or FIG. 64.

Block 426 includes initiating, in response to a selection of the particular sub-container, a performance of the functional test, the reset procedure, or the guided component test. The function(s) of block 426 can be performed by a processor (e.g., one or more hardware processors) configured by machine-readable instructions including a module that is the same or similar to the perform functional test module 463, in accordance with the example embodiments. As an example, the processor can initiate, in response to a selection of the particular sub-container, a performance of the functional test, the reset procedure, or the guided component test, as discussed with respect to the perform functional test module 463.

Block 427 includes outputting, in response to the selection of the particular sub-container, a user-selectable control selectable to initiate the performance of the functional test, the reset procedure, or the guided component test. The function(s) of block 427 can be performed by a processor (e.g., one or more hardware processors) configured by machine-readable instructions including a module that is the same or similar to the output USC module 455, in accordance with the example embodiments. As an example, the processor can output, in response to the selection of the particular sub-container, a user-selectable control selectable to initiate the performance of the functional test, the reset procedure, or the guided component test, as discussed with respect to the output USC module 455.

Figures 62, 63, 64:
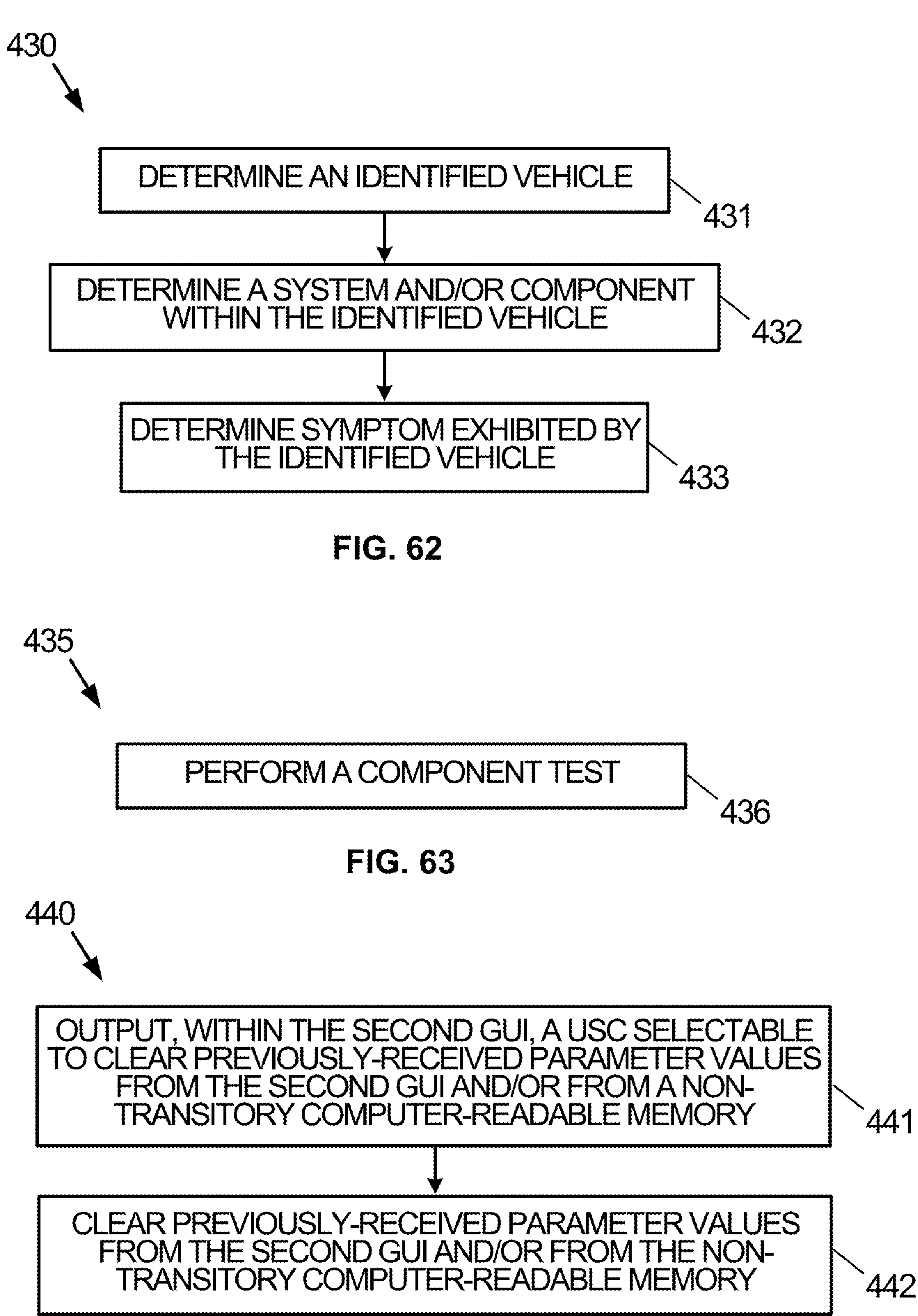

Next, FIG. 62 shows a function set 430. In accordance with the example embodiments, a method including the function(s) of the function set 430 can include one or more functions of the function set 400. Additionally, in accordance with at least some example embodiments, a method including the function(s) of the function set 430 can include a function discussed with respect to any one or more of FIG. 58 to FIG. 61, FIG. 63, or FIG. 64.

Block 431 includes determining an identified vehicle. The function(s) of block 431 can be performed by a processor (e.g., one or more hardware processors) configured by machine-readable instructions including a module that is the same or similar to the determine vehicle module 451, in accordance with the example embodiments. As an example, the processor can determine an identified vehicle, as discussed with respect to the determine vehicle module 451.

Block 432 includes determining a system and/or component within the identified vehicle. The function(s) of block 432 can be performed by a processor (e.g., one or more hardware processors) configured by machine-readable instructions including a module that is the same or similar to the determine system/component module 452, in accordance with the example embodiments. As an example, the processor can determine a system and/or component within the identified vehicle, as discussed with respect to the determine system/component module 452.

Block 433 includes determining a symptom exhibited by the identified vehicle. The function(s) of block 433 can be performed by a processor (e.g., one or more hardware processors) configured by machine-readable instructions including a module that is the same or similar to the determine symptom module 453, in accordance with the example embodiments. As an example, the processor can determine a symptom exhibited by the identified vehicle, as discussed with respect to the determine symptom module 453.

Next, FIG. 63 shows a function set 435. In accordance with the example embodiments, a method including the function(s) of the function set 435 can include one or more functions of the function set 400. Additionally, in accordance with at least some example embodiments, a method including the function(s) of the function set 435 can include a function discussed with respect to any one or more of FIG. 58 to FIG. 62 or FIG. 64.

Block 436 includes performing a component test. The function(s) of block 436 can be performed by a processor (e.g., one or more hardware processors) configured by machine-readable instructions including a module that is the same or similar to the perform component test module 464, in accordance with the example embodiments. As an example, the processor can determine an identified vehicle, as discussed with respect to the perform component test module 464.

Next, FIG. 64 shows a function set 440. In accordance with the example embodiments, a method including the function(s) of the function set 440 can include one or more functions of the function set 400. Additionally, in accordance with at least some example embodiments, a method including the function(s) of the function set 440 can include a function discussed with respect to any one or more of FIG. 58 to FIG. 63.

Block 441 includes outputting, within the second GUI a user-selectable control selectable to clear previously-received parameter values from the second GUI and/or from a non-transitory computer-readable memory. The function(s) of block 441 can be performed by a processor (e.g., one or more hardware processors) configured by machine-readable instructions including a module that is the same or similar to the output USC module 455, in accordance with the example embodiments. As an example, the processor can output, within the second GUI a user-selectable control selectable to clear previously-received parameter values from the second GUI and/or from a non-transitory computer-readable memory, as discussed with respect to the output USC module 455.

Block 442 includes clearing previously-received parameter values from the second GUI and/or from the non-transitory computer-readable memory. The function(s) of block 442 can be performed by a processor (e.g., one or more hardware processors) configured by machine-readable instructions including a module that is the same or similar to the clear parameter value module 465, in accordance with the example embodiments. As an example, the processor can clear previously-received parameter values from the second GUI and/or from the non-transitory computer-readable memory, as discussed with respect to the clear parameter value module 465.

V. Example Vehicle

A vehicle is a mobile machine that can be used to transport a person, people, and/or cargo. A vehicle can be driven and/or otherwise guided along a path (e.g., a paved road or otherwise) on land, in water, in the air, and/or outer space. A vehicle can be wheeled, tracked, railed, and/or skied. A vehicle can include an automobile, a motorcycle (e.g., a two or three wheel motorcycle), an all-terrain vehicle (ATV) defined by ANSI/SVIA-1-2007, a snowmobile, a watercraft (e.g., a JET SKI® watercraft), a light-duty truck, a medium-duty truck, a heavy-duty truck, a semi-tractor, a drone, and/or a farm machine. A vehicle can include and/or use any appropriate voltage and/or current source, such as a battery, an alternator, a fuel cell, and the like, providing any appropriate current and/or voltage, such as about 12 volts, about 42 volts, 400 volts, 800 volts, or some other voltage level. A vehicle can include and/or use any system and/or engine to provide its mobility. Those systems and/or engines can include vehicle components that use fossil fuels, such as gasoline, diesel fuel, natural gas, propane, and the like, electricity, such as that generated by a battery, magneto, fuel cell, solar cell and the like, wind and hybrids and/or combinations thereof. A vehicle can include an electronic control unit (ECU), an OBDC, and a vehicle network that connects the OBDC to the ECU. A vehicle can be operable to operate as an autonomous vehicle.

A vehicle manufacturer can build various quantities of vehicles each calendar year (i.e., January 1$^{st}$ to December 31$^{st}$). In some instances, a vehicle manufacturer defines a model year for a particular vehicle model to be built. The model year can start on a date other than January 1$^{st}$ and/or can end on a date other than December 31$^{st}$. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a particular vehicle model with different vehicle options. For example, the particular vehicle model can include vehicles with six-cylinder engines and vehicles with eight-cylinder engines. The vehicle manufacturer or another entity can define vehicle identifying information for each vehicle built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can comprise indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name, or more simply "model"), and features of the vehicle (e.g., an engine type). In accordance with that example, the particular vehicle identifying information can be referred to by an abbreviation YMMEF, where each letter in the order shown represents a model year identifier, vehicle make identifier, vehicle model name identifier, engine type identifier, and fuel type identifier, respectively, or YMMF, where each letter in the order shown represents a model year identifier, vehicle make identifier, vehicle model name identifier, and fuel type identifier, respectively, or YMME, where each letter in the order shown represents a model year identifier, vehicle make identifier, vehicle model name identifier, and engine type identifier, respectively, or an abbreviation YMM, where each letter in the order shown represents a model year identifier, vehicle make identifier, and vehicle model name identifier, respectively. As yet another example, any of the aforementioned forms of vehicle identifiers can include information regarding a market such that the vehicle identifiers take the form of YMMM, YMMFM, YMMEM, or YMMEFM, where the last "M" represents a market. The marked for example, could be the United States market, the United Kingdom market, the German market, the Canadian market or the market of some other country or region. Other aspects of a vehicle, such as an engine displacement of internal combustion engines, or sub-models designators, can also be represented with the vehicle identifying information.

An example YMME is 2021/Toyota/Camry/4Cyl, in which "2021" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine) within the vehicle. Another example YMME is 2016/Freightliner/Cascadia/Cummins ISX15 EPA, in which "2016" represents the model year the vehicle was built, "Freightliner" represents the name of the vehicle manufacturer Daimler Trucks North America, Cleveland, North Carolina, "Cascadia" represents a vehicle model built by that manufacturer, and "Cummins ISX15 EPA" represents an engine manufacturer and model within the vehicle. An example YMM is 2016/Freightliner/Cascadia. An example YM is 2016/Freightliner. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Michigan.

In some cases, different types of vehicles (e.g., vehicles with different YMM, YMMM, YMME, YMMEM, YMMF, YMMFM, YMMEF, or YMMEFM combinations) are part of a vehicle leveraging group. As an example, a vehicle leveraging group may be defined for three different YMM combinations based on different years (e.g., 2022 MM, 2021 MM, and 2020 MM), wherein the make and model name does not change. The leveraging group may be useful because any vehicle within the leveraging group may have a common set of vehicle data messages available to communicate with an off-board computing system. Accordingly, any vehicle within the leveraging group can perform the same functional tests and reset procedures, and be configured to respond to a common set of vehicle data messages.

Some vehicles, such as automobiles, are associated with a unique VIN. Some VINs include seventeen alpha-numeric characters. For at least some seventeen character VINs, the last six characters represent a unique serial number associated with a particular type of vehicle represented by the first eleven alpha-numeric characters of those VINs. The first eleven alpha-numeric characters typically represent at least a YMME or a YMM. In some instances, a vehicle includes a one dimensional or multi-dimensional bar code indicative of a VIN associated with that vehicle.

A vehicle network (e.g., the vehicle network 13 shown in FIG. 2 or the vehicle network 44 shown in FIG. 3) can include one or more conductors (e.g., copper wire conductors) and/or can be wireless. As an example, a vehicle network can include one or two conductors for carrying vehicle data messages in accordance with a vehicle data message (VDM) protocol, such as a bi-directional VDM protocol. A bi-directional VDM protocol can include a SAE® J1850 (PWM or VPW) VDM protocol, an SAER J1939 VDM protocol based on the SAE® J1939_201808 serial control and communications heavy duty vehicle network-top level document, and/or any other core J1939 standard, an ISO® 15764-4 controller area network (CAN) VDM protocol, an ISO® 9141-2 K-Line VDM protocol, an ISO® 14230-4 KWP2000 K-Line VDM protocol, an ISO® 17458 (e.g., parts 1-5) FlexRay VDM protocol, an ISO® 17987 local interconnect network (LIN) VDM protocol, a CAN 2.0 VDM protocol, standardized in part using an ISO®

11898-1:2015 road vehicle-CAN-Part I: data link layer and physical signaling protocol, a CAN FD VDM protocol (e.g., CAN with flexible data rate VDM protocol), a MOST® Cooperation VDM protocol (such as the MOST Specification Rev. 3.0 E2, or the MOST® Dynamic Specification, Rev. 3.0.2), an Ethernet VDM protocol (e.g., an Ethernet 802.3 protocol using a BROADR-REACH® physical layer transceiver specification for Automotive Applications by Broadcom Inc., San Jose, California), or some other VDM protocol defined for performing communications with or within the vehicle 4, 32, 50. The aforementioned protocols can include definition for at least physical and data link layers of the seven layer Open Systems Interconnection (OSI) model. Each and every VDM discussed in this description is arranged according to a VDM protocol.

In at least some implementations, a VDM protocol works in conjunction a Unified Diagnostic Services (UDS) protocol, such as the ISO® 14229-1:2020 standard for Road vehicles—UDS—Part 1: application layer, the ISO® 14229-2 standard for Road vehicles—unified diagnostic services, session layer services, or ISO® 14229-3:2022 standard for Road Vehicles—UDS on CAN implementation (UDSonCAN). A VDM sent on a CAN vehicle bus according the UDS protocol can include a CAN message identifier, a protocol control information filed, a service identifier (SID), and data parameter value requests. Table E shows example SIDs sent to an ECU from a VST and example SIDs sent in response to the VST from the ECU.

TABLE E

| Request SID | Service | Response SID |
|---|---|---|
| $10 | Diagnostic session control | $50 |
| $11 | ECU reset | $51 |
| $14 | Clear DTC | $54 |
| $19 | Read DTC | $59 |
| $22 | Read data by identifier | $62 |
| $23 | Read memory by address | $63 |
| $24 | Read scaling data by identifier | $64 |
| $27 | Security access | $67 |
| $28 | Communication control | $68 |
| $29 | Authentication | $69 |
| $2A | Read data by identifier periodically | $6A |
| $2C | Dynamically define data identifier | $6C |
| $2E | Write data by identifier | $6E |
| $2F | Input Output Control by identifier | $6F |
| $31 | Routine control | $71 |
| $34 | Request download | $74 |
| $35 | Request upload | $75 |
| $36 | Transfer data | $76 |
| $37 | Request transfer exit | $77 |
| $38 | Request file transfer | $78 |
| $3D | Write memory by address | $7D |
| $3E | Tester present | $7E |
| $83 | Access timing parameters | $C3 |
| $84 | Secured data transmission | $C4 |
| $85 | Control DTC settings | $C5 |
| $86 | Response on event | $C6 |
| $87 | Link control | $C7 |

As an example, the processor 71 can transmit a VDM with a SID $2A to request an ECU to transmit VDMs with PID parameter data periodically. Moreover, the processor 71 can include a data rate, such as slow, medium, or fast to set a transmission rate for the ECU, or a data rate of stop to end the periodic transmission of PID parameter data from the ECU for the requested PID.

As another example, the processor 71 can transmit a VDM with a SID $2F to request the ECU to perform a functional test or a reset procedure. In other words, the VST 3, 70 and/or the processor 71 can gain control over an analog or digital input or output of the ECU by sending a VDM with the SID $2F.

As yet another example, the processor 71 can transmit a VDM with a SID $22 to request a PID parameter value from an ECU, a SID $14 to clear DTCs, or a SID $19 to read DTCs. In at least some implementations, a VDM protocol can be unidirectional instead of bidirectional. For example, a SENT VDM protocol (e.g., a single-edge nibble transmission VDM protocol) is a unidirectional VDM protocol. The SENT VDM protocol has been standardized as the SAE J2716 VDM protocol. A sensor in a vehicle can include a transmitter operable to communicate using the SENT VDM protocol (e.g., a SENT VDM transmitter). A vehicle communication bus can operatively connect the SENT VDM transmitter and an ECU within the vehicle. The transceiver 72 (e.g., the vehicle communications transceiver 91) can include a SENT VDM receiver connectable to the vehicle communication bus operatively connected to the SENT VDM transmitter. The SENT VDM receiver can receive SENT VDM protocol messages representing sensor values output by the sensor with the SENT VDM transmitter.

An OBDC, such as the OBDC 11, 37, 60 can include an on-board diagnostic (OBD) connector, such as an OBD II connector. An OBD II connector can include slots for retaining up to sixteen connector terminals, but can include a different number of slots or no slots at all. As an example, an OBDC can include an OBD II connector that meets the SAE J1962 specification such as a connector 16M, part number 12110252, available from Aptiv LLC of Dublin, Ireland. An OBDC can include conductor terminals that connect to a conductor in a vehicle. For instance, an OBDC can include connector terminals that connect to conductors that respectively connect to positive and negative terminals of a battery or battery pack. An OBDC can include one or more conductor terminals that connect to a conductor of a vehicle communication bus such that the OBDC is operatively connected to one or more ECUs. A computing system, such as the VST 3, 70 can operatively connect to an OBDC in order to receive a VDM from the vehicle including that OBDC. A VDM can carry VDM data. The VDM data can include a PID and parameter values associated with the PID. The VDM data can include a DTC. An operative connection between the OBDC and the VST 3, 70 can occur via the arrangement 8, 9, 10 shown in FIG. 2 or via some other arrangement. A PID can be associated with one or more thresholds. A threshold corresponding to a PID can be dependent upon an operating condition of the vehicle 4. A VDM can be transmitted over a physical communication link, such as a copper wire or an optical cable, or using radio signals over an air interface. In many implementations, the PID and parameter value are transmitted as binary data. A processor can parse a received VDM to recover a binary representation of a PID and parameter value. The processor can translate the binary representation of a PID and parameter value into a textual a PID and parameter value displayable on a display device.

An ECU can control various aspects of vehicle operation and/or components within a vehicle system. For example, an ECU can include a powertrain (PT) system ECU, an engine control module (ECM) ECU, a supplemental inflatable restraint (SIR) system (e.g., an air bag system) ECU, an entertainment system ECU, or some other ECU. An ECU can receive an electrical or optical input from an ECU-connected input device (e.g., a sensor input), control an ECU-connected output device (e.g., a solenoid) via an electrical or optical signal output by the ECU, generate a vehicle data message (VDM) (such as a VDM based on a received input or a controlled output), and set a DTC to a state (such as active or history). An ECU can perform a functional test in response to receiving a VDM requesting performance of the functional test. The functional test can be used to test an ECU-connected output device. In at least some implementations, the ECU is operable to perform the functional test and/or provide the DTC in accordance with an industry standard, such as the SAE J1979_201202 and/or ISO 15031-5 standards for E/E diagnostic test modes.

VI. Example Computing System Configuration

Figures 65, 66:
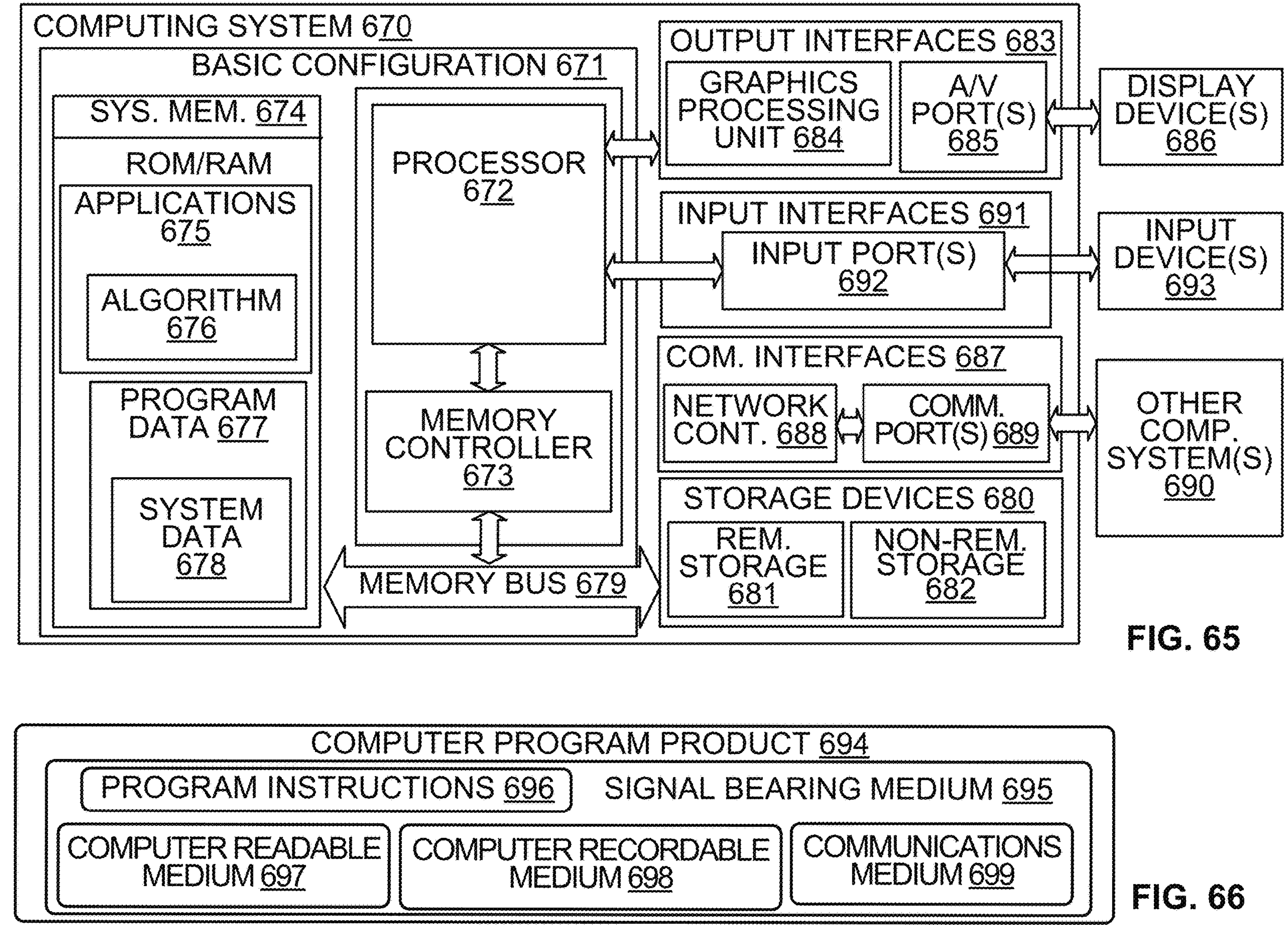
FIG. 65 is a block diagram illustrating a computing system that is arranged in accordance with the example embodiments.
FIG. 66 is a schematic illustrating a conceptual partial view of a computer program product for executing a computer process on a computing system, in accordance with the example embodiments.

Next, FIG. 65 is a block diagram of a computing system 670 in accordance with the example implementations. In a basic configuration 671, the computing system 670 can include a processor 672 and a system memory 674. A memory bus 679 can be used for communicating between the processor 672 and the system memory 674. Depending on the desired configuration, the processor 672 can be of any type including but not limited to a microprocessor (μP), a microcontroller (μC), a digital signal processor (DSP), or any combination thereof. A memory controller 673 can also be used with the processor 672, or in some implementations, the memory controller 673 can be an internal part of the processor 672.

Depending on the desired configuration, the system memory 674 can be of any type including but not limited to volatile memory (such as RAM), non-volatile memory (such as ROM, flash memory, etc.) or any combination thereof. The system memory 674 can include one or more applications 675, and program data 677. The application 675 can include an algorithm 676 that is arranged to perform the functions described as being performed by the VST 3, 70 or the server 6, 130. The program data 677 can include system data 678 that could be directed to any number of types of data, such as the computer-readable data stored in the memory 73, 133. In some example implementations, the applications 675 can be arranged to operate with the program data 677 on an operating system executable by the processor 672.

The computing system 670 can have additional features or functionality, and additional interfaces to facilitate communications between the basic configuration 671 and any devices and interfaces. For example, storage devices 680 can be provided including removable storage devices 681, non-removable storage devices 682, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and non-volatile, non-transitory, removable and non-removable media implemented in any method or technology for storage of information, such as computer-readable program instructions, data structures, program modules, or other data such as the data stored in a computer-readable memory, such at the memory 73, 133.

The system memory 674 and the storage devices 680 are examples of computer-readable memory, such as the memory 73, 133. The system memory 674 and the storage devices 680 can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing system 670.

The computing system 670 can include or be implemented as a portion of a small-form factor portable (e.g., mobile) electronic device such as a smartphone (e.g., an IPHONE® smartphone from Apple Inc. of Cupertino, California, or a GALAXY S® smartphone from Samsung Electronics Co., Ltd. of Maetan-Dong, Yeongtong-Gu Suwon-Si, Gyeonggi-Do, Republic of Korea), a tablet device (e.g., an IPAD® tablet device from Apple Inc., or a SAMSUNG GALAXY TAB tablet device from Samsung Electronics Co., Ltd.), or a wearable computing device (e.g., a wireless web-watch device or a personal headset device). The application 675, or the program data 677 can include an application downloaded to the communication interfaces 687 from the APP STORE® online retail store, from the GOOGLE PLAY® online retail store, or another source of the applications. A component of the VST 3, 70, such as the display 81 and/or the transceiver 72, can be embodied in the small-form factor electronic device.

The computing system 670 can include or be implemented as part of a personal computing system (including both laptop computer and non-laptop computer configurations), or a server. The computing system 670 can be configured as an embedded system in which the processor 672 includes an embedded processor and the system memory 674 includes an embedded memory.

The computing system 670 can also include output interfaces 683 that can include a graphics processing unit 684, which can be configured to communicate to various external devices such as displays 686 or speakers via one or more A/V ports 685 or a communication interface 687. The communication interface 687 can include a network controller 688, which can be arranged to facilitate communications with the other computing systems 690 over a network communication via one or more communication ports 689. The communication connection is one example of a communication media. Communication media can be embodied by computer-readable program instructions, data structures, program modules, GUIs, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

For the VST 3, 70, the communication interface 687 can include the network transceiver 90 and/or the vehicle communications transceiver 91, and the communication port 689 can include a communication port connectable to a printer for printing a paper copy of GUI content.

In FIG. 66, a schematic illustrating a conceptual partial view of a computer program product 694 is shown. The computer program product 694 includes a computer program for executing a computer process on a computing system, arranged according to at least some implementations presented herein. That computer program can be encoded on a non-transitory computer-readable storage medium in a machine-readable format, or on another non-transitory medium or article of manufacture.

In at least some implementations, the computer program product 694 is provided using a signal bearing medium 695. The signal bearing medium 695 can include one or more programming instructions 696 that, when executed by a processor can provide functionality or portions of the functionality described above with respect to FIG. 1 to FIG. 64. In some examples, the signal bearing medium 695 can encompass a computer-readable memory 697, such as, but not limited to, a hard disk drive, a Compact Disc (CD), a Digital Video Disk (DVD), a digital tape, or any other memory described herein. In some implementations, the signal bearing medium 695 can encompass a computer recordable medium 698, such as, but not limited to, memory, read/write (R/W) CDs, R/W DVDs, etc. In some implementations, the signal bearing medium 695 can encompass a communications medium 699, such as, but not limited to, a digital and/or an analog communication medium (e.g., a fiber optic cable, a waveguide, a wired communications link, a wireless communication link, etc.). Thus, for example, the signal bearing medium 695 can be conveyed by a wireless form of the communications medium 699 (e.g., a wireless communications medium conforming to the IEEE 802.11 standard or another transmission protocol).

The one or more programming instructions 696 can be, for example, computer executable and/or logic implemented instructions. In some examples, a computing system such as the computer program product 694 of FIG. 66 can be configured to provide various operations, functions, or actions in response to the programming instructions 696 conveyed to the computing system 670 by one or more of the following; the computer-readable memory 697, the computer recordable medium 698, or the communications medium 699.

The VST 3, 70 can include any of the components of the computing system 670. The processor 71 can be configured like the processor 672. The memory 73 can be configured as part of or all of the system memory 674 or the storage devices 680. The transceiver 72 can be configured as part of or all of the communication interfaces 687.

In at least some implementations, the VST 3, 70, the server 6, 130 and/or the computing system 670 includes a power source. The power source can include a connection to an external power source and circuitry to allow current to flow to other elements connected to the power source. As an example, the external power source can include a wall outlet at which a connection to an alternating current can be made. As another example, the external power source can include an energy storage device (e.g., a battery) or an electric generator.

Additionally or alternatively, a power source can include a connection to an internal power source and power transfer circuitry to allow current to flow to other elements connected to the power source. As an example, the internal power source can include an energy storage device, such as a battery. Furthermore, any power source (e.g., a power supply) described herein can include various circuit protectors and signal conditioners. The power sources described herein can provide a way to transfer electrical currents to other elements that operate electrically.

VII. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether. Furthermore, various functions described and/or shown in the drawings as being performed by one or more elements can be carried out by a processor executing computer-readable program instructions or by a combination of hardware, firmware, and/or software. For purposes of this description, execution of CRPI contained in a computer-readable memory to perform some function can include executing all of the program instructions of those CRPI or only a portion of those CRPI.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing implementations only, and is not intended to be limiting.

In this description, the articles "a," "an," and "the" are used to introduce elements and/or functions of the example implementations. The intent of using those articles is that there is one or more of the introduced elements and/or functions.

In this description, the intent of using the term "and/or" within a list of at least two elements or functions and the intent of using the terms "at least one of," "at least one of the following," "one or more of," "one or more from among," and "one or more of the following" immediately preceding a list of at least two components or functions is to cover each implementation including a listed component or function independently and each implementation including a combination of the listed components or functions. For example, an implementation described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible implementations: (i) an implementation including A, but not B and not C, (ii) an implementation including B, but not A and not C, (iii) an implementation including C, but not A and not B, (iv) an implementation including A and B, but not C, (v) an implementation including A and C, but not B, (v) an implementation including B and C, but not A, and/or (vi) an implementation including A, B, and C. For the implementations including component or function A, the implementations can include one A or multiple A. For the implementations including component or function B, the implementations can include one B or multiple B. For the implementations including component or function C, the implementations can include one C or multiple C. In accordance with the aforementioned example and at least some of the example implementations, "A" can represent a component, "B" can represent a system, and "C" can represent a symptom.

The use of ordinal numbers such as "first," "second," "third" and so on is to distinguish respective elements rather than to denote an order of those elements unless the context of using those terms explicitly indicates otherwise. The use of the symbol "$" as prefix to a number indicates the number is a hexadecimal number.

Implementations of the present disclosure can thus relate to one of the enumerated example embodiments (EEEs) listed below.

EEE A1 is a computing system comprising: a processor; a display operatively coupled to the processor; and a non-transitory computer-readable memory containing instructions executable by the processor to perform functions comprising: determining a first selection made using a first graphical user interface output on the display; outputting, on the display, a second graphical user interface based on the first selection, wherein: the second graphical user interface includes a first set of containers and a first parameter-identifier facet selector, the first set of containers includes a first container corresponding to a first parameter-identifier group, and the first container includes multiple sub-containers corresponding to a respective parameter-identifier; transmitting requests to a vehicle, each request including one or more parameter-identifiers within the first parameter-identifier group; outputting, within the second graphical user interface, parameter values received in response to a first portion of the requests, wherein each parameter value received in response to the first portion of the requests corresponds to one of the parameter-identifiers within the first parameter-identifier group; determining a selection of the first parameter-identifier facet selector has occurred via the second graphical user interface; outputting, within the second graphical user interface in response to the selection of the first parameter-identifier facet selector, a second set of containers instead of the first set of containers, wherein: the second set of containers includes a container corresponding to a second parameter-identifier group different than the first parameter-identifier group, and the container corresponding to the second parameter-identifier group includes multiple sub-containers corresponding to a respective parameter-identifier; and outputting, within the second graphical user interface, parameter values received in response to a second portion of the requests, wherein each parameter value received in response to the second portion of the requests corresponds to one of the parameter-identifiers within the second parameter-identifier group.

EEE A2 is the computing system of EEE A1, wherein the functions further include: transmitting a diagnostic trouble code request to the vehicle, and receiving a diagnostic trouble code in response to the diagnostic trouble code request, wherein the first selection includes the received diagnostic trouble code, and wherein the first parameter-identifier group corresponds to the received diagnostic trouble code.

EEE A3 is the computing system of any one of EEE A1 to A2, wherein the first selection includes one or more from among: a selection of a vehicle system, a selection of a vehicle component, a selection of the first parameter-identifier group from among multiple parameter-identifier groups corresponding to the vehicle system, a selection of the first parameter-identifier group from among multiple parameter-identifier groups corresponding to the vehicle component, a selection of a symptom, or a selection of a diagnostic trouble code.

EEE A4 is the computing system of EEE A3, wherein the selection of the vehicle system includes a selection of multiple vehicle systems.

EEE A5 is the computing system of any one of EEE A3 to A4, wherein the selection of the vehicle component includes a selection of multiple vehicle components.

EEE A6 is the computing system of any one of EEE A3 to A5, wherein the selection of the system includes a selection of multiple symptoms.

EEE A7 is the computing system of any one of EEE A3 to A6, wherein the selection of the diagnostic trouble code includes a selection of multiple diagnostic trouble codes.

EEE A8 is the computing system of any one or EEE A1 to A7, further comprising: determining parameter values received for a particular parameter-identifier have breached a threshold corresponding to the particular parameter-identifier; determining the particular parameter-identifier corresponds to a PID facet corresponding to the first parameter-identifier facet selector; and highlighting, within the second graphical user interface, the first parameter-identifier facet selector.

EEE A9 is the computing system of any one of EEE A1 to A7, wherein the second graphical user interface includes one or more other parameter-identifier facet selectors, and wherein the functions further include: determining parameter values received for one or more parameter-identifiers within the first parameter-identifier group have breached a respective threshold corresponding to the one or more parameter-identifiers; determining the one or more parameter-identifiers correspond to a PID facet corresponding to the first parameter-identifier facet selector; and highlighting, within the second graphical user interface, the first parameter-identifier facet selector with respect to at least some of the one or more other parameter-identifier facet selectors.

EEE A10 is the computing system of EEE A9, wherein the functions further include outputting, within each sub-container corresponding to the one or more parameter-identifiers within the first parameter-identifier group, an indicator that indicates whether a parameter value corresponding to the one or more parameter-identifiers within the first parameter-identifier group has breached the respective threshold corresponding to the one or more parameter-identifiers.

EEE A11 is the computing system of any one of EEE A9 to A10, wherein the functions further include: determining two or more parameter-identifier facet selectors are selected from the second graphical user interface, and modifying the second graphical user interface to include user-selectable controls for one or more functional tests or reset procedures corresponding to the selected parameter-identifier facet selectors and/or one or more guided component tests corresponding to the selected parameter-identifier facet selectors.

EEE A12 is the computing system of EEE A11, wherein the selected parameter-identifier facet selectors include one or more spatial parameter-identifier facet selectors.

EEE A13 is the computing system of EEE A12, wherein the one or more spatial parameter-identifier facet selectors include a parameter-identifier facet selector corresponding to one of the following positions: front, rear, left, right, top or bottom.

EEE A14 is the computing system of any one of EEE A11 to A13, wherein the functions further include: determining from mapping data corresponding to the two or more parameter-identifier facet selectors data indicative of parameter-identifiers and tests corresponding to each parameter-identifier facet selector of the two or more parameter-identifier facet selectors.

EEE A14 is the computing system of any one of EEE A11 to A13, wherein the selected parameter-identifier facet selectors include one or more measurement parameter-identifier facet selectors.

EEE A15 is the computing system of EEE A14, wherein the one or more measurement parameter-identifier facet selectors include a parameter-identifier facet selector corresponding to one of the following measurement: a voltage, a current, a percentage, a temperature, or a weight.

EEE A16 is the computing system of any one of EEE A11 to A15, wherein each user-selectable control of the user-selectable controls includes and/or is within a container and/or a sub-container.

EEE A17 is the computing system of any one of EEE A11 to A16, further comprising a test device configured to perform the one or more guided component tests.

EEE A18 is the computing systems of EEE A17, wherein the test device includes an oscilloscope.

EEE A19 is the computing systems of EEE A17, wherein the test device includes a meter configured to measure one or more of a voltage, a current, or a resistance.

EEE A20 is the computing system of any one of EEE A1 to A7, wherein the second graphical user interface includes one or more other parameter-identifier facet selectors, wherein the method further comprises: determining two or more parameter-identifier facet selectors are selected from the second graphical user interface; determining from mapping data corresponding to the two or more parameter-identifier facet selectors data indicative of parameter-identifiers, functional tests, guided component tests, and/or reset procedures corresponding to each parameter-identifier facet selector of the two or more parameter-identifier facet selectors, determining parameter-identifiers, functional tests, guided component tests, and/or reset procedures to include in the second graphical user interface based on use of a Boolean function with respect to the data indicative of parameter-identifiers, functional tests, guided component tests, and/or reset procedures corresponding to each parameter-identifier facet selector of the two or more parameter-identifier facet selectors.

EEE A21 is the computing system of EEE A20, wherein the Boolean function is an AND function.

EEE A22 is the computing system of EEE A20, wherein the Boolean function is an OR function.

EEE A23 is the computing system of any one of EEE A1 to A22, wherein the second set of containers includes one or more other containers, wherein the one or more other containers include a particular sub-container corresponding to a functional test, a reset procedure, or a guided component test, and wherein the functions further include: initiating, in response to a selection of the particular sub-container, a performance of the functional test, the reset procedure, or the guided component test, or outputting, in response to the selection of the particular sub-container, a user-selectable control selectable to initiate the performance of the functional test, the reset procedure, or the guided component test.

EEE A24 is the computing system of EEE A23, wherein the user-selectable control of includes and/or is within a container and/or a sub-container.

EEE A25 is the computing system of any one of EEE A1 to A24, wherein: the first set of containers includes one or more other containers, each of the one or more other containers corresponds to a respective parameter-identifier group other than the first parameter-identifier group, and each of the one or more other containers includes multiple sub-containers corresponding to a respective parameter-identifier within one of the respective parameter-identifier groups.

EEE A26 is the computing system of any one of EEE A1 to A25, wherein: the second graphical user interface includes one or more groups of parameter-identifier facet selectors, and the first parameter-identifier facet selector is contained within one of the one or more groups of parameter-identifier facet selectors.

EEE A27 is the computing system of EEE A26, wherein the one or more groups of parameter-identifier facet selectors includes one or more of the following: a group of parameter-identifier facet selectors corresponding to cylinders of an internal combustion engine, a group of parameter-identifier facet selectors corresponding to fuel injectors of the internal combustion engine, a group of parameter-identifier facet selectors corresponding to ignition coils of the internal combustion engine, or a group of parameter-identifier facet selectors corresponding to different banks of the internal combustion engine.

EEE A28 is the computing system of EEE A26, wherein the one or more groups of parameter-identifier facet selectors include a particular group of parameter-identifier facet selectors, and the particular group of parameter-identifier facet selectors includes multiple, particular parameter-identifier facet selectors corresponding to respective vehicle components distinguished, in part, using numerals based on a spatial arrangement of the vehicle components within the vehicle.

EEE A29 is the computing system of EEE A26, wherein the one or more groups of parameter-identifier facet selectors includes one or more of the following: a group of parameter-identifier facet selectors corresponding to cylinders of an internal combustion engine, a group of parameter-identifier facet selectors corresponding to a component of the internal combustion engine, or a group of parameter-identifier facet selectors corresponding to different banks of the internal combustion engine.

EEE A30 is the computing system of any one of EEE A1 to A29, wherein the non-transitory computer-readable memory includes a database including data associating each parameter-identifier of the first parameter-identifier group with one or more of a vehicle system, a vehicle sub-system, or a vehicle component.

EEE A31 is the computing system of any one of EEE A1 to A30, the non-transitory computer-readable memory includes a data map with multiple classes of data, and the multiple classes include two or more classes from among a set of classes including: a vehicle model year class, a vehicle make class, a vehicle model class, a vehicle system class, a vehicle sub-system class, a vehicle component class, a vehicle data message class, a parameter-identifier group class, a guided component test class, a units class, and a spatial class.

EEE A32 is the computing system of EEE A31, wherein: the first selection is indicative of a selection of data corresponding to one or more from among the vehicle model year class, the vehicle make class, the vehicle model class, the vehicle system class, the vehicle sub-system class, or the vehicle component class, the vehicle data message class includes a parameter-identifier message class, and the data model is arranged so that first particular data within the data model indicates the first vehicle component is related to the first vehicle sub-system, and that the first vehicle sub-system is related to the vehicle system.

EEE A33 is the computing system of any one of EEE A31 to A32, wherein the vehicle data message class includes a parameter-identifier message class, a functional test actuator class, or a functional test reset class.

EEE A34 is the computing system of any one of EEE A1 to A33, wherein the first selection is indicative of one or more from among: a vehicle model year, a vehicle make, a vehicle model, a vehicle system, a vehicle sub-system, a vehicle component, a vehicle symptom, or a diagnostic trouble code.

EEE A35 is the computing system of any one of EEE A1 to A34, wherein the functions further include: outputting, within the second graphical user interface a user-selectable control selectable to clear previously-received parameter values from the second graphical user interface and/or from a non-transitory computer-readable memory; and clearing previously-received parameter values from the second graphical user interface and/or from the non-transitory computer-readable memory.

EEE A36 is the computing system of any one of EEE A1 to A35, wherein the processor includes multiple processors.

EEE A37 is the computing system of any one of EEE A1 to A36, wherein one or more containers of the first set of containers or the second set of containers include line segments to define a boundary of each container of the one or more containers of the first set of containers or the second set of containers.

EEE A38 is the computing system of any one of EEE A1 to A36, wherein one or more containers of the first set of containers or the second set of containers use shading to define a boundary of each container of the one or more containers of the first set of containers or the second set of containers.

EEE A39 is the computing system any one of EEE A1 to A38, further comprising: a dongle configured to operatively couple the computing system to the vehicle to allow communication of vehicle data messages between the vehicle and the computing system.

EEE B1 is a method performed by computing system comprising a processor and a display, the method comprising: determining a first selection made using a first graphical user interface output on the display; outputting, on the display, a second graphical user interface based on the first selection, wherein: the second graphical user interface includes a first set of containers and a first parameter-identifier facet selector, the first set of containers includes a first container corresponding to a first parameter-identifier group, and the first container includes multiple sub-containers corresponding to a respective parameter-identifier; transmitting requests to a vehicle, each request including one or more parameter-identifiers within the first parameter-identifier group; outputting, within the second graphical user interface, parameter values received in response to a first portion of the requests, wherein each parameter value received in response to parameter-identifier group; determining a selection of the first parameter-identifier facet selector has occurred via the second graphical user interface; outputting, within the second graphical user interface in response to the selection of the first parameter-identifier facet selector, a second set of containers instead of the first set of containers, wherein: the second set of containers includes a container corresponding to a second parameter-identifier group different than the first parameter-identifier group, and the container corresponding to the second parameter-identifier group includes multiple sub-containers corresponding to a respective parameter-identifier; and outputting, within the second graphical user interface, parameter values received in response to a second portion of the requests, wherein each parameter value received in response to the second portion of the requests corresponds to one of the parameter-identifiers within the second parameter-identifier group.

EEE B2 is the method of EEE B1, further comprising: transmitting a diagnostic trouble code request to the vehicle, and receiving a diagnostic trouble code in response to the diagnostic trouble code request, wherein the first selection includes the received diagnostic trouble code, and wherein the first parameter-identifier group corresponds to the received diagnostic trouble code.

EEE B3 is the method of any one of EEE B1 to B2, wherein the first selection includes one or more from among: a selection of a vehicle system, a selection of a vehicle component, a selection of the first parameter-identifier group from among multiple parameter-identifier groups corresponding to the vehicle system, a selection of the first parameter-identifier group from among multiple parameter-identifier groups corresponding to the vehicle component, a selection of a symptom, or a selection of a diagnostic trouble code.

EEE B4 is the method of EEE B3, wherein the selection of the vehicle system includes a selection of multiple vehicle systems.

EEE B5 is the method of any one of EEE B3 to B4, wherein the selection of the vehicle component includes a selection of multiple vehicle components.

EEE B6 is the method of any one of EEE B3 to B5, wherein the selection of the system includes a selection of multiple symptoms.

EEE B7 is the method of any one of EEE B3 to B6, wherein the selection of the diagnostic trouble code includes a selection of multiple diagnostic trouble codes.

EEE B8 is the method of any one or EEE B1 to B7, further comprising: determining parameter values received for a particular parameter-identifier have breached a threshold corresponding to the particular parameter-identifier; determining the particular parameter-identifier corresponds to a PID facet corresponding to the first parameter-identifier facet selector; and highlighting, within the second graphical user interface, the first parameter-identifier facet selector.

EEE B9 is the method of any one of EEE B1 to B7, wherein the second graphical user interface includes one or more other parameter-identifier facet selectors, and wherein the method further includes: determining parameter values received for one or more parameter-identifiers within the first parameter-identifier group have breached a respective threshold corresponding to the one or more parameter-identifiers; determining the one or more parameter-identifiers correspond to a PID facet corresponding to the first parameter-identifier facet selector; and highlighting, within the second graphical user interface, the first parameter-identifier facet selector with respect to at least some of the one or more other parameter-identifier facet selectors.

EEE B10 is the method of EEE B9, further comprising: outputting, within each sub-container corresponding to the one or more parameter-identifiers within the first parameter-identifier group, an indicator that indicates whether a parameter value corresponding to the one or more parameter-identifiers within the first parameter-identifier group has breached the respective threshold corresponding to the one or more parameter-identifiers.

EEE B11 is the method of any one of EEE B9 to B10, further comprising: determining two or more parameter-identifier facet selectors are selected from the second graphical user interface, and modifying the second graphical user interface to include user-selectable controls for one or more functional tests or reset procedures corresponding to the selected parameter-identifier facet selectors and/or one or more guided component tests corresponding to the selected parameter-identifier facet selectors.

EEE B12 is the method of EEE B11, wherein the selected parameter-identifier facet selectors include one or more spatial parameter-identifier facet selectors.

EEE B13 is the method of EEE B12, wherein the one or more spatial parameter-identifier facet selectors include a parameter-identifier facet selector corresponding to one of the following positions: front, rear, left, right, top or bottom.

EEE B14 is the method of any one of EEE B11 to B13, further comprising: determining from mapping data corresponding to the two or more parameter-identifier facet selectors data indicative of parameter-identifiers and tests corresponding to each parameter-identifier facet selector of the two or more parameter-identifier facet selectors.

EEE B14 is the method of any one of EEE B11 to B13, wherein the selected parameter-identifier facet selectors include one or more measurement parameter-identifier facet selectors.

EEE B15 is the method of EEE B14, wherein the one or more measurement parameter-identifier facet selectors include a parameter-identifier facet selector corresponding to one of the following measurement: a voltage, a current, a percentage, a temperature, or a weight.

EEE B16 is the method of any one of EEE B11 to B15, wherein each user-selectable control of the user-selectable controls includes and/or is within a container and/or a sub-container.

EEE B17 is the method of any one of EEE B11 to B16, further comprising a test device configured to perform the one or more guided component tests.

EEE B18 is the methods of EEE B17, wherein the test device includes an oscilloscope.

EEE B19 is the methods of EEE B17, wherein the test device includes a meter configured to measurement one or more of a voltage, a current, or a resistance.

EEE B20 is the method of any one of EEE B1 to B7, wherein the second graphical user interface includes one or more other parameter-identifier facet selectors, wherein the method further comprises: determining two or more parameter-identifier facet selectors are selected from the second graphical user interface; determining from mapping data corresponding to the two or more parameter-identifier facet selectors data indicative of parameter-identifiers, functional tests, guided component tests, and/or reset procedures corresponding to each parameter-identifier facet selector of the two or more parameter-identifier facet selectors, determining parameter-identifiers, functional tests, guided component tests, and/or reset procedures to include in the second graphical user interface based on use of a Boolean function with respect to the data indicative of parameter-identifiers, functional tests, guided component tests, and/or reset procedures corresponding to each parameter-identifier facet selector of the two or more parameter-identifier facet selectors.

EEE B21 is the method of EEE B20, wherein the Boolean function is an AND function.

EEE B22 is the method of EEE B20, wherein the Boolean function is an OR function.

EEE B23 is the method of any one of EEE B1 to B22, wherein the second set of containers includes one or more other containers, wherein the one or more other containers include a particular sub-container corresponding to a functional test, a reset procedure, or a guided component test, and wherein the method further comprises: initiating, in response to a selection of the particular sub-container, a performance of the functional test, the reset procedure, or the guided component test, or outputting, in response to the selection of the particular sub-container, a user-selectable control selectable to initiate the performance of the functional test, the reset procedure, or the guided component test.

EEE B24 is the method of EEE B23, wherein the user-selectable control of includes and/or is within a container and/or a sub-container.

EEE B25 is the method of any one of EEE B1 to B24, wherein: the first set of containers includes one or more other containers, each of the one or more other containers corresponds to a respective parameter-identifier group other than the first parameter-identifier group, and each of the one or more other containers includes multiple sub-containers corresponding to a respective parameter-identifier within one of the respective parameter-identifier groups.

EEE B26 is the method of any one of EEE B1 to B25, wherein: the second graphical user interface includes one or more groups of parameter-identifier facet selectors, and the first parameter-identifier facet selector is contained within one of the one or more groups of parameter-identifier facet selectors.

EEE B27 is the method of EEE B26, wherein the one or more groups of parameter-identifier facet selectors includes one or more of the following: a group of parameter-identifier facet selectors corresponding to cylinders of an internal combustion engine, a group of parameter-identifier facet selectors corresponding to fuel injectors of the internal combustion engine, a group of parameter-identifier facet selectors corresponding to ignition coils of the internal combustion engine, or a group of parameter-identifier facet selectors corresponding to different banks of the internal combustion engine.

EEE B28 is the method of EEE B26, wherein the one or more groups of parameter-identifier facet selectors include a particular group of parameter-identifier facet selectors, and the particular group of parameter-identifier facet selectors includes multiple, particular parameter-identifier facet selectors corresponding to respective vehicle components distinguished, in part, using numerals based on a spatial arrangement of the vehicle components within the vehicle.

EEE B29 is the method of EEE B26, wherein the one or more groups of parameter-identifier facet selectors includes one or more of the following: a group of parameter-identifier facet selectors corresponding to cylinders of an internal combustion engine, a group of parameter-identifier facet selectors corresponding to a component of the internal combustion engine, or a group of parameter-identifier facet selectors corresponding to different banks of the internal combustion engine.

EEE B30 is the method of any one of EEE B1 to B29, wherein a non-transitory computer-readable memory of the computing system includes a database including data associating each parameter-identifier of the first parameter-identifier group with one or more of a vehicle system, a vehicle sub-system, or a vehicle component.

EEE B31 is the method of any one of EEE B1 to B30, wherein a non-transitory computer-readable memory of the computing system includes a data map with multiple classes of data, and the multiple classes include two or more classes from among a set of classes including: a vehicle model year class, a vehicle make class, a vehicle model class, a vehicle system class, a vehicle sub-system class, a vehicle component class, a vehicle data message class, a parameter-identifier group class, a guided component test class, a units class, and a spatial class.

EEE B32 is the method of EEE B31, wherein: the first selection is indicative of a selection of data corresponding to one or more from among the vehicle model year class, the vehicle make class, the vehicle model class, the vehicle system class, the vehicle sub-system class, or the vehicle component class, the vehicle data message class includes a parameter-identifier message class, and the data model is arranged so that first particular data within the data model indicates the first vehicle component is related to the first vehicle sub-system, and that the first vehicle sub-system is related to the vehicle system.

EEE B33 is the method of any one of EEE B31 to B32, wherein the vehicle data message class includes a parameter-identifier message class, a functional test actuator class, or a functional test reset class.

EEE B34 is the method of any one of EEE B1 to B33, wherein the first selection is indicative of one or more from among: a vehicle model year, a vehicle make, a vehicle model, a vehicle system, a vehicle sub-system, a vehicle component, a vehicle symptom, or a diagnostic trouble code.

EEE B35 is the method of any one of EEE B1 to B34, further comprising outputting, within the second graphical user interface a user-selectable control selectable to clear previously-received parameter values from the second graphical user interface and/or from a non-transitory computer-readable memory; and clearing previously-received parameter values from the second graphical user interface and/or from the non-transitory computer-readable memory.

EEE B36 is the method of any one of EEE B1 to B35, wherein the processor includes multiple processors.

EEE B37 is the method of any one of EEE B1 to B36, wherein one or more containers of the first set of containers or the second set of containers include line segments to define a boundary of each container of the one or more containers of the first set of containers or the second set of containers.

EEE B38 is the method of any one of EEE B1 to B36, wherein one or more containers of the first set of containers or the second set of containers use shading to define a boundary of each container of the one or more containers of the first set of containers or the second set of containers.

EEE B39 is the method any one of EEE B1 to B38, wherein the computing system further includes a dongle configured to operatively couple the computing system to the vehicle to allow communication of vehicle data messages between the vehicle and the computing system.

EEE B40 is the method of any one of EEE B11 to B19, further comprising: performing one or more from among: a functional test or reset procedure of the procedures corresponding to the selected parameter-identifier facet, or a component test of the one or more guided component tests.

EEE C1 is a non-transitory computer-readable memory having stored therein instructions executable by a processor to cause a computing system to perform functions comprising: determining a first selection made using a first graphical user interface output on a display; outputting, on the display, a second graphical user interface based on the first selection, wherein: the second graphical user interface includes a first set of containers and a first parameter-identifier facet selector, the first set of containers includes a first container corresponding to a first parameter-identifier group, and the first container includes multiple sub-containers corresponding to a respective parameter-identifier; transmitting requests to a vehicle, each request including one or more parameter-identifiers within the first parameter-identifier group; outputting, within the second graphical user interface, parameter values received in response to a first portion of the requests, wherein each parameter value received in response to the first portion of the requests corresponds to one of the parameter-identifiers within the first parameter-identifier group; determining a selection of the first parameter-identifier facet selector has occurred via the second graphical user interface; outputting, within the second graphical user interface in response to the selection of the first parameter-identifier facet selector, a second set of containers instead of the first set of containers, wherein: the second set of containers includes a container corresponding to a second parameter-identifier group different than the first parameter-identifier group, and the container corresponding to the second parameter-identifier group includes multiple sub-containers corresponding to a respective parameter-identifier; and outputting, within the second graphical user interface, parameter values received in response to a second portion of the requests, wherein each parameter value received in response to the second portion of the requests corresponds to one of the parameter-identifiers within the second parameter-identifier group.

EEE C2 is a non-transitory computer-readable memory having stored therein instructions executable by a processor to cause a computing system to perform functions in any one of EEE B1 to B40.

What is claimed is:

1. A computing system comprising:

a processor;

a display operatively coupled to the processor; and a non-transitory computer-readable memory containing instructions executable by the processor to perform functions comprising:

determining a first selection made using a first graphical user interface output on the display;

outputting, on the display, a second graphical user interface based on the first selection, wherein:

the second graphical user interface includes a first set of containers and a first parameter-identifier facet selector, the first set of containers includes a first container corresponding to a first parameter-identifier group, the first container corresponding to the first parameter-identifier group includes multiple sub-containers, each of those sub-containers corresponding to a respective parameter-identifier within the first parameter-identifier group, the first set of containers includes a second container having user-selectable controls selectable to perform or initiate performance of a first group of tests, and the first parameter-identifier group and the first group of tests correspond to the first selection;

transmitting requests to a vehicle, each request including one or more parameter-identifiers within the first parameter-identifier group or within a second parameter-identifier group different than the first parameter-identifier group;

outputting, within the second graphical user interface, parameter values received in response to a first portion of the requests, wherein each parameter value received in response to the first portion of the requests corresponds to one of the parameter-identifiers within the first parameter-identifier group;

determining a selection of the first parameter-identifier facet selector has occurred via the second graphical user interface;

outputting, within the second graphical user interface in response to the selection of the first parameter-identifier facet selector, a second set of containers instead of the first set of containers, wherein:

the second set of containers includes a first container corresponding to the second parameter-identifier group, the first container corresponding to the second parameter-identifier group includes multiple sub-containers, each of those sub-containers corresponding to a respective parameter-identifier within the second parameter-identifier group, the second set of containers includes a second container having user-selectable controls selectable to perform or initiate performance of a second group of tests different than the first group of tests, and the second parameter-identifier group and the second group of tests correspond to the first selection; and outputting, within the second graphical user interface, parameter values received in response to a second portion of the requests, wherein each parameter value received in response to the second portion of the requests corresponds to one of the parameter-identifiers within the second parameter-identifier group.

2. The computing system of claim 1, wherein the functions further include:

transmitting a diagnostic trouble code request to the vehicle, and receiving a diagnostic trouble code in response to the diagnostic trouble code request, wherein the first selection includes the received diagnostic trouble code, and wherein the first parameter-identifier group corresponds to the received diagnostic trouble code.

3. The computing system of claim 1, wherein the first selection includes one or more from among: a selection of a vehicle system, a selection of a vehicle component, a selection of the first parameter-identifier group from among multiple parameter-identifier groups corresponding to the vehicle system, a selection of the first parameter-identifier group from among multiple parameter-identifier groups corresponding to the vehicle component, a selection of a symptom, or a selection of a diagnostic trouble code.

4. The computing system of claim 1, wherein the second graphical user interface includes one or more other parameter-identifier facet selectors, and wherein the functions further include:

determining parameter values received for one or more parameter-identifiers within the first parameter-identifier group have breached a respective threshold corresponding to the one or more parameter-identifiers within the first parameter-identifier group;

determining the one or more parameter-identifiers within the first parameter-identifier group correspond to a parameter-identifier facet corresponding to the first parameter-identifier facet selector; and highlighting, within the second graphical user interface, the first parameter-identifier facet selector with respect to at least some of the one or more other parameter-identifier facet selectors.

5. The computing system of claim 4, wherein the functions further include:

outputting, within each sub-container corresponding to the one or more parameter-identifiers within the first parameter-identifier group, an indicator that indicates whether a parameter value corresponding to the one or more parameter-identifiers within the first parameter-identifier group has breached the respective threshold corresponding to the one or more parameter-identifiers within the first parameter-identifier group.

6. The computing system of claim 1, wherein:

the first set of containers includes one or more other containers, each of the one or more other containers corresponds to a respective parameter-identifier group other than the first parameter-identifier group, and each of the one or more other containers includes multiple sub-containers corresponding to a respective parameter-identifier within the respective parameter-identifier group.

7. The computing system of claim 1, wherein:

the second graphical user interface includes one or more groups of parameter-identifier facet selectors, and the first parameter-identifier facet selector is contained within one of the one or more groups of parameter-identifier facet selectors.

8. The computing system of claim 7, wherein the one or more groups of parameter-identifier facet selectors includes one or more of the following:

a group of parameter-identifier facet selectors corresponding to cylinders of an internal combustion engine, a group of parameter-identifier facet selectors corresponding to a component of the internal combustion engine, or a group of parameter-identifier facet selectors corresponding to different banks of the internal combustion engine.

9. The computing system of claim 7, wherein:

the one or more groups of parameter-identifier facet selectors include a particular group of parameter-identifier facet selectors, and the particular group of parameter-identifier facet selectors includes multiple, particular parameter-identifier facet selectors corresponding to respective vehicle components distinguished, in part, using numerals based on a spatial arrangement of the vehicle components within the vehicle.

10. The computing system of claim 1, wherein the non-transitory computer-readable memory includes a database including data associating each parameter-identifier of the first parameter-identifier group with one or more of a vehicle system, a vehicle sub-system, a vehicle component, a vehicle data message protocol, a units class, and/or a spatial class.

11. The computing system of claim 1, wherein:

the non-transitory computer-readable memory includes a data map with multiple classes of data, and the multiple classes include two or more classes from among a set of classes including:

a vehicle model year class,
a vehicle make class,
a vehicle model class,
a vehicle system class,
a vehicle sub-system class,
a vehicle component class,
a vehicle data message class,
a parameter-identifier group class,
a guided component test class,
a units class, and
a spatial class.

12. The computing system of claim 11, wherein:

the first selection is indicative of a selection of data corresponding to one or more from among the vehicle model year class, the vehicle make class, the vehicle model class, the vehicle system class, the vehicle sub-system class, or the vehicle component class, the vehicle data message class includes a parameter-identifier message class, and the data map is arranged so that first particular data within the data map indicates: (i) a first vehicle component is related to a first vehicle sub-system, and the first vehicle sub-system is related to a first vehicle system, or (ii) the first vehicle component is related to the first vehicle system.

13. The computing system of claim 11, wherein the vehicle data message class includes a parameter-identifier message class, a functional test actuator class, or a functional test reset class.

14. The computing system of claim 1, wherein the first selection is indicative of one or more from among: a vehicle model year, a vehicle make, a vehicle model, a vehicle system, a vehicle sub-system, a vehicle component, a vehicle symptom, or a diagnostic trouble code.

15. The computing system of claim 1, wherein the functions further include:

outputting, within the second graphical user interface a user-selectable control selectable to clear previously-received parameter values from the second graphical user interface and/or from the non-transitory computer-readable memory; and clearing previously-received parameter values from the second graphical user interface and/or from the non-transitory computer-readable memory.

16. The computing system of claim 1, wherein transmitting the requests to the vehicle includes transmitting to the vehicle at least one vehicle data message using a first vehicle data message protocol and at least one vehicle data message using a second vehicle data message protocol different than the first vehicle data message protocol.

17. The computing system of claim 1, further comprising: a dongle configured to operatively couple the computing system to the vehicle to allow communication of vehicle data messages between the vehicle and the computing system.

18. The computing system of claim 1, wherein the first group of tests and the second group of tests comprise functional tests, reset procedures, or guided component tests.

19. The computing system of claim 1, wherein:

the first set of containers includes a third container corresponding to a third parameter-identifier group, the third container includes multiple sub-containers, each of those sub-containers corresponding to a respective parameter-identifier for inclusion in a request to the vehicle to obtain parameter values, the first container of the first set of containers and parameter-identifiers of the first parameter-identifier group correspond to a first system or component within the vehicle, and the third container of the first set of containers and parameter-identifiers of the third parameter-identifier group correspond to a second system or component within the vehicle, and the first system or component differs from the second system or component.

20. The computing system of claim 19, wherein:

a parameter-identifier within the first parameter-identifier group and a parameter-identifier within the third parameter-identifier group both indicate an identical operating parameter of the vehicle.

21. The computing system of claim 20, wherein the functions further include:

transmitting a first request to the vehicle to obtain a parameter value corresponding to the parameter-identifier within the first parameter-identifier group; and transmitting a second request to the vehicle to obtain a parameter value corresponding to the parameter-identifier within the third parameter-identifier group.

22. A method comprising:

determining a first selection made using a first graphical user interface output on a display;

outputting, on the display, a second graphical user interface based on the first selection, wherein:

the second graphical user interface includes a first set of containers and a first parameter-identifier facet selector, the first set of containers includes a first container corresponding to a first parameter-identifier group, the first container corresponding to the first parameter-identifier group includes multiple sub-containers, each of those sub-containers corresponding to a respective parameter-identifier within the first parameter-identifier group, the first set of containers includes a second container having user-selectable controls selectable to perform or initiate performance of a first group of tests, and the first parameter-identifier group and the first group of tests correspond to the first selection;

transmitting requests to a vehicle, each request including one or more parameter-identifiers within the first parameter-identifier group or within a second parameter-identifier group different than the first parameter-identifier group;

outputting, within the second graphical user interface, parameter values received in response to a first portion of the requests, wherein each parameter value received in response to the first portion of the requests corresponds to one of the parameter-identifiers within the first parameter-identifier group;

determining a selection of the first parameter-identifier facet selector has occurred via the second graphical user interface;

outputting, within the second graphical user interface in response to the selection of the first parameter-identifier facet selector, a second set of containers instead of the first set of containers, wherein:

the second set of containers includes a first container corresponding to the second parameter-identifier group, the first container corresponding to the second parameter-identifier group includes multiple sub-containers, each of those sub-containers corresponding to a respective parameter-identifier within the second parameter-identifier group, the second set of containers includes a second container having user-selectable controls selectable to perform or initiate performance of a second group of tests different than the first group of tests, and the second parameter-identifier group and the second group of tests correspond to the first selection; and outputting, within the second graphical user interface, parameter values received in response to a second portion of the requests, wherein each parameter value received in response to the second portion of the requests corresponds to one of the parameter-identifiers within the second parameter-identifier group.

23. A non-transitory computer-readable memory having stored therein instructions executable by a processor to cause a computing system to perform functions comprising:

determining a first selection made using a first graphical user interface output on a display;

outputting, on the display, a second graphical user interface based on the first selection, wherein:

the second graphical user interface includes a first set of containers and a first parameter-identifier facet selector, the first set of containers includes a first container corresponding to a first parameter-identifier group, the first container corresponding to the first parameter-identifier group includes multiple sub-containers, each of those sub-containers corresponding to a respective parameter-identifier within the first parameter-identifier group, the first set of containers includes a second container having user-selectable controls selectable to perform or initiate performance of a first group of tests, and the first parameter-identifier group and the first group of tests correspond to the first selection;

transmitting requests to a vehicle, each request including one or more parameter-identifiers within the first parameter-identifier group or within a second parameter-identifier group different than the first parameter-identifier group;

outputting, within the second graphical user interface, parameter values received in response to a first portion of the requests, wherein each parameter value received in response to the first portion of the requests corresponds to one of the parameter-identifiers within the first parameter-identifier group;

determining a selection of the first parameter-identifier facet selector has occurred via the second graphical user interface;

outputting, within the second graphical user interface in response to the selection of the first parameter-identifier facet selector, a second set of containers instead of the first set of containers, wherein:

the second set of containers includes a first container corresponding to the second parameter-identifier group, the first container corresponding to the second parameter-identifier group includes multiple sub-containers, each of those sub-containers corresponding to a respective parameter-identifier within the second parameter-identifier group, the second set of containers includes a second container having user-selectable controls selectable to perform or initiate performance of a second group of tests different than the first group of tests, and the second parameter-identifier group and the second group of tests correspond to the first selection; and outputting, within the second graphical user interface, parameter values received in response to a second portion of the requests, wherein each parameter value received in response to the second portion of the requests corresponds to one of the parameter-identifiers within the second parameter-identifier group.

* * * * *